US011087252B2

(12) United States Patent
DaCosta et al.

(10) Patent No.: US 11,087,252 B2
(45) Date of Patent: *Aug. 10, 2021

(54) INTERACTIVE REAL TIME SYSTEM AND REAL TIME METHOD OF USE THEREOF IN CONVEYANCE INDUSTRY SEGMENTS

(71) Applicant: TELEPORT MOBILITY, INC., San Diego, CA (US)

(72) Inventors: Alexis DaCosta, Santa Clara, CA (US); Vince Coletti, San Marcos, CA (US)

(73) Assignee: TELEPORT MOBILITY, INC., San Diego, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/038,487

(22) Filed: Jul. 18, 2018

(65) Prior Publication Data

US 2018/0336510 A1 Nov. 22, 2018

Related U.S. Application Data

(60) Continuation-in-part of application No. 15/680,439, filed on Aug. 18, 2017, which is a division of application No. 15/675,757, filed on Aug. 13, 2017.

(Continued)

(51) Int. Cl.
*G06Q 10/06* (2012.01)
*G08G 1/127* (2006.01)
(Continued)

(52) U.S. Cl.
CPC ... *G06Q 10/063114* (2013.01); *G01C 21/343* (2013.01); *G05D 1/00* (2013.01);
(Continued)

(58) Field of Classification Search
CPC combination set(s) only.
See application file for complete search history.

(56) References Cited

U.S. PATENT DOCUMENTS 6,182,010 B1   1/2001   Berstis ........................ 701/211
6,297,748 B1  10/2001   Lappenbusch et al. ...... 340/905
(Continued)

FOREIGN PATENT DOCUMENTS

CA        2782611 A1    6/2011
CN      105894099 A     8/2016
(Continued)

OTHER PUBLICATIONS

Greenwood et al., "Dynamic Dispatching and Transport Optimization—Real-World Experience with Perspectives on Pervasive Technology Integration," 2009 42nd Hawaii International Conference on System Sciences, 2009, pp. 1-9, doi: 10.1109/HICSS.2009.168. (Year: 2009).*

(Continued)

*Primary Examiner* — Crystol Stewart
(74) *Attorney, Agent, or Firm* — Eleanor Musick; Musick Davison LLP

(57) ABSTRACT

The present invention recognizes that there is a long felt need for more efficient systems in the interactive conveyance industry for goods and services. A first aspect of the present invention generally relates to an interactive real time system in the conveyance and other industries. A second aspect of the present invention generally relates to a real time method of use of the interactive system of the present invention.

80 Claims, 11 Drawing Sheets

Related U.S. Application Data

(60) Provisional application No. 62/539,706, filed on Aug. 1, 2017, provisional application No. 62/482,306, filed on Apr. 6, 2017, provisional application No. 62/426,549, filed on Nov. 27, 2016, provisional application No. 62/375,491, filed on Aug. 16, 2016.

(51) Int. Cl.

| | | |
|---|---|---|
| *G06F 16/2457* | (2019.01) | |
| *G05D 1/00* | (2006.01) | |
| *G06Q 10/02* | (2012.01) | |
| *G08G 1/123* | (2006.01) | |
| *G06Q 50/30* | (2012.01) | |
| *G06Q 10/08* | (2012.01) | |
| *B60W 60/00* | (2020.01) | |
| *G06Q 30/06* | (2012.01) | |
| *G01C 21/34* | (2006.01) | |
| *G08G 1/00* | (2006.01) | |
| *G06Q 50/32* | (2012.01) | |
| *G06F 3/0485* | (2013.01) | |
| *G06F 16/248* | (2019.01) | |

(52) U.S. Cl.
 CPC ....... *G06F 16/24578* (2019.01); *G06Q 10/02* (2013.01); *G06Q 10/06316* (2013.01); *G06Q 10/063112* (2013.01); *G06Q 30/0633* (2013.01); *G08G 1/123* (2013.01); *G08G 1/127* (2013.01); *B60W 60/00253* (2020.02); *G01C 21/34* (2013.01); *G06F 3/0485* (2013.01); *G06F 16/248* (2019.01); *G06Q 10/0833* (2013.01); *G06Q 50/30* (2013.01); *G06Q 50/32* (2013.01); *G08G 1/202* (2013.01)

(56) References Cited

U.S. PATENT DOCUMENTS

| | | | |
|---|---|---|---|
| 6,356,838 B1 | 3/2002 | Paul | |
| 7,561,069 B2 | 7/2009 | Horstemeyer | |
| 7,840,427 B2 | 11/2010 | O'Sullivan | |
| 7,894,984 B2 | 2/2011 | Rasmussen et al. | 701/208 |
| 7,920,967 B1 | 4/2011 | Harris et al. | |
| 7,941,267 B2 | 5/2011 | Adamczyk et al. | |
| 8,005,488 B2 | 8/2011 | Staffaroni et al. | |
| 8,244,594 B2 | 8/2012 | Barron et al. | |
| 8,285,570 B2 | 10/2012 | Meyer et al. | |
| 8,510,043 B1 | 8/2013 | Whiton et al. | |
| 8,630,791 B2 | 1/2014 | Yuasa | |
| 8,635,012 B2 | 1/2014 | O'Sullivan et al. | |
| 8,688,532 B2 | 4/2014 | Khunger et al. | 705/26.1 |
| 8,768,565 B2 | 7/2014 | Jefferies et al. | |
| 9,007,238 B2 | 4/2015 | Whiton et al. | |
| 9,014,876 B2 | 4/2015 | Mason et al. | |
| 9,026,367 B2 | 5/2015 | Paek et al. | |
| 9,026,454 B2 | 5/2015 | Hinrichs et al. | |
| 9,058,703 B2 | 6/2015 | Ricci | |
| 9,066,206 B2 | 6/2015 | Lin et al. | H04W 4/023 |
| 9,068,852 B2 | 6/2015 | Mason et al. | |
| 9,157,748 B2 | 10/2015 | Millspaugh | G01C 21/20 |
| 9,164,507 B2 | 10/2015 | Cheatham et al. | |
| 9,256,852 B1 | 2/2016 | Myllymaki | |
| 9,364,178 B2 | 6/2016 | Duncan et al. | |
| 9,368,026 B1 | 6/2016 | Herbach et al. | |
| 9,424,515 B2 | 8/2016 | Atlas | |
| 9,436,182 B2 | 9/2016 | Nemec et al. | |
| 9,459,622 B2 | 10/2016 | Abhyanker | |
| 9,488,484 B2 | 11/2016 | Lord et al. | |
| 9,534,913 B2 | 1/2017 | Newlin et al. | |
| 9,552,564 B1 | 1/2017 | Martenis | |
| 9,557,183 B1 | 1/2017 | Ross et al. | G01C 21/34 |
| 9,558,469 B2 | 1/2017 | Lord et al. | |
| 9,562,785 B1 | 2/2017 | Racah et al. | |
| 9,569,740 B2 | 2/2017 | Lord et al. | |
| 9,581,455 B2 | 2/2017 | Lord et al. | |
| 9,606,539 B1 | 3/2017 | Kentley et al. | |
| 9,613,386 B1 | 4/2017 | Arden et al. | |
| 9,619,776 B1 | 4/2017 | Lord et al. | |
| 9,625,906 B2 | 4/2017 | Meuleau et al. | |
| 9,632,502 B1 | 4/2017 | Levinson et al. | |
| 9,646,356 B1 | 5/2017 | Schwie et al. | |
| 9,665,101 B1 | 5/2017 | Templeton | |
| 9,671,233 B2 | 6/2017 | Holden et al. | G01C 21/30 |
| 9,679,489 B2 | 6/2017 | Lambert et al. | G08G 1/202 |
| 9,684,914 B1 | 6/2017 | Porter et al. | |
| 9,689,694 B2 | 6/2017 | Lord et al. | |
| 9,706,367 B2 | 7/2017 | Tao et al. | |
| 9,715,378 B2 | 7/2017 | Dickerson et al. | |
| 9,716,565 B2 | 7/2017 | Mandeville-Clarke et al. | |
| 9,718,397 B2 | 8/2017 | Kalanick et al. | |
| 9,726,506 B2 | 8/2017 | O'Beirne et al. | |
| 9,741,010 B1 | 8/2017 | Heinla | |
| 9,743,239 B1 | 8/2017 | Mishra | |
| 9,754,490 B2 | 9/2017 | Kentley et al. | |
| 9,769,616 B1 | 9/2017 | Pao et al. | |
| 9,776,512 B2 | 10/2017 | Netzer | |
| 9,778,057 B2 | 10/2017 | O'Mahony et al. | |
| 9,778,060 B2 | 10/2017 | Cheng | |
| 9,786,187 B1 | 10/2017 | Bar-Zeev et al. | |
| 9,805,519 B2 | 10/2017 | Ramanujam | |
| 9,805,605 B2 | 10/2017 | Ramanujam | |
| 9,811,086 B1 | 11/2017 | Poeppel et al. | |
| 9,813,510 B1 | 11/2017 | Nickels et al. | |
| 9,857,188 B1 | 1/2018 | O'Hare et al. | |
| 9,857,190 B2 | 1/2018 | Marueli et al. | |
| 9,886,671 B2 | 2/2018 | Lord et al. | |
| 9,898,791 B1 | 2/2018 | Stumpf et al. | |
| 9,904,900 B2 | 2/2018 | Cao | |
| 10,055,995 B2 | 8/2018 | Marco et al. | |
| D832,304 S | 10/2018 | Whatman et al. | |
| 10,104,605 B1 | 10/2018 | Parshin et al. | |
| 10,168,164 B2 | 1/2019 | Shelby et al. | |
| 10,227,178 B2 | 3/2019 | High et al. | |
| 10,345,117 B2 | 7/2019 | O'Beirne et al. | |
| 10,349,223 B1 | 7/2019 | Yoo et al. | |
| 10,365,783 B2 | 7/2019 | Bowden et al. | |
| 10,387,791 B2 | 8/2019 | Dukatz et al. | |
| 10,460,411 B2 | 10/2019 | Liu | |
| 10,467,554 B2 | 11/2019 | Yoo et al. | |
| 10,504,258 B2 | 12/2019 | Okumura | |
| 10,628,758 B2 * | 4/2020 | Ikeda | G06Q 10/02 |
| 2004/0143466 A1 * | 7/2004 | Smith | G08G 1/20 705/6 |
| 2009/0248587 A1 * | 10/2009 | Van Buskirk | G06Q 10/063112 705/80 |
| 2009/0319096 A1 | 12/2009 | Offer et al. | |
| 2010/0280884 A1 | 11/2010 | Levine et al. | |
| 2010/0312591 A1 | 12/2010 | Wu | |
| 2011/0055046 A1 | 3/2011 | Bowen et al. | |
| 2011/0153629 A1 * | 6/2011 | Lehmann | G06Q 30/06 707/758 |
| 2013/0096827 A1 | 4/2013 | McCall et al. | |
| 2013/0103313 A1 | 4/2013 | Moore et al. | |
| 2013/0132140 A1 | 5/2013 | Amin et al. | |
| 2014/0026065 A1 * | 1/2014 | Wang | G06Q 10/02 715/744 |
| 2014/0039784 A1 * | 2/2014 | Millspaugh | G08G 1/202 701/300 |
| 2014/0040079 A1 * | 2/2014 | Smirin | G06F 3/0482 705/27.1 |
| 2014/0046585 A1 | 2/2014 | Morris et al. | |
| 2014/0148970 A1 | 5/2014 | Dufford et al. | |
| 2014/0173511 A1 | 6/2014 | Lehmann et al. | |
| 2014/0229258 A1 * | 8/2014 | Seriani | G06Q 50/30 705/14.23 |
| 2014/0309876 A1 | 10/2014 | Ricci | |
| 2014/0365268 A1 * | 12/2014 | Masterlark | G06F 11/1474 705/7.28 |
| 2015/0066361 A1 * | 3/2015 | Stenneth | G06Q 10/047 701/465 |
| 2015/0161564 A1 | 6/2015 | Sweeney et al. | |

(56) References Cited

U.S. PATENT DOCUMENTS

| | | | |
|---|---|---|---|
| 2015/0161752 A1 | 6/2015 | Barreto et al. | G06Q 50/30 |
| 2015/0185034 A1 | 7/2015 | Abhyanker | |
| 2015/0206267 A1 | 7/2015 | Khanna et al. | |
| 2015/0281387 A1 | 10/2015 | Barreto | |
| 2015/0294566 A1* | 10/2015 | Huang | G08G 1/133 |
| | | | 701/41 |
| 2015/0323333 A1 | 11/2015 | Lord et al. | |
| 2015/0324708 A1 | 11/2015 | Skipp et al. | |
| 2015/0325128 A1 | 11/2015 | Lord et al. | |
| 2015/0338852 A1 | 11/2015 | Ramanujam | |
| 2015/0339928 A1 | 11/2015 | Ramanujam | G08G 1/202 |
| 2015/0356703 A1 | 12/2015 | Ellis et al. | |
| 2016/0034845 A1 | 2/2016 | Hiyama et al. | |
| | | | G06Q 10/036114 |
| 2016/0104110 A1 | 4/2016 | Jones et al. | |
| 2016/0110836 A1 | 4/2016 | Garg et al. | |
| 2016/0138928 A1 | 5/2016 | Guo et al. | |
| 2016/0171637 A1 | 6/2016 | Rai | |
| 2016/0187150 A1 | 6/2016 | Sherman et al. | |
| 2016/0231129 A1 | 8/2016 | Erez et al. | |
| 2016/0247106 A1 | 8/2016 | Dalloro et al. | |
| 2016/0298977 A1 | 10/2016 | Newlin et al. | |
| 2016/0321771 A1 | 11/2016 | Liu et al. | |
| 2016/0334232 A1 | 11/2016 | Zhuang | |
| 2016/0334797 A1* | 11/2016 | Ross | G06Q 10/08 |
| 2016/0356615 A1 | 12/2016 | Arata et al. | |
| 2016/0356624 A1 | 12/2016 | O'Beirne et al. | |
| 2016/0364679 A1 | 12/2016 | Cao | |
| 2016/0364812 A1 | 12/2016 | Cao | |
| 2016/0364823 A1 | 12/2016 | Cao | |
| 2017/0011324 A1* | 1/2017 | Truong | G06Q 50/32 |
| 2017/0024393 A1 | 1/2017 | Choksi et al. | G06F 17/3053 |
| 2017/0038948 A1 | 2/2017 | Cun et al. | |
| 2017/0059336 A1* | 3/2017 | Huang | G01C 21/343 |
| 2017/0059347 A1 | 3/2017 | Flier et al. | |
| 2017/0083957 A1 | 3/2017 | Ross et al. | |
| 2017/0091856 A1 | 3/2017 | Canberk et al. | |
| 2017/0098224 A1 | 4/2017 | Marco et al. | |
| 2017/0102243 A1 | 4/2017 | Samocha et al. | |
| 2017/0115125 A1 | 4/2017 | Outwater et al. | |
| 2017/0123421 A1 | 5/2017 | Kentley et al. | |
| 2017/0123422 A1 | 5/2017 | Kentley et al. | |
| 2017/0123429 A1 | 5/2017 | Levinson et al. | |
| 2017/0124205 A1* | 5/2017 | Shaam | G06F 16/24552 |
| 2017/0126810 A1 | 5/2017 | Kentley et al. | |
| 2017/0138749 A1 | 5/2017 | Pan et al. | G01C 21/3438 |
| 2017/0141873 A1 | 5/2017 | Mandeville-Clarke et al. | |
| 2017/0147959 A1* | 5/2017 | Sweeney | G07C 5/008 |
| 2017/0163398 A1 | 6/2017 | Ross et al. | |
| 2017/0169366 A1 | 6/2017 | Klein et al. | |
| 2017/0176989 A1 | 6/2017 | Hay et al. | |
| 2017/0187787 A1 | 6/2017 | Syamala et al. | |
| 2017/0192428 A1 | 7/2017 | Vogt et al. | |
| 2017/0192437 A1 | 7/2017 | Bier et al. | |
| 2017/0193419 A1 | 7/2017 | Haparnas et al. | |
| | | | G06Q 10/06398 |
| 2017/0193627 A1 | 7/2017 | Urmson et al. | |
| 2017/0200321 A1 | 7/2017 | Hummel et al. | |
| 2017/0212525 A1 | 7/2017 | Wang et al. | |
| 2017/0213308 A1 | 7/2017 | Wellborn et al. | |
| 2017/0220045 A1 | 8/2017 | Templeton | |
| 2017/0227370 A1 | 8/2017 | O'Mahony et al. | |
| 2017/0234687 A1 | 8/2017 | Tseng et al. | |
| 2017/0132934 A1 | 9/2017 | Kentley et al. | |
| 2017/0265040 A1 | 9/2017 | Friedlander et al. | |
| 2017/0262790 A1 | 10/2017 | Khasis | |
| 2017/0285642 A1 | 10/2017 | Rander | |
| 2017/0293991 A1 | 10/2017 | High et al. | |
| 2017/0313323 A1 | 11/2017 | Tseng et al. | |
| 2017/0277191 A1 | 12/2017 | Fairfield et al. | |
| 2017/0351987 A1 | 12/2017 | Liu | |
| 2017/0352125 A1 | 12/2017 | Dicker et al. | |
| 2018/0004202 A1 | 1/2018 | Onaga et al. | |
| 2018/0004211 A1 | 1/2018 | Grimm et al. | |
| 2018/0004224 A1 | 1/2018 | Arndt et al. | |
| 2018/0015801 A1 | 1/2018 | Mohamed et al. | |
| 2018/0024552 A1 | 1/2018 | She | |
| 2018/0024554 A1* | 1/2018 | Brady | G06Q 10/08 |
| | | | 701/23 |
| 2018/0025298 A1 | 1/2018 | Baggott et al. | |
| 2018/0033058 A1* | 2/2018 | Mukherjee | H04L 67/306 |
| 2018/0039917 A1 | 2/2018 | Buttolo et al. | |
| 2018/0059663 A1 | 3/2018 | Yako et al. | |
| 2018/0060813 A1 | 3/2018 | Ford | |
| 2018/0060827 A1 | 3/2018 | Abbas et al. | |
| 2018/0074494 A1 | 3/2018 | Myers et al. | |
| 2018/0087918 A1 | 3/2018 | Yamashita et al. | |
| 2018/0089786 A1 | 3/2018 | Shi et al. | |
| 2018/0100747 A1 | 4/2018 | Greenwood et al. | |
| 2018/0101170 A1 | 4/2018 | Cawley et al. | |
| 2018/0101179 A1 | 4/2018 | Louey et al. | |
| 2018/0075754 A1 | 8/2018 | Salter et al. | |
| 2018/0245942 A1 | 8/2018 | Scarr et al. | |
| 2018/0276863 A1 | 9/2018 | Nerurkar et al. | |
| 2018/0074495 A1 | 10/2018 | Myers et al. | |
| 2018/0356821 A1 | 12/2018 | Kentley-Klay et al. | |
| 2018/0374182 A1 | 12/2018 | Khanna et al. | |
| 2019/0033883 A1 | 1/2019 | Ferguson et al. | |
| 2019/0094032 A1 | 3/2019 | Shelby et al. | |
| 2019/0129413 A1 | 5/2019 | Chamberlain et al. | |
| 2019/0204110 A1 | 7/2019 | Dubielzyk et al. | |
| 2019/0293447 A1 | 9/2019 | O'Beirne et al. | |

FOREIGN PATENT DOCUMENTS

| | | | |
|---|---|---|---|
| EP | 2507753 A4 | 10/2012 | |
| EP | 3183707 A1 | 6/2017 | |
| WO | WO2015160782 A1 | 10/2015 | |
| WO | WO2017053047 A1 | 3/2017 | |
| WO | WO2017064202 A1 | 4/2017 | |
| WO | WO2017079222 A1 | 5/2017 | |
| WO | WO2017156586 A1 | 9/2017 | |
| WO | WO2017172415 A1 | 10/2017 | |
| WO | WO2017173209 A1 | 10/2017 | |
| WO | WO2017145171 A3 | 11/2017 | |
| WO | WO2018071127 A1 | 4/2018 | |
| WO | WO2019018695 A1 | 1/2019 | |
| WO | WO2019027715 A1 | 2/2019 | |
| WO | WO2019027718 A1 | 2/2019 | |
| WO | WO2019118827 A1 | 6/2019 | |
| WO | WO2019204783 A1 | 10/2019 | |

OTHER PUBLICATIONS

"Why you'll love the new Apple CarPlay Features in iOS for iPhone 5/6/SE," from Auto Connected Car News, Jul. 3, 2016.

"Mapping a new course with smartphone apps," The Mercury News, Sep. 14, 2016.

"Catch a Ride with Lyft or Uber Straight from Apple Maps in iOS 11," from ios.gadgethacks.com, Oct. 6, 2017.

"Uber's Sire and Apple Maps Integrations Have Disappeared," from macrumors.com, Jan. 31, 2018.

"Google unveils ride-sharing price comparison tool," from businessinsider.com, obtained Aug. 18, 2018.

"Our Driver App Functionality," Materials from Uber from sec.gov, S-1 SEC Filing of Apr. 11, 2019.

"Uber Freight," Materials from Uber from sec.gov, S-1 SEC Filing of Apr. 11, 2019.

"Personal Mobility," Materials from Uber from sec.gov, S-1 SEC filing of Apr. 11, 2019.

PCT Search and Examination Reports for PCT/US18/43359, dated Oct. 16, 2018.

PCT Search and Examination Reports for PCT/US18/43363, dated Oct. 15, 2018.

* cited by examiner

INTERACTIVE REAL TIME SYSTEM AND REAL TIME METHOD OF USE THEREOF IN CONVEYANCE INDUSTRY SEGMENTS

RELATED APPLICATIONS AND/OR PRIORITY STATEMENT

The present application is a Continuation-in-Part of U.S. Utility application Ser. No. 15/680,439, filed Aug. 18, 2017, which is a Divisional application of U.S. Utility application Ser. No. 15/675,757, filed Aug. 13, 2017, which claims benefit of priority to U.S. Provisional Application Ser. No. 62/375,491 filed Aug. 16, 2016, U.S. Provisional Application Ser. No. 62/426,549 filed Nov. 27, 2016, U.S. Provisional Application Ser. No. 62/482,306 filed Apr. 6, 2017, and U.S. Provisional Application Ser. No. 62/539,706 filed Aug. 1, 2017, each of which are incorporated by reference herein in their entirety for all purposes.

TECHNICAL FIELD

The present invention relates generally to the fields of interactive real time systems and real lime methods of use in the conveyance industry segments.

BACKGROUND

As in any new industry or industry segment, when created, there are typically multiple inefficiencies in the related systems and methods due to there not being enough data or knowledge on how to optimize these systems and methods ahead of time. These inefficiencies are typically identified over time through trial and error, which leads to technological advancement in the field. The same can be said about the conveyance industry and many of the new conveyance industry segments including but not limited to the ride-hail industry segment, rideshare industry segment, good delivery industry segment, and courier industry segment.

The current inefficient systems and methods available in the conveyance industry segments lead to disadvantages for the companies or entities themselves, hereinafter referred to as service providers, as well as the representatives carrying out the services for the service providers. Also, currently there are difficulties and challenges to efficiently utilize, dispatch, and/or provide or perform conveyance services using autonomous vehicles for both service providers and owners or controllers of autonomous vehicles.

The problems relating to the current systems and methods used in the conveyance industry segments are rooted in computer technology and tied to the fact that the modern conveyance industry segments operate and change drastically in real time or near real time. Conveyance industry segments are real time or near real time environments in that conveyance service requests are available one second and gone the next second. In the real time or near real time conveyance industry segments, a representative cannot procure all or most of the real time or near real time information and analyze or evaluate this information accurately to make a well-informed decision on the fly. There is currently no real time or near real time system or real time or near real time method that can assist a representative with this type of analysis. This lack of a real time or near real time system or real time or near real time method leads to a representative securing or obtaining a suboptimal, one-size-fits-all conveyance service request due to the inability to apply their own preferences.

Currently, a representative obtaining a ride service request in the ride-hail industry segment, can have very different ride options, prices, wait times, and times to destination depending on which service provider a given conveyance service request is from and when the conveyance service request is secured or obtained. However, a representative is only given one conveyance service request from only one service provider to accept or decline. Currently, there is a poor system and method to dispatch or assign representatives to conveyance service requests. Thus, there exists a need that the present invention addresses.

The current systems and methods for a representative to analyze or evaluate incoming conveyance service requests are very difficult and time consuming in the fast-paced, real time or near real time environment of conveyance industry segments. The current technology does not permit a representative to analyze or evaluate and then secure or obtain conveyance service requests that the representative would prefer based on their individual preferences. Representatives are currently given a single conveyance service request and only have the option to accept or decline that specific conveyance service request without an alternative. Generally, any details of a conveyance service request a representative is securing or obtaining are not provided ahead of time, but are only revealed after that conveyance service request is secured or obtained. A representative must choose to either secure or obtain a conveyance service request without knowing any of the details of the conveyance service to be provided or choose not to work at all.

Furthermore, a representative is penalized for canceling a conveyance service request the representative does not wish to fulfill even though the representative likely never would have secured or obtained that conveyance service request in the first place had the representative been given a choice. This disadvantage among others, has led to the common practice of representatives working for more than one service provider at the same time to give the representatives some semblance of choice. However, that method of analyzing or evaluating is a very laborious and time consuming process which is not useful or practical in the real time or near real time environment of conveyance industry segments.

To analyze or evaluate conveyance service requests, a representative would need to login to multiple applications from different service providers and navigate between these applications, viewing one individual conveyance service request per application. Analyzing or evaluating conveyance service requests in such a way takes a lot of time and can cause a representative to miss conveyance service requests that the representative would consider as preferred due to the real time or near real time environment. Currently there is no system or method that a representative can use as a tool to analyze or evaluate conveyance service requests in real time or near real time.

A representative is currently not able to analyze or evaluate conveyance service requests from more than one service provider in real time or near real time given conventional systems and methods, which is a frustrating hindrance when every other aspect of conveyance industry segments operates in real time or near real time. With no way to analyze or evaluate conveyance service requests continuously in real time or near real time, a representative currently is not able to maximize their profit or work as efficiently as they would like, as the representative is forced to secure or obtain less preferred conveyance service requests. To secure or obtain a preferred conveyance service request, a representative may have to wait and pass up less preferred conveyance service requests for a more preferred conveyance service request to become available to them, as representatives are only provided one conveyance service request at a time. A representative wishing to work more efficiently is not able to do so given the current limitations of the systems and methods in the conveyance industry segments.

There is also currently no system or method to analyze or evaluate and secure or obtain conveyance service requests in real time or near real time across more than one conveyance industry segment. This lack of a real time or near real time system or real time or near real time method further limits a representative's exposure in the conveyance industry and their ability to operate more efficiently if the representative wants to provide conveyance services in more than one conveyance industry segment. In addition, current limitations also reduce the amount of potential preferred conveyance service requests available to a representative. Currently, if a representative wants to provide a ride in the ride-hail industry segment, then deliver food in the good delivery industry segment because that conveyance service request is in close proximity to them, a representative would not have the ability to analyze or evaluate and then secure or obtain these preferred conveyance service requests in real time or near real time. If there were a system and method for a representative to be able to do so, the representative would have access to a greater number of diverse conveyance service requests and gives the representative more flexibility in providing conveyance services within the conveyance industry. One non-limiting aspect of the present invention solves this problem for representatives.

There is currently no system, method or product that can analyze or evaluate conveyance service requests continuously in real time or near real time and preferably secure or obtain a subsequent or additional preferred conveyance service request while a representative performs a conveyance service. In addition, there is no technology available to automatically analyze or evaluate and then secure or obtain more than one preferred conveyance service request concurrently for a representative in real time or near real time. Also, existing technology cannot automatically analyze or evaluate and then secure or obtain an additional or subsequent preferred conveyance service request in real time or near real time. A representative's decision-making ability is limited given the current state of the art. Currently, only one conveyance service request, not even a preferred conveyance service request, can be secured or obtained at a time. After completion of a conveyance service, only then can a representative manually secure or obtain a new conveyance service request.

The current systems and methods of securing or obtaining a conveyance service request in a conveyance industry segment can also be unsafe for a representative, conveyance client, and people around them. A representative that provides one conveyance service after another often tries to perform their faux analysis or just accept the next conveyance service request while still driving to operate more efficiently. Currently, the only way this type of analysis can be done is by opening different applications in hopes to find the next available conveyance service request. As a result, representatives take their eyes off the road and their surroundings, greatly increasing the probability of getting into an accident. In some states, it is illegal to operate a mobile device while driving. Existing technology is lacking in its ability to perform this type of analysis for a representative in real time or near real time and then secure or obtain a preferred conveyance service request for them. The present invention would allow a representative to be more focused on providing the conveyance service at hand as the representative would not need to be distracted with their mobile device to find their next preferred conveyance service request.

Currently, representatives are assigned or provided with one conveyance service request at a time that can either be blindly accepted, without knowing any details, or rejected. This process is not a useful way of presenting conveyance service requests to representatives.

Currently, some service providers dynamically increase prices in certain areas for various reasons. Representatives looking to work more efficiently or earn more money try to work in these areas as much as possible. The problem is that by the time a representative gets to the area with elevated pricing, the increased pricing has either moved or been removed. Representatives experience the challenge of chasing the elevated pricing areas but generally do not have the chance to capitalize on them. As a result, some representatives have given up on chasing areas with elevated pricing. Currently there is no system or method a representative can use to predict or estimate where the areas of elevated pricing will be in order to maximize their earning potential.

Analyzing or evaluating multiple conveyance service requests to be performed sequentially creates a situation known as the travelling salesman problem or dynamic travelling salesman problem. The problem of analyzing or evaluating is compounded even further when new or additional conveyance service requests to be secured or obtained become available in real time or near real time. One non-limiting aspect of the present invention solves this problem.

Many problems described herein associated with representatives can also be related to autonomous vehicles and owners or controllers of autonomous vehicles.

Service providers are also disadvantaged due to inefficient systems and methods currently used in conveyance industry segments. The biggest problem among service providers currently is the lack of representatives to provide conveyance services. Representatives, as mentioned, switch between different service providers at will. As a result, service providers do not have a stable supply of representatives to provide conveyance services. With autonomous vehicles becoming more common, service providers think they have found the solution to this problem by using autonomous vehicles to supplement the lack of representatives.

If service providers supplement the lack of representatives with autonomous vehicles, other issues such as the vehicle routing problem and vehicle dispatch problem become prevalent. Existing technology is lacking in its ability to analyze or evaluate and then secure or obtain a preferred conveyance service request for an autonomous vehicle. There is currently no system, method, or product that can automatically analyze or evaluate conveyance service requests continuously in real time or near real time and preferably secure or obtain a subsequent or additional preferred conveyance service request while an autonomous vehicle performs a conveyance service. The decision-making ability of an owner or controller of an autonomous vehicle or a service provider is limited given the current state of the art. One non-limiting aspect of the present invention solves this problem.

Currently, service providers outsource labor through representatives, however many issues have arisen. Disputes over including but not limited to wages, medical coverage, vacation pay, insurance, profit sharing, taxi permits, vehicle qualifications, vehicle maintenance, and corporate culture have all arisen and have been causing a lot of chaos. Service providers can use autonomous vehicles to address some of these challenges and increase profits, however an efficient system and method to incorporate or utilize autonomous vehicles into the conveyance industry segments is needed.

When autonomous vehicles are more common, an owner of an autonomous vehicle could enlist their vehicle to operate in at least one conveyance industry segment when not in use by the owner. Rather than having an autonomous vehicle sitting in a parking garage for eight hours while the owner is at work, the autonomous vehicle could be used to generate income in at least one conveyance industry segment for the owner during that time as well as supplement the lack of available representatives for a service provider. One non-limiting aspect of the present invention solves this problem.

Another problem faced by an owner or controller of an autonomous vehicle is how to enroll or employ an autonomous vehicle into a system that will facilitate performing or providing conveyance services. Furthermore, currently an autonomous vehicle cannot operate in multiple conveyance industry segments. In addition, autonomous vehicles cannot be employed by or contracted with multiple service providers to facilitate conveyance services. At least one non-limiting aspect of the present invention solves this problem.

SUMMARY

The present invention recognizes that there is a long felt need for more efficient systems in the interactive conveyance industry for goods and services.

A first aspect of the present invention generally relates to an interactive system in the conveyance and other industries.

A second aspect of the present invention generally relates to a method of use of the interactive system of the present invention.

Figure 1:
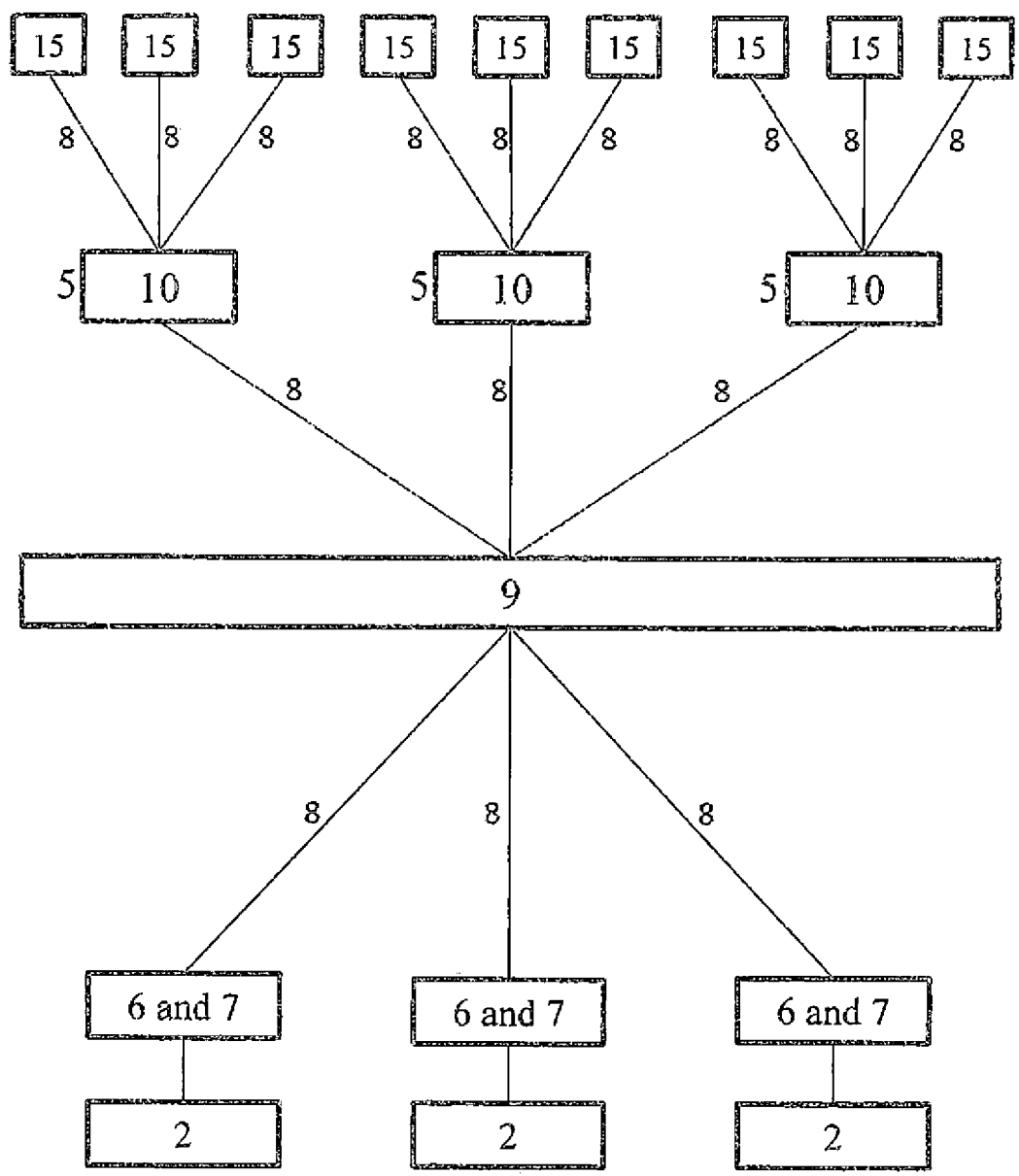
FIG. 1 relates to a preferred example of one non-limiting aspect of the present invention as a macro level view of a Representative Automated Platform 13, automated in whole or in part, where at least one representative 2 can benefit from the present invention. The conveyance service requests 15 can be sourced from at least one external server 10 and can be transmitted to a central server 9 by way of at least one link 8. At least one service provider 5 can be associated with at least one external server 10. In this non-limiting figure, each service provider 5 is associated with one external server 10. A central server 9 can filter conveyance service requests 15 into filtered conveyance service requests 16 by using at least one representative preference 18 and preferably the real time or near real time geographical location of at least one representative 2. A central server 9 can calculate the weighted average of at least one representative preference 18. A central server 9 can preferably sort the filtered conveyance service requests 16 in an order relating to the corresponding weighted averages to identify at least one preferred conveyance service request 17. At least one preferred conveyance service request 17 can be identified by a central server 9 from the filtered conveyance service requests 16 that has the highest weighted average. At least one preferred conveyance service request 17 can be secured or obtained by a central server 9. At least one secured or obtained preferred conveyance service request 17 can be transmitted from a central server 9 to at least one application 6 by way of at least one link 8. At least one application 6 can operate on at least one terminal 7. At least one secured or obtained preferred conveyance service request 17 can be displayed on at least one application 6. A Representative Automated Platform 13 can analyze or evaluate and then preferably secure or obtain at least one subsequent or additional preferred conveyance service request 17 continuously in real time or near real time, while at least one representative 2 performs at least one conveyance service relating to at least one secured or obtained preferred conveyance service request 17 until the process is stopped by at least one representative 2. At least one link 8 can be at least one connection or at least one association with at least one software function or at least one software component relating to at least one application 6, at least one terminal 7, at least one central server 9, at least one external server 10, or a combination thereof.
Figure 2:
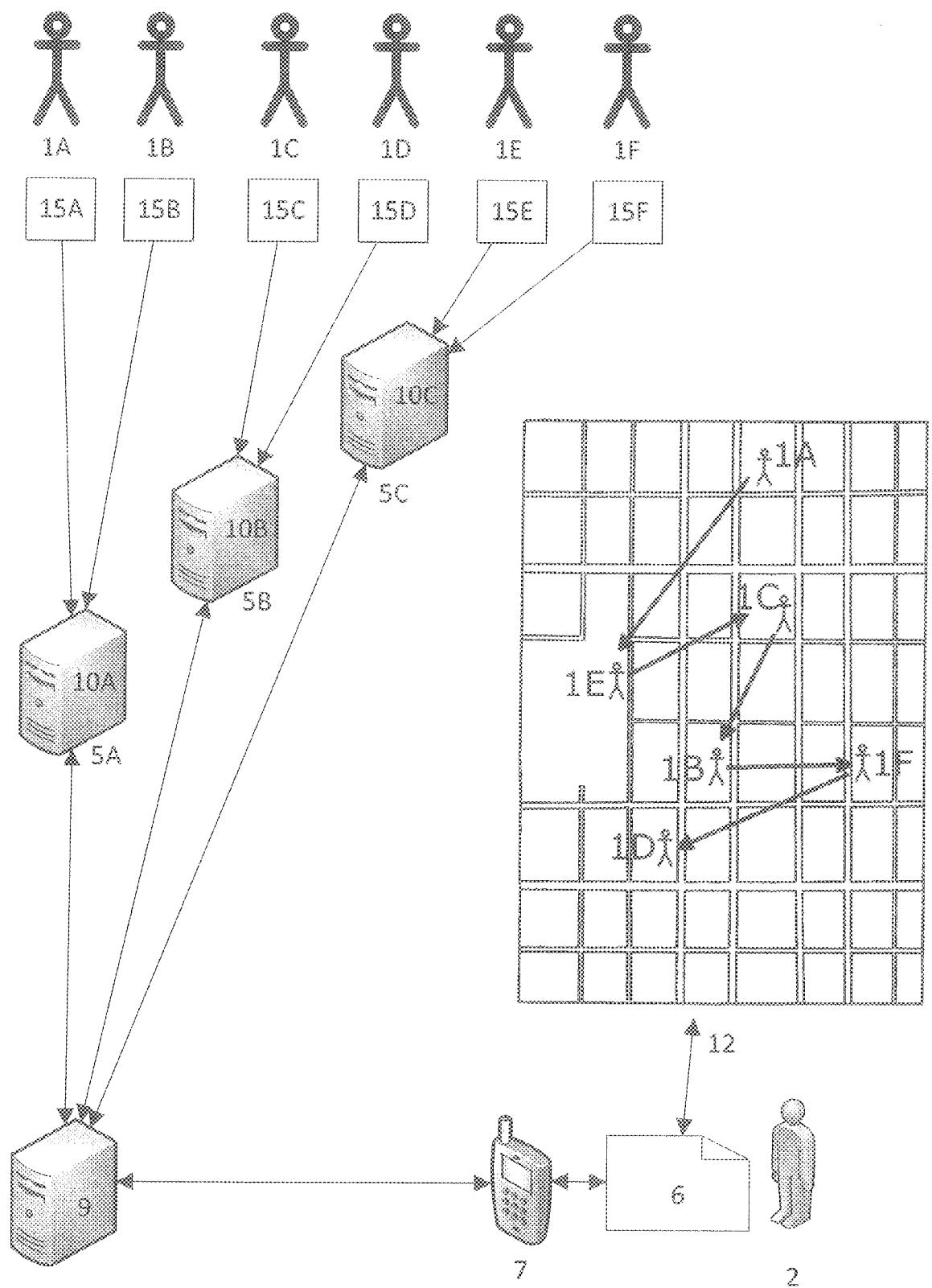
FIG. 2 relates to a preferred example of one non-limiting aspect of the present invention as a macro level view of a Representative Automated Platform 13, automated in whole or in part, where a representative 2 can benefit from the present invention. An individual conveyance service request 15 can be submitted by each individual conveyance client 1A, 1B, 1C, 1D, 1E, and 1F. An individual conveyance service request 15 corresponds with each individual conveyance client 1 in the figure. Conveyance service requests 15A and 15B are submitted by conveyance clients 1A and 1B to external server 10A associated with service provider 5A. Conveyance service requests 15C and 15D are submitted by conveyance clients 1C and 1D to external server 10B associated with service provider 5B. Conveyance service requests 15E and 15F are submitted by conveyance clients 1E and 1F to external server 10C associated with service provider 5C. Each service provider 5 can have at least one external server 10.

A central server 9 can receive conveyance service requests 15 and then filter the conveyance service requests 15 into filtered conveyance service requests 16 by using at least one representative preference 18 and preferably the real time or near real time geographical location of a representative 2. A central server 9 can calculate the weighted average of at least one representative preference 18. A central server 9 can preferably sort the filtered conveyance service requests 16 in an order relating to the corresponding weighted averages to identify at least one preferred conveyance service request 17. At least one preferred conveyance service request 17 can be identified by a central server 9 from the filtered conveyance service requests 16 that has the highest weighted average.

A central server 9 can analyze or evaluate conveyance service requests 15 and then secure or obtain at least one preferred conveyance service request 17. At least one secured or obtained preferred conveyance service request 17 can be transmitted from a central server 9 to an application 6 by way of at least one link 8. An application 6 can operate on a terminal 7 and can display al least one secured or obtained preferred conveyance service request 17. In this non-limiting figure, a representative 2 can use a visual representation 12 in conjunction with a Representative Automated Platform 13 to visually analyze or evaluate where at least one conveyance client 1 or at least one preferred conveyance service request 17 is geographically located. A Representative Automated Platform 13 can analyze or evaluate and then preferably secure or obtain at least one subsequent or additional preferred conveyance service request 17 continuously in real time or near real time, while a representative 2 performs at least one conveyance service relating to at least one secured or obtained preferred conveyance service request 17, until the process is stopped by a representative 2.

At least one link can be at least one connection or at least one association with at least one software function or at least one software component relating to at least one application 6, at least one terminal 7, at least one central server 9, at least one external server 10, or a combination thereof. At least one link can be at least one connection or at least one association with at least one application 6, at least one central server 9, at least one external server 10, or a combination thereof, on at least one terminal 7 associated with at least one representative 2.

Figure 3:
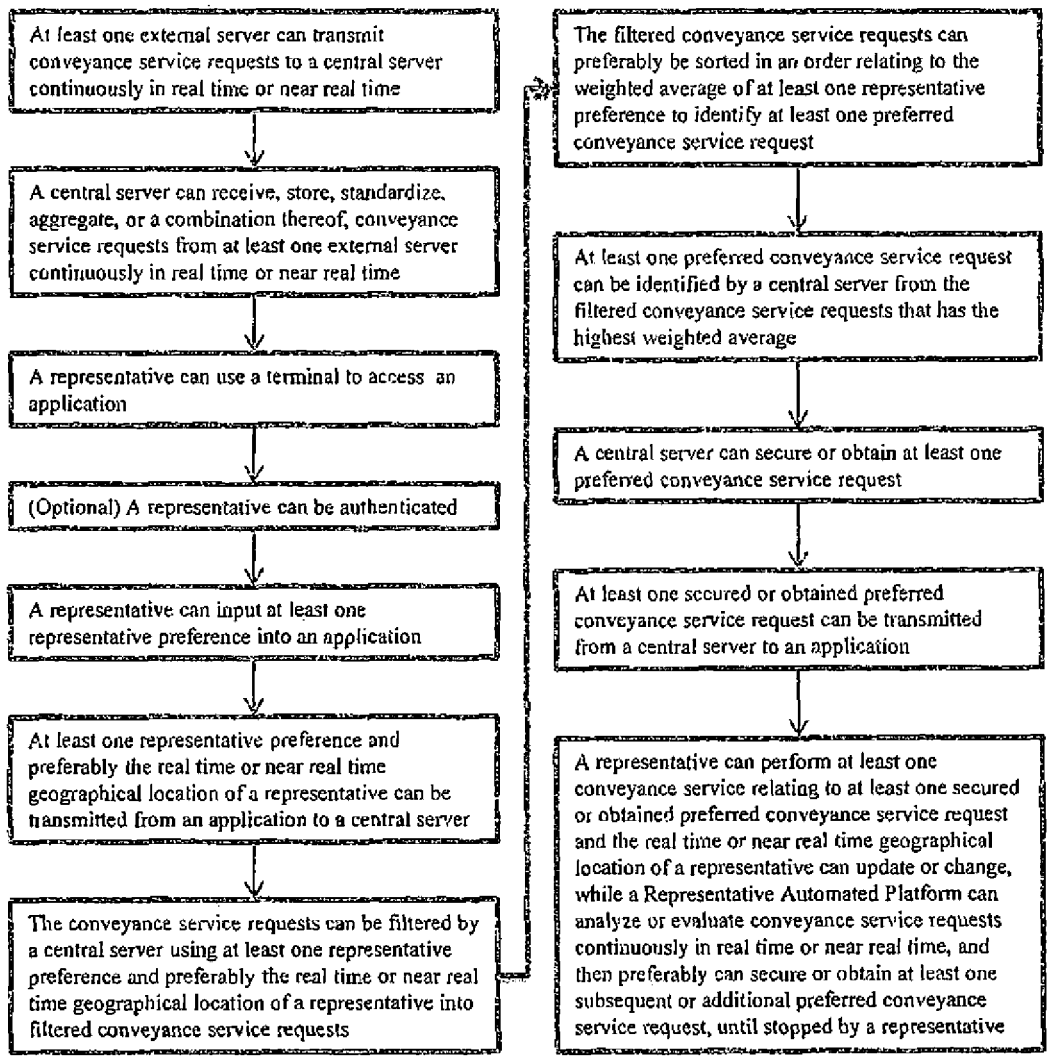

FIG. 3 relates to a preferred example of one non-limiting aspect of the present invention as a flowchart of steps of an exemplary method in a preferable but not required order where a representative 2 can benefit from the present invention. The flowchart describes steps of how a Representative Automated Platform 13, automated in whole or in part, can assist a representative 2 in analyzing or evaluating and then securing or obtaining at least one preferred conveyance service request 17. A Representative Automated Platform 13, automated in whole or in part, after securing or obtaining at least one preferred conveyance service request 17, can continuously analyze or evaluate conveyance service requests 15 in real time or near real time and then preferably secure or obtain at least one subsequent or additional preferred conveyance service request 17 while a representative 2 is performing at least one conveyance service. At least one link can be at least one connection or at least one association with at least one software function or at least one software component relating to at least one application 6, at least one terminal 7, at least one central server 9, at least one external server 10, or a combination thereof.

Figure 4:
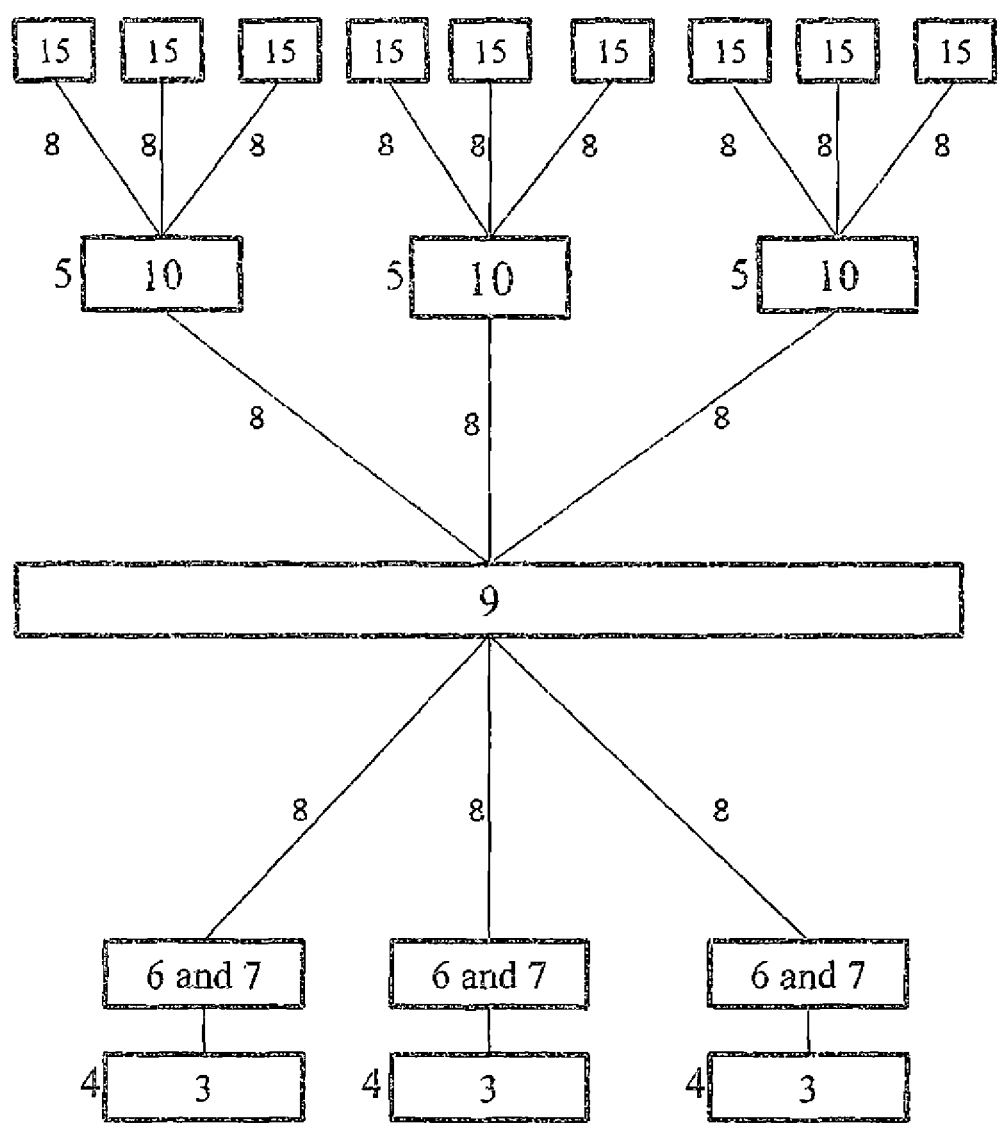

FIG. 4 relates to a preferred example of one non-limiting aspect of the present invention as a macro level view of an Autonomous Vehicle Automated Platform 14, automated in whole or in part, where at least one owner or at least one controller of at least one autonomous vehicle 4 can benefit from the present invention. The conveyance service requests 15 can be sourced from at least one external server 10 and can be transmitted to a central server 9 by way of at least one link 8. At least one service provider 5 can be associated with at least one external server 10. In this non-limiting figure, each service provider 5 is associated with one external server 10. A central server 9 can filter conveyance service requests 15 into filtered conveyance service requests 16 by using at least one selected preference 19 and preferably the real time or near real time geographical location of at least one autonomous vehicle 3. A central server 9 can calculate the weighted average of at least one selected preference 19. A central server 9 can preferably sort the filtered conveyance service requests 16 in an order relating to the corresponding weighted averages to identify at least one preferred conveyance service request 17. At least one preferred conveyance service request 17 can be identified by a central server 9 from the filtered conveyance service requests 16 that has the highest weighted average. At least one preferred conveyance service request 17 can be secured or obtained by a central server 9. At least one secured or obtained preferred conveyance service request 17 can be transmitted from a central server 9 to at least one application 6 by way of at least one link 8. At least one application 6 can operate on at least one terminal 7 associated with at least one autonomous vehicle 3. An Autonomous Vehicle Automated Platform 14 can analyze or evaluate and then preferably secure or obtain at least one subsequent or additional preferred conveyance service request 17 continuously in real time or near real time, while at least one autonomous vehicle 3 performs at least one conveyance service relating to at least one secured or obtained preferred conveyance service request 17 until the process is stopped by at least one owner or at least one controller of at least one autonomous vehicle 4. At least one link 8 can be at least one connection or at least one association with at least one software function or at least one software component relating to at least one application 6, at least one owner or controller application, at least one terminal 7, at least one central server 9, at least one external server 10, or a combination thereof.

Figure 5:
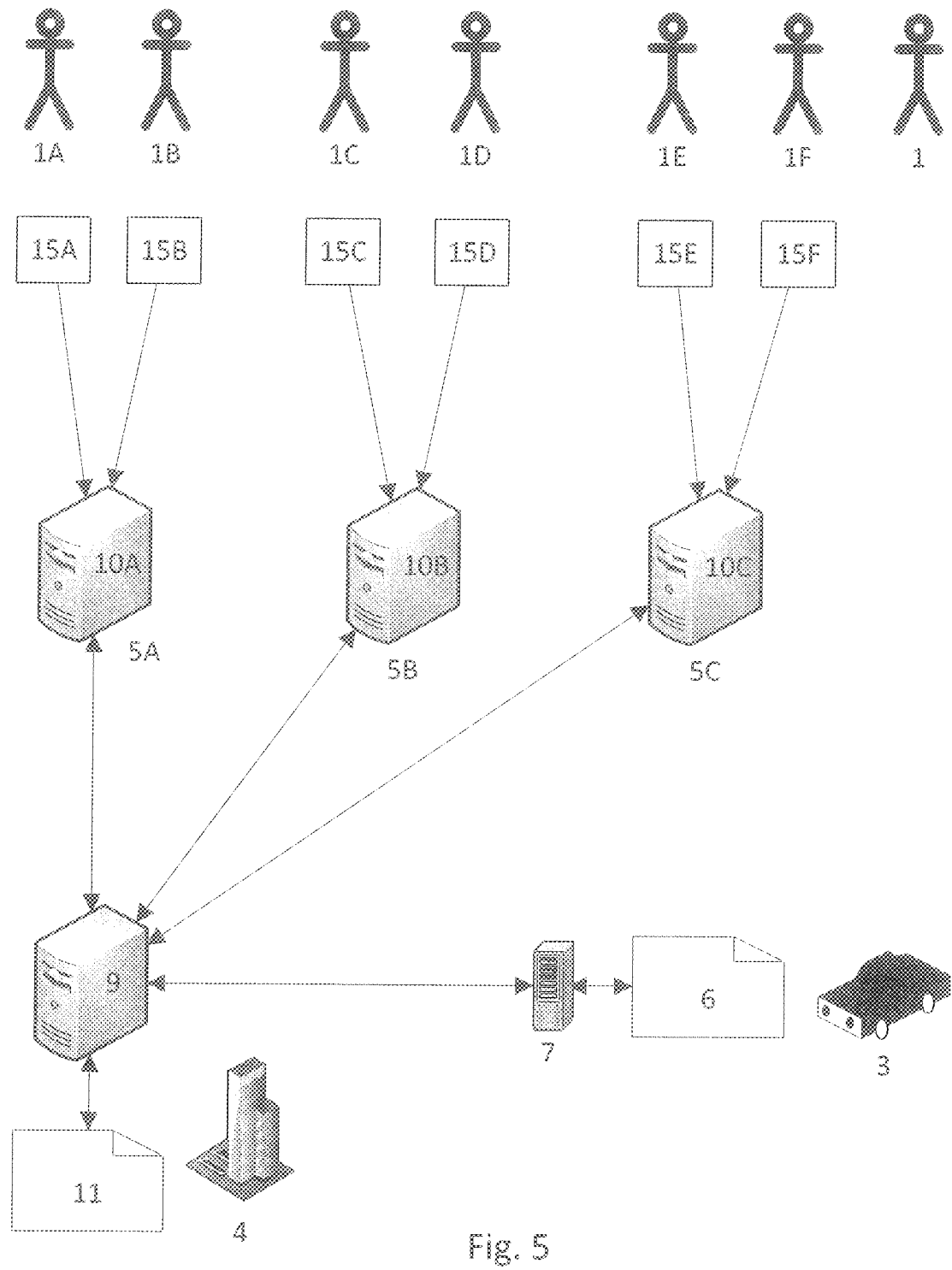

FIG. 5 relates to a preferred example of one non-limiting aspect of the present invention as a macro level view of an Autonomous Vehicle Automated Platform 14, automated in whole or in part, where an owner or controller of an autonomous vehicle 4 can benefit from the present invention. An individual conveyance service request 15 can be submitted by each individual conveyance client 1A, 1B, 1C, 1D, 1E, and 1F. An individual conveyance service request 15 corresponds with each individual conveyance client 1 in the figure. Conveyance service requests 15A and 15B are submitted by conveyance clients 1A and 1B to external server 10A associated with service provider 5A. Conveyance service requests 15C and 15D are submitted by conveyance clients 1C and 1D to external server 10B associated with service provider 5B. Conveyance service requests 15E and 15F are submitted by conveyance clients 1E and 1F to external server 10C associated with service provider 5C. Each service provider 5 can have at least one external server 10.

A central server 9 can receive conveyance service requests 15 and then filter the conveyance service requests 15 into filtered conveyance service requests 16 by using at least one selected preference 19 and preferably the real time or near real time geographical location of an autonomous vehicle 3. A central server 9 can calculate the weighted average of at least one selected preference 19. A central server 9 can preferably sort the filtered conveyance service requests 16 in an order relating to the corresponding weighted averages to identify at least one preferred conveyance service request 17. At least one preferred conveyance service request 17 can be identified by a central server 9 from the filtered conveyance service requests 16 that has the highest weighted average.

At least one preferred conveyance service request 17 can be transmitted from a central server 9 to an owner or controller application 11 by way of at least one link 8. In this non-limiting figure, an owner or controller of an autonomous vehicle 4 can accept at least one preferred conveyance service request 17, when an Autonomous Vehicle Automated Platform 14 is automated in part, by using an owner or controller application 11. A central server 9 can then secure or obtain at least one preferred conveyance service request 17. At least one secured or obtained preferred conveyance service request 17 can be transmitted from a central server 9 to an application 6 by way of at least one link 8. An application 6 can operate on a terminal 7 associated with an autonomous vehicle 3. An Autonomous Vehicle Automated Platform 14 can analyze or evaluate and then preferably secure or obtain at least one subsequent or additional preferred conveyance service request 17 continuously in real time or near real time, while an autonomous vehicle 3 performs at least one conveyance service relating to at least one secured or obtained preferred conveyance service request 17, until the process is stopped by an owner or controller of an autonomous vehicle 4.

At least one link can be at least one connection or at least one association with at least one software function or at least one software component relating to at least one application 6, at least one owner or controller application 11, at least one terminal 7, at least one central server 9, at least one external server 10, or a combination thereof. At least one link can be at least one connection or at least one association with at least one application 6, at least one owner or controller application 11, at least one central server 9, at least one external server 10, or a combination thereof, on at least one terminal 7 associated with at least one autonomous vehicle 3.

Figure 6:
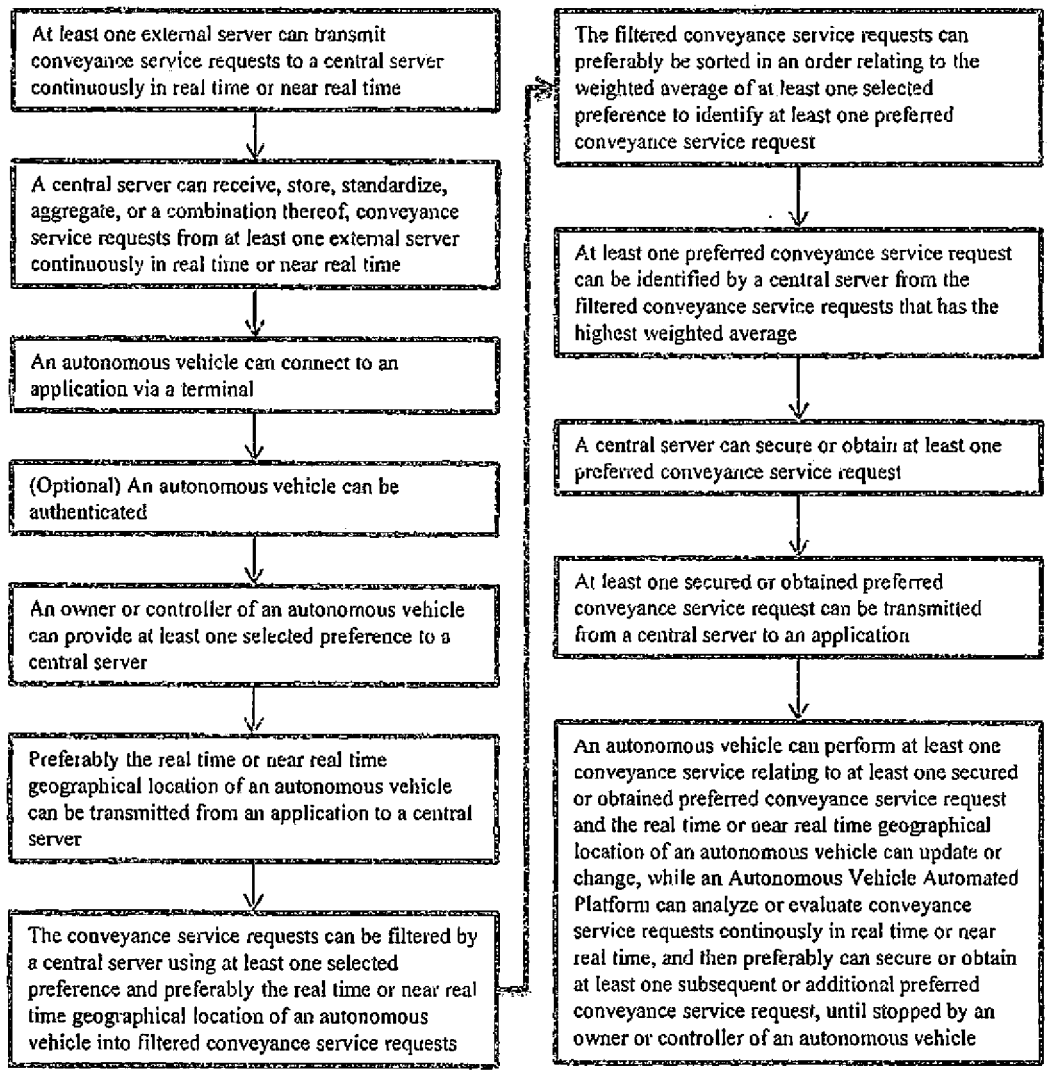

FIG. 6 relates to a preferred example of one non-limiting aspect of the present invention as a flowchart of steps of an exemplary method in a preferable but not required order where an owner or controller of an autonomous vehicle 4 can benefit from the present invention. The flowchart describes steps of how an Autonomous Vehicle Automated Platform 14, automated in whole or in part, can assist an autonomous vehicle 3 or an owner or controller of an autonomous vehicle 4 in analyzing or evaluating and then securing or obtaining at least one preferred conveyance service request 17. An Autonomous Vehicle Automated Platform 14, automated in whole or in part, after securing or obtaining at least one preferred conveyance service request 17, can continuously analyze or evaluate conveyance service requests 15 in real time or near real time and then preferably secure or obtain at least one subsequent or additional preferred conveyance service request 17 while an autonomous vehicle 3 is performing at least one conveyance service. At least one link can be at least one connection or at least one association with at least one software function or at least one software component relating to at least one application 6, at least one owner or controller application, at least one terminal 7, at least one central server 9, at least one external server 10, or a combination thereof.

Figure 7:
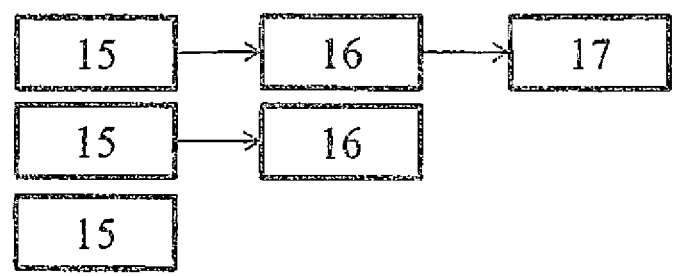

FIG. 7 relates to a preferred example of at least one non-limiting aspect of the present invention as a flowchart of the transformation of at least one conveyance service request 15 into at least one preferred conveyance service request 17. Once a central server 9 receives at least one conveyance service request 15 from at least one external server 10, a central server 9 can filter at least one conveyance service request 15 using at least one representative preference 18 or at least one selected preference 19 and preferably the real time or near real time geographical location of at least one representative 2 or at least one autonomous vehicle 3 into at least one filtered conveyance service request 16. A central server 9 can calculate the weighted average of at least one representative preference 18 or at least one selected preference 19. A central server 9 can preferably sort at least one filtered conveyance service request 16 in an order relating to the corresponding weighted averages to identify at least one preferred conveyance service request 17. At least one preferred conveyance service request 17 can be identified by a central server 9 as at least one filtered conveyance service request 16 that has the highest weighted average from at least one filtered conveyance service request 16. Not every at least one conveyance service request 15 can become at least one filtered conveyance service request 16 and not every at least one filtered conveyance service request 16 can become at least one preferred conveyance service request 17. A central server 9 can be used by a Representative Automated Platform 13 to analyze and identify at least one preferred conveyance service request 17. A central server 9 can be used by an Autonomous Vehicle Automated Platform 14 to analyze and identify at least one preferred conveyance service request 17. At least one function of a central server 9 or at least one function of an external server 10 can be performed by an application 6, an owner or controller application 11, or a combination thereof. All or some of conveyance data relating to at least one autonomous vehicle 3 can be filtered and can be identified as preferred in at least one same or at least one similar process to filter and identify at least one conveyance service request 15 into at least one preferred conveyance service request 17. At least one link can be at least one connection or at least one association with at least one software function or at least one software component relating to at least one application 6, at least one owner or controller application, at least one terminal 7, at least one central server 9, at least one external server 10, or a combination thereof.

Figure 8:
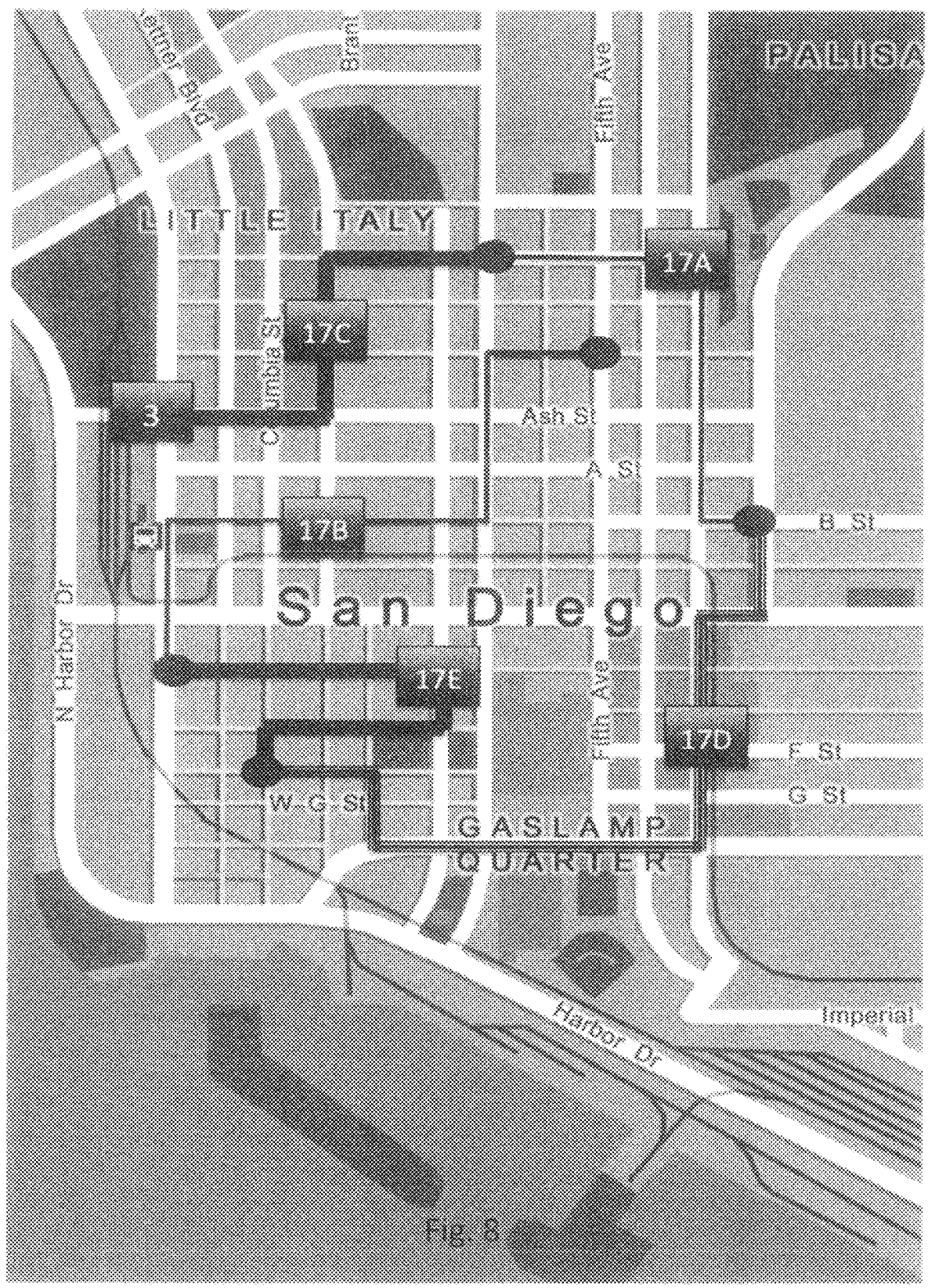

FIG. 8 relates to a preferred example of at least one non-limiting aspect of the present invention as an overview of an Autonomous Vehicle Automated Platform 14, automated in whole, being used by an autonomous vehicle 3 to analyze or evaluate and then secure or obtain, for example, five preferred conveyance service requests 17. In this non-limiting figure, not all five preferred conveyance service requests 17 were present or available when an Autonomous Vehicle Automated Platform 14 secured or obtained a first preferred conveyance service request 17. After securing or obtaining a first preferred conveyance service request 17, an Autonomous Vehicle Automated Platform 14 can continuously analyze or evaluate conveyance service requests 15 in real time or near real time and then preferably secure or obtain at least one subsequent or additional preferred conveyance service request 17 while an autonomous vehicle 3 is performing the first conveyance service and the real time or near real time geographical location of an autonomous vehicle 3 updates or changes.

The preferred conveyance service requests 17 change continuously and are updated in real time or near real time, but for illustration purposes, depicted are all five secured or obtained preferred conveyance service requests 17A, 17B, 17C, 17D, and 17E. An Autonomous Vehicle Automated Platform 14 is not required to secure or obtain preferred conveyance service requests 17A, 17B, 17C, 17D, and 17E in a sequential order because after a first preferred conveyance service request 17C is secured or obtained, an Autonomous Vehicle Automated Platform 14 analyzes or evaluates again or continuously in real time or near real time with updated information prior to securing or obtaining the next preferred conveyance service request 17.

A first preferred conveyance service request 17C is secured or obtained for an autonomous vehicle 3 by an Autonomous Vehicle Automated Platform 14. An autonomous vehicle 3 picks up the first conveyance client 1 at the beginning service geographical location, displayed as box 17C, and proceeds to the ending service geographical location depicted by the first black circle on the route. Prior to completing the first preferred conveyance service request 17C, an Autonomous Vehicle Automated Platform 14 continuously analyzes or evaluates and then secures or obtains a second preferred conveyance service request 17A. An autonomous vehicle 3 drops off the first conveyance client 1 at the ending service geographical location and proceeds to the beginning service geographical location for the second preferred conveyance service request 17A, displayed as box 17A.

An autonomous vehicle 3 picks up the second conveyance client 1 at the beginning service geographical location and proceeds to the ending service geographical location depicted by the second black circle on the route. Prior to completing the second preferred conveyance service request 17A, an Autonomous Vehicle Automated Platform 14 continuously analyzes or evaluates and then secures or obtains a third preferred conveyance service request 17D. An autonomous vehicle 3 drops off the second conveyance client 1 at the ending service geographical location and proceeds to the beginning service geographical location for the third preferred conveyance service request 17D, displayed as box 17D.

An autonomous vehicle 3 picks up the third conveyance client 1 at the beginning service geographical location and proceeds to the ending service geographical location depicted by the third black circle on the route. Prior to completing the third preferred conveyance service request 17D, an Autonomous Vehicle Automated Platform 14 continuously analyzes or evaluates and then secures or obtains a fourth preferred conveyance service request 17E. An autonomous vehicle 3 drops off the third conveyance client 1 at the ending service geographical location and proceeds to the beginning service geographical location for the fourth preferred conveyance service request 17E, displayed as box 17E.

An autonomous vehicle 3 picks up the fourth conveyance client 1 at the beginning service geographical location and proceeds to the ending service geographical location depicted by the fourth black circle on the route. Prior to completing the fourth preferred conveyance service request 17E, an Autonomous Vehicle Automated Platform 14 continuously analyzes or evaluates and then secures or obtains a fifth preferred conveyance service request 17B. An autonomous vehicle 3 drops off the fourth conveyance client 1 at the ending service geographical location and proceeds to the beginning service geographical location for the fifth preferred conveyance service request 17B, displayed as box 17B.

An autonomous vehicle 3 picks up the fifth conveyance client 1 at the beginning service geographical location and proceeds to the ending service geographical location depicted by the fifth black circle on the route. An autonomous vehicle 3 drops off the fifth conveyance client 1 at the ending service geographical location. In this non-limiting figure, after an autonomous vehicle 3 completes the fifth preferred conveyance service request 17B, the owner or controller of an autonomous vehicle 4 turns off an Autonomous Vehicle Automated Platform 14 via an owner or controller application 11. At least one link can be at least one connection or at least one association with at least one software function or at least one software component relating to at least one application 6, at least one owner or controller application, at least one terminal 7, at least one central server 9, at least one external server 10, or a combination thereof.

Figure 9:
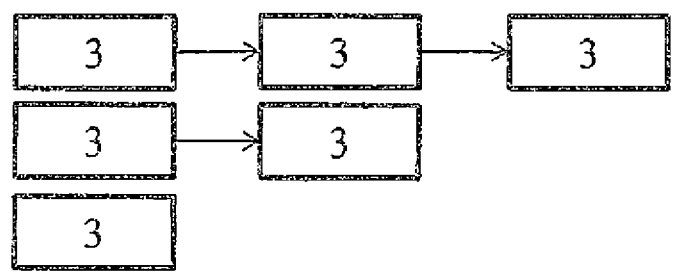

FIG. 9 relates to a preferred example of at least one non-limiting aspect of the present invention as a flowchart of the transformation of how at least one autonomous vehicle 3 becomes at least one autonomous vehicle 3 that can be identified as preferred. Another non-limiting aspect of the present invention as a flowchart can display the transformation of all or some of conveyance data relating at least one autonomous vehicle 3 into all or some of preferred conveyance data relating at least one autonomous vehicle 3, at least one autonomous vehicle 3 that can be identified as preferred, or a combination thereof. The left column can represent all or some of conveyance data relating at least one autonomous vehicle 3, at least one autonomous vehicle 3, or a combination thereof. The middle column can represent all or some of filtered conveyance data relating at least one autonomous vehicle 3, at least one autonomous vehicle 3 that can be filtered, or a combination thereof. The right column can represent all or some of preferred conveyance data relating at least one autonomous vehicle 3, at least one autonomous vehicle 3 that can be identified as preferred, or a combination thereof.

Once a central server 9 receives at least one conveyance service request 15 with corresponding conveyance data, at least one autonomous vehicle 3 with corresponding conveyance data, all or some of conveyance data relating at least one autonomous vehicle 3, at least one real time or near real time geographical location of at least one autonomous vehicle 3, or a combination thereof, from at least one external server 10, a central server 9 can filter all or some of conveyance data relating at least one autonomous vehicle 3 using at least one selected preference 19 and preferably the real time or near real time geographical location of at least one autonomous vehicle 3 into all or some of filtered conveyance data relating at least one autonomous vehicle 3. A central server 9 can calculate the weighted average of at least one selected preference 19. A central server 9 can preferably sort all or some of filtered conveyance data relating at least one autonomous vehicle 3 in an order relating to the corresponding weighted averages to identify at least one autonomous vehicle 3 that can be identified as preferred, all or some of preferred conveyance data relating at least one autonomous vehicle 3, or a combination thereof.

All or some of preferred conveyance data relating at least one autonomous vehicle 3 can be identified by a central server 9 as all or some of filtered conveyance data relating at least one autonomous vehicle 3 that can have the highest weighted average from all or some of filtered conveyance data relating at least one autonomous vehicle 3. At least one autonomous vehicle 3 that can be identified as preferred can be identified by a central server 9 as all or some of filtered conveyance data relating at least one autonomous vehicle 3 that can have the highest weighted average from all or some of filtered conveyance data relating at least one autonomous vehicle 3. Not all or some of conveyance data relating at least one autonomous vehicle 3 can become all or some of filtered conveyance data relating at least one autonomous vehicle 3 and not all or some of filtered conveyance data relating at least one autonomous vehicle 3 can become all or some of preferred conveyance data relating at least one autonomous vehicle 3, at least one autonomous vehicle 3 that can be identified as preferred, or a combination thereof. Not every at least one autonomous vehicle 3 can become at least one autonomous vehicle 3 that can be filtered and not every at least one autonomous vehicle 3 that can be filtered can become at least one autonomous vehicle 3 that can be identified as preferred.

A central server 9 can be used by a Representative Automated Platform to analyze and identify at least one autonomous vehicle 3 that can be identified as preferred, all or some of preferred conveyance data relating at least one autonomous vehicle 3, or a combination thereof. A central server 9 can be used by an Autonomous Vehicle Automated Platform to analyze and identify at least one autonomous vehicle 3 that can be identified as preferred, all or some of preferred conveyance data relating at least one autonomous vehicle 3, or a combination thereof. At least one function of a central server 9 or at least one function of an external server 10 can be performed by an application 6, an owner or controller application 11, an external server 10, or a combination thereof. All or some of conveyance data relating to at least one autonomous vehicle 3 can be filtered and can be identified as preferred in at least one same or at least one similar process to filter and identify at least one conveyance service request 15 into at least one preferred conveyance service request 17. At least one link can be at least one connection or at least one association with at least one software function or at least one software component relating to at least one application 6, at least one owner or controller application, at least one terminal 7, at least one central server 9, at least one external server 10, or a combination thereof.

Figure 10:
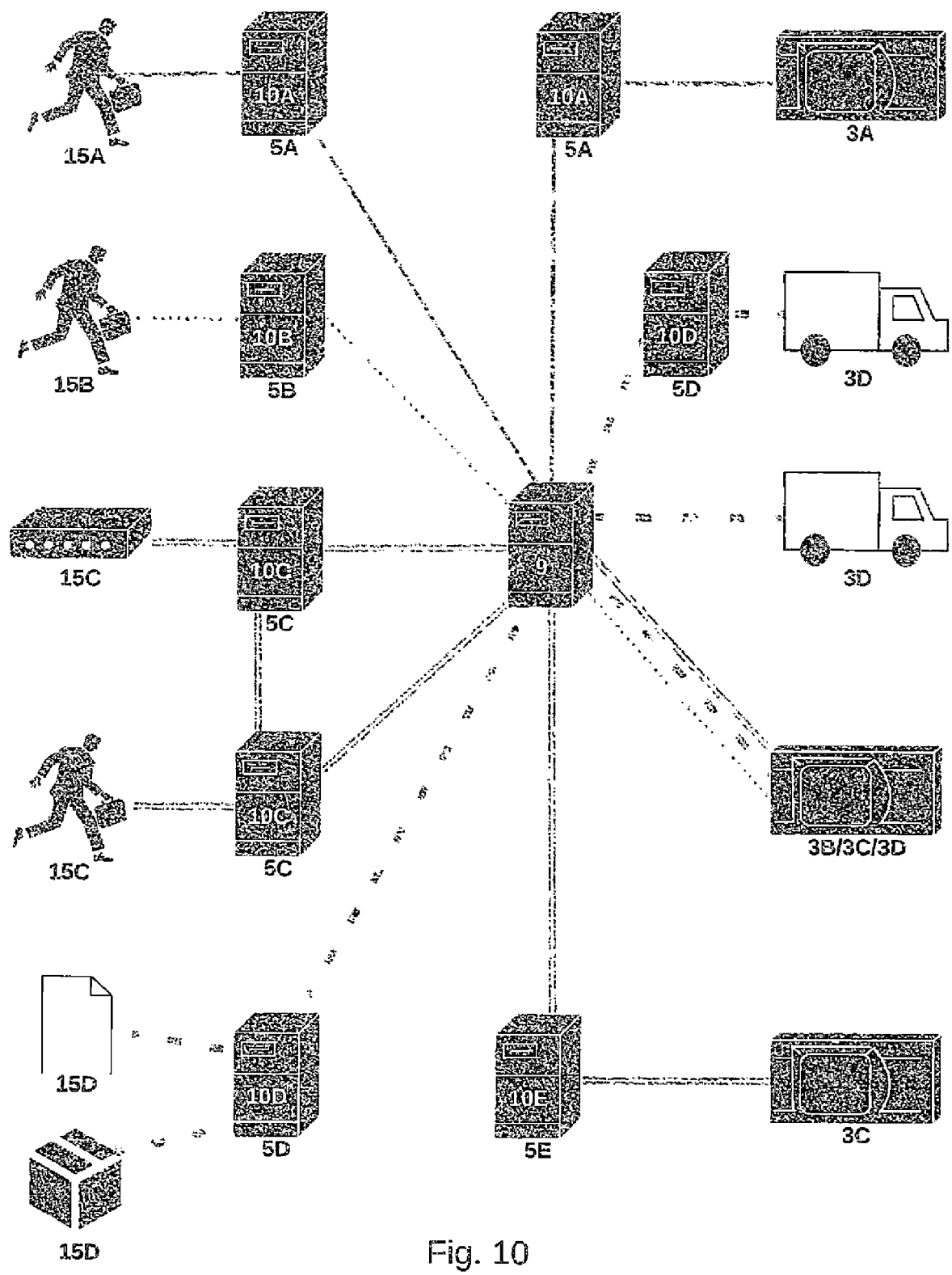

FIG. 10 generally relates to one preferred example of one non-limiting aspect of the present invention as a macro level view of an Autonomous Vehicle Automated Platform, automated in whole or in part, where an owner or controller of an autonomous vehicle 4, a fleet manager, a good supplier, a service provider 5, a logistics provider, a logistics supplier, or a combination thereof, can benefit from the present invention. In this non-limiting example, at least five different scenarios relating to a service provider 5, can be implemented for an Autonomous Vehicle Automated Platform.

Each individual service provider 5 can be displayed with a corresponding letter A, B, C, D, and E to identify different service providers 5. Each individual service provider 5A, 5B, 5C, and 5D can be displayed for example, with at least one different or unique line representing direct or indirect connections. A service provider 5E or a fleet manager can manage or operate a fleet of autonomous vehicles 3 for another service provider 5C, which is demonstrated and displayed as having a same double solid line as service provider 5C. Each individual service provider 5 can use or utilize at least one external server 10 in conjunction with a central server 9.

A conveyance service request 15A can be a ride-hail request submitted to an external server 10A associated with a service provider 5A, as indicated by a single solid line. A conveyance service request 15B can be a ride-hail request submitted to an external server 10B associated with a service provider 5B, as indicated by a circular dotted line. Conveyance service requests 15C can be a food delivery request and a ride-hail request that can come from two external servers 10C associated with a service provider 5C, as both can be indicated by a double solid line. Conveyance service requests 15D can be a courier delivery request and a good delivery request submitted to one external server 10D associated with a service provider 5D or good supplier, as indicated by a rectangular dotted line. There are no conveyance service requests 15 submitted to external server 10E associated with service provider 5E or fleet manager.

In this non-limiting figure, each individual service provider 5 can control, own, operate, manage, or the like, at least one service provider 5 network that can have at least one different feature or at least one different variation. Each individual service provider 5 network can be displayed with at least one different combination of at least one connection. Each individual service provider 5 network can display at least one data flow, via at least one different or unique line, and who each individual service provider 5 can communicate with. At least one link can be at least one connection or at least one association with at least one software function or at least one software component relating to at least one application 6, at least one owner or controller application, at least one terminal 7, at least one central server 9, at least one external server 10, or a combination thereof.

Figure 11:
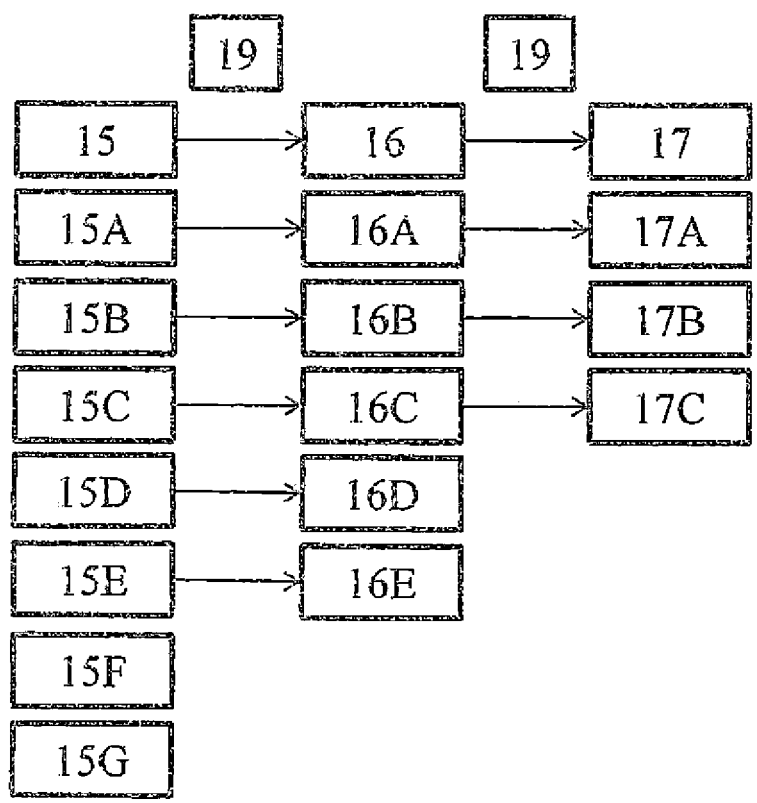

FIG. 11 relates to a preferred example of at least one non-limiting aspect of the present invention relating to a transformation of at least one conveyance service request 15 into at least one preferred conveyance service request 17. Each individual conveyance service request 15 can be displayed with a corresponding letter A, B, C, D, E, F, and G to identify different service providers associated with each request. At least one selected preference 19 can be applied to filter conveyance service requests 15 into filtered conveyance service requests 16, The preferred conveyance service requests 17 can be identified from the filtered conveyance service requests 16 by utilizing at least one selected preference 19. Both conveyance service requests 15F and 15G do not match or satisfy at least one selected preference 19 and therefore do not become filtered conveyance service requests 16. The filtered conveyance service requests 16, 16A, 16B, 16C, 16D, and 16E can preferably be sorted relating to at least one selected preference 19 and as a result both filtered conveyance service requests 16D and 16E do not become preferred conveyance service requests 17, The filtered conveyance service requests 16, 16A, 16B, and 16C become preferred conveyance service requests 17, 17A, 17B, and 17C, All or some of conveyance data relating to at least one autonomous vehicle 3 can be filtered and can be identified as preferred in at least one same or at least one similar process to filter and identify at least one conveyance service request 15 into at least one preferred conveyance service request 17. At least one link can be at least one connection or at least one association with at least one software function or at least one software component relating to at least one application 6, at least one owner or controller application, at least one terminal 7, at least one central server 9, at least one external server 10, or a combination thereof.

Figure 12:
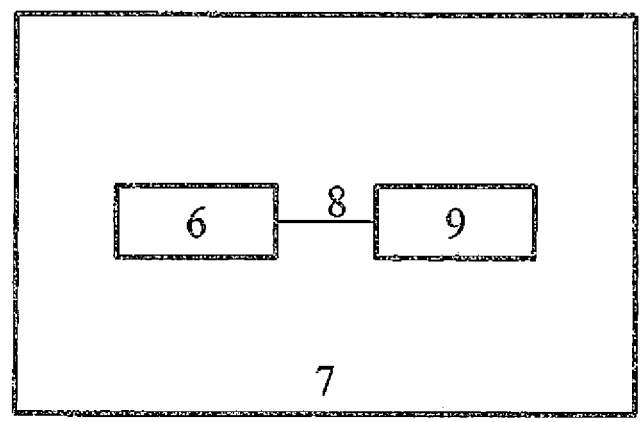

FIG. 12 relates to a preferred example of at least one non-limiting aspect of the present invention relating to at least one integration of hardware and software. At least one application 6, at least one central server 9, at least one terminal 7, at least one link 8, or a combination thereof, can be combined or integrated. At least one application 6, at least one central server 9, at least one link 8, or a combination thereof, can be combined or integrated on at least one terminal 7. At least one application 6, at least one central server 9, at least one link 8, or a combination thereof, can be combined or integrated on at least one terminal 7 associated with at least one autonomous vehicle.

At least one link 8 can be at least one connection or at least one association with at least one software function or at least one software component relating to at least one application 6, at least one owner or controller application, at least one autonomous vehicle, at least one terminal 7, at least one central server 9, at least one external server 10, or a combination thereof.

DETAILED DESCRIPTION OF THE INVENTION

Definitions

Unless defined otherwise, all technical and scientific terms used herein have the same meaning as commonly understood by one of ordinary skill in the art to which this invention belongs. Generally, the nomenclature used herein and the procedures described below are well-known and commonly employed in the art. Conventional methods are used for these procedures, such as those provided in the art and various general references. Where a term is provided in the singular, the inventors also contemplate the plural of that term, and where a term is provided in the plural, the inventors also contemplate the singular of that term. The nomenclature used herein and the procedures described below are those well-known and commonly employed in the art, unless otherwise indicated. Other technical terms used herein have their ordinary meaning in the art that they are used, as exemplified by a variety of technical dictionaries.

INTRODUCTION

The present invention recognizes that there is a long felt need for more efficient systems in the interactive conveyance industry for goods and services.

As a non-limiting introduction to the breath of the present invention, the present invention includes several general and useful aspects, including:

1. an interactive system in the conveyance and other industries; and
2. a method of use of the interactive system of the present invention.

These aspects of the invention, as well as others described herein, can be achieved by using the methods, articles of manufacture and compositions of matter described herein. To gain a full appreciation of the scope of the present invention, it will be further recognized that various aspects of the present invention can be combined to make desirable embodiments of the invention.

GENERAL DESCRIPTION OF THE PRESENT INVENTION AND PROBLEMS BEING SOLVED

One non-limiting aspect of the present invention, hereinafter referred to as at least one Representative Automated Platform, can be at least one technology based solution, automated in whole or in part, that can use at least one real time or near real time system and at least one real time or near real time method to assist at least one representative in at least one process of analyzing or evaluating and then securing or obtaining at least one preferred conveyance service request.

At least one Representative Automated Platform of the present invention, automated in whole or in part, can analyze or evaluate at least one conveyance service request continuously in real time or near real time, in order to identify and then secure or obtain at least one preferred conveyance service request based on at least one representative preference and preferably at least one real time or near real time geographical location of at least one representative. After securing or obtaining at least one first preferred conveyance service request, at least one representative can perform at least one conveyance service and at least one Representative Automated Platform of the present invention, can automatically and continuously repeat at least one real time or near real time process of analyzing or evaluating and then securing or obtaining at least one subsequent or additional preferred conveyance service request until at least one process is stopped by at least one representative and at least one representative performs at least one final conveyance service.

One benefit of at least one Representative Automated Platform of the present invention, automated in whole or in part, can be improved efficiency for at least one representative in analyzing or evaluating at least one conveyance service request continuously in real time or near real time to identify and then secure or obtain at least one preferred conveyance service request and preferably at least one subsequent or additional preferred conveyance service request. At least one Representative Automated Platform of the present invention can be updated in real time or near real time with at least one incoming conveyance service request to be continuously analyzed or evaluated and can then secure or obtain at least one subsequent or additional preferred conveyance service request. At least one Representative Automated Platform of the present invention can continuously analyze or evaluate at least one conveyance service request in real time or near real time and preferably secure or obtain at least one preferred conveyance service request while at least one representative performs at least one conveyance service.

As a result, at least one representative and at least one service provider can operate more efficiently and can potentially perform at least one additional conveyance service to increase earning potential. At least one proposal or recommendation from at least one Representative Automated Platform of the present invention of at least one different conveyance service request can improve efficiency relating to at least one representative and solve at least one problem relating to at least one traveling salesman problem or at least one dynamic traveling salesman problem. At least one Representative Automated Platform of the present invention can solve at least one problem by identifying, securing or obtaining at least one subsequent or additional preferred conveyance service request, and performing at least one conveyance service more efficiently by continuously analyzing or evaluating at least one conveyance service request in real time or near real time. This improved efficiency can allow at least one representative to perform at least one additional conveyance service based on at least one representative preference and preferably at least one real time or near real time geographical location of at least one representative. At least one benefit of the present invention can address at least one problem relating to at least one traveling salesman problem, at least one dynamic traveling salesman problem, or a combination thereof, relating to at least one conveyance industry segment.

One benefit of one non-limiting embodiment of at least one Representative Automated Platform of the present invention, when automated in part, can also relate to efficiency. When at least one Representative Automated Platform of the present invention is automated in part, the present invention can perform at least one process to identify at least one preferred conveyance service request relating to at least one representative preference and at least one representative can simply accept or decline. In this non-limiting embodiment of the present invention, at least one pop-up or notification of at least one preferred conveyance service request can be displayed on at least one application for at least one representative to accept or decline. If declined, at least one next preferred conveyance service request can be displayed until at least one preferred conveyance service request is accepted, declined, or at least one representative turns off at least one Representative Automated Platform of the present invention. At least one ability of at least one Representative Automated Platform of the present invention to analyze or evaluate continuously in real time or near real time and display at least one preferred conveyance service request, can allow at least one representative to work more efficiently and improve at least one user interaction compared to the current state of the art.

One benefit of at least one Representative Automated Platform of the present invention, automated in whole or in part, can improve at least one decision making process for at least one representative in at least one real time or near real time conveyance industry segment. At least one Representative Automated Platform of the present invention can continuously analyze or evaluate at least one conveyance service request in real time or near real time whereas at least one current system limitation and at least one current method limitation generally only permit at least one representative to potentially receive only one next conveyance service request at one point in time and usually when at least one representative is close to completing one conveyance service request.

At least one limitation can decrease at least one representative's decision making ability, not allow at least one representative to use at least one representative preference, and can reduce at least one opportunity for at least one representative to secure or obtain at least one most preferred conveyance service request available at that time. At least one Representative Automated Platform of the present invention can identify at least one preferred conveyance service request that at least one representative can miss due to the current convention. At least one Representative Automated Platform of the present invention can secure or obtain at least one subsequent or additional preferred conveyance service request while at least one representative is performing at least one conveyance service. Due to the current state of the art, at least one representative can potentially miss securing or obtaining at least one subsequent or additional preferred conveyance service request because at least one representative is limited on how and when at least one conveyance service request can be secured or obtained, let alone even analyzed or evaluated. Instead of having at least one representative multi-task while performing at least one conveyance service and searching for at least one next conveyance service request, which can often lead to securing or obtaining at least one suboptimal conveyance service request, at least one Representative Automated Platform of the present invention can take care of analyzing or evaluating and then securing or obtaining at least one preferred conveyance service request for at least one representative.

With at least one Representative Automated Platform of the present invention, by using continuous and improved real time or near real time analysis or evaluation instead of a one-time analysis or evaluation, at least one decision making process can be improved, and at least one preferred conveyance service request can be secured or obtained. At least one benefit of at least one improved decision making process of the present invention can also address at least one problem relating to at least one traveling salesman problem, at least one dynamic traveling salesman problem, or a combination thereof, relating to at least one conveyance industry segment.

One benefit of at least one Representative Automated Platform of the present invention can be related to improved usability or interaction with at least one user. The current state of the art can require at least one representative to take valuable time and effort to potentially receive at least one subsequent or additional conveyance service request, often times while driving. At least one Representative Automated Platform of the present invention can update or notify at least one representative while performing at least one conveyance service about including but not limited to at least one direction, at least one route, at least one conveyance client, at least one conveyance service request, at least one preferred conveyance service request, at least one beginning service geographical location, at least one ending service geographical location, or a combination thereof, which can improve at least one interaction or usability for at least one representative to perform at least one conveyance service. The present invention can improve the current state of the art and can allow at least one representative to input or provide at least one representative preference and at least one Representative Automated Platform of the present invention can facilitate analyzing or evaluating and then securing or obtaining at least one subsequent or additional preferred conveyance service request continuously in real time or near real time.

One benefit of at least one Representative Automated Platform of the present invention can be related to safety. The less attention at least one representative has to pay to at least one mobile device and the more focused at least one representative is on performing at least one conveyance service, the safer it can be for at least one representative, at least one conveyance client, and others in the vicinity or area. At least one Representative Automated Platform of the present invention can use at least one preferred system and at least one preferred method to automatically search, filter, analyze or evaluate, and then secure or obtain at least one preferred conveyance service request based on at least one representative preference and preferably at least one real time or near real time geographical location of at least one representative while allowing at least one representative to focus solely on at least one conveyance service and provide higher levels of safety for at least one conveyance client and others.

At least one Representative Automated Platform of the present invention can manage or control at least one representative from at least one single vehicle perspective, at least one fleet perspective, at least one independent third party perspective, or a combination thereof. At least one Representative Automated Platform of the present invention can benefit at least one fleet manager, at least one service provider, at least one good supplier, at least one owner or at least one controller of at least one autonomous vehicle, at least one logistics provider, at least one logistics supplier, or the like, by integrating or implementing software, hardware, logistics, or a combination thereof, to optimize vehicle utilization in real time or near real time. At least one Representative Automated Platform of the present invention can integrate or implement software, hardware, logistics, or a combination thereof, for or with at least one fleet manager, at least one service provider, at least one good supplier, at least one owner or at least one controller of at least one autonomous vehicle, at least one logistics provider, at least one logistics supplier, or the like. At least one Representative Automated Platform of the present invention can integrate or implement software, hardware, logistics, or a combination thereof, for or with at least one fleet manager, at least one service provider, at least one good supplier, at least one owner or at least one controller of at least one autonomous vehicle, at least one logistics provider, at least one logistics supplier, or the like, to facilitate at least one conveyance service in real time or near real time between at least one representative and at least one conveyance client. At least one fleet manager, at least one service provider, at least one good supplier, at least one owner or at least one controller of at least one autonomous vehicle, at least one logistics provider, at least one logistics supplier, or the like, can employ or utilize at least one Representative Automated Platform of the present invention to optimize vehicle utilization, which can result in more affordable services and can improve consumer sentiment among or with at least one conveyance client.

One non-limiting aspect of the present invention, hereinafter referred to as at least one Autonomous Vehicle Automated Platform, can be at least one technology based solution, automated in whole or in part, that can use at least one real time or near real time system and at least one real time or near real time method to assist at least one autonomous vehicle in at least one process of analyzing or evaluating and then securing or obtaining at least one preferred conveyance service request.

At least one Autonomous Vehicle Automated Platform of the present invention, automated in whole or in part, can analyze or evaluate at least one conveyance service request continuously in real time or near real time, in order to identify and then secure or obtain at least one preferred conveyance service request based on at least one selected preference and preferably at least one real time or near real time geographical location of at least one autonomous vehicle. After securing or obtaining at least one first preferred conveyance service request, at least one autonomous vehicle can perform at least one conveyance service and at least one Autonomous Vehicle Automated Platform of the present invention can automatically and continuously repeat at least one real time or near real time process of analyzing or evaluating and then securing or obtaining at least one subsequent or additional preferred conveyance service request until at least one process is stopped by at least one owner or at least one controller of at least one autonomous vehicle and at least one autonomous vehicle performs at least one final conveyance service.

One benefit of at least one Autonomous Vehicle Automated Platform of the present invention, automated in whole or in part, can be improved efficiency in analyzing or evaluating at least one conveyance service request continuously in real time or near real time to identify and then secure or obtain at least one preferred conveyance service request and preferably at least one subsequent or additional preferred conveyance service request for at least one autonomous vehicle. At least one Autonomous Vehicle Automated Platform of the present invention can be updated in real time or near real time with at least one incoming conveyance service request to be continuously analyzed or evaluated and can then secure or obtain at least one subsequent or additional preferred conveyance service request. At least one Autonomous Vehicle Automated Platform of the present invention can continuously analyze or evaluate at least one conveyance service request in real time or near real time and preferably secure or obtain at least one preferred conveyance service request while at least one autonomous vehicle performs at least one conveyance service.

As a result, at least one autonomous vehicle, at least one owner or at least one controller of at least one autonomous vehicle, at least one service provider, at least one good supplier, at least one fleet manager, at least one logistics provider, at least one logistics supplier, or a combination thereof, can operate more efficiently and can potentially perform at least one additional conveyance service to increase earning potential. At least one proposal or recommendation from at least one Autonomous Vehicle Automated Platform of the present invention of at least one different conveyance service request can improve efficiency relating to at least one autonomous vehicle, at least one service provider, at least one owner or at least one controller of at least one autonomous vehicle, at least one good supplier, at least one fleet manager, at least one logistics provider, at least one logistics supplier, or a combination thereof, and solve at least one problem relating to at least one vehicle routing problem or at least one vehicle dispatch problem. At least one Autonomous Vehicle Automated Platform of the present invention can solve at least one problem by identifying, securing or obtaining at least one subsequent or additional preferred conveyance service request, and performing at least one conveyance service more efficiently by continuously analyzing or evaluating at least one conveyance service request in real time or near real time. This improved efficiency can allow at least one service provider, at least one owner or at least one controller of at least one autonomous vehicle, at least one good supplier, at least one fleet manager, at least one logistics provider, at least one logistics supplier, or a combination thereof, to strategically place or dispatch at least one autonomous vehicle based on at least one selected preference and preferably at least one real time or near real time geographical location of at least one autonomous vehicle. At least one benefit of at least one Autonomous Vehicle Automated Platform of the present invention can address at least one problem relating to at least one vehicle routing problem, at least one vehicle dispatch problem, or a combination thereof, relating to at least one conveyance industry segment.

One benefit of at least one Autonomous Vehicle Automated Platform of the present invention can be increased earning potential due to at least one extra seat within at least one autonomous vehicle available for at least one conveyance service. The present invention can introduce at least one driverless autonomous vehicle that can result in having at least one extra seat available. Due to having at least one extra seat available, earning potential can be increased by facilitating at least one additional conveyance service request.

One benefit of one non-limiting embodiment of at least one Autonomous Vehicle Automated Platform of the present invention, when automated in part, can also relate to efficiency. When at least one Autonomous Vehicle Automated Platform of the present invention is automated in part, the present invention can perform at least one process to identify at least one preferred conveyance service request relating to at least one selected preference and at least one owner or at least one controller of at least one autonomous vehicle can simply accept or decline. In this non-limiting embodiment of the present invention, at least one pop-up or notification of at least one preferred conveyance service request can be displayed on at least one owner or controller application for at least one owner or at least one controller of at least one autonomous vehicle to accept or decline. If declined, at least one next preferred conveyance service request can be displayed until at least one preferred conveyance service request is accepted, declined, or at least one owner or at least one controller of at least one autonomous vehicle turns off at least one Autonomous Vehicle Automated Platform of the present invention. At least one ability of at least one Autonomous Vehicle Automated Platform of the present invention to analyze or evaluate continuously in real time or near real time and display at least one preferred conveyance service request, can allow at, least one autonomous vehicle, at least one owner or at least one controller of at least one autonomous vehicle, at least one service provider, at least one good supplier, at least one fleet manager, at least one logistics provider, at least one logistics supplier, or a combination thereof, to work more efficiently.

One benefit of at least one Autonomous Vehicle Automated Platform of the present invention, automated in whole or in part, can improve at least one decision making process for at least one owner or at least one controller of at least one autonomous vehicle, at least one autonomous vehicle, at least one service provider, at least one good supplier, at least one fleet manager, at least one logistics provider, at least one logistics supplier, or a combination thereof, in at least one real time or near real time conveyance industry segment. At least one Autonomous Vehicle Automated Platform of the present invention can continuously analyze or evaluate at least one conveyance service request in real time or near real time whereas at least one current system limitation and at least one current method limitation generally only permit at least one owner or at least one controller of at least one autonomous vehicle to potentially receive only one next conveyance service request at one point in time and usually when at least one autonomous vehicle is close to completing one conveyance service request.

At least one limitation can decrease at least one owner or at least one controller of at least one autonomous vehicle's decision making ability, not allow at least one owner or at least one controller of at least one autonomous vehicle to use at least one selected preference, and can reduce at least one opportunity for at least one most preferred conveyance service request available at that time to be secured or obtained. At least one Autonomous Vehicle Automated Platform of the present invention can identify at least one preferred conveyance service request that at least one owner or at least one controller of at least one autonomous vehicle, at least one service provider, at least one good supplier, at least one fleet manager, at least one logistics provider, at least one logistics supplier, or a combination thereof, can miss due to the current convention. At least one Autonomous Vehicle Automated Platform of the present invention can secure or obtain at least one subsequent or additional preferred conveyance service request while at least one autonomous vehicle is performing at least one conveyance service. Due to the current state of the art, at least one owner or at least one controller of at least one autonomous vehicle, at least one service provider, at least one good supplier, at least one fleet manager, at least one logistics provider, at least one logistics supplier, or a combination thereof, can potentially miss securing or obtaining at least one subsequent or additional preferred conveyance service request because at least one owner or at least one controller of at least one autonomous vehicle, at least one service provider, at least one good supplier, at least one fleet manager, at least one logistics provider, at least one logistics supplier, or a combination thereof, is limited as to how and when at least one conveyance service request can be secured or obtained, let alone even analyzed or evaluated.

With at least one Autonomous Vehicle Automated Platform of the present invention, by using continuous and improved real time or near real time analysis or evaluation instead of a one-time analysis or evaluation, at least one decision making process can be improved, and at least one preferred conveyance service request can be secured or obtained. At least one benefit of at least one improved decision making process of the present invention can also address at least one problem relating to at least one vehicle routing problem, at least one vehicle dispatch problem, or a combination thereof, relating to at least one conveyance industry segment.

Currently, there is a shortage of at least one representative in at least one conveyance industry segment. One benefit of at least one Autonomous Vehicle Automated Platform of the present invention can be at least one ability to assist at least one service provider, at least one owner or at least one controller of at least one autonomous vehicle, at least one good supplier, at least one fleet manager, at least one logistics provider, at least one logistics supplier, or a combination thereof, in supplementing a shortage of at least one representative to provide at least one additional conveyance service, which can increase profitability for at least one service provider, at least one owner or at least one controller of at least one autonomous vehicle, at least one good supplier, at least one fleet manager, at least one logistics provider, at least one logistics supplier, or a combination thereof, and decrease waiting times for at least one conveyance client. At least one Autonomous Vehicle Automated Platform of the present invention can allow at least one owner or at least one controller of at least one autonomous vehicle, at least one service provider, at least one good supplier, at least one fleet manager, at least one logistics provider, at least one logistics supplier, or a combination thereof, to supplement the lack of at least one representative with at least one autonomous vehicle to help fulfill at least one additional conveyance service request.

One benefit of at least one Autonomous Vehicle Automated Platform of the present invention can be at least one solution to enroll or employ at least one autonomous vehicle into at least one real time or near real time system and at least one real time or near real time method to facilitate at least one conveyance service. The present invention enables at least one owner or at least one controller of at least one autonomous vehicle to perform or provide at least one conveyance service.

One benefit of at least one Autonomous Vehicle Automated Platform of the present invention can be at least one solution for improved quality of service for at least one conveyance client. Currently, there are problems with quality of service relating to at least one representative. The present invention can improve and mitigate challenges associated with quality of service within the conveyance industry.

One benefit of at least one Autonomous Vehicle Automated Platform of the present invention, automated in whole or in part, can be at least one improved process to manage or control at least one autonomous vehicle or at least one fleet of at least one autonomous vehicle in real time or near real time relating to at least one fleet manager, at least one service provider, at least one good supplier, at least one owner or at least one controller of at least one autonomous vehicle, at least one logistics provider, at least one logistics supplier, or the like. At least one fleet manager, at least one service provider, at least one good supplier, at least one owner or at least one controller of at least one autonomous vehicle, at least one logistics provider, at least one logistics supplier, or the like, can have greater control managing or operating at least one autonomous vehicle by employing at least one Autonomous Vehicle Automated Platform of the present invention. At least one Autonomous Vehicle Automated Platform of the present invention can manage or control at least one autonomous vehicle from at least one single vehicle perspective, at least one fleet perspective, at least one independent third party perspective, or a combination thereof.

At least one Autonomous Vehicle Automated Platform of the present invention can benefit at least one fleet manager, at least one service provider, at least one good supplier, at least one owner or at least one controller of at least one autonomous vehicle, at least one logistics provider, at least one logistics supplier, or the like, by integrating or implementing software, hardware, logistics, or a combination thereof, to optimize vehicle utilization in real time or near real time. At least one Autonomous Vehicle Automated Platform of the present invention can integrate or implement software, hardware, logistics, or a combination thereof, for or with at least one fleet manager, at least one service provider, at least one good supplier, at least one owner or at least one controller of at least one autonomous vehicle, at least one logistics provider, at least one logistics supplier, or the like. At least one Autonomous Vehicle Automated Platform of the present invention can integrate or implement software, hardware, logistics, or a combination thereof, for or with at least one fleet manager, at least one service provider, at least one good supplier, at least one owner or at least one controller of at least one autonomous vehicle, at least one logistics provider, at least one logistics supplier, or the like, to facilitate at least one conveyance service in real time or near real time between at least one autonomous vehicle and at least one conveyance client. At least one fleet manager, at least one service provider, at least one good supplier, at least one owner or at least one controller of at least one autonomous vehicle, at least one logistics provider, at least one logistics supplier, or the like, can employ or utilize at least one Autonomous Vehicle Automated Platform of the present invention to optimize vehicle utilization, which can result in more affordable services and can improve consumer sentiment among or with at least one conveyance client.

At least one Autonomous Vehicle Automated Platform of the present invention can benefit at least one fleet manager, at least one service provider, at least one good supplier, at least one owner or at least one controller of at least one autonomous vehicle, at least one logistics provider, at least one logistics supplier, or the like, by having at least one third party control or operate at least one autonomous vehicle to perform at least one conveyance service.

At least one Autonomous Vehicle Automated Platform of the present invention can benefit at least one third party or the like, by having at least one fleet manager, at least one service provider, at least one good supplier, at least one owner or at least one controller of at least one autonomous vehicle, at least one logistics provider, at least one logistics supplier, or the like control or operate at least one autonomous vehicle to perform at least one conveyance service.

One benefit of the present invention can be at least one improved ability for at least one representative to interact with including but not limited to at least one conveyance client, at least one good supplier, at least one service provider, at least one owner or at least one controller of at least one autonomous vehicle, at least one good supplier, at least one fleet manager, at least one logistics provider, at least one logistics supplier, or a combination thereof, or a combination thereof, due to increased insight or knowledge relating to at least one conveyance industry segment. The present invention can be at least one tool for presenting including but not limited to at least one preferred conveyance service request, at least one filtered conveyance service request, conveyance data, or a combination thereof, to be analyzed or evaluated by at least one representative.

One benefit of the present invention can be that at least one representative can have more control or flexibility when analyzing or evaluating and then securing or obtaining at least one preferred conveyance service request. At least one representative can set at least one parameter or at least one representative preference on how and where at least one representative wants to work, thus providing more control or flexibility for at least one representative. At least one owner or at least one controller of at least one autonomous vehicle can set at least one parameter or at least one selected preference on how and where to dispatch at least one autonomous vehicle, thus providing more control or flexibility for at least one owner or at least one controller of at least one autonomous vehicle.

One benefit of the present invention for at least one representative or at least one owner or at least one controller of at least one autonomous vehicle can be that at least one method of analyzing or evaluating and then securing or obtaining at least one preferred conveyance service request can now be accomplished in real time or near real time. By utilizing at least one system and at least one method that can operate in real time or near real time, quantum computing, machine learning technology, or a combination thereof, can be incorporated to further improve analysis or evaluation for including but not limited to at least one representative, at least one autonomous vehicle, at least one owner or at least one controller of at least one autonomous vehicle, at least one service provider, at least one good supplier, at least one fleet manager, at least one logistics provider, at least one logistics supplier, or a combination thereof, to secure or obtain at least one preferred conveyance service request.

One benefit of the present invention can be a larger number of at least one conveyance service request available to be analyzed or evaluated by at least one representative, at least one owner or at least one controller of at least one autonomous vehicle, at least one autonomous vehicle, at least one service provider, at least one good supplier, at least one fleet manager, at least one logistics provider, at least one logistics supplier, or a combination thereof. The larger number of at least one conveyance service request that at least one representative, at least one owner or at least one controller of at least one autonomous vehicle, at least one autonomous vehicle, at least one service provider, at least one good supplier, at least one fleet manager, at least one logistics provider, at least one logistics supplier, or a combination thereof, has exposure to, the greater the chance of identifying at least one preferred conveyance service request to secure or obtain given at least one representative preference or at least one selected preference.

One benefit of the present invention can be that at least one representative can now input or provide at least one representative preference to filter at least one conveyance service request into at least one filtered conveyance service request and identify at least one preferred conveyance service request from at least one filtered conveyance service request. At least one representative can analyze or evaluate at least one conveyance service request more efficiently due to at least one improved process by using at least one representative preference to identify and preferably secure or obtain at least one preferred conveyance service request. At least one improved process can allow at least one representative to work more efficiently and spend less time on identifying and securing or obtaining at least one preferred conveyance service request and more time on providing at least one conveyance service.

One benefit of the present invention can be that at least one owner or at least one controller of at least one autonomous vehicle can now input or provide at least one selected preference to filter at least one conveyance service request into at least one filtered conveyance service request and identify at least one preferred conveyance service request from at least one filtered conveyance service request. At least one autonomous vehicle, at least one owner or at least one controller of at least one autonomous vehicle, or a combination thereof, can analyze or evaluate at least one conveyance service request more efficiently due to at least one improved process by using at least one selected preference to identify and preferably secure or obtain at least one preferred conveyance service request. At least one improved process can allow at least one autonomous vehicle, at least one owner or at least one controller of at least one autonomous vehicle, or a combination thereof, to work more efficiently and spend less time on identifying and securing or obtaining at least one preferred conveyance service request and more time on providing at least one conveyance service.

One benefit of the present invention can be that at least one representative can increase their earning potential when securing or obtaining at least one preferred conveyance service request relating to at least one representative preference. The present invention can provide at least one ability for at least one representative to input or provide at least one representative preference to identify and preferably secure or obtain at least one preferred conveyance service request. At least one improved process can allow at least one representative to secure or obtain only at least one preferred conveyance service request that can increase at least one representative's earning potential over at least one given period of time when using at least one elevated pricing preference. At least one representative may only want to provide at least one shorter distance conveyance service to stay within at least one given area when using at least one elevated pricing preference to increase earning potential. At least one representative can increase earning potential for every at least one conveyance service provided within at least one area of elevated pricing rather than at least one representative performing at least one similar conveyance service outside of at least one area of elevated pricing. The increased benefit of higher earning potential extends to including but not limited to at least one autonomous vehicle, at least one owner or at least one controller of at least one autonomous vehicle, at least one service provider, at least one good supplier, at least one fleet manager, at least one logistics provider, at least one logistics supplier, or a combination thereof, or a combination thereof.

One benefit of the present invention can be at least one ability of at least one representative or at least one autonomous vehicle to operate or contract with at least one service provider, at least one good supplier, at least one fleet manager, at least one logistics provider, at least one logistics supplier, or a combination thereof. The present invention can allow at least one representative or at least one autonomous vehicle to operate with at least one service provider, at least one good supplier, at least one fleet manager, at least one logistics provider, at least one logistics supplier, or a combination thereof, concurrently or subsequently.

One benefit of the present invention can be at least one ability of at least one representative or at least one autonomous vehicle to operate or provide at least one conveyance service in at least one conveyance industry segment. Currently, at least one service provider, at least one good supplier, at least one fleet manager, at least one logistics provider, at least one logistics supplier, or a combination thereof, does not have at least one ability to enable at least one representative or at least one autonomous vehicle to operate in at least one additional conveyance industry segment at the same time. The present invention can allow at least one representative or at least one autonomous vehicle to operate initially in at least one conveyance industry segment, then perform at least one conveyance service in at least one different conveyance industry segment, and then go back to operate in at least one first conveyance industry segment. The present invention can seamlessly allow at least one representative or at least one autonomous vehicle to transfer between at least one conveyance industry segment based on at least one representative preference or at least one selected preference.

One benefit of the present invention can be that value can be added to the conveyance industry as a whole. At least one Representative Automated Platform of the present invention and at least one Autonomous Vehicle Automated Platform of the present invention can allow at least one conveyance industry segment to operate more efficiently, handle more capacity, and prosper for future growth of the industry. At least one representative and at least one service provider, at least one good supplier, at least one fleet manager, at least one logistics provider, at least one logistics supplier, or a combination thereof, can benefit from the present invention by increasing satisfaction of at least one representative and allowing at least one representative to identify and perform at least one preferred conveyance service based on at least one representative preference. At least one service provider, at least one good supplier, at least one fleet manager, at least one logistics provider, at least one logistics supplier, or a combination thereof, can also benefit by using at least one autonomous vehicle to help reduce a shortage of at least one representative. At least one owner or at least one controller of at least one autonomous vehicle can benefit from the present invention, as now their at least one autonomous vehicle can holster the supply of at least one representative and increase earning potential while their at least one autonomous vehicle is not in use. At least one conveyance client can benefit from the present invention including but not limited to shorter wait times, higher quality of at least one conveyance service, more price transparency, or a combination thereof. Together, the present invention can improve at least one existing system and at least one existing method by adapting to the real time or near real time environment to enhance at least one conveyance industry segment for the better for all involved.

DETAILED DESCRIPTION OF EXEMPLARY ASPECTS AND EMBODIMENTS OF THE PRESENT INVENTION

I. System #1: Autonomous Vehicle Automated Platform

A first aspect of the present invention includes a real time or near real time system, automated in whole or in part, to assist at least one autonomous vehicle in at least one process of securing or obtaining, within the conveyance industry, at least one preferred conveyance service request relating to at least one selected preference and at least one real time or near real time geographical location of said at least one autonomous vehicle, comprising:

a) at least one external server; comprising:
   i) at least one computer processor;
   ii) at least one computer readable memory;
   iii) at least one network interface;
   iv) at least one real time or near real time source of a plurality of conveyance service requests;
   v) at least one real time or near real time source of conveyance data relating to said at least one autonomous vehicle;
   vi) or a combination thereof;

b) at least one central server; comprising:
   i) at least one computer processor;
   ii) at least one computer readable memory; and
   iii) at least one network interface;

c) at least one terminal; comprising:
   at least one electronic computing device comprising:
   (i) at least one computer processor;
   (ii) at least one computer readable memory;
   (iii) at least one geographical location module; and
   (iv) at least one network interface;

d) at least one application; comprising:
   i) at least one computer program being operable to communicate said at least one preferred conveyance service request with said at least one autonomous vehicle; and
   ii) said at least one computer program being operable to communicate all or some of conveyance data relating to said at least one autonomous vehicle;

e) at least one link; comprising:
  i) at least one electronic communication network channel;
  ii) at least one connection or at least one association with at least one software function or at least one software component;
  iii) or a combination thereof;
f) a plurality of conveyance service requests, comprising: at least one individual conveyance service request comprising:
  (i) at least one request for transporting at least one person, at least one good, at least one thing, or a combination thereof, from at least one geographical location to at least one other geographical location;
  (ii) said individual conveyance service request being updated in real time or near real time; and
  (iii) qualitative and quantitative conveyance data corresponding to said individual conveyance service request;
g) a plurality of filtered conveyance service requests; comprising:
  i) at least one subset of all or some of said plurality of conveyance service requests that is at least one result of filtering all or some of said plurality of conveyance service requests using said at least one selected preference and said at least one real time or near real time geographical location of said at least one autonomous vehicle;
  ii) all or some of said plurality of filtered conveyance service requests being updated in real time or near real time; and
  iii) qualitative and quantitative conveyance data corresponding to individual filtered conveyance service requests;
h) at least one preferred conveyance service request; comprising:
  i) at least one request for transporting said at least one person, said at least one good, said at least one thing, or a combination thereof, from at least one geographical location to at least one other geographical location that is identified from all or some of said plurality of filtered conveyance service requests;
  ii) said at least one preferred conveyance service request being updated in real time or near real time; and
  iii) qualitative and quantitative conveyance data corresponding to an individual preferred conveyance service request;
i) at least one autonomous vehicle; comprising:
  i) at least one self-maneuvering machine or at least one self-driving machine that performs or provides at least one conveyance service;
  ii) said at least one real time or near real time geographical location of said at least one autonomous vehicle being updated in real time or near real time; and
  iii) qualitative and quantitative conveyance data corresponding to said at least one autonomous vehicle; and
j) at least one selected preference; comprising:
  i) at least one option selected or provided by at least one owner or at least one controller of said at least one autonomous vehicle that is used to filter:
    (1) all or some of said plurality of conveyance service requests into all or some of said plurality of filtered conveyance service requests;
    (2) all or some of conveyance data relating to said at least one autonomous vehicle into all or some of filtered conveyance data relating to said at least one autonomous vehicle;
    (3) or a combination thereof; and
  ii) said at least one selected preference being used to identify said at least one preferred conveyance service request, all or some of preferred conveyance data relating to said at least one autonomous vehicle, said at least one autonomous vehicle that is identified as preferred, or a combination thereof;

wherein, all or some of said plurality of conveyance service requests, all or some of conveyance data relating to said at least one autonomous vehicle, all or some of said at least one real time or near real time geographical location of said at least one autonomous vehicle, or a combination thereof, is transmitted in real time or near real time between said at least one external server and said at least one central server by way of at least one link between said at least one external server and said at least one central server;

further wherein, said at least one preferred conveyance service request, all or some of preferred conveyance data relating to said at least one autonomous vehicle, all or some of conveyance data relating to said at least one autonomous vehicle, all or some of said at least one real time or near real time geographical location of said at least one autonomous vehicle, or a combination thereof, is transmitted in real time or near real time between said at least one central server and said at least one application by way of at least one link between said at least one central server and said at least one application;

further wherein, said at least one application operates on said at least one terminal and is utilized by said at least one autonomous vehicle;

further wherein, said at least one terminal is associated with said at least one autonomous vehicle;

further wherein, said at least one central server analyzes or evaluates all or some of said plurality of filtered conveyance service requests, all or some of filtered conveyance data relating to said at least one autonomous vehicle, all or some of said at least one real time or near real time geographical location of said at least one autonomous vehicle, or a combination thereof, and then secures or obtains said at least one preferred conveyance service request or said at least one autonomous vehicle that is identified as preferred relating to said at least one selected preference in real time or near real time;

further wherein, said at least one external server is at least one real time or near real lime source of all or some of said plurality of conveyance service requests, all or some of conveyance data relating to said at least one autonomous vehicle, all or some of said at least one real time or near real time geographical location of said at least one autonomous vehicle, or a combination thereof, that is transmitted in real time or near real time from said at least one external server to said at least one central server by way of at least one link between said at least one external server and said at least one central server;

further wherein, all or some of said plurality of conveyance service requests, all or some of conveyance data relating to said at least one autonomous vehicle, all or some of said at least one real time or near real time geographical location of said at least one autonomous vehicle, or a combination thereof, is updated in real time or near real time;

further wherein, said at least one central server standardizes, aggregates, or a combination thereof, in real time or near real time, all or some of said plurality of conveyance service requests or all or some of conveyance data relating to said at least one autonomous vehicle;

further wherein, said at least one central server filters in real time or near real time, all or some of said plurality of conveyance service requests or all or some of conveyance data relating to said at least one autonomous vehicle by using said at least one selected preference and all or some of said at least one real time or near real time geographical location of said at least one autonomous vehicle, to identify all or some of said plurality of filtered conveyance service requests or all or some of filtered conveyance data relating to said at least one autonomous vehicle;

further wherein, all or some of said plurality of filtered conveyance service requests, all or some of filtered conveyance data relating to said at least one autonomous vehicle, all or some of said at least one real time or near real time geographical location of said at least one autonomous vehicle, or a combination thereof, is updated in real time or near real time;

further wherein, said at least one terminal interfaces with said at least one autonomous vehicle and facilitates or provides operation of said at least one application;

further wherein, said at least one central server analyzes or evaluates all or some of said plurality of filtered conveyance service requests or all or some of filtered conveyance data relating to said at least one autonomous vehicle in real time or near real time, to identify said at least one preferred conveyance service request, all or some of preferred conveyance data relating to said at least one autonomous vehicle, said at least one autonomous vehicle that is identified as preferred, or a combination thereof;

further wherein, said at least one preferred conveyance service request, all or some of preferred conveyance data relating to said at least one autonomous vehicle, all or some of said at least one real time or near real time geographical location of said at least one autonomous vehicle, or a combination thereof, is updated in real time or near real time;

further wherein, said at least one central server secures or obtains said at least one preferred conveyance service request, said at least one autonomous vehicle that is identified as preferred, or a combination thereof, relating to said at least one selected preference in real time or near real time;

further wherein, by way of at least one link between said at least one central server and said at least one application, at least one secured or obtained preferred conveyance service request is transmitted in real time or near real time from said at least one central server to said at least one application and updated in real time or near real time; and further wherein, said at least one autonomous vehicle that is identified as preferred performs or provides said at least one conveyance service relating to said at least one secured or obtained preferred conveyance service request and all or some of said at least one real time or near real time geographical location of said at least one autonomous vehicle updates or changes, while said at least one central server repeatedly analyzes or evaluates all or some of said plurality of conveyance service requests, all or some of conveyance data relating to said at least one autonomous vehicle, all or some of said at least one real time or near real time geographical location of said at least one autonomous vehicle, or a combination thereof, in real time or near real time, and then secures or obtains at least one subsequent or additional preferred conveyance service request for or with said at least one autonomous vehicle that is identified as preferred, until stopped by said at least one owner or said at least one controller of said at least one autonomous vehicle.

An embodiment of the present invention includes, wherein at least one function of said at least one central server or said at least one external server is performed by said at least one application, at least one owner or controller application, or a combination thereof.

Another embodiment of the present invention includes, wherein said at least one central server is located on said at least one terminal associated with said at least one autonomous vehicle.

A further embodiment of the present invention includes, wherein all or some of said plurality of conveyance service requests in conjunction with corresponding conveyance data, all or some of conveyance data relating to said at least one autonomous vehicle, all or some of said at least one real time or near real time geographical location of said at least one autonomous vehicle, or a combination thereof, is structured in at least one different format, and is standardized or converted into at least one uniform format.

An additional embodiment of the present invention includes, wherein all or some of said plurality of conveyance service requests in conjunction with corresponding conveyance data, all or some of conveyance data relating to said at least one autonomous vehicle, all or some of said at least one real time or near real time geographical location of said at least one autonomous vehicle, or a combination thereof, is structured in at least one uniform format prior to being transmitted from said at least one external server to said at least one central server by way of at least one link between said at least one external server and said at least one central server, and is not standardized.

An embodiment of the present invention includes, wherein said at least one application, at least one owner or controller application, or a combination thereof, operates on said at least one central server.

Another embodiment of the present invention includes, wherein all or some of said plurality of conveyance service requests in conjunction with corresponding conveyance data, all or some of conveyance data relating to said at least one autonomous vehicle, all or some of said at least one real time or near real time geographical location of said at least one autonomous vehicle, or a combination thereof, is sourced or provided by said at least one external server.

A further embodiment of the present invention includes, wherein said at least one external server is operated, controlled, or managed by at least one service provider, at least one good supplier, at least one fleet manager, said at least one owner or said at least one controller of said at least one autonomous vehicle, at least one logistics provider, at least one logistics supplier, or a combination thereof, operating in at least one conveyance industry segment.

An additional embodiment of the present invention includes, wherein at least one function of said at least one application, at least one owner or controller application, or a combination thereof, is performed by said at least one central server or said at least one external server.

An embodiment of the present invention includes, wherein all or some of said plurality of conveyance service requests comprise at least one ride-hail service request, at least one ride-share service request, at least one car-share service request, at least one peer-to-peer conveyance service request, at least one transportation service request, at least one person delivery service request, at least one taxi service request, at least one shuttle service request, at least one good delivery service request, at least one item delivery service request, at least one medical service and delivery request, at least one food delivery service request, at least one courier delivery service request, at least one freight delivery service request, at least one animal delivery service request, at least one delivery service request, or a combination thereof.

Another embodiment of the present invention includes, wherein said plurality of conveyance service requests is a single conveyance service request.

A further embodiment of the present invention includes, wherein conveyance data comprises at least one beginning service geographical location, at least one ending service geographical location, pricing information, elevated pricing information, at least one selected preference, at least one distance parameter, at least one estimated time of arrival, at least one time to destination, at least one conveyance client geographical location, at least one conveyance client review, at least one conveyance client rating, at least one conveyance client detail, at least one conveyance service detail, at least one conveyance service route, at least one preferred conveyance client, at least one sensor data, at least one representative geographical location, at least one representative review, at least one representative rating, at least one representative detail, at least one autonomous vehicle geographical location, at least one autonomous vehicle review, at least one autonomous vehicle rating, at least one autonomous vehicle detail, at least one preferred autonomous vehicle, at least one route planning preference, at least one fuel economy preference, at least one battery longevity preference, at least one vehicle capacity preference, at least one vehicle diagnostic preference, at least one conveyance data preference, at least one service provider geographical location, at least one service provider review, at least one service provider rating, at least one service provider detail, at least one preferred service provider, at least one good supplier geographical location, at least one good supplier review, at least one good supplier rating, at least one good supplier detail, at least one preferred good supplier, at least one owner or at least one controller of at least one autonomous vehicle geographical location, at least one owner or at least one controller of at least one autonomous vehicle review, at least one owner or at least one controller of at least one autonomous vehicle rating, at least one owner or at least one controller of at least one autonomous vehicle detail, at least one preferred owner or at least one preferred controller of at least one autonomous vehicle, at least one fleet manager geographical location, at least one fleet manager review, at least one fleet manager rating, at least one fleet manager detail, at least one preferred fleet manager, at least one logistics provider geographical location, at least one logistics provider review, at least one logistics provider rating, at least one logistics provider detail, at least one preferred logistics provider, at least one logistics supplier geographical location, at least one logistics supplier review, at least one logistics supplier rating, at least one logistics supplier detail, at least one preferred logistics supplier, at least one conveyance industry segment detail, at least one preferred conveyance industry segment, at least one good detail, at least one item detail, at least one type of vehicle detail, at least one vehicle detail, at least one measurement of at least one statistical variable, at least one level of service detail, at least one fuel consumption, at least one battery level, at least one vehicle diagnostic, at least one vehicle capacity, or a combination thereof.

An additional embodiment of the present invention includes, wherein all or some of said plurality of conveyance service requests or all or some of conveyance data relating to said at least one autonomous vehicle is filtered relating to said at least one selected preference and all or some of said at least one real time or near real time geographical location of said at least one autonomous vehicle, to identify all or some of said plurality of filtered conveyance service requests or all or some of filtered conveyance data relating to said at least one autonomous vehicle by at least one process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

An additional embodiment of the present invention includes, wherein at least one different geographical location is used other than said at least one real time or near real time geographical location of said at least one autonomous vehicle when filtering all or some of said plurality of conveyance service requests, all or some of conveyance data relating to said at least one autonomous vehicle, or a combination thereof.

An embodiment of the present invention includes, wherein at least one weighted average of said at least one selected preference is used to identify:
  all or some of preferred conveyance data relating to said at least one autonomous vehicle or said at least one autonomous vehicle that is identified as preferred from all or some of filtered conveyance data relating to said at least one autonomous vehicle,
  said at least one preferred conveyance service request from all or some of said plurality of filtered conveyance service requests,
  or a combination thereof.

Another embodiment of the present invention includes, wherein all or some of said plurality of conveyance service requests or all or some of conveyance data relating to said at least one autonomous vehicle is filtered relating to said at least one selected preference, to identify all or some of said plurality of filtered conveyance service requests or all or some of filtered conveyance data relating to said at least one autonomous vehicle by at least one process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

A further embodiment of the present invention includes, wherein at least one weighted average of said at least one selected preference is used to identify:
  all or some of preferred conveyance data relating to said at least one autonomous vehicle or said at least one autonomous vehicle that is identified as preferred from all or some of filtered conveyance data relating to said at least one autonomous vehicle,
  said at least one preferred conveyance service request from all or some of said plurality of filtered conveyance service requests,
  or a combination thereof.

An additional embodiment of the present invention includes, wherein said plurality of filtered conveyance service requests is a single filtered conveyance service request.

An embodiment of the present invention includes, wherein said at least one autonomous vehicle comprises at least one car, at least one automobile, at least one van, at least one delivery van, at least one delivery vehicle, at least one last mile delivery vehicle, at least one vehicle with at least one locker, at least one vehicle with least one storage unit, at least one vehicle with at least one compartment, at least one RV, at least one truck, at least one delivery truck, at least one semi-trailer truck, at least one shuttle, at least one helicopter, at least one boat, at least one vessel, at least one aircraft, at least one spacecraft, at least one bus, at least one train, at least one wagon, at least one rickshaw, at least one scooter, at least one bike, at least one moped, at least one trike, at least one all-terrain vehicle, at least one eighteen wheeler, at least one transportation machine, at least one drone, at least one medical vehicle, or a combination thereof.

Another embodiment of the present invention includes, wherein said at least one selected preference comprises at least one pricing preference, at least one elevated pricing preference, at least one geographical location preference, at least one distance preference, at least one route preference, at least one service duration preference, at least one beginning service geographical location preference, at least one ending service geographical location preference, at least one time preference, at least one predictive preference, at least one historical preference, at least one efficiency preference, at least one sensor preference, at least one event preference, at least one traffic based preference, at least one road condition preference, at least one weather condition preference, at least one transportation preference, at least one route planning preference, at least one fuel economy preference, at least one battery longevity preference, at least one vehicle capacity preference, at least one vehicle diagnostic preference, at least one conveyance data preference, at least one duration of conveyance service preference, at least one conveyance service request density preference, at least one conveyance client density preference, at least one conveyance client detail preference, at least one conveyance client rating preference, at least one representative density preference, at least one autonomous vehicle density preference, at least one service provider preference, at least one service provider density preference, at least one level of service preference, at least one good supplier preference, at least one good supplier density preference, at least one owner or at least one controller of at least one autonomous vehicle preference, at least one owner or at least one controller of at least one autonomous vehicle density preference, at least one fleet manager preference, at least one fleet manager density preference, at least one logistics provider preference, at least one logistics provider density preference, at least one logistics supplier preference, at least one logistics supplier density preference, at least one good detail preference, at least one conveyance industry segment preference, at least one freight preference, at least one waypoint preference, at least one delivery service preference, at least one oldest outstanding request preference, or a combination thereof.

A further embodiment of the present invention includes, wherein said at least one subsequent or additional preferred conveyance service request is secured or obtained in at least one different conveyance industry segment for or with said at least one autonomous vehicle that is identified as preferred.

An additional embodiment of the present invention includes, wherein more than one said preferred conveyance service requests are secured or obtained concurrently for or with said at least one autonomous vehicle that is identified as preferred.

An embodiment of the present invention includes, wherein said at least one owner or said at least one controller of said at least one autonomous vehicle is at least one service provider, at least one good supplier, at least one fleet manager, at least one logistics provider, at least one logistics supplier, or a combination thereof, operating in at least one conveyance industry segment.

Another embodiment of the present invention includes, wherein said at least one central server, said at least one application, at least one owner or controller application, or a combination thereof, proposes or recommends:
  at least one different conveyance service request other than said at least one preferred conveyance service request, or
  at least one different autonomous vehicle other than said at least one autonomous vehicle that is identified as preferred.

A further embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, all or some of said at least one real time or near real time geographical location of said at least one autonomous vehicle, at least one representative preference, said at least one selected preference, said at least one secured or obtained preferred conveyance service request, at least one secured or obtained autonomous vehicle that is identified as preferred, or a combination thereof, is transmitted in real time or near real time between said at least one application and said at least one central server and updated in real time or near real time by way of at least one link between said at least one application and said at least one central server.

An additional embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, all or some of said at least one real time or near real time geographical location of said at least one autonomous vehicle, at least one representative preference, said at least one selected preference, said at least one secured or obtained preferred conveyance service request, at least one secured or obtained autonomous vehicle that is identified as preferred, or a combination thereof, is transmitted in real time or near real time between said at least one application and said at least one external server and updated in real time or near real time by way of at least one link between said at least one application and said at least one external server.

An embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, all or some of said at least one real time or near real time geographical location of said at least one autonomous vehicle, at least one representative preference, said at least one selected preference, said at least one secured or obtained preferred conveyance service request, at least one secured or obtained autonomous vehicle that is identified as preferred, or a combination thereof, is transmitted in real time or near real time between said at least one central server and said at least one external server and updated in real time or near real time by way of at least one link between said at least one central server and said at least one external server.

Another embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, all or some of said at least one real time or near real time geographical location of said at least one autonomous vehicle, at least one representative preference, said at least one selected preference, said at least one secured or obtained preferred conveyance service request, at least one secured or obtained autonomous vehicle that is identified as preferred, or a combination thereof, is transmitted in real time or near real time between at least one owner or controller application and said at least one central server and updated in real time or near real time by way of at least one link between said at least one owner or controller application and said at least one central server.

A further embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, all or some of said at least one real time or near real time geographical location of said at least one autonomous vehicle, at least one representative preference, said at least one selected preference, said at least one secured or obtained preferred conveyance service request, at least one secured or obtained autonomous vehicle that is identified as preferred, or a combination thereof, is transmitted in real time or near real time between at least one owner or controller application and said at least one external server and updated in real time or near real time by way of at least one link between said at least one owner or controller application and said at least one external server.

An additional embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, all or some of said at least one real time or near real time geographical location of said at least one autonomous vehicle, at least one representative preference, said at least one selected preference, said at least one secured or obtained preferred conveyance service request, at least one secured or obtained autonomous vehicle that is identified as preferred, or a combination thereof, is transmitted in real time or near real time between at least one owner or controller application and said at least one application and updated in real time or near real time by way of at least one link between said at least one owner or controller application and said at least one application.

An embodiment of the present invention includes, wherein all or some of conveyance data relating to said at least one autonomous vehicle, all or some of filtered conveyance data relating to said at least one autonomous vehicle, all or some of preferred conveyance data relating to said at least one autonomous vehicle, all or some of said plurality of conveyance service requests, all or some of said plurality of filtered conveyance service requests, said at least one preferred conveyance service request, or a combination thereof, is filtered and identified as preferred in any order prior to securing or obtaining said at least one autonomous vehicle that is identified as preferred or said at least one preferred conveyance service request.

An embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, at least one representative preference, said at least one selected preference, said at least one secured or obtained preferred conveyance service request, at least one secured or obtained autonomous vehicle that is identified as preferred, or a combination thereof, is identified or updated in real time or near real time as all or some of said at least one real time or near real time geographical location of said at least one autonomous vehicle updates or changes or as traffic information updates or changes.

Another embodiment of the present invention includes, wherein said at least one selected preference relating to said at least one owner or said at least one controller of said at least one autonomous vehicle, at least one service provider, at least one good supplier, at least one fleet manager, at least one logistics provider, at least one logistics supplier, or a combination thereof, is provided or inputted into at least one owner or controller application and transmitted to said at least one central server by way of at least one link between said at least one owner or controller application and said at least one central server.

A further embodiment of the present invention includes, wherein said at least one subsequent or additional preferred conveyance service request is secured or obtained for or with said at least one autonomous vehicle that is identified as preferred and at least one order to perform said at least one conveyance service is updated or changed in real time or near real time.

An additional embodiment of the present invention includes, wherein said at least one owner or said at least one controller of said at least one autonomous vehicle secures or obtains:

said at least one said autonomous vehicle that is filtered other than said at least one said autonomous vehicle that is identified as preferred, at least one said filtered conveyance service request other than said at least one preferred conveyance service request, or a combination thereof.

An embodiment of the present invention includes, wherein said at least one preferred conveyance service request, at least one conveyance client, or a combination thereof, is secured or obtained for or with said at least one autonomous vehicle that is identified as preferred, operating in at least one conveyance industry segment.

Another embodiment of the present invention includes, wherein said at least one autonomous vehicle that is identified as preferred is secured or obtained in at least one same or at least one similar process as securing or obtaining said at least one preferred conveyance service request.

A further embodiment of the present invention includes, wherein at least one representative provides or performs all or some of said at least one conveyance service in conjunction with said at least one autonomous vehicle.

An additional embodiment of the present invention includes, wherein said at least one owner or said at least one controller of said at least one autonomous vehicle secures or obtains said at least one preferred conveyance service request for or with said at least one autonomous vehicle that is identified as preferred to perform said at least one conveyance service.

An embodiment of the present invention includes, wherein said at least one application or at least one owner or controller application, secures or obtains said at least one preferred conveyance service request, said at least one autonomous vehicle that is identified as preferred, or a combination thereof.

Another embodiment of the present invention includes, wherein said at least one owner or said at least one controller of said at least one autonomous vehicle uses at least one owner or controller application or said at least one application to secure or obtain said at least one preferred conveyance service request, said at least one autonomous vehicle that is identified as preferred, or a combination thereof.

A further embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, all or some of said at least one real time or near real time geographical location of said at least one autonomous vehicle, at least one representative preference, said at least one selected preference, said at least one secured or obtained preferred conveyance service request, at least one secured or obtained autonomous vehicle that is identified as preferred, or a combination thereof, is transmitted to said at least one owner or controller application or said at least one application and is displayed, comprising at least one pop-up, at least one icon, at least one visual, at least one symbol, at least one pattern, at least one marker, at least one notification, at least one alert, at least one message, at least one short message service, at least one multimedia messaging service, at least one smart messaging service, or at least one extended message service.

An additional embodiment of the present invention includes, wherein said at least one owner or said at least one controller of said at least one autonomous vehicle accepts or declines said at least one preferred conveyance service request, said at least one autonomous vehicle that is identified as preferred, or a combination thereof.

An embodiment of the present invention includes, wherein said at least one owner or said at least one controller of said at least one autonomous vehicle declines said at least one preferred conveyance service request or said at least one autonomous vehicle that is identified as preferred and:

at least one new or different preferred conveyance service request, at least one new or different autonomous vehicle that is identified as preferred, or a combination thereof, is identified and displayed.

An additional embodiment of the present invention includes, wherein said at least one application, at least one owner or controller application, said at least one autonomous vehicle, said at least one terminal, said at least one central server, said at least one external server, at least one link, or a combination thereof, is combined or integrated.

II. Method #1: Autonomous Vehicle Platform

A second aspect of the present invention includes, a real time or near real time method, automated in whole or in part, to assist at least one autonomous vehicle in at least one process of securing or obtaining, within the conveyance industry, at least one preferred conveyance service request relating to at least one selected preference and at least one real time or near real time geographical location of said at least one autonomous vehicle, the method comprising:

a) providing the system of section I above;

b) receiving in real time or near real time, at said at least one central server, all or some of said plurality of conveyance service requests, all or some of conveyance data relating to said at least one autonomous vehicle, all or some of said at least one real time or near real time geographical location of said at least one autonomous vehicle, or a combination thereof, from said at least one external server by way of at least one link between said at least one central server and said at least one external server;

c) storing in real time or near real time, all or some of said plurality of conveyance service requests, all or some of conveyance data relating to said at least one autonomous vehicle, all or some of said at least one real time or near real time geographical location of said at least one autonomous vehicle, or a combination thereof, in said at least one computer readable memory of said at least one central server;

d) standardizing in real time or near real time, all or some of said plurality of conveyance service requests, all or some of conveyance data relating to said at least one autonomous vehicle, all or some of said at least one real time or near real time geographical location of said at least one autonomous vehicle, or a combination thereof, using said at least one central server;

e) aggregating in real time or near real time, all or some of said plurality of conveyance service requests, all or some of conveyance data relating to said at least one autonomous vehicle, all or some of said at least one real time or near real time geographical location of said at least one autonomous vehicle, or a combination thereof, using said at least one central server;

f) transmitting in real time or near real time, all or some of said at least one real time or near real time geographical location of said at least one autonomous vehicle, all or some of conveyance data relating to said at least one autonomous vehicle, or a combination thereof, from said at least one application to said at least one central server by way of at least one link between said at least one application and said at least one central server, wherein:
  (1) said at least one application provides all or some of said at least one real time or near real time geographical location of said at least one autonomous vehicle using said at least one geographical location module of said at least one terminal; and
  (2) said at least one application provides all or some of conveyance data relating to said at least one autonomous vehicle;

g) receiving in real time or near real time, all or some of said at least one real time or near real time geographical location of said at least one autonomous vehicle, all or some of conveyance data relating to said at least one autonomous vehicle, or a combination thereof, at said at least one central server from said at least one application by way of at least one link between said at least one central server and said at least one application;

h) filtering in real time or near real time, at said at least one central server, all or some of said plurality of conveyance service requests, all or some of conveyance data relating to said at least one autonomous vehicle, or a combination thereof, by using said at least one selected preference and all or some of said at least one real time or near real time geographical location of said at least one autonomous vehicle, to identify all or some of said plurality of filtered conveyance service requests or all or some of filtered conveyance data relating to said at least one autonomous vehicle, wherein:
  (1) said at least one selected preference is inputted or provided by said at least one owner or said at least one controller of said at least one autonomous vehicle and stored or cached in said at least one computer readable memory of said at least one central server;

i) identifying in real time or near real time, at said at least one central server, said at least one preferred conveyance service request from all or some of said plurality of filtered conveyance service requests, said at least one autonomous vehicle that is identified as preferred or all or some of preferred conveyance data relating to said at least one autonomous vehicle from all or some of filtered conveyance data relating to said at least one autonomous vehicle, or a combination thereof, relating to said at least one selected preference;

j) securing or obtaining in real time or near real time, at said at least one central server, said at least one preferred conveyance service request, said at least one autonomous vehicle that is identified as preferred, or a combination thereof;

k) transmitting in real time or near real time, said at least one secured or obtained preferred conveyance service request from said at least one central server to said at least one application by way of at least one link between said at least one central server and said at least one application;

l) receiving in real time or near real time, said at least one secured or obtained preferred conveyance service request at said at least one application from said at least one central server by way of at least one link between said at least one application and said at least one central server; and m) wherein, said at least one autonomous vehicle that is identified as preferred performs or provides said at least one conveyance service relating to said at least one secured or obtained preferred conveyance service request and all or some of said at least one real time or near real time geographical location of said at least one autonomous vehicle updates or changes, while said at least one central server repeatedly analyzes or evaluates all or some of said plurality of conveyance service requests, all or some of conveyance data relating to said at least one autonomous vehicle, all or some of said at least one real time or near real time geographical location of said at least one autonomous vehicle, or a combination thereof, in real time or near real time, and then secures or obtains said at least one subsequent or additional preferred conveyance service request for or with said at least one autonomous vehicle that is identified as preferred, until stopped by said at least one owner or said at least one controller of said at least one autonomous vehicle.

An embodiment of the present invention includes, wherein all or some of said plurality of conveyance service requests in conjunction with corresponding conveyance data, all or some of conveyance data relating to said at least one autonomous vehicle, all or some of said at least one real time or near real time geographical location of said at least one autonomous vehicle, or a combination thereof, is structured in at least one different format, and is standardized or converted into at least one uniform format.

Another embodiment of the present invention includes, wherein all or some of said plurality of conveyance service requests in conjunction with corresponding conveyance data, all or some of conveyance data relating to said at least one autonomous vehicle, all or some of said at least one real time or near real time geographical location of said at least one autonomous vehicle, or a combination thereof is structured in at least one uniform format prior to being transmitted from said at least one external server to said at least one central server by way of at least one link between said at least one external server and said at least one central server, and is not standardized.

A further embodiment of the present invention includes, wherein said at least one selected preference is provided or inputted by said at least one owner or said at least one controller of said at least one autonomous vehicle into said at least one application or at least one owner or controller application and stored or cached on said at least one application, said at least one owner or controller application, said at least one computer readable memory of said at least one central server, or a combination thereof.

An additional embodiment of the present invention includes, wherein steps C-G above can be in any order prior to filtering all or some of said plurality of conveyance service requests, all or some of conveyance data relating to said at least one autonomous vehicle, all or some of said at least one real time or near real time geographical location of said at least one autonomous vehicle, or a combination thereof.

An embodiment of the present invention includes, wherein said at least one selected preference, all or some of said at least one real time or near real time geographical location of said at least one autonomous vehicle, all or some of conveyance data relating to said at least one autonomous vehicle, or a combination thereof, is transmitted to said at least one central server at any time prior to filtering all or some of said plurality of conveyance service requests or all or some of conveyance data relating to said at least one autonomous vehicle.

Another embodiment of the present invention includes, wherein all or some of said plurality of conveyance service requests or all or some of conveyance data relating to said at least one autonomous vehicle is filtered relating to said at least one selected preference and all or some of said at least one real time or near real time geographical location of said at least one autonomous vehicle, to identify all or some of said plurality of filtered conveyance service requests or all or some of filtered conveyance data relating to said at least one autonomous vehicle by at least one process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

A further embodiment of the present invention includes, wherein all or some of said plurality of conveyance service requests or all or some of conveyance data relating to said at least one autonomous vehicle are filtered in real time or near real time, said at least one preferred conveyance service request is identified in real time or near real time from all or some of said plurality of filtered conveyance service requests, said at least one autonomous vehicle that is identified as preferred is identified in real time or near real time from all or some of filtered conveyance data relating to said at least one autonomous vehicle, or a combination thereof, on said at least one application by:
 transmitting in real time or near real time, all or some of said plurality of conveyance service requests from said at least one central server to said at least one application by way of at least one link between said at least one central server and said at least one application;
 filtering in real time or near real time, all or some of said plurality of conveyance service requests by using said at least one selected preference and said at least one real time or near real time geographical location of said at least one autonomous vehicle, to identify all or some of said plurality of filtered conveyance service requests; and
 identifying in real time or near real time, said at least one preferred conveyance service request from all or some of said plurality of filtered conveyance service requests relating to said at least one selected preference; or
 transmitting in real time or near real time, all or some of conveyance data relating to said at least one autonomous vehicle from said at least one central server to said at least one application by way of at least one link between said at least one central server and said at least one application;
 filtering in real time or near real time, all or some of conveyance data relating to said at least one autonomous vehicle by using said at least one selected preference and said at least one real time or near real time geographical location of said at least one autonomous vehicle, to identify all or some of said plurality of filtered conveyance service requests; and
 identifying in real time or near real time, said at least one autonomous vehicle that is identified as preferred or all or some of preferred conveyance data relating to said at least one autonomous vehicle from all or some of filtered conveyance data relating to said at least one autonomous vehicle, relating to said at least one selected preference;
 or a combination thereof.

An additional embodiment of the present invention includes, wherein all or some of said plurality of conveyance service requests or all or some of conveyance data relating to said at least one autonomous vehicle are filtered in real time or near real time, said at least one preferred conveyance service request is identified in real time or near real time from all or some of said plurality of filtered conveyance service requests, said at least one autonomous vehicle that is identified as preferred is identified in real time or near real time from all or some of filtered conveyance data relating to said at least one autonomous vehicle, or a combination thereof, on at least one owner or controller application by:
 transmitting in real time or near real time, all or some of said plurality of conveyance service requests from said at least one central server to said at least one owner or controller application by way of at least one link between said at least one central server and said at least one owner or controller application;
 filtering in real time or near real time, all or some of said plurality of conveyance service requests by using said at least one selected preference and said at least one real time or near real time geographical location of said at least one autonomous vehicle, to identify all or some of said plurality of filtered conveyance service requests; and
 identifying in real time or near real time, said at least one preferred conveyance service request from all or some of said plurality of filtered conveyance service requests relating to said at least one selected preference; or
 transmitting in real time or near real time, all or some of conveyance data relating to said at least one autonomous vehicle from said at least one central server to said at least one owner or controller application by way of at least one link between said at least one central server and said at least one owner or controller application;
 filtering in real time or near real time, all or some of conveyance data relating to said at least one autonomous vehicle by using said at least one selected preference and said at least one real time or near real time geographical location of said at least one autonomous vehicle, to identify all or some of said plurality of filtered conveyance service requests; and
 identifying in real time or near real time, said at least one autonomous vehicle that is identified as preferred or all or some of preferred conveyance data relating to said at least one autonomous vehicle from all or some of filtered conveyance data relating to said at least one autonomous vehicle, relating to said at least one selected preference;
 or a combination thereof.

An embodiment of the present invention includes, wherein at least one different geographical location is used other than said at least one real time or near real time geographical location of said at least one autonomous vehicle when filtering all or some of said plurality of conveyance service requests, all or some of conveyance data relating to said at least one autonomous vehicle, or a combination thereof.

An another embodiment of the present invention includes, wherein all or some of said plurality of conveyance service requests or all or some of conveyance data relating to said at least one autonomous vehicle is filtered relating to said at least one selected preference, to identify all or some of said plurality of filtered conveyance service requests or all or some of filtered conveyance data relating to said at least one autonomous vehicle by at least one process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

A further embodiment of the present invention includes, wherein all or some of said plurality of conveyance service requests or all or some of conveyance data relating to said at least one autonomous vehicle are filtered in real time or near real time, said at least one preferred conveyance service request is identified in real time or near real time from all or some of said plurality of filtered conveyance service requests, said at least one autonomous vehicle that is identified as preferred is identified in real time or near real time from all or some of filtered conveyance data relating to said at least one autonomous vehicle, or a combination thereof, on said at least one application by:
  transmitting in real time or near real time, all or some of said plurality of conveyance service requests from said at least one central server to said at least one application by way of at least one link between said at least one central server and said at least one application;
  filtering in real time or near real time, all or some of said plurality of conveyance service requests by using said at least one selected preference to identify all or some of said plurality of filtered conveyance service requests; and
  identifying in real time or near real time, said at least one preferred conveyance service request from all or some of said plurality of filtered conveyance service requests relating to said at least one selected preference; or
  transmitting in real time or near real time, all or some of conveyance data relating to said at least one autonomous vehicle from said at least one central server to said at least one application by way of at least one link between said at least one central server and said at least one application;
  filtering in real time or near real time, all or some of conveyance data relating to said at least one autonomous vehicle by using said at least one selected preference to identify all or some of said plurality of filtered conveyance service requests; and
  identifying in real time or near real time, said at least one autonomous vehicle that is identified as preferred or all or some of preferred conveyance data relating to said at least one autonomous vehicle from all or some of filtered conveyance data relating to said at least one autonomous vehicle, relating to said at least one selected preference;
  or a combination thereof.

An additional embodiment of the present invention includes, wherein all or some of said plurality of conveyance service requests or all or some of conveyance data relating to said at least one autonomous vehicle are filtered in real time or near real time, said at least one preferred conveyance service request is identified in real time or near real time from all or some of said plurality of filtered conveyance service requests, said at least one autonomous vehicle that is identified as preferred is identified in real time or near real time from all or some of filtered conveyance data relating to said at least one autonomous vehicle, or a combination thereof, on at least one owner or controller application by:
  transmitting in real time or near real time, all or some of said plurality of conveyance service requests from said at least one central server to said at least one owner or controller application by way of at least one link between said at least one central server and said at least one owner or controller application;
  filtering in real time or near real time, all or some of said plurality of conveyance service requests by using said at least one selected preference to identify all or some of said plurality of filtered conveyance service requests; and
  identifying in real time or near real time, said at least one preferred conveyance service request from all or some of said plurality of filtered conveyance service requests relating to said at least one selected preference; or
  transmitting in real time or near real time, all or some of conveyance data relating to said at least one autonomous vehicle from said at least one central server to said at least one owner or controller application by way of at least one link between said at least one central server and said at least one owner or controller application;
  filtering in real time or near real time, all or some of conveyance data relating to said at least one autonomous vehicle by using said at least one selected preference to identify all or some of said plurality of filtered conveyance service requests; and
  identifying in real time or near real time, said at least one autonomous vehicle that is identified as preferred or all or some of preferred conveyance data relating to said at least one autonomous vehicle from all or some of filtered conveyance data relating to said at least one autonomous vehicle, relating to said at least one selected preference;
  or a combination thereof.

An embodiment of the present invention includes, wherein said at least one preferred conveyance service request relating to said at least one selected preference is identified from all or some of said plurality of filtered conveyance service requests, said at least one autonomous vehicle that is identified as preferred or all or some of preferred conveyance data relating to said at least one autonomous vehicle relating to said at least one selected preference is identified from or all or some of filtered conveyance data relating to said at least one autonomous vehicle, or a combination thereof, by using at least one sorting algorithm, at least one selection algorithm, at least one search algorithm, at least one merge algorithm, at least one maximum function, at least one minimum function, at least one graph algorithm, at least one graph search algorithm, at least one tree algorithm, at least one tree search algorithm, at least one matrix calculation, at least one matrix algorithm, at least one comparison, or a combination thereof.

Another embodiment of the present invention includes, wherein at least one weighted average of said at least one selected preference is used to identify:
  all or some of preferred conveyance data relating to said at least one autonomous vehicle or said at least one autonomous vehicle that is identified as preferred from all or some of filtered conveyance data relating to said at least one autonomous vehicle, said at least one preferred conveyance service request from all or some of said plurality of filtered conveyance service requests, or a combination thereof.

A further embodiment of the present invention includes, wherein said at least one preferred conveyance service request is identified in real time or near real time from all or some of said plurality of filtered conveyance service requests or said at least one autonomous vehicle that is identified as preferred is identified in real time or near real time from all or some of filtered conveyance data relating to said at least one autonomous vehicle on said at least one application by:

transmitting in real time or near real time, all or some of said plurality of filtered conveyance service requests from said at least one central server to said at least one application by way of at least one link between said at least one central server and said at least one application; and identifying in real time or near real time, said at least one preferred conveyance service request from all or some of said plurality of filtered conveyance service requests relating to said at least one selected preference, transmitting in real time or near real time, all or some of conveyance data relating to said at least one autonomous vehicle from said at least one central server to said at least one application by way of at least one link between said at least one central server and said at least one application; and identifying in real time or near real time, said at least one autonomous vehicle that is identified as preferred or all or some of preferred conveyance data relating to said at least one autonomous vehicle from all or some of filtered conveyance data relating to said at least one autonomous vehicle, relating to said at least one selected preference, or a combination thereof.

An additional embodiment of the present invention includes, wherein said at least one preferred conveyance service request is identified in real time or near real time from all or some of said plurality of filtered conveyance service requests or said at least one autonomous vehicle that is identified as preferred is identified in real time or near real time from all or some of filtered conveyance data relating to said at least one autonomous vehicle on at least one owner or controller application by:

transmitting in real time or near real time, all or some of said plurality of filtered conveyance service requests from said at least one central server to said at least one owner or controller application by way of at least one link between said at least one central server and said at least one owner or controller application; and identifying in real time or near real time, said at least one preferred conveyance service request from all or some of said plurality of filtered conveyance service requests relating to said at least one selected preference, transmitting in real time or near real time, all or some of conveyance data relating to said at least one autonomous vehicle from said at least one central server to said at least one owner or controller application by way of at least one link between said at least one central server and said at least one owner or controller application; and identifying in real time or near real time, said at least one autonomous vehicle that is identified as preferred or all or some of preferred conveyance data relating to said at least one autonomous vehicle from all or some of filtered conveyance data relating to said at least one autonomous vehicle, relating to said at least one selected preference, or a combination thereof.

An embodiment of the present invention includes, wherein more than one said preferred conveyance service requests are secured or obtained concurrently for or with said at least one autonomous vehicle that is identified as preferred.

Another embodiment of the present invention includes, wherein said at least one application, at least one owner or controller application, or a combination thereof, operates on said at least one central server.

A further embodiment of the present invention includes, wherein all or some of said plurality of conveyance service requests in conjunction with corresponding conveyance data, all or some of conveyance data relating to said at least one autonomous vehicle, all or some of said at least one real time or near real time geographical location of said at least one autonomous vehicle, or a combination thereof, is sourced or provided by said at least one external server.

An additional embodiment of the present invention includes, wherein said at least one external server is operated, controlled, or managed by at least one service provider, at least one good supplier, at least one fleet manager, said at least one owner or said at least one controller of said at least one autonomous vehicle, at least one logistics provider, at least one logistics supplier, or a combination thereof, operating in at least one conveyance industry segment.

An embodiment of the present invention includes, wherein said at least one subsequent or additional preferred conveyance service request is secured or obtained in at least one different conveyance industry segment for or with said at least one autonomous vehicle that is identified as preferred.

Another embodiment of the present invention includes, wherein said at least one owner or said at least one controller of said at least one autonomous vehicle is at least one service provider, at least one good supplier, at least one fleet manager, at least one logistics provider, at least one logistics supplier, or a combination thereof, operating in at least one conveyance industry segment.

A further embodiment of the present invention includes, wherein said at least one central server, said at least one application, at least one owner or controller application, or a combination thereof, proposes or recommends:

at least one different conveyance service request other than said at least one preferred conveyance service request, or at least one different autonomous vehicle other than said at least one autonomous vehicle that is identified as preferred.

An additional embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, all or some of said at least one real time or near real time geographical location of said at least one autonomous vehicle, at least one representative preference, said at least one selected preference, said at least one secured or obtained preferred conveyance service request, at least one secured or obtained autonomous vehicle that is identified as preferred, or a combination thereof, is transmitted in real time or near real time between said at least one application and said at least one central server and updated in real time or near real time by way of at least one link between said at least one application and said at least one central server.

An embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, all or some of said at least one real time or near real time geographical location of said at least one autonomous vehicle, at least one representative preference, said at least one selected preference, said at least one secured or obtained preferred conveyance service request, at least one secured or obtained autonomous vehicle that is identified as preferred, or a combination thereof, is transmitted in real time or near real time between said at least one application and said at least one external server and updated in real time or near real time by way of at least one link between said at least one application and said at least one external server.

Another embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, all or some of said at least one real time or near real time geographical location of said at least one autonomous vehicle, at least one representative preference, said at least one selected preference, said at least one secured or obtained preferred conveyance service request, at least one secured or obtained autonomous vehicle that is identified as preferred, or a combination thereof, is transmitted in real time or near real time between said at least one central server and said at least one external server and updated in real time or near real time by way of at least one link between said at least one central server and said at least one external server.

A further embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, all or some of said at least one real time or near real time geographical location of said at least one autonomous vehicle, at least one representative preference, said at least one selected preference, said at least one secured or obtained preferred conveyance service request, at least one secured or obtained autonomous vehicle that is identified as preferred, or a combination thereof, is transmitted in real time or near real time between at least one owner or controller application and said at least one central server and updated in real time or near real time by way of at least one link between said at least one owner or controller application and said at least one central server.

An additional embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, all or some of said at least one real time or near real time geographical location of said at least one autonomous vehicle, at least one representative preference, said at least one selected preference, said at least one secured or obtained preferred conveyance service request, at least one secured or obtained autonomous vehicle that is identified as preferred, or a combination thereof, is transmitted in real time or near real time between at least one owner or controller application and said at least one external server and updated in real time or near real time by way of at least one link between said at least one owner or controller application and said at least one external server.

An additional embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, all or some of said at least one real time or near real time geographical location of said at least one autonomous vehicle, at least one representative preference, said at least one selected preference, said at least one secured or obtained preferred conveyance service request, at least one secured or obtained autonomous vehicle that is identified as preferred, or a combination thereof, is transmitted in real time or near real time between at least one owner or controller application and said at least one application and updated in real time or near real time by way of at least one link between said at least one owner or controller application and said at least one application.

An embodiment of the present invention includes, wherein all or some of conveyance data relating to said at least one autonomous vehicle, all or some of filtered conveyance data relating to said at least one autonomous vehicle, all or some of preferred conveyance data relating to said at least one autonomous vehicle, all or some of said plurality of conveyance service requests, all or some of said plurality of filtered conveyance service requests, said at least one preferred conveyance service request, or a combination thereof, is filtered and identified as preferred in any order prior to securing or obtaining said at least one autonomous vehicle that is identified as preferred or said at least one preferred conveyance service request.

Another embodiment of the present invention includes, wherein at least one function of said at least one central server or said at least one external server is performed by said at least one application, at least one owner or controller application, or a combination thereof.

A further embodiment of the present invention includes, wherein said plurality of conveyance service requests is a single conveyance service request.

An embodiment of the present invention includes, wherein said plurality of filtered conveyance service requests is a single filtered conveyance service request.

Another embodiment of the present invention includes, wherein said at least one owner or said at least one controller of said at least one autonomous vehicle secures or obtains:
 said at least one said autonomous vehicle that is filtered other than said at least one said autonomous vehicle that is identified as preferred,
 at least one said filtered conveyance service request other than said at least one preferred conveyance service request,
 or a combination thereof.

A further embodiment of the present invention includes, wherein said at least one preferred conveyance service request, at least one conveyance client, or a combination thereof, is secured or obtained for or with said at least one autonomous vehicle that is identified as preferred, operating in at least one conveyance industry segment.

An additional embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, at least one representative preference, said at least one selected preference, said at least one secured or obtained preferred conveyance service request, at least one secured or obtained autonomous vehicle that is identified as preferred, or a combination thereof, is identified or updated in real time or near real time as all or some of said at least one real time or near real time geographical location of said at least one autonomous vehicle updates or changes or as traffic information updates or changes.

An embodiment of the present invention includes, wherein said at least one subsequent or additional preferred conveyance service request is secured or obtained for or with said at least one autonomous vehicle that is identified as preferred and at least one order to perform said at least one conveyance service is updated or changed in real time or near real time.

Another embodiment of the present invention includes, wherein at least one function of said at least one application, at least one owner or controller application, or a combination thereof, is performed by said at least one central server or said at least one external server.

A further embodiment of the present invention includes, wherein all or some of conveyance data relating to said at least one autonomous vehicle is filtered and identified as all or some of preferred conveyance data relating to said at least one autonomous vehicle or said at least one autonomous vehicle that is identified as preferred, relating to said at least one selected preference, all or some of conveyance data relating to said at least one autonomous vehicle, all or some of said at least one real time or near real time geographical location of said at least one autonomous vehicle, or a combination thereof, and is secured or obtained.

An additional embodiment of the present invention includes, wherein at least one process of filtering, identifying as preferred, and securing or obtaining said at least one preferred conveyance service request as in steps H-L above, is used with said at least one selected preference to filter, identify as preferred, and secure or obtain said at least one autonomous vehicle that is identified as preferred.

An embodiment of the present invention includes, wherein at least one process of securing or obtaining said at least one preferred conveyance service request is used with said at least one selected preference to secure or obtain said at least one autonomous vehicle that is identified as preferred.

Another embodiment of the present invention includes, wherein at least one representative provides or performs all or some of said at least one conveyance service in conjunction with said at least one autonomous vehicle.

A further embodiment of the present invention includes, wherein said at least one owner or said at least one controller of said at least one autonomous vehicle secures or obtains said at least one preferred conveyance service request for or with said at least one autonomous vehicle that is identified as preferred to perform said at least one conveyance service.

An additional embodiment of the present invention includes, wherein said at least one application or at least one owner or controller application, secures or obtains said at least one preferred conveyance service request, said at least one autonomous vehicle that is identified as preferred, or a combination thereof.

An embodiment of the present invention includes, wherein said at least one owner or said at least one controller of said at least one autonomous vehicle uses at least one owner or controller application or said at least one application to secure or obtain said at least one preferred conveyance service request, said at least one autonomous vehicle that is identified as preferred, or a combination thereof.

An embodiment of the present invention includes, wherein said at least one preferred conveyance service request in conjunction with corresponding conveyance data, all or some of said plurality of filtered conveyance service requests in conjunction with corresponding conveyance data, all or some of said plurality of conveyance service requests in conjunction with corresponding conveyance data, all or some of preferred conveyance data relating to said at least one autonomous vehicle, all or some of filtered conveyance data relating to said at least one autonomous vehicle, all or some of conveyance data relating to said at least one autonomous vehicle, all or some of said at least one real time or near real time geographical location of said at least one autonomous vehicle, at least one representative preference, said at least one selected preference, said at least one secured or obtained preferred conveyance service request, at least one secured or obtained autonomous vehicle that is identified as preferred, or a combination thereof, is transmitted to said at least one owner or controller application or said at least one application and is displayed, comprising at least one pop-up, at least one icon, at least one visual, at least one symbol, at least one pattern, at least one marker, at least one notification, at least one alert, at least one message, at least one short message service, at least one multimedia messaging service, at least one smart messaging service, or at least one extended message service.

Another embodiment of the present invention includes, wherein said at least one owner or said at least one controller of said at least one autonomous vehicle accepts or declines said at least one preferred conveyance service request, said at least one autonomous vehicle that is identified as preferred, or a combination thereof.

A further embodiment of the present invention includes, wherein said at least one owner or said at least one controller of said at least one autonomous vehicle declines said at least one preferred conveyance service request or said at least one autonomous vehicle that is identified as preferred and:

at least one new or different preferred conveyance service request, at least one new or different autonomous vehicle that is identified as preferred, or a combination thereof, is identified and displayed.

A further embodiment of the present invention includes, wherein said at least one central server is located on said at least one terminal associated with said at least one autonomous vehicle.

A further embodiment of the present invention includes, wherein said at least one application, at least one owner or controller application, said at least one autonomous vehicle, said at least one terminal, said at least one central server, said at least one external server, at least one link, or a combination thereof, is combined or integrated.

III. Detailed Description of Sections I and II

The following detailed description of invention, which includes in part, a system and method for securing or obtaining at least one preferred conveyance service request within the conveyance industry. The system includes but is not limited to the following hardware, software, parties, automated platforms, and some information involved in securing or obtaining at least one preferred conveyance service request within the conveyance industry.

Near Real Time

Near real time can for example pertain to a delay introduced, by automated data processing, between at least one occurrence of at least one event and at least one use of the processed data. Near real time can refer to the timeliness of data or information, which can be delayed by the time required for electronic communication and automatic data processing. Near real time can imply no significant delays. Near real time can refer to the highest level of development or state of the art.

As a non-limiting example, near real time can be in or similar to real time. As a non-limiting example, near real time can depict at least one event or at least one situation as it existed at the current time less the processing time. As a non-limiting example, at least one function of at least one system, at least one method, or a combination thereof, can be performed in real time or near real time. As a non-limiting example, at least one real time or near real time geographical location of at least one autonomous vehicle can be updated in real time or near real time. As a non-limiting example, at least one real time or near real time geographical location of at least one fleet of at least one autonomous vehicle can be updated in real time or near real time.

Conveyance Client

At least one conveyance client can be but is not limited to at least one person, at least one entity, at least one robot, at least one machine, or a combination thereof, that can for example receive or request at least one conveyance service. At least one conveyance client does not have to be at least one consumer of at least one conveyance service. At least one conveyance client can perform at least one function in real time or near real time being updated or refreshed in the highest level of development or state of the art.

At least one conveyance client can, for example, input or generate at least one conveyance service request, which can become at least one filtered conveyance service request and/or at least one preferred conveyance service request for or with including but not limited to at least one representative, at least one autonomous vehicle, at least one owner or at least one controller of at least one autonomous vehicle, at least one service provider, at least one good supplier, at least one fleet manager, at least one logistics provider, at least one logistics supplier, or a combination thereof.

As a non-limiting example, at least one conveyance client can be at least one passenger in the ride-hail industry segment. As a non-limiting example, at least one conveyance client can be at least one consumer of at least one good in the food delivery industry segment. As a non-limiting example, at least one conveyance client can be at least one consumer of freight in the freight delivery industry segment. As a non-limiting example, at least one conveyance client can analyze or evaluate all or some of conveyance data relating to at least one autonomous vehicle. As a non-limiting example, at least one conveyance client can utilize at least one front end application relating to at least one Autonomous Vehicle Automated Platform to analyze or evaluate all or some of conveyance data relating to at least one autonomous vehicle operating for or with at least one owner or at least one controller of at least one autonomous vehicle, at least one service provider, at least one good supplier, at least one fleet manager, at least one logistics provider, at least one logistics supplier, or a combination thereof. As a non-limiting example, at least one conveyance client can benefit from at least one improved system, at least one improved method, or a combination thereof, relating to at least one Autonomous Vehicle Automated Platform.

Service Provider

At least one service provider can be for example at least one entity or at least one business that can retain or contract with including but not limited to at least one representative, at least one autonomous vehicle, at least one owner or at least one controller of at least one autonomous vehicle, at least one good supplier, at least one fleet manager, at least one logistics provider, at least one logistics supplier, or a combination thereof, to provide at least one conveyance service. At least one service provider can facilitate at least one conveyance service between including but not limited to at least one representative, at least one autonomous vehicle, at least one owner or at least one controller of at least one autonomous vehicle, at least one good supplier, at least one fleet manager, at least one conveyance client, at least one logistics provider, at least one logistics supplier, or a combination thereof. At least one service provider can be at least one entity or at least one business that can for example provide or perform at least one service, at least one delivery service, or a combination thereof. At least one service provider can own, operate, or control at least one autonomous vehicle.

At least one service provider, via at least one external server, can be at least one source or at least one provider of at least one conveyance service request with corresponding conveyance data, at least one autonomous vehicle with corresponding conveyance data, at least one real time or near real time geographical location of at least one autonomous vehicle, or a combination thereof, relating to at least one conveyance industry segment. At least one service provider can for example utilize at least one external server that can be at least one source or at least one provider of at least one conveyance service request with corresponding conveyance data, at least one autonomous vehicle, all or some of conveyance data relating to at least one autonomous vehicle, all or some of at least one real time or near real time geographical location of at least one autonomous vehicle, any data or information related to at least one autonomous vehicle, or a combination thereof, relating to at least one conveyance industry segment.

At least one service provider can operate, own, or control at least one autonomous vehicle. At least one service provider can operate, own, or control at least one autonomous vehicle on behalf of at least one third party. At least one service provider can operate, own, or control at least one network to facilitate at least one conveyance service in at least one conveyance industry segment. At least one service provider can operate, own, or control at least one autonomous vehicle on at least one network. At least one service provider can operate, own, or control at least one autonomous vehicle on at least one other network. At least one service provider can operate, own, or control at least one autonomous vehicle on behalf of at least one third party on at least one network.

At least one service provider can use at least one Representative Automated Platform to facilitate, operate, or manage at least one conveyance service. At least one service provider can use at least one Autonomous Vehicle Automated Platform to facilitate, operate, or manage at least one conveyance service. At least one service provider can use at least one Autonomous Vehicle Automated Platform to control or operate at least one autonomous vehicle. At least one service provider can use at least one Autonomous Vehicle Automated Platform to secure or obtain at least one preferred conveyance service request for or with at least one autonomous vehicle that can be identified as preferred, at least one autonomous vehicle, or a combination thereof.

At least one service provider can use including but not limited to at least one central server, at least one external server, at least one application, at least one owner or controller application, or a combination thereof, to facilitate and perform at least one conveyance service. At least one service provider can operate in at least one conveyance industry segment. At least one service provider can independently control or operate including but not limited to at least one conveyance network of at least one representative, at least one autonomous vehicle, at least one good supplier, at least one fleet manager, at least one logistics provider, at least one logistics supplier, at least one conveyance client, at least one owner or at least one controller of at least one autonomous vehicle, or a combination thereof. At least one service provider can optionally be perceived or referred to as at least one owner or at least one controller of at least one autonomous vehicle. At least one service provider can utilize Information Technology infrastructure relating to including but not limited to at least one service provider, at least one good supplier, at least one owner or at least one controller of at least one autonomous vehicle, at least one fleet manager, at least one logistics provider, at least one logistics supplier, or a combination thereof. At least one service provider can perform at least one function in real time or near real time being updated or refreshed in the highest level of development or state of the art. At least one service provider can accept or decline at least one preferred conveyance service request, at least one autonomous vehicle that can be identified as preferred, or a combination thereof.

At least one service provider can be but is not limited to at least one vehicle that can have or utilize at least one designated locker, or the like, that can be at least one good supplier or at least one autonomous vehicle. At least one service provider can be but is not limited to at least one vehicle that can have or utilize at least one compartment, or the like, that can be at least one mobile good supplier, at least one mobile autonomous vehicle, at least one mobile store front, at least one last mile delivery vehicle, at least one mobile logistics provider, at least one mobile logistics supplier, or a combination thereof.

As a non-limiting example, at least one service provider can be but is not limited to at least one rideshare service controller, at least one ride-hail service controller, at least one car-share service controller, at least one taxi service controller, at least one shuttle service controller, at least one person delivery service controller, at least one food delivery service controller, at least one good delivery service controller, at least one animal delivery service controller, at least one medical service and delivery controller, at least one courier service controller, at least one item delivery service controller, at least one freight delivery service controller, at least one peer-to-peer conveyance service controller, at least one delivery service controller, at least one transportation service controller, or a combination thereof.

As a non-limiting example, at least one service provider can be perceived or referred to as at least one representative when utilizing at least one autonomous vehicle. As a non-limiting example, at least one service provider can be perceived or referred to as at least one autonomous vehicle, at least one fleet of at least one autonomous vehicle, at least one representative, at least one good supplier, at least one fleet manager, at least one owner or at least one controller of at least one autonomous vehicle, at least one logistics provider, at least one logistics supplier, at least one third party, or a combination thereof.

As a non-limiting example, at least one service provider can operate in at least one individual conveyance industry segment. As a non-limiting example, at least one service provider can be at least one source or at least one provider of all or some of at least one conveyance service request in conjunction with corresponding conveyance data, all or some of conveyance data relating to at least one autonomous vehicle, all or some of at least one autonomous vehicle, all or some of at least one real time or near real time geographical location of at least one autonomous vehicle, all or some of conveyance data relating to at least one fleet of at least one autonomous vehicle, all or some of at least one fleet of at least one autonomous vehicle, all or some of at least one real time or near real time geographical location of at least one fleet of at least one autonomous vehicle, or a combination thereof.

As a non-limiting example, at least one service provider can have or utilize at least one API that can provide all or some of at least one conveyance service request with corresponding conveyance data, all or some of at least one autonomous vehicle with corresponding conveyance data, all or some of at least one real time or near real time geographical location of at least one autonomous vehicle, all or some of conveyance data relating to at least one fleet of at least one autonomous vehicle, all or some of at least one real time or near real time geographical location of at least one fleet of at least one autonomous vehicle, or a combination thereof. As a non-limiting example, at least one service provider can have or generate all or some of conveyance data.

As a non-limiting example, at least one service provider can operate or control at least one autonomous vehicle for or on behalf of at least one OEM or at least one auto manufacturer to provide at least one conveyance service. As a non-limiting example, at least one service provider can control or operate at least one autonomous vehicle or at least one fleet of at least one autonomous vehicle for or on behalf of at least one OEM on at least one network that can operate in at least one conveyance industry segment. As a non-limiting example, at least one service provider can utilize at least one external server for or with at least one conveyance industry segment. As a non-limiting example, at least one service provider can lease or sublease at least one autonomous vehicle. As a non-limiting example, at least one service provider can lease or sublease at least one fleet of at least one autonomous vehicle. As a non-limiting example, at least one service provider can lease or sublease at least one autonomous vehicle or at least one fleet of at least one autonomous vehicle from at least one third party.

As a non-limiting example, at least one service provider can be for example at least one entity or at least one business that can retain or contract with including but not limited at least one fleet of at least one autonomous vehicle to provide at least one conveyance service. As a non-limiting example, at least one service provider can retain or contract at least one fleet of at least one autonomous vehicle in at least one conveyance industry segment. As a non-limiting example, at least one service provider can use at least one Autonomous Vehicle Automated Platform to control or operate at least one fleet of at least one autonomous vehicle.

As a non-limiting example, at least one service provider can own, operate, or control at least one fleet of at least one autonomous vehicle. As a non-limiting example, at least one service provider can own, operate, or control at least one fleet of at least one autonomous vehicle on at least one network. As a non-limiting example, at least one service provider can own, operate, or control at least one fleet of at least one autonomous vehicle on at least one other network. As a non-limiting example, at least one service provider can own, operate, or control at least one fleet of at least one autonomous vehicle on behalf of at least one third party on at least one network.

As a non-limiting example, at least one service provider can for example utilize at least one external server that can be at least one source or at least one provider of all or some of at least one fleet of at least one autonomous vehicle, all or some of conveyance data relating to at least one fleet of at least one autonomous vehicle, all or some of at least one real time or near real time geographical location of at least one fleet of at least one autonomous vehicle, any data or information related to at least one fleet of at least one autonomous vehicle, or a combination thereof, relating to at least one conveyance industry segment.

As a non-limiting example, at least one service provider or the like can input or provide at least one selected preference into at least one owner or controller application, being at least one computer program and at least one selected preference can be transmitted to at least one central server, at least one external server, at least one application, or a combination thereof. As a non-limiting example, at least one service provider can use at least one Autonomous Vehicle Automated Platform, at least one Representative Automated Platform, or a combination thereof, to facilitate, operate, perform, or the like, at least one conveyance service in at least one conveyance industry segment.

Good Supplier

At least one good supplier can be for example at least one entity or at least one business that can provide or supply including but not limited to at least one good, at least one article, at least one thing, at least one item, or a combination thereof, to be conveyed in at least one conveyance service. At least one good supplier can be for example at least one entity or at least one business that can provide or supply including but not limited to at least one service, at least one delivery service, or a combination thereof. At least one good supplier can own, operate, or control at least one autonomous vehicle.

At least one good supplier can be for example at least one entity or at least one business that can retain or contract with including but not limited to at least one representative, at least one autonomous vehicle, at least one owner or at least one controller of at least one autonomous vehicle, at least one service provider, at least one fleet manager, at least one logistics provider, at least one logistics supplier, or a combination thereof, to provide at least one conveyance service. At least one good supplier can facilitate at least one conveyance service between including but not limited to at least one representative, at least one autonomous vehicle, at least one owner or at least one controller of at least one autonomous vehicle, at least one service provider, at least one fleet manager, at least one logistics provider, at least one logistics supplier, at least one conveyance client, or a combination thereof.

At least one good supplier, via at least one external server, can be at least one source or at least one provider of at least one conveyance service request with corresponding conveyance data, at least one autonomous vehicle with corresponding conveyance data, at least one real time or near real time geographical location of at least one autonomous vehicle, or a combination thereof, relating to at least one conveyance industry segment. At least one good supplier can for example utilize at least one external server that can be at least one source or at least one provider of at least one conveyance service request with corresponding conveyance data, at least one autonomous vehicle, all or some of conveyance data relating to at least one autonomous vehicle, all or some of at least one real time or near real time geographical location of at least one autonomous vehicle, any data or information related to at least one autonomous vehicle, or a combination thereof, relating to at least one conveyance industry segment.

At least one good supplier can operate, own, or control at least one autonomous vehicle. At least one good supplier can operate, own, or control at least one autonomous vehicle on behalf of at least one third party. At least one good supplier can operate, own, or control at least one network to facilitate at least one conveyance service in at least one conveyance industry segment. At least one good supplier can operate, own, or control at least one autonomous vehicle on at least one network. At least one good supplier can operate, own, or control at least one autonomous vehicle on at least one other network. At least one good supplier can operate, own, or control at least one autonomous vehicle on behalf of at least one third party on at least one network.

At least one good supplier can use at least one Representative Automated Platform to facilitate, operate, or manage at least one conveyance service. At least one good supplier can use at least one Autonomous Vehicle Automated Platform to facilitate, operate, or manage at least one conveyance service. At least one good supplier can use at least one Autonomous Vehicle Automated Platform to control or operate at least one autonomous vehicle. At least one good supplier can use at least one Autonomous Vehicle Automated Platform to secure or obtain at least one preferred conveyance service request for or with at least one autonomous vehicle that can be identified as preferred, at least one autonomous vehicle, or a combination thereof.

At least one good supplier can use including but not limited to at least one central server, at least one external server, at least one application, at least one owner or controller application, or a combination thereof, to facilitate and perform at least one conveyance service. At least one good supplier can operate in at least one conveyance industry segment. At least one good supplier can independently control or operate including but not limited to at least one conveyance network of at least one representative, at least one autonomous vehicle, at least one service provider, at least one fleet manager, at least one logistics provider, at least one logistics supplier, at least one conveyance client, at least one owner or at least one controller of at least one autonomous vehicle, or a combination thereof. At least one good supplier can optionally be perceived or referred to as at least one owner or at least one controller of at least one autonomous vehicle. At least one good supplier can utilize Information Technology infrastructure relating to including but not limited to at least one good supplier, at least one service provider, at least one owner or at least one controller of at least one autonomous vehicle, at least one fleet manager, at least one logistics provider, at least one logistics supplier, or a combination thereof.

At least one good supplier can operate for or with at least one service provider. At least one good supplier can accept or decline at least one preferred conveyance service request, at least one autonomous vehicle that can be identified as preferred, or a combination thereof. At least one good supplier can perform at least one function in real time or near real time being updated or refreshed in the highest level of development or state of the art. At least one good supplier can accept or decline at least one preferred conveyance service request.

At least one good supplier can be but is not limited to at least one vehicle that can have or utilize at least one designated locker, or the like, that can be at least one service provider or at least one autonomous vehicle. At least one good supplier can be but is not limited to at least one vehicle that can have or utilize at least one compartment, or the like, that can be at least one mobile service provider, at least one mobile autonomous vehicle, at least one mobile store front, at least one last mile delivery vehicle, at least one mobile logistics provider, at least one mobile logistics supplier, or a combination thereof.

As a non-limiting example, at least one good supplier can be but is not limited to at least one food delivery service controller, at least one good delivery service controller, at least one animal delivery service controller, at least one medical service and delivery controller, at least one courier service controller, at least one item delivery service controller, at least one freight delivery service controller, at least one peer-to-peer conveyance service controller, at least one delivery service controller, at least one transportation service controller, or a combination thereof.

As a non-limiting example, at least one good supplier can be perceived or referred to as at least one service provider. As a non-limiting example, at least one good supplier can be perceived or referred to as at least one autonomous vehicle, at least one fleet of at least one autonomous vehicle, at least one representative, at least one service provider, at least one fleet manager, at least one owner or at least one controller of at least one autonomous vehicle, at least one logistics provider, at least one logistics supplier, or a combination thereof.

As a non-limiting example, at least one good supplier can be at least one food truck. As a non-limiting example, at least one good supplier can be at least one entity that produces or supplies freight. As a non-limiting example, at least one good supplier can operate in at least one individual conveyance industry segment. As a non-limiting example, at least one good supplier can be at least one source or at least one provider of at least one conveyance service request. As a non-limiting example, at least one good supplier can provide or perform at least one conveyance service relating to at least one food item.

As a non-limiting example, at least one good supplier can operate for or on behalf of at least one individual service provider. As a non-limiting example, at least one good supplier can be at least one source or at least one provider of all or some of at least one conveyance service request in conjunction with corresponding conveyance data, all or some of conveyance data relating to at least one autonomous vehicle, all or some of at least one autonomous vehicle, all or some of at least one real time or near real time geographical location of at least one autonomous vehicle, all or some of conveyance data relating to at least one fleet of at least one autonomous vehicle, all or some of at least one fleet of at least one autonomous vehicle, all or some of at least one real time or near real time geographical location of at least one fleet of at least one autonomous vehicle, or a combination thereof. As a non-limiting example, at least one good supplier can have or generate all or some of conveyance data.

As a non-limiting example, at least one good supplier can have or utilize at least one API that can provide all or some of at least one conveyance service request with corresponding conveyance data, all or some of at least one autonomous vehicle with corresponding conveyance data, all or some of at least one real time or near real time geographical location of at least one autonomous vehicle, all or some of conveyance data relating to at least one fleet of at least one autonomous vehicle, all or some of at least one real time or near real time geographical location of at least one fleet of at least one autonomous vehicle, or a combination thereof.

As a non-limiting example, at least one good supplier can operate or control at least one autonomous vehicle for or on behalf of at least one OEM or at least one auto manufacturer to provide at least one conveyance service. As a non-limiting example, at least one good supplier can control or operate at least one autonomous vehicle or at least one fleet of at least one autonomous vehicle for or on behalf of at least one OEM on at least one network that can operate in at least one conveyance industry segment. As a non-limiting example, at least one good supplier can utilize at least one external server for at least one conveyance industry segment. As a non-limiting example, at least one good supplier can lease or sublease at least one autonomous vehicle. As a non-limiting example, at least one good supplier can lease or sublease at least one fleet of at least one autonomous vehicle. As a non-limiting example, at least one good supplier can lease or sublease at least one autonomous vehicle or at least one fleet of at least one autonomous vehicle from at least one third party.

As a non-limiting example, at least one good supplier can be for example at least one entity or at least one business that can retain or contract with including but not limited at least one fleet of at least one autonomous vehicle to provide at least one conveyance service. As a non-limiting example, at least one good supplier can retain or contract at least one fleet of at least one autonomous vehicle in at least one conveyance industry segment. As a non-limiting example, at least one good supplier can use at least one Autonomous Vehicle Automated Platform to control or operate at least one fleet of at least one autonomous vehicle.

As a non-limiting example, at least one good supplier can own, operate, or control at least one fleet of at least one autonomous vehicle. As a non-limiting example, at least one good supplier can own, operate, or control at least one fleet of at least one autonomous vehicle on at least one network. As a non-limiting example, at least one good supplier can own, operate, or control at least one fleet of at least one autonomous vehicle on at least one other network. As a non-limiting example, at least one good supplier can own, operate, or control at least one fleet of at least one autonomous vehicle on behalf of at least one third party on at least one network.

As a non-limiting example, at least one good supplier can for example utilize at least one external server that can be at least one source or at least one provider of all or some of at least one fleet of at least one autonomous vehicle, all or some of conveyance data relating to at least one fleet of at least one autonomous vehicle, all or some of at least one real time or near real time geographical location of at least one fleet of at least one autonomous vehicle, any data or information related to at least one fleet of at least one autonomous vehicle, or a combination thereof, relating to at least one conveyance industry segment.

As a non-limiting example, at least one good supplier or the like can input or provide at least one selected preference into at least one owner or controller application, being at least one website and at least one selected preference can be transmitted to at least one central server, at least one external server, at least one application, or a combination thereof. As a non-limiting example, at least one good supplier can use at least one Autonomous Vehicle Automated Platform, at least one Representative Automated Platform, or a combination thereof, to facilitate, operate, perform, or the like, at least one conveyance service in at least one conveyance industry segment.

Representative

At least one representative can be but is not limited to at least one person, at least one entity, at least one robot, at least one machine, or the like, that can for example secure or obtain at least one preferred conveyance service request, at least one filtered conveyance service request, at least one conveyance service request, or a combination thereof. At least one representative can provide or perform at least one conveyance service of including but not limited to at least one person, at least one good, at least one article, at least one thing, at least one item, at least one conveyance client, or a combination thereof. At least one representative can be retained by or contracted with at least one service provider, at least, one good supplier, at least one owner or at least one controller of at least one autonomous vehicle, at least one fleet manager, at least one logistics provider, at least one logistics supplier, or a combination thereof. At least one representative can be at least one entity or at least one person that can for example provide or perform at least one service, at least one delivery service, or a combination thereof. At least one representative can own, operate, or control at least one autonomous vehicle.

At least one representative can at any time sign on and/or sign off of including but not limited to at least one service provider network, at least one owner or at least one controller of at least one autonomous vehicle network, at least one fleet manager network, at least one logistics provider network, at least one logistics supplier network, at least one application, at least one central server, at least one external server, or a combination thereof. At least one representative can sign in to including but not limited to at least one service provider network, at least one owner or at least one controller of at least one autonomous vehicle network, at least one fleet manager network, at least one logistics provider network, at least one logistics supplier network, at least one central server, at least one application, at least one external server, or a combination thereof. Once, for example, at least one beginning service geographical location, at least one ending service geographical location, pricing information, or a combination thereof, is known, at least one conveyance service offering relating to at least one representative can be generated.

At least one representative can input or provide at least one representative preference to be used to filter at least one conveyance service request. At least one representative can input or provide at least one representative preference used to identify including but not limited to at least one preferred conveyance service request, at least one filtered conveyance service request, or a combination thereof.

At least one representative can use at least one application to access at least one service provider network, at least one good supplier network, at least one owner or at least one controller of at least one autonomous vehicle network, at least one fleet manager network, at least one logistics provider network, at least one logistics supplier network, or a combination thereof, via including but not limited to at least one terminal, at least one central server, at least one external server, at least one application, or a combination thereof, to facilitate and perform at least one conveyance service. At least one representative can provide at least one conveyance service in at least: one conveyance industry segment. At least one representative can provide at least one conveyance service for at least one service provider, at least one good supplier, at least one owner or at least one controller of at least one autonomous vehicle, at least one fleet manager, at least one logistics provider, at least one logistics supplier, or a combination thereof. At least one representative can use Information Technology infrastructure relating to including but not limited to at least one service provider, at least one good supplier, at least one owner or at least one controller of at least one autonomous vehicle, at least one fleet manager, at least one logistics provider, at least one logistics supplier, or a combination thereof, or a combination thereof. At least one representative can perform at least one function in real time or near real time being updated or refreshed in the highest level of development or state of the art.

At least one Representative Automated Platform can secure or obtain at least one preferred conveyance service request for at least one representative. At least one representative can utilize at least one Representative Automated Platform to secure or obtain at least one proposed or recommended conveyance service request other than at least one preferred conveyance service request. At least one representative can accept or decline at least one preferred conveyance service request when using at least one Representative Automated Platform. As a non-limiting example, at least one representative can secure or obtain at least one filtered conveyance service request other than at least one preferred conveyance service request. As a non-limiting example, at least one representative can accept or decline at least one preferred conveyance service request using at least one application, at least one central server, at least one external server, or a combination thereof.

As a non-limiting example, at least one representative can be perceived or referred to as at least one service provider when utilizing at least one autonomous vehicle. As a non-limiting example, at least one representative can be perceived or referred to as at least one autonomous vehicle, at least one fleet of at least one autonomous vehicle, at least one owner or at least one controller of at least one autonomous vehicle, at least one service provider, at least one good supplier, at least one fleet manager, at least one logistics provider, at least one logistics supplier, or a combination thereof. As a non-limiting example, at least one representative can use at least one visual representation such as but not limited to at least one dynamic map, at least one heat map, or a combination thereof, to analyze or evaluate where at least one conveyance client or at least one preferred conveyance service request can be geographically located. As a non-limiting example, at least one representative can use at least one autonomous vehicle to perform at least one conveyance service.

As a non-limiting example, at least one representative can be at least one independent third party. As a non-limiting example, at least one representative can be at least one independent contractor. As a non-limiting example, in the ride-hail/ride-share industry segment, at least one representative can be at least one driver. As a non-limiting example, in the food delivery industry segment, at least one representative can be at least one driver picking up at least one food item and dropping at least one food item off to at least one conveyance client. As a non-limiting example, in the courier industry segment, at least one representative can be at least one person picking up and dropping off at least one good, at least one thing, at least one article, or a combination thereof. As a non-limiting example, at least one representative can provide at least one conveyance service in at least one individual conveyance industry segment. As a non-limiting example, at least one representative can provide at least one conveyance service for at least one individual service provider.

As a non-limiting example, at least one representative can be managed or operated with at least one autonomous vehicle or at least one fleet of at least one autonomous vehicle to perform at least one conveyance service. As a non-limiting example, at least one service provider, at least one good supplier, at least one logistics provider, at least one logistics supplier, or the like, can utilize at least one Autonomous Vehicle Automated Platform to manage or operate at least one representative and at least one autonomous vehicle in at least one efficient manner. As a non-limiting example, at least one service provider, at least one fleet manager, at least one logistics provider, at least one logistics supplier, or the like, can utilize at least one Autonomous Vehicle Automated Platform to manage or operate at least one autonomous vehicle fleet in conjunction with utilizing at least one Representative Automated Platform to manage or operate at least one representative. As a non-limiting example, at least one service provider, at least one fleet manager, at least one logistics provider, at least one logistics supplier, or the like, can use at least one representative and at least one autonomous vehicle to perform at least one conveyance service in at least one conveyance industry segment. As a non-limiting example, at least one representative can have or generate all or some of conveyance data.

As a non-limiting example, at least one representative can perform all or some of at least one conveyance service. As a non-limiting example, at least one representative can perform all or some of at least one conveyance service in conjunction with at least one autonomous vehicle. As a non-limiting example, at least one representative can perform part of at least one conveyance service and at least one autonomous vehicle can perform at least one other part of at least one conveyance service. As a non-limiting example, at least one representative can perform part of at least one conveyance service during at least one waypoint and at least one autonomous vehicle can perform at least one other part of at least one conveyance service.

As a non-limiting example, at least one representative can pick up food and put the food in at least one autonomous vehicle to be delivered. As a non-limiting example, at least one representative can order food and put the food in at least one autonomous vehicle to be delivered. As a non-limiting example, at least one representative can put food in at least one autonomous vehicle, such as at least one drone to be delivered. As a non-limiting example, at least one representative can put food in at least one autonomous vehicle, such as at least one autonomous ground vehicle to be delivered.

As a non-limiting example, at least one representative can use at least one Representative Automated Platform, at least one Autonomous Vehicle Automated Platform, or a combination thereof, to facilitate, operate, perform, or the like, at least one conveyance service in at least one conveyance industry segment.

Autonomous Vehicle

At least one autonomous vehicle can be but is not limited to at least one machine, at least one robot, at least one car, or the like, that can for example provide or perform at least one conveyance service. At least one autonomous vehicle can be perceived as at least one entity or at least one business that can for example provide or perform at least one service, at least one delivery service, or a combination thereof. At least one autonomous vehicle can be for example at least one self-governing machine, at least one self-maneuvering machine, at least one self-driving machine, or the like, that can be used to convey or transport including but not limited to at least one person, at least, one good, at least one thing, at least one article, at least one item, at least one conveyance client, or a combination thereof, from at least one geographical location to at least one other geographical location.

When at least one autonomous vehicle is considered, at least one autonomous vehicle that can be filtered, at least one autonomous vehicle that can be identified as preferred, or a combination thereof, can also be considered. When all or some of at least one real time or near real time geographical location of at least one autonomous vehicle is considered, all or some of at least one real time or near real time geographical location of at least one autonomous vehicle that can be filtered, all or some of at least one real time or near real time geographical location of at least one autonomous vehicle that can be identified as preferred, or a combination thereof, can also be considered.

At least one autonomous vehicle can communicate with at least one owner or at least one controller of at least one autonomous vehicle, at least one service provider, at least one good supplier, at least one fleet manager, at least one logistics provider, at least one logistics supplier, at least one conveyance client, at least one representative, or a combination thereof, using at least one link between at least one central server, at least one external server, at least one owner or controller application, at least one application, or a combination thereof.

At least one autonomous vehicle can sign in to including but not limited to at least one service provider network, at least one owner or at least one controller of at least one autonomous vehicle network, at least one good supplier network, at least one fleet manager network, at least one logistics provider network, at least one logistics supplier network, at least one central server, at least one application, at least one external server, at least one owner or controller application, or a combination thereof. Once at least one beginning service geographical location, at least one ending service geographical location, pricing information, or a combination thereof, is known, at least one conveyance service offering relating to at least one autonomous vehicle can be generated. At least one autonomous vehicle can provide or perform at least one conveyance service for at least one conveyance client or at least one entity.

At least one autonomous vehicle can be partially autonomous, semi-autonomous, or the like. At least one autonomous vehicle can have or be characterized by different levels of autonomy relating to the Society of Automotive Engineers' levels (SAE) adopted by the National Highway Traffic Safety Administration for automated driving systems, ranging from complete human driver control to full autonomy. At least one autonomous vehicle can include hardware and/or software alone or in a combination. At least one autonomous vehicle can utilize at least one terminal, at least one application, at least one link, or a combination thereof. At least one autonomous vehicle can utilize or be associated with at least one terminal, at least one application, at least one link, at least one central server, at least one external server, at least one owner or controller application, or a combination thereof. At least one autonomous vehicle can perform at least one function in real time or near real time being updated or refreshed in the highest level of development or state of the art.

At least one autonomous vehicle can for example communicate at least one conveyance service request in conjunction with corresponding conveyance data, at least one filtered conveyance service request in conjunction with corresponding conveyance data, at least one preferred conveyance service request in conjunction with corresponding conveyance data, all or some of conveyance data relating to at least one autonomous vehicle, all or some of filtered conveyance data relating to at least one autonomous vehicle, all or some of preferred conveyance data relating to at least one autonomous vehicle, all or some of at least one real time or near real time geographical location of at least one autonomous vehicle, at least one selected preference, or a combination thereof, to or with at least one central server, at least one external server, at least one terminal, at least one application, at least one owner or controller application, or a combination thereof, relating to at least one owner or at least one controller of at least one autonomous vehicle, at least one service provider, at least one good supplier, at least one fleet manager, at least one logistics provider, at least one logistics supplier, or the like.

At least one autonomous vehicle can provide or perform at least one conveyance service in at least one conveyance industry segment. At least one autonomous vehicle can provide or perform at least one conveyance service relating to at least one service provider, at least one owner or at least one controller of at least one autonomous vehicle, at least one good supplier, at least one fleet manager, at least one logistics provider, at least one logistics supplier, or a combination thereof, operating in at least one conveyance industry segment.

At least one autonomous vehicle can be controlled or operated by at least one service provider, at least one good supplier, at least one fleet manager, at least one logistics provider, at least one logistics supplier, at least one owner or at least one controller of at least one autonomous vehicle, at least one third party, or the like, operating in at least one conveyance industry segment. At least one autonomous vehicle can be accessed, utilized, controlled, or operated remotely by including but not limited to at least one service provider, at least one owner or at least one controller or at least one autonomous vehicle, at least one good supplier, at least one logistics provider, at least one logistics supplier, at least one fleet manager, or the like utilizing at least one central server, at least one external server, at least one application, at least one owner or controller application, or a combination thereof, by way of or with at least one link. At least one application or at least one owner or controller application can operate on or control at least one terminal that can be associated with at least one autonomous vehicle and can interface with at least one autonomous vehicle function. At least one selected preference can be used to secure or obtain including but not limited to at least one preferred conveyance service request, at least one filtered conveyance service request, or a combination thereof, for or with at least one autonomous vehicle or at least one autonomous vehicle that can be identified as preferred.

At least one autonomous vehicle can be sourced or provided by at least one service provider, at least one good supplier, at least one fleet manager, at least one logistics provider, at least one logistics supplier, at least one owner or at least one controller of at least one autonomous vehicle, or a combination thereof. All or some of conveyance data relating to at least one autonomous vehicle can be sourced or provided by at least one external server that can be associated with at least one service provider, at least one good supplier, at least one fleet manager, at least one logistics provider, at least one logistics supplier, at least one owner or at least one controller of at least one autonomous vehicle, or a combination thereof.

At least one autonomous vehicle can have or generate all or some of conveyance data relating to at least one autonomous vehicle. At least one autonomous vehicle can have or be associated with all or some of conveyance data relating to at least one autonomous vehicle. At least one autonomous vehicle that can be filtered can have or be associated with all or some of filtered conveyance data relating to at least one autonomous vehicle. At least one autonomous vehicle that can be identified as preferred can have or be associated with all or some of preferred conveyance data relating to at least one autonomous vehicle.

At least one Autonomous Vehicle Automated Platform can secure or obtain at least one preferred conveyance service request for or with at least one autonomous vehicle, at least one autonomous vehicle that can be filtered, at least one autonomous vehicle that can be identified as preferred, or a combination thereof. At least one Autonomous Vehicle Automated Platform can secure or obtain at least one autonomous vehicle, at least one autonomous vehicle that can be filtered, at least one autonomous vehicle that can be identified as preferred, or a combination thereof, for or with at least one preferred conveyance service request. At least one autonomous vehicle can utilize at least one Autonomous Vehicle Automated Platform to secure or obtain at least one proposed or recommended conveyance service request other than at least one preferred conveyance service request. At least one autonomous vehicle can be utilized with at least one Autonomous Vehicle Automated Platform to secure or obtain at least one proposed or recommended autonomous vehicle other than at least one autonomous vehicle can be identified as preferred. At least one autonomous vehicle can be geofenced when utilized, operated, or controlled by or with at least one Autonomous Vehicle Automated Platform.

At least one autonomous vehicle can utilize machine learning technology or the like to analyze or evaluate and then secure or obtain at least one preferred conveyance service request or propose or recommend at least one different conveyance service request other than at least one preferred conveyance service request. At least one autonomous vehicle can utilize machine learning technology or the like to analyze or evaluate and then secure or obtain at least one autonomous vehicle that can be identified as preferred or propose or recommend at least one different autonomous vehicle other than at least one autonomous vehicle that can be identified as preferred. At least one autonomous vehicle can utilize machine learning technology or the like to facilitate at least one conveyance service. At least one autonomous vehicle can utilize machine learning technology or the like to communicate with at least one other autonomous vehicle.

At least one autonomous vehicle can be but is not limited to at least one vehicle that can have or utilize at least one designated locker, or the like. At least one autonomous vehicle can be but is not limited to at least one vehicle that can have or utilize at least one designated locker, or the like, that can be at least one service provider or at least one good supplier. At least one autonomous vehicle can be but is not limited to at least one vehicle that can have or utilize at least one compartment, or the like, that can be at least one mobile service provider, at least one mobile good supplier, at least one mobile store front, at least one last mile delivery vehicle, at least one mobile logistics provider, at least one mobile logistics supplier, or a combination thereof.

At least one autonomous vehicle can communicate all or some of information or data with at least one central server, at least one external server, at least one application, at least one owner or controller application, at least one autonomous vehicle, or a combination thereof.

As a non-limiting example, at least one autonomous vehicle can be but is not limited to at least one car, at least one automobile, at least one van, at least one delivery van, at least one delivery vehicle, at least one last mile delivery vehicle, at least one vehicle that can have or utilize at least one locker, at least one vehicle that can have or utilize at least one storage unit, at least one vehicle that can have or utilize at least one compartment, at least one RV, at least one truck, at least one delivery truck, at least one semi-trailer truck, at least one shuttle, at least one helicopter, at least one boat, at least one vessel, at least one aircraft, at least one spacecraft, at least one bus, at least one train, at least one wagon, at least one rickshaw, at least one scooter, at least one bike, at least one moped, at least one trike, at least one all-terrain vehicle, at least one eighteen wheeler, at least one transportation machine, at least one drone, at least one medical vehicle, or a combination thereof.

As a non-limiting example, at least one autonomous vehicle can be at least one machine, at least one robot, at least one car, or the like, that can perform at least one conveyance service without the aid of at least one human driver. As a non-limiting example, at least one autonomous vehicle can secure or obtain at least one filtered conveyance service request other than at least one preferred conveyance service request. As a non-limiting example, at least one autonomous vehicle, at least one owner or at least one controller of at least one autonomous vehicle, or a combination thereof, can secure or obtain at least one said autonomous vehicle that can be filtered other than at least one said autonomous vehicle that can be identified as preferred. As a non-limiting example, at least one autonomous vehicle can be owned or controlled by at least one service provider, at least one entity, at least one business, at least one individual, at least one owner or at least one controller of at least one autonomous vehicle, at least one good supplier, at least one fleet manager, at least one third party, at least one logistics provider, at least one logistics supplier, or a combination thereof.

As a non-limiting example, at least one terminal associated with at least one autonomous vehicle can be accessed, utilized, controlled, or operated by at least one application or at least one owner or controller application through at least one In-Vehicle infotainment, at least one interface, at least one touchscreen, at least one keypad, at least one heads up display, at least one voice recognition, at least one voice control, or a combination thereof. As a non-limiting example, at least one terminal associated with at least one autonomous vehicle can have at least one input source such as but not limited to at least one touchscreen, at least one keypad, at least one voice recognition, at least one voice control, at least one heads up display, at least one In-Vehicle infotainment, or the like.

As a non-limiting example, at least one terminal can be for example at least one autonomous vehicle that can be utilized to combine or integrate at least one application, at least one owner or controller application, at least one central server, at least one external server, at least one terminal, at least one link, or a combination thereof. As a non-limiting example, at least one application, at least one owner or controller application, at least one autonomous vehicle, at least one terminal, at least one central server, at least one external server, at least one link, or a combination thereof, can be combined or integrated.

As a non-limiting example, at least one autonomous vehicle can be perceived or referred to as at least one representative, at least one service provider, at least one good supplier, at least one owner or at least one controller of at least one autonomous vehicle, at least one fleet manager, at least one third party, at least one logistics provider, at least one logistics supplier, or a combination thereof. As a non-limiting example, at least one autonomous vehicle can accept or decline at least one preferred conveyance service request using at least one application, at least one central server, at least one external server, at least one owner or controller application, or a combination thereof.

As a non-limiting example, at least one autonomous vehicle can be used to convey freight from at least one geographical location to at least one other geographical location. As a non-limiting example, at least one autonomous vehicle can perform at least one conveyance service while at least one owner or at least one controller of at least one autonomous vehicle is at work. As a non-limiting example, at least one autonomous vehicle can be used for at least one medical service and delivery. As a non-limiting example, at least one autonomous vehicle can provide at least one conveyance service in at least one individual conveyance industry segment. As a non-limiting example, at least one autonomous vehicle can provide at least one conveyance service relating to at least one individual service provider. As a non-limiting example, at least one autonomous vehicle can be at least one tuk-tuk, at least one remorque, at least one rickshaw, or the like. As a non-limiting example, at least one autonomous vehicle can be characterized as level 0, level 1, level 2, level 3, level 4, and level 5 autonomy in accordance with the Society of Automotive Engineers' levels (SAE).

As a non-limiting example, at least one autonomous vehicle can be but is not limited to at least one delivery van, at least one delivery vehicle, at least one van that can have or utilize at least one locker, at least one van that can have or utilize at least one storage unit, at least one van that can have or utilize at least one compartment, or a combination thereof, that can transport or convey at least one delivery item or at least one delivery good. As a non-limiting example, at least one autonomous vehicle can be but is not limited to at least one delivery vehicle, or the like, that can transport or convey at least one good or perform or provide at least one service that can operate on at least one sidewalk, at least one bike lane, or the like.

As a non-limiting example, when at least one autonomous vehicle is updated in real time or near real time, at least one physical real time or near real time geographical location of at least one autonomous vehicle can be updated in real time or near real time. As a non-limiting example, when at least one autonomous vehicle is updated in real time or near real time, at least one physical real time or near real time geographical location of at least one autonomous vehicle as well as at least one digital representation can be updated in real time or near real time. As a non-limiting example, at least one physical autonomous vehicle can be updated in real time or near real time as well as at least one digital representation on at least one visual representation, at least one infotainment, at least one application, at least one central server, at least one owner or controller application, or a combination thereof.

As a non-limiting example, when at least one autonomous vehicle is considered, at least one fleet of at least one autonomous vehicle can also be considered. As a non-limiting example, at least one autonomous vehicle can be part of at least one fleet of at least one autonomous vehicle. As a non-limiting example, when at least one fleet of at least one autonomous vehicle is considered, at least one fleet of at least one autonomous vehicle that can be filtered, at least one fleet of at least one autonomous vehicle that can be identified as preferred, or a combination thereof, can also be considered.

As a non-limiting example, when at least one autonomous vehicle is considered, at least one fleet of at least one autonomous vehicle, at least one autonomous vehicle fleet, or a combination thereof, can also be considered. As a non-limiting example, at least one autonomous vehicle can be perceived as or referred to as at least one fleet of at least one autonomous vehicle, at least one autonomous vehicle fleet, or a combination thereof. As a non-limiting example, at least one fleet of at least one autonomous vehicle can be at least one autonomous vehicle fleet.

As a non-limiting example, at least one autonomous vehicle can be controlled or operated by more than one service provider, more than one good supplier, more than one fleet manager, more than one owner or more than one controller of more than one autonomous vehicle, more than one logistics provider, more than one logistics supplier, or the like, operating in at least one conveyance industry segment. As a non-limiting example, at least one autonomous vehicle can be controlled or operated by at least one OEM or the like operating in at least one conveyance industry segment. As a non-limiting example, at least one autonomous vehicle can be owned by at least one OEM or the like and controlled or operated by at least one service provider or the like operating in at least one conveyance industry segment. As a non-limiting example, at least one autonomous vehicle or at least one fleet of at least one autonomous vehicle can be controlled or operated by at least one fleet manager. As a non-limiting example, at least one autonomous vehicle can be owned by at least one OEM or the like and controlled or operated by at least one fleet manager operating in at least one conveyance industry segment. As a non-limiting example, at least one autonomous vehicle can be owned by at least one OEM or the like and controlled or operated by at least one third party operating in at least one conveyance industry segment. As a non-limiting example, at least one autonomous vehicle can be utilized by at least one service provider or the like to facilitate at least one conveyance service for or on behalf of at least one good supplier or the like. As a non-limiting example, at least one autonomous vehicle or at least one fleet of at least one autonomous vehicle can be controlled or operated by at least one owner or at least one controller of at least one autonomous vehicle.

As a non-limiting example, at least one autonomous vehicle can be controlled or operated by at least one logistics provider, at least one logistics supplier, or a combination thereof. As a non-limiting example, at least one owner or at least one controller of at least one autonomous vehicle, at least one service provider, at least one good supplier, at least one fleet manager, at least one logistics provider, at least one logistics supplier, or a combination thereof, can control or operate at least one autonomous vehicle for at least one third party. As a non-limiting example, at least one third party can control or operate at least one autonomous vehicle for at least one owner or at least one controller of at least one autonomous vehicle, at least one service provider, at least one good supplier, at least one fleet manager, at least one logistics provider, at least one logistics supplier, or a combination thereof.

As a non-limiting example, at least one autonomous vehicle can have or generate all or some of conveyance data relating to at least one autonomous vehicle relating to at least one autonomous vehicle sensor or the like. As a non-limiting example, at least one autonomous vehicle can have or generate all or some of conveyance data relating to at least one autonomous vehicle battery level or the like. As a non-limiting example, all or some of conveyance data relating to at least one autonomous vehicle can be all or some data relating to one autonomous vehicle. As a non-limiting example, conveyance data relating to at least one autonomous vehicle can be all or some data relating to at least one fleet of at least one autonomous vehicle. As a non-limiting example, conveyance data relating to at least one autonomous vehicle can include but is not limited to at least one real time or near real time geographical location of at least one autonomous vehicle, at least one real time or near real time geographical location of at least one fleet of at least one autonomous vehicle, at least one real time or near real time geographical location of at least one autonomous vehicle fleet, or a combination thereof. As a non-limiting example, at least one autonomous vehicle can have or generate all or some of conveyance data relating to at least one autonomous vehicle that can preferably be stored or cached on at least one application associated with at least one autonomous vehicle.

As a non-limiting example, when at least one autonomous vehicle is considered, all or some of conveyance data relating to at least one autonomous vehicle can also be considered. As a non-limiting example, when at least one autonomous vehicle that can be filtered is considered, all or some of filtered conveyance data relating to at least one autonomous vehicle can also be considered. As a non-limiting example, when at least one autonomous vehicle that can be identified as preferred is considered, all or some of preferred conveyance data relating to at least one autonomous vehicle can also be considered. As a non-limiting example, at least one autonomous vehicle can be utilized by or with at least one Autonomous Vehicle Automated Platform at least one Representative Automated Platform, or a combination thereof, to facilitate, operate, perform, or the like, at least one conveyance service in at least one conveyance industry segment.

Owner or Controller of an Autonomous Vehicle

At least one owner or at least one controller of at least one autonomous vehicle can be but is not limited to at least one person, at least one entity, at least one robot, at least one machine, or a combination thereof, that can for example own, operate, or control at least one autonomous vehicle used to provide at least one conveyance service for at least one conveyance client. At least one owner or at least one controller of at least one autonomous vehicle can be at least one entity or at least one person that can for example provide or perform at least one service, at least one delivery service, or a combination thereof. At least one owner or at least one controller of at least one autonomous vehicle can own, operate, or control at least one autonomous vehicle. At least one owner or at least one controller of at least one autonomous vehicle can analyze or evaluate and then secure or obtain at least one preferred conveyance service request for or with at least one autonomous vehicle, at least one autonomous vehicle that can be identified as preferred, or a combination thereof.

At least one owner or at least one controller of at least one autonomous vehicle can for example retain, contract with, or be including but not limited to at least one representative, at least one autonomous vehicle, at least one service provider, at least one good supplier, at least one fleet manager, at least one logistics provider, at least one logistics supplier, or a combination thereof, to provide at least one conveyance service. At least one owner or at least one controller of at least one autonomous vehicle can facilitate at least one conveyance service between including but not limited to at least one representative, at least one autonomous vehicle, at least one service provider, at least one good supplier, at least one fleet manager, at least one conveyance client, at least one logistics provider, at least one logistics supplier, or a combination thereof.

At least one owner or at least one controller of at least one autonomous vehicle can for example have or be associated with at least one external server that can be at least one source or at least one provider of at least one conveyance service request with corresponding conveyance data, at least one autonomous vehicle, all or some of conveyance data relating to at least one autonomous vehicle, all or some of at least one real time or near real time geographical location of at least one autonomous vehicle, any data or information related to at least one autonomous vehicle, or a combination thereof, relating to at least one conveyance industry segment.

At least one owner or at least one controller of at least one autonomous vehicle can operate, own, or control at least one autonomous vehicle. At least one owner or at least one controller of at least one autonomous vehicle can operate, own, or control at least one autonomous vehicle on behalf of at least one third party. At least one owner or at least one controller of at least one autonomous vehicle can operate, own, or control at least one network to facilitate at least one conveyance service in at least one conveyance industry segment. At least one owner or at least one controller of at least one autonomous vehicle can operate, own, or control at least one autonomous vehicle on at least one network. At least one owner or at least one controller of at least one autonomous vehicle can operate, own, or control at least one autonomous vehicle on at least one other network. At least one owner or at least one controller of at least one autonomous vehicle can operate, own, or control at least one autonomous vehicle on behalf of at least one third party on at least one network.

At least one owner or at least one controller of at least one autonomous vehicle can use at least one Autonomous Vehicle Automated Platform to facilitate, operate, or manage at least one conveyance service. At least one owner or at least one controller of at least one autonomous vehicle can use at least one Autonomous Vehicle Automated Platform to control or operate at least one autonomous vehicle. At least one owner or at least one controller of at least one autonomous vehicle can use at least one Autonomous Vehicle Automated Platform to secure or obtain at least one preferred conveyance service request for or with at least one autonomous vehicle that can be identified as preferred, at least one autonomous vehicle, or a combination thereof.

At least one owner or at least one controller of at least one autonomous vehicle can use including but not limited to at least one central server, at least one external server, at least one application, at least one owner or controller application, or a combination thereof, to facilitate and perform at least one conveyance service. At least one owner or at least one controller of at least one autonomous vehicle can independently control or operate, including but not limited to, at least one conveyance network of at least one representative, at least one autonomous vehicle, at least one good supplier, at least one fleet manager, at least one logistics provider, at least one logistics supplier, al least one conveyance client, at least one service provider, or a combination thereof. At least one owner or at least one controller of at least one autonomous vehicle can use including but not limited to at least one application or at least one owner or controller application to access at least one service provider network or the like via at least one terminal, at least one central server, at least one external server, or a combination thereof, to facilitate at least one conveyance service.

At least one owner or at least one controller of at least one autonomous vehicle can use including but not limited to at least one application or at least one owner or controller application to analyze or evaluate and then secure or obtain at least one preferred conveyance service request for or with at least one autonomous vehicle that can be identified as preferred, at least one autonomous vehicle, or a combination thereof. At least one owner or at least one controller of at least one autonomous vehicle can identify at least one autonomous vehicle or at least one autonomous vehicle that can be identified as preferred, to be secured or obtained for or with at least one preferred conveyance service request.

At least one owner or at least one controller of at least one autonomous vehicle can at any time sign on and/or sign off of including but not limited to at least one service provider network, at least one good supplier network, at least one fleet manager network, at least one logistics provider network, at least one logistics supplier network, at least one central server, at least one external server, at least one owner or controller application, or a combination thereof. At least one owner or at least one controller of at least one autonomous vehicle can use Information Technology infrastructure relating to including but not limited to at least one service provider, at least one good supplier, at least one fleet manager, at least one logistics provider, at least one logistics supplier, at least one third party, or a combination thereof.

At least one owner or at least one controller of at least one autonomous vehicle can operate in at least one conveyance industry segment. At least one owner or at least one controller of at least one autonomous vehicle can optionally be perceived or referred to as at least one fleet manager operating in at least one conveyance industry segment. At least one owner or at least one controller of at least one autonomous vehicle can be at least one independent third party. At least one owner or at least one controller of at least one autonomous vehicle can be at least one private individual person. At least one owner or at least one controller of at least one autonomous vehicle can accept or decline at least one preferred conveyance service request, at least one autonomous vehicle that can be identified as preferred, or a combination thereof.

At least one owner or at least one controller of at least one autonomous vehicle can work for or be associated with at least one service provider, at least one good supplier, at least one fleet manager, at least one logistics provider, at least one logistics supplier, at least one third party, or a combination thereof. At least one owner or at least one controller of at least one autonomous vehicle can control or operate at least one autonomous vehicle in at least one conveyance industry segment. At least one owner or at least one controller of at least one autonomous vehicle can control or operate at least one autonomous vehicle relating to at least one service provider, at least one good supplier, at least one fleet manager, at least one logistics provider, at least one logistics supplier, or a combination thereof. At least one owner or at least one controller of at least one autonomous vehicle can perform at least one function in real time or near real time being updated or refreshed in the highest level of development or state of the art.

At least one owner or at least one controller of at least one autonomous vehicle can input or provide at least one selected preference into at least one owner or controller application, at least one application, at least one central server, or a combination thereof. At least one owner or at least one controller of at least one autonomous vehicle can input or provide at least one selected preference to be used to filter at least one conveyance service request for at least one autonomous vehicle. At least one owner or at least one controller of at least one autonomous vehicle can input or provide at least one selected preference used to identify including but not limited to at least one preferred conveyance service request, at least one filtered conveyance service request, or a combination thereof. At least one owner or at least one controller of at least one autonomous vehicle can input or provide at least one selected preference to be used to filter all or some of conveyance data relating to at least one autonomous vehicle. At least one owner or at least one controller of at least one autonomous vehicle can input or provide at least one selected preference used to identify including but not limited to at least one autonomous vehicle that can be filtered, all or some of filtered conveyance data relating to at least one autonomous vehicle, at least one autonomous vehicle that can be identified as preferred, all or some of preferred conveyance data relating to at least one autonomous vehicle, or a combination thereof.

At least one owner or at least one controller of at least one autonomous vehicle can for example filter two variables when utilizing at least one Autonomous Vehicle Automated Platform if desired, being at least one conveyance service request and at least one autonomous vehicle, using at least one selected preference. At least one owner or at least one controller of at least one autonomous vehicle can for example identify two preferred variables when utilizing at least one Autonomous Vehicle Automated Platform if desired, being at least one preferred conveyance service request, at least one autonomous vehicle that can be identified as preferred, all or some of preferred conveyance data, relating to at least one autonomous vehicle, or a combination thereof, using at least one selected preference.

At least one Autonomous Vehicle Automated Platform can secure or obtain at least one preferred conveyance service request, at least one autonomous vehicle that can be identified as preferred, or a combination thereof, for at least one owner or at least one controller of at least one autonomous vehicle. At least one owner or at least one controller of at least one autonomous vehicle can utilize at least one Autonomous Vehicle Automated Platform to secure or obtain at least one proposed or recommended different conveyance service request other than at least one preferred conveyance service request. At least one owner or at least one controller of at least one autonomous vehicle can utilize at least one Autonomous Vehicle Automated Platform to secure or obtain at least one proposed or recommended different autonomous vehicle other than at least one autonomous vehicle can be identified as preferred. At least one owner or at least one controller of at least one autonomous vehicle can accept or decline at least one preferred conveyance service request when using at least one Autonomous Vehicle Automated Platform. At least one owner or at least one controller of at least one autonomous vehicle can use at least one Autonomous Vehicle Automated Platform to identify and preferably secure or obtain at least one preferred conveyance service request for or with at least one autonomous vehicle, at least one autonomous vehicle that can be identified as preferred, or a combination thereof.

As a non-limiting example, at least one owner or at least one controller of at least one autonomous vehicle can be but is not limited to at least one rideshare service controller, at least one ride-hail service controller, at least one car-share service controller, at least one taxi service controller, at least one shuttle service controller, at least one person delivery service controller, at least one food delivery service controller, at least one good delivery service controller, at least one animal delivery service controller, at least one medical service and delivery controller, at least one courier service controller, at least one item delivery service controller, at least one freight delivery service controller, at least one peer-to-peer conveyance service controller, at least one delivery service controller, at least one transportation service controller, or a combination thereof.

As a non-limiting example, at least one owner or at least one controller of at least one autonomous vehicle can be perceived or referred to as at least one fleet manager, at least one service provider, at least one good supplier, at least one logistics provider, at least one logistics supplier, at least one third party, at least one autonomous vehicle, at least one fleet of at least one autonomous vehicle, or a combination thereof. As a non-limiting example, at least one owner or at least one controller of at least one autonomous vehicle can be at least one private owner or al least one private controller of at least one autonomous vehicle.

As a non-limiting example, at least one at least one owner or at least one controller of at least one autonomous vehicle can operate in at least one individual conveyance industry segment. As a non-limiting example, at least one owner or at least one controller of at least one autonomous vehicle can control or operate at least one autonomous vehicle relating to at least one individual service provider or the like. As a non-limiting example, at least one owner or at least one controller of at least one autonomous vehicle can be at least one source or at least one provider of all or some of at least one conveyance service request in conjunction with corresponding conveyance data, all or some of conveyance data relating to at least one autonomous vehicle, all or some of at least one autonomous vehicle, all or some of at least one real time or near real time geographical location of at least one autonomous vehicle, all or some of conveyance data relating to at least one fleet of at least one autonomous vehicle, all or some of at least one fleet of at least one autonomous vehicle, all or some of at least one real time or near real time geographical location of at least one fleet of at least one autonomous vehicle, or a combination thereof.

As a non-limiting example, at least one at least one owner or at least one controller of at least one autonomous vehicle can have or utilize at least one API that can provide all or some of at least one conveyance service request with corresponding conveyance data, all or some of at least one autonomous vehicle with corresponding conveyance data, all or some of at least one real time or near real time geographical location of at least one autonomous vehicle, all or some of conveyance data relating to at least one fleet of at least one autonomous vehicle, all or some of at least one real time or near real time geographical location of at least one fleet of at least one autonomous vehicle, or a combination thereof.

As a non-limiting example, at least one at least one owner or at least one controller of at least one autonomous vehicle can operate or control at least one autonomous vehicle for or on behalf of at least one OEM or at least one auto manufacturer to provide at least one conveyance service. As a non-limiting example, at least one at least one owner or at least one controller of at least one autonomous vehicle can control or operate at least one autonomous vehicle or at least one fleet of at least one autonomous vehicle for or on behalf of at least one OEM on at least one network that can operate in at least one conveyance industry segment. As a non-limiting example, at least one owner or at least one controller of at least one autonomous vehicle can control or operate at least one autonomous vehicle or at least one fleet of at least one autonomous vehicle for or on behalf of at least one OEM on at least one service provider network or the like that can operate in at least one conveyance industry segment.

As a non-limiting example, at least one at least one owner or at least one controller of at least one autonomous vehicle can utilize at least one external server for or with at least one conveyance industry segment. As a non-limiting example, at least one at least one owner or at least one controller of at least one autonomous vehicle can lease or sublease at least one autonomous vehicle. As a non-limiting example, at least one at least one owner or at least one controller of at least one autonomous vehicle can lease or sublease at least one fleet of at least one autonomous vehicle. As a non-limiting example, at least one at least one owner or at least one controller of at least one autonomous vehicle can lease or sublease at least one autonomous vehicle or at least one fleet of at least one autonomous vehicle from at least one third party. As a non-limiting example, at least one owner or at least one controller of at least one autonomous vehicle can be at least one lessee of at least one autonomous vehicle.

As a non-limiting example, at least one owner or at least one controller of at least one autonomous vehicle can secure or obtain at least one filtered conveyance service request other than at least one preferred conveyance service request. As a non-limiting example, at least one owner or at least one controller of at least one autonomous vehicle can secure or obtain at least one autonomous vehicle that can be filtered other than at least one autonomous vehicle that can be identified as preferred. As a non-limiting example, at least one owner or at least one controller of at least one autonomous vehicle can accept or decline at least one preferred conveyance service request using at least one owner or controller application, at least one application, at least one central server, at least one external server, or a combination thereof.

As a non-limiting example, at least one owner or at least one controller of at least one autonomous vehicle can be for example at least one entity or at least one business that can retain or contract with including but not limited at least one fleet of at least one autonomous vehicle to provide at least one conveyance service. As a non-limiting example, at least one owner or at least one controller of at least one autonomous vehicle can retain or contract at least one fleet of at least one autonomous vehicle in at least one conveyance industry segment. As a non-limiting example, at least one owner or at least one controller of at least one autonomous vehicle can use at least one Autonomous Vehicle Automated Platform to control or operate at least one fleet of at least one autonomous vehicle.

As a non-limiting example, at least one owner or at least one controller of at least one autonomous vehicle can own, operate, or control at least one fleet of at least one autonomous vehicle. As a non-limiting example, at least one owner or at least one controller of at least one autonomous vehicle can own, operate, or control at least one fleet of at least one autonomous vehicle on at least one network. As a non-limiting example, at least one owner or at least one controller of at least one autonomous vehicle can own, operate, or control at least one fleet of at least one autonomous vehicle on at least one other network. As a non-limiting example, at least one owner or at least one controller of at least one autonomous vehicle can own, operate, or control at least one fleet of at least one autonomous vehicle on behalf of at least one third party on at least one network.

As a non-limiting example, at least one owner or at least one controller of at least one autonomous vehicle can for example utilize at least one external server that can be at least one source or at least one provider of all or some of at least one fleet of at least one autonomous vehicle, all or some of conveyance data relating to at least one fleet of at least one autonomous vehicle, all or some of at least one real time or near real time geographical location of at least one fleet of at least one autonomous vehicle, any data or information related to at least one fleet of at least one autonomous vehicle, or a combination thereof, relating to at least one conveyance industry segment.

As a non-limiting example, at least one owner or at least one controller of at least one autonomous vehicle or the like can input or provide at least one selected preference into at least one owner or controller application, being at least one computer program, and at least one selected preference can be transmitted to at least one central server, at least one application, or a combination thereof. As a non-limiting example, at least one owner or at least one controller of at least one autonomous vehicle can use at least one Autonomous Vehicle Automated Platform, at least one Representative Automated Platform, or a combination thereof, to facilitate, operate, perform, or the like, at least one conveyance service in at least one conveyance industry segment.

As a non-limiting example, at least one owner or at least one controller of at least one autonomous vehicle can identify at least one autonomous vehicle that can be identified as preferred, that can be waiting the longest to perform at least one conveyance service and secure or obtain at least one preferred conveyance service request for or with at least one autonomous vehicle that can be identified as preferred. As a non-limiting example, at least one owner or at least one controller of at least one autonomous vehicle can identify at least one autonomous vehicle that is not performing as expected and preferably secure or obtain at least one preferred conveyance service request for or with at least one autonomous vehicle that can be identified as preferred, at least one autonomous vehicle, or a combination thereof. As a non-limiting example, at least one owner or at least one controller of at least one autonomous vehicle can identify at least one fleet of at least one autonomous vehicle that can be moved towards at least one football stadium to perform at least one conveyance service when at least one game ends.

Representative Automated Platform

At least one Representative Automated Platform can be at least one system and/or at least one method that can for example facilitate at least one operation or at least one function to secure or obtain at least one preferred conveyance service request. At least one Representative Automated Platform can be at least one system and/or at least one method that can for example be utilized or operated by at least one service provider, at least one good supplier, at least one fleet manager, at least one logistics provider, at least one logistics supplier, at least one representative, or a combination thereof.

At least one Representative Automated Platform can utilize at least one rules based approach. At least one Representative Automated Platform can utilize at least one rules based system, al least one rules based method, or a combination thereof. At least one Representative Automated Platform can be at least one software as a service (SaaS). At least one Representative Automated Platform can be at least one subscription service. At least one Representative Automated Platform can optimize vehicle utilization for or with at least one representative, at least one service provider, at least one good supplier, at least one fleet manager, at least one logistics provider, at least one logistics supplier, at least one representative, or a combination thereof.

At least one Representative Automated Platform, automated in whole or in part, can for example analyze or evaluate at least one conveyance service request relating to at least one representative preference and preferably at least one real time or near real time geographical location of at least one representative to secure or obtain at least one preferred conveyance service request for at least one representative. Any at least one conveyance service request secured, obtained, or identified by at least one Representative Automated Platform can be perceived or referred to as at least one preferred conveyance service request. At least one Representative Automated Platform can be at least one computer program product. At least one Representative Automated Platform can be used by including but not limited to at least one representative, at least one service supplier, at least one good supplier, at least one owner or at least one controller of at least one autonomous vehicle, or a combination thereof.

At least one Representative Automated Platform can provide or identify at least one route or at least one dispatching instruction to or for at least one autonomous vehicle. At least one Representative Automated Platform can provide or identify at least one route or at least one dispatching instruction to or for at least one owner or at least one controller of at least one autonomous vehicle, at least one service provider, at least one good supplier, at least one fleet manager, at least one logistics provider, at least one logistics supplier, or a combination thereof. At least one Representative Automated. Platform can have at least one entity, at least one person, at least one entity, at least one computer, or the like manage logistics on at least one backend system, at least one frontend system, or a combination thereof.

At least one Representative Automated Platform can have or be utilized from at least one perspective. At least one Representative Automated Platform can have or be utilized from at least one different perspective. At least one Representative Automated Platform can have or be utilized from at least one perspective at the same time. At least one Representative Automated Platform can have or be utilized from at least one perspective relating to at least one owner or at least one controller of at least one autonomous vehicle, at least one representative, at least one service provider, at least one good supplier, at least one fleet manager, at least one logistics provider, at least one logistics supplier, or the like. At least one Representative Automated Platform can implement or utilize machine learning technology or the like. At least one Representative Automated Platform can implement or utilize machine learning technology or the like to analyze or evaluate information or data sourced or provided by at least one input source.

At least one preferred conveyance service request can be secured or obtained and can be displayed to at least one representative. At least one Representative Automated Platforms can secure or obtain at least one subsequent or additional preferred conveyance service request after at least one first preferred conveyance service request is secured or obtained.

At least one Representative Automated Platform, when automated in part, can allow at least one representative to use including but not limited to at least one application or at least one central server to analyze or evaluate and then secure or obtain at least one preferred conveyance service request. At least one preferred conveyance service request in conjunction with corresponding conveyance data, at least one filtered conveyance service request in conjunction with corresponding conveyance data, or a combination thereof, can be transmitted from at least one central server to at least one application and displayed as but not limited to at least one pop-up, at least one icon, at least one visual, at least one symbol, at least one pattern, at least one marker, at least one notification, at least one alert, at least one message, at least one short message service, at least one multimedia messaging service, at least one smart messaging service, or at least one extended message service. At least one representative can accept or decline including but not limited to at least one preferred conveyance service request, at least one filtered conveyance service request, or a combination thereof, that can be displayed on at least one application. If at least one representative declines at least one preferred conveyance service request or at least one filtered conveyance service request, at least one new or different preferred conveyance service request or at least one new or different filtered conveyance service request can be identified by at least one Representative Automated Platform and displayed.

At least one Representative Automated Platform can secure or obtain at least one preferred conveyance service request provided or sourced by including but not limited to at least one service provider, at least one external server, at least one central server, or a combination thereof. At least one Representative Automated Platform can secure or obtain at least one preferred conveyance service request in at least one conveyance industry segment. At least one Representative Automated Platform can secure or obtain, for at least one representative, at least one subsequent or additional preferred conveyance service request in at least one different conveyance industry segment. At least one Representative Automated Platform can secure or obtain at least one preferred conveyance service request relating to at least one service provider.

At least one Representative Automated Platform can update at least one preferred conveyance service request, at least one filtered conveyance service request, at least one conveyance service request, or a combination thereof, in real time or near real time as at least one real time or near real time geographical location of at least one representative changes or updates. At least one Representative Automated Platform can identify and preferably secure or obtain at least one new or different preferred conveyance service request as at least one real time or near real time geographical location of at least one representative updates or changes. At least one Representative Automated Platform can update at least one preferred conveyance service request, at least one filtered conveyance service request, at least one conveyance service request, or a combination thereof, as traffic information updates.

At least one Representative Automated. Platform can be updated or refreshed in real time or near real time and can refer to being updated or refreshed in the highest level of development or state of the art. At least one Representative Automated Platform can perform at least one function in real time or near real time and can refer to being updated or refreshed in the highest level of development or state of the art.

At least one Representative Automated Platform can repeatedly or continuously analyze or evaluate at least one conveyance service request in real time or near real time and preferably secure or obtain at least one subsequent or additional preferred conveyance service request while at least one representative performs at least one conveyance service and at least one real time or near real time geographical location of at least one representative updates or changes. At least one Representative Automated Platform can update or notify at least one representative while performing at least one conveyance service of including but not limited to at least one direction, at least one route, at least one conveyance client, at least one conveyance service request, at least one filtered conveyance service request, at least one preferred conveyance service request, at least one beginning service geographical location, at least one ending service geographical location, traffic information, or a combination thereof. At least one Representative Automated Platform can update or change at least one order of which at least one conveyance service is to be performed by repeatedly or continuously analyzing or evaluating in real time or near real time, including but not limited to, at least one conveyance service request, at least one filtered conveyance service request, at least one preferred conveyance service request, at least one real time or near real time geographical location of at least one representative, at least one representative preference, or a combination thereof. At least one Representative Automated Platform can unsecure or cancel at least one secured or obtained preferred conveyance service request or at least one secured or obtained filtered conveyance service request.

At least one Representative Automated Platform can use machine learning technology or the like to propose or recommend and optionally secure or obtain at least one preferred conveyance service request, at least one filtered conveyance service request, at least one conveyance service request, or a combination thereof. At least one Representative Automated Platform can propose or recommend at least one different conveyance service request other than at least one preferred conveyance service request based on including but not limited to at least one historical conveyance service, at least one historical pattern, at least one trend of at least one representative, the current real time or near real time environment, at least one real time or near real time geographical location of at least one representative, at least one representative preference, at least one different representative preference, at least one different combination of at least one representative preference, or a combination thereof. At least one representative can rank at least one representative preference for at least one Representative Automated Platform to make at least one proposal or recommendation. At least one Representative Automated Platform can propose, recommend, or notify at least one representative of at least one alternative or at least one different conveyance service request in addition to or replacement of at least one preferred conveyance service request. At least one proposal or recommendation of at least one different conveyance service request can assist at least one representative perform at least one additional conveyance service request. Any proposed or recommended at least one conveyance service request by at least one Representative Automated Platform that is secured or obtained can be identified as at least one preferred conveyance service request.

As a non-limiting example, at least one preferred conveyance service request, at least one filtered conveyance service request, or at least one conveyance service request can be secured or obtained without any interaction with at least one representative. As a non-limiting example, at least one Representative Automated Platform can secure or obtain at least one preferred conveyance service request in at least one individual conveyance industry segment. As a non-limiting example, at least one Representative Automated Platform can secure or obtain at least one preferred conveyance service request relating to at least one individual service provider.

As a non-limiting example, at least one Representative Automated Platform can secure or obtain al least one filtered conveyance service request or at least one conveyance service request other than at least one preferred conveyance service request. As a non-limiting example, at least one Representative Automated Platform can update or notify at least one representative of at least one preferred conveyance service request identified by at least one central server, at least one application, or a combination thereof, that can be accepted or declined by at least one representative. As a non-limiting example, at least one different conveyance service request can be accepted or selected by at least one representative other than at least one preferred conveyance service request identified by at least one Representative Automated Platform.

As a non-limiting example, at least one secured or obtained conveyance service can be performed at the same time or during the same or similar trip. As a non-limiting example, at least one Representative Automated Platform can create and/or optimize at least one route of at least one preferred conveyance service request based on including but not limited to at least one representative preference, at least one real time or near real time geographical location of at least one representative, or a combination thereof. As a non-limiting example, at least one Representative Automated Platform can show at least one preferred conveyance service request on at least one visual representation, at least one application, at least one central server, or a combination thereof. As a non-limiting example, at least one Representative Automated Platform can utilize at least one application, at least one terminal, at least one central server, at least one external server, at least one link, or a combination thereof, that can be combined or integrated.

As a non-limiting example, at least one Representative Automated Platform can unsecure or cancel at least one secured or obtained preferred conveyance service request or at least one secured or obtained filtered conveyance service request if at least one better preferred conveyance service request or at least one better filtered conveyance service request becomes available such as but not limited to in real time or near real time.

As a non-limiting example, at least one Representative Automated Platform can propose or recommend at least one different conveyance service request in at least one other geographical location or at least one other area based on at least one historical conveyance service. As a non-limiting example, at least one Representative Automated Platform can propose or recommend at least one preferred conveyance service request, at least one filtered conveyance service request, at least one conveyance service request, or a combination thereof, based on elevated pricing when at least one representative has chosen at least one specific conveyance industry segment preference and at least one level of service preference as at least one representative preference and at least one pricing preference not being at least one representative preference. As a non-limiting example, at least one application can propose or recommend at least one different conveyance service request other than at least one preferred conveyance service request.

As a non-limiting example, at least one Representative Automated Platform can automatically secure or obtain at least one preferred conveyance service request after at least one pop-up or at least one notification has had a given amount of time elapse. As a non-limiting example, at least one representative can accept or decline at least one preferred conveyance service request identified by at least one Representative Automated Platform by swiping or using at least one other gesture on at least one application. As a non-limiting example, at least one Representative Automated Platform can utilize at least one neural network. As a non-limiting example, at least one Representative Automated Platform can utilize quantum computing. As a non-limiting example, at least one Representative Automated Platform can display at least one preferred conveyance service request or at least one filtered conveyance service request and at least one representative can secure or obtain at least one preferred conveyance service request or at least one filtered conveyance service request. As a non-limiting example, more than one preferred conveyance service request can be secured or obtained concurrently for at least one representative.

As a non-limiting example, at least one owner or at least one controller of at least one autonomous vehicle, at least one service provider, at least one good supplier, at least one fleet manager, at least one logistics provider, at least one logistics supplier, or a combination thereof, can utilize at least one Representative Automated Platform in conjunction with at least one Autonomous Vehicle Automated Platform to facilitate or perform at least one conveyance service. As a non-limiting example, at least one representative can perform all or some of at least one conveyance service utilizing at least one Representative Automated Platform. As a non-limiting example, at least one representative can perform all or some of at least one conveyance service in conjunction with at least one autonomous vehicle utilizing at least one Representative Automated Platform, at least one Autonomous Vehicle Automated Platform, or a combination thereof. As a non-limiting example, at least one representative can perform part of at least one conveyance service and at least one autonomous vehicle can perform at least one other part of at least one conveyance service utilizing at least one Representative Automated Platform, at least one Autonomous Vehicle Automated Platform, or a combination thereof.

Autonomous Vehicle Automated Platform

At least one Autonomous Vehicle Automated Platform, automated in whole or in part, can be at least one system and/or at least one method that can for example facilitate at least one operation or at least one function to secure or obtain at least one preferred conveyance service request, at least one autonomous vehicle that can be identified as preferred, or a combination thereof. At least one Autonomous Vehicle Automated Platform, automated in whole or in part, can be at least one system and/or at least one method that can for example be utilized or operated by at least one owner or at least one controller of at least one autonomous vehicle, at least one service provider, at least one good supplier, at least one fleet manager, at least one logistics provider, at least one logistics supplier, at least one autonomous vehicle, or a combination thereof. At least one Autonomous Vehicle Automated Platform can optimize vehicle utilization for or with at least one owner or at least one controller of at least one autonomous vehicle, at least one service provider, at least one good supplier, at least one fleet manager, at least one logistics provider, at least one logistics supplier, or a combination thereof.

At least one Autonomous Vehicle Automated Platform can be at least one computer program product. At least one Autonomous Vehicle Automated Platform can utilize at least one rules based approach. At least one Autonomous Vehicle Automated Platform can utilize at least one rules based system, at least one rules based method, or a combination thereof. At least one Autonomous Vehicle Automated Platform can be at least one software as a service (SaaS). At least one Autonomous Vehicle Automated Platform can be at least one subscription service.

At least one Autonomous Vehicle Automated Platform can manage, control, or operate at least one autonomous vehicle. At least one Autonomous Vehicle Automated Platform, automated in whole or in part, can for example analyze or evaluate at least one conveyance service request relating to at least one selected preference and preferably at least one real time or near real time geographical location of at least one autonomous vehicle to secure or obtain at least one preferred conveyance service request for or with at least one autonomous vehicle, at least one autonomous vehicle that can be identified as preferred, or a combination thereof. When at least one preferred conveyance service request is secured or obtained for or with at least one autonomous vehicle, at least one autonomous vehicle that can be identified as preferred can also be considered. Any at least one conveyance service request secured, obtained, or identified by at least one Autonomous Vehicle Automated Platform can be perceived or referred to as at least one preferred conveyance service request.

At least one Autonomous Vehicle Automated Platform, automated in whole or in part, can for example analyze or evaluate all or some of conveyance data relating to at least one autonomous vehicle relating to at least one selected preference and preferably at least one real time or near real time geographical location of at least one autonomous vehicle to secure or obtain at least one autonomous vehicle, at least one autonomous vehicle that can be identified as preferred, or a combination thereof, for or with at least one preferred conveyance service request. When at least one autonomous vehicle is considered, at least one autonomous vehicle that can be filtered, at least one autonomous vehicle that can be identified as preferred, or a combination thereof, can also be considered. Any at least one autonomous vehicle secured, obtained, or identified by at least one Autonomous Vehicle Automated Platform can be perceived or referred to as at least one autonomous vehicle that can be identified as preferred.

At least one Autonomous Vehicle Automated Platform can provide or identify at least one route or at least one dispatching instruction to or for at least one autonomous vehicle. At least one Autonomous Vehicle Automated Platform can provide or identify at least one route or at least one dispatching instruction to or for at least one owner or at least one controller of at least one autonomous vehicle, at least one service provider, at least one good supplier, at least one fleet manager, at least one logistics provider, at least one logistics supplier, or a combination thereof. At least one Autonomous Vehicle Automated Platform can be used by including but not limited to at least one owner or at least one controller of at least one autonomous vehicle, at least one autonomous vehicle, at least one service provider, at least one good supplier, at least one fleet manager, at least one logistics provider, at least one logistics supplier, or a combination thereof.

At least one Autonomous Vehicle Automated Platform can have or be utilized from at least one perspective. At least one Autonomous Vehicle Automated Platform can have or be utilized from at least one different perspective. At least one Autonomous Vehicle Automated Platform can have or be utilized from at least one perspective at the same time. At least one Autonomous Vehicle Automated Platform can have or be utilized from at least one perspective relating to at least one owner or at least one controller of at least one autonomous vehicle, at least one service provider, at least one good supplier, at least one fleet manager, at least one logistics provider, at least one logistics supplier, or the like. At least one Autonomous Vehicle Automated Platform can optimize fleet performance and can control or operate at least one autonomous vehicle in at least one efficient manner. At least one Autonomous Vehicle Automated Platform can optimize fleet performance by taking perspective from at least one single autonomous vehicle to at least one fleet of at least one autonomous vehicle. At least one Autonomous Vehicle Automated Platform can single out or identify at least one autonomous vehicle that can be underperforming and enhance at least one selected preference for that at least one autonomous vehicle, to increase a likelihood of securing or obtaining at least one preferred conveyance service request for the underperforming at least one autonomous vehicle.

At least one Autonomous Vehicle Automated Platform can have at least one entity, at least one person, at least one entity, at least one computer, or the like, manage logistics for at least one owner or at least one controller of at least one autonomous vehicle, at least one autonomous vehicle, at least one service provider, at least one good supplier, at least one fleet manager, at least one logistics provider, at least one logistics supplier, or a combination thereof. At least one Autonomous Vehicle Automated Platform can have at least one entity, at least one person, at least one entity, at least one computer, or the like manage logistics on at least one backend system, at least one frontend system, or a combination thereof.

At least one Autonomous Vehicle Automated Platform can secure or obtain at least one preferred conveyance service request, at least one autonomous vehicle, at least one autonomous vehicle that can be identified as preferred, or a combination thereof, relating to at least one service provider, at least one owner or at least one controller of at least one autonomous vehicle, at least one good supplier, at least one fleet manager, at least one logistics provider, at least one logistics supplier, or the like. At least one preferred conveyance service request can be secured or obtained for or with at least one autonomous vehicle, at least one autonomous vehicle that can be identified as preferred, or a combination thereof. At least one Autonomous Vehicle Automated Platform can secure or obtain at least one subsequent or additional preferred conveyance service request after at least one first preferred conveyance service request is secured or obtained for or with at least one autonomous vehicle, at least one autonomous vehicle that can be identified as preferred, or a combination thereof.

At least one Autonomous Vehicle Automated Platform can secure or obtain at least one preferred conveyance service request, at least one autonomous vehicle, at least one autonomous vehicle that can be identified as preferred, or a combination thereof, provided or sourced by including but not limited to at least one service provider, at least one good supplier, at least one fleet manager, at least one logistics provider, at least one logistics supplier, at least one owner or at least one controller of at least one autonomous vehicle, at least one external server, at least one central server, at least one application, at least one owner or controller application, or a combination thereof. At least one Autonomous Vehicle Automated Platform can secure or obtain at least one preferred conveyance service request, at least one autonomous vehicle, at least one autonomous vehicle that can be identified as preferred, or a combination thereof, in at least one conveyance industry segment. At least one Autonomous Vehicle Automated Platform can secure or obtain, for at least one autonomous vehicle or at least one autonomous vehicle that can be identified as preferred, at least one subsequent or additional preferred conveyance service request in at least one different conveyance industry segment. At least one Autonomous Vehicle Automated Platform can secure or obtain at least one subsequent or additional preferred conveyance service request in at least one different conveyance industry segment for or with at least one autonomous vehicle that is identified as preferred.

At least one Autonomous Vehicle Automated Platform can secure or obtain at least one preferred conveyance service request, at least one autonomous vehicle, at least one autonomous vehicle that can be identified as preferred, or a combination thereof, on or at at least one central server, at least one external server, at least one application, at least one owner or controller application, or a combination thereof. At least one Autonomous Vehicle Automated Platform can secure or obtain at least one preferred conveyance service request or the like on at least one central server and secure or obtain at least one autonomous vehicle that can be identified as preferred or the like on at least one other central server. At least one Autonomous Vehicle Automated Platform can secure or obtain another at least one preferred conveyance service request for at least one autonomous vehicle that can be identified as preferred if the previously secured or obtained at least one preferred conveyance service request is rejected or not available.

At least one Autonomous Vehicle Automated Platform can manage, operate, or control at least one fleet of at least one autonomous vehicle for or with at least one service provider, at least one owner or at least one controller of at least one autonomous vehicle, at least one good supplier, at least one fleet manager, at least one logistics provider, at least one logistics supplier, or the like. At least one Autonomous Vehicle Automated Platform can facilitate all or some of at least one conveyance service. At least one Autonomous Vehicle Automated Platform can facilitate part of at least one conveyance service and contract out at least one other part of at least one conveyance service. At least one Autonomous Vehicle Automated Platform can be utilized with at least one Representative Automated Platform to facilitate at least one conveyance service. At least one Autonomous Vehicle Automated Platform can use at least one unique identifier or at least one unique number to manage, operate, or control at least one autonomous vehicle.

At least one Autonomous Vehicle Automated Platform can update at least one preferred conveyance service request, at least one filtered conveyance service request, at least one conveyance service request, all or some of conveyance data relating to at least one autonomous vehicle, all or some of filtered conveyance data relating to at least one autonomous vehicle, all or some of preferred conveyance data relating to at least one autonomous vehicle, or a combination thereof, in real time or near real time as all or some of at least one real time or near real time geographical location of at least one autonomous vehicle changes or updates. At least one Autonomous Vehicle Automated Platform can identify and preferably secure or obtain at least one new or different preferred conveyance service request or at least one new or different autonomous vehicle that can be identified as preferred, as all or some of at least one real time or near real time geographical location of at least one autonomous vehicle updates or changes. At least one Autonomous Vehicle Automated Platform can update at least one preferred conveyance service request, at least one filtered conveyance service request, at least one conveyance service request, all or some of conveyance data relating to at least one autonomous vehicle, all or some of filtered conveyance data relating to at least one autonomous vehicle, all or some of preferred conveyance data relating to at least one autonomous vehicle, or a combination thereof, as traffic information updates.

At least one Autonomous Vehicle Automated Platform can be updated or refreshed in real time or near real time and can refer to being updated or refreshed in the highest level of development or state of the art. At least one Autonomous Vehicle Automated Platform can perform at least one function in real time or near real time and can refer to being updated or refreshed in the highest level of development or state of the art. At least one Autonomous Vehicle Automated Platform can use at least one selected preference to preferably enable only at least one preferred conveyance service request to be secured or obtained for or with at least one autonomous vehicle that can be identified as preferred. At least one Autonomous Vehicle Automated Platform can apply at least one selected preference to preferably enable only at least one autonomous vehicle that can be identified as preferred to be secured or obtained for or with at least one preferred conveyance service request.

At least one Autonomous Vehicle Automated Platform can repeatedly or continuously analyze or evaluate at least one conveyance service request in real time or near real time and preferably secure or obtain at least one subsequent or additional preferred conveyance service request while at least one autonomous vehicle performs or provides at least one conveyance service and all or some of at least one real time or near real time geographical location of at least one autonomous vehicle updates or changes. At least one Autonomous Vehicle Automated Platform can repeatedly or continuously analyze or evaluate at least one autonomous vehicle or all or some of conveyance data relating to at least one autonomous vehicle in real time or near real time and preferably secure or obtain at least one subsequent or additional preferred conveyance service request while at least one autonomous vehicle or at least one autonomous vehicle that can be identified as preferred, performs or provides at least one conveyance service and all or some of at least one real time or near real time geographical location of at least one autonomous vehicle updates or changes.

At least one Autonomous Vehicle Automated Platform can update or notify at least one autonomous vehicle, at least one owner or at least one controller of at least one autonomous vehicle, or the like, while performing at least one conveyance service of including but not limited to at least one direction, at least one route, at least one conveyance client, at least one conveyance service request, at least one filtered conveyance service request, at least one preferred conveyance service request, at least one beginning service geographical location, at least one ending service geographical location, traffic information, all or some of conveyance data relating to at least one autonomous vehicle, all or some of filtered conveyance data relating to at least one autonomous vehicle, all or some of preferred conveyance data relating to at least one autonomous vehicle, or a combination thereof.

At least one Autonomous Vehicle Automated Platform can update or change at least one order of which at least one conveyance service is to be performed by repeatedly or continuously analyzing or evaluating, in real time or near real time, including but not limited to, at least one conveyance service request, at least one filtered conveyance service request, at least one preferred conveyance service request, all or some of conveyance data relating to at least one autonomous vehicle, all or some of filtered conveyance data relating to at least one autonomous vehicle, all or some of preferred conveyance data relating to at least one autonomous vehicle, at least one real time or near real time geographical location of at least one autonomous vehicle, at least one selected preference, or a combination thereof.

At least one Autonomous Vehicle Automated Platform can unsecure or cancel at least one secured or obtained preferred conveyance service request or at least one secured or obtained filtered conveyance service request. At least one Autonomous Vehicle Automated Platform can unsecure or cancel at least one conveyance service request, at least one filtered conveyance service request, at least one preferred conveyance service request, all or some of conveyance data relating to at least one autonomous vehicle, all or some of filtered conveyance data relating to at least one autonomous vehicle, all or some of preferred conveyance data relating to at least one autonomous vehicle, at least one autonomous vehicle, at least one autonomous vehicle that can be filtered, at least one autonomous vehicle that can be identified as preferred, or a combination thereof.

At least one Autonomous Vehicle Automated Platform can unsecure or cancel at least one conveyance service request, at least one filtered conveyance service request, at least one preferred conveyance service request, all or some of conveyance data relating to at least one autonomous vehicle, all or some of filtered conveyance data relating to at least one autonomous vehicle, all or some of preferred conveyance data relating to at least one autonomous vehicle, at least one autonomous vehicle, at least one autonomous vehicle that can be filtered, at least one autonomous vehicle that can be identified as preferred, or a combination thereof, on at least one central server, at least one external server, at least one application, at least one owner or controller application, or a combination thereof.

At least one Autonomous Vehicle Automated Platform can implement or utilize machine learning technology or the like. At least one Autonomous Vehicle Automated Platform can implement or utilize machine learning technology or the like to analyze or evaluate information or data sourced or provided by at least one input source. At least one Autonomous Vehicle Automated Platform can use machine learning technology or the like to propose or recommend and optionally secure or obtain at least one preferred conveyance service request, at least one filtered conveyance service request, at least one conveyance service request, at least one autonomous vehicle that can be identified as preferred, at least one autonomous vehicle that can be filtered, at least one autonomous vehicle, or a combination thereof. At least one owner or at least one controller of at least one autonomous vehicle, at least one service provider, at least one good supplier, at least one fleet manager, at least one logistics provider, at least one logistics supplier, or the like, can rank at least one selected preference for at least one Autonomous Vehicle Automated Platform to make at least one proposal or recommendation.

At least one Autonomous Vehicle Automated Platform can propose or recommend at least one different conveyance service request other than at least one preferred conveyance service request based on including but not limited to at least one historical conveyance service, at least one historical pattern, at least one trend of at least one autonomous vehicle, the current real time or near real time environment, at least one real time or near real time geographical location of at least one autonomous vehicle, at least one selected preference, at least one different selected preference, at least one different combination of at least one selected preference, or a combination thereof. At least one Autonomous Vehicle Automated Platform can propose or recommend at least one different autonomous vehicle other than at least one autonomous vehicle that can be identified as preferred.

At least one Autonomous Vehicle Automated Platform can propose, recommend, or notify at least one autonomous vehicle, at least one owner or at least one controller of at least one autonomous vehicle, at least one service provider, at least one good supplier, at least one fleet manager, at least one logistics provider, at least one logistics supplier, or a combination thereof, of at least one alternative or at least one different conveyance service request in addition to or replacement of at least one preferred conveyance service request. At least one proposal or recommendation of at least one different conveyance service request can assist at least one owner or at least one controller of at least one autonomous vehicle, at least one autonomous vehicle, at least one service provider, at least one good supplier, at least one fleet manager, at least one logistics provider, at least one logistics supplier, or a combination thereof, perform or provide at least one additional conveyance service request. Any proposed or recommended at least one conveyance service request by at least one Autonomous Vehicle Automated Platform that is secured or obtained can be identified as at least one preferred conveyance service request. Any proposed or recommended at least one autonomous vehicle by at least one Autonomous Vehicle Automated Platform that is secured or obtained can be identified as at leas one autonomous vehicle that can be identified as preferred.

At least one Autonomous Vehicle Automated Platform, when automated in part, can allow at least one owner or at least one controller of at least one autonomous vehicle, at least one service provider, or the like to use including but not limited to at least one application, at least one owner or controller application, at least one central server, at least one external server, or a combination thereof, to analyze or evaluate and then secure or obtain at least one preferred conveyance service request. At least one preferred conveyance service request in conjunction with corresponding conveyance data, at least one filtered conveyance service request in conjunction with corresponding conveyance data, all or some of preferred conveyance data relating to at least one autonomous vehicle, all or some of filtered conveyance data relating to at least one autonomous vehicle, or a combination thereof, can be transmitted from at least one central server to at least one application or at least one owner or controller application and displayed as but not limited to at least one pop-up, at least one icon, at least one visual, at least one symbol, at least one pattern, at least one marker, at least one notification, at least one alert, at least one message, at least one short message service, at least one multimedia messaging service, at least one smart messaging service, or at least one extended message service.

At least one owner or at least one controller of at least one autonomous vehicle, at least one service provider, or the like can accept or decline including but not limited to at least one preferred conveyance service request, at least one filtered conveyance service request, all or some of preferred conveyance data relating to at least one autonomous vehicle, all or some of filtered conveyance data relating to at least one autonomous vehicle, or a combination thereof, that can be displayed on at least one application or at least one owner or controller application.

If at least one owner or at least one controller of at least one autonomous vehicle, at least one service provider, or the like declines at least one preferred conveyance service request or at least one filtered conveyance service request, at least one new or different preferred conveyance service request or at least one new or different filtered conveyance service request can be identified by at least one Autonomous Vehicle Automated Platform and displayed. If at least one owner or at least one controller of at least one autonomous vehicle, at least one service provider, or the like declines at least one autonomous vehicle that can be identified as preferred or at least one autonomous vehicle that can be filtered, at least one new or different autonomous vehicle that can be identified as preferred or at least one new or different at least one autonomous vehicle that can be filtered can be identified by at least one Autonomous Vehicle Automated Platform and displayed.

As a non-limiting example, at least one preferred conveyance service request, at least one filtered conveyance service request, at least one conveyance service request, at least one autonomous vehicle, at least one autonomous vehicle that can be filtered, at least one autonomous vehicle that can be identified as preferred, or a combination thereof, can be secured or obtained without any interaction by at least one owner or at least one controller of at least one autonomous vehicle or the like. As a non-limiting example, at least one Autonomous Vehicle Automated Platform can secure or obtain at least one preferred conveyance service request for or with at least one autonomous vehicle, at least one autonomous vehicle that can be identified as preferred, or a combination thereof, in at least one individual conveyance industry segment. As a non-limiting example, at least one Autonomous Vehicle Automated Platform can secure or obtain at least one preferred conveyance service request for or with at least one autonomous vehicle, at least one autonomous vehicle that can be identified as preferred, or a combination thereof, relating to at least one individual service provider.

As a non-limiting example, at least one Autonomous Vehicle Automated Platform can secure or obtain at least one filtered conveyance service request or at least one conveyance service request other than at least one preferred conveyance service request. As a non-limiting example, at least one Autonomous Vehicle Automated Platform can secure or obtain at least one autonomous vehicle that can be filtered or at least one autonomous vehicle other than at least one autonomous vehicle that can be identified as preferred. As a non-limiting example, at least one Autonomous Vehicle Automated Platform can update or notify at least one owner or at least one controller of at least one autonomous vehicle, at least one service provider, or the like of at least one preferred conveyance service request, identified by at least one central server, at least one application, at least one owner or controller application, or a combination thereof, that can be accepted or declined by at least one owner or at least one controller of at least one autonomous vehicle, at least one service provider, or the like. As a non-limiting example, at least one different conveyance service request can be accepted or selected by at least one owner or at least one controller of at least one autonomous vehicle, at least one service provider, or the like other than at least one preferred conveyance service request identified by at least one Autonomous Vehicle Automated Platform. As a non-limiting example, at least one different autonomous vehicle can be accepted or selected by at least one owner or at least one controller of at least one autonomous vehicle, at least one service provider, or the like other than at least one autonomous vehicle that can be identified as preferred that can be identified by at least one Autonomous Vehicle Automated Platform.

As a non-limiting example, at least one Autonomous Vehicle Automated Platform can be used by at least one owner or at least one controller of at least one autonomous vehicle, at least one service provider, at least one good supplier, at least one fleet manager, at least one logistics provider, at least one logistics supplier, or a combination thereof, to facilitate at least one conveyance service. As a non-limiting example, at least one Autonomous Vehicle Automated Platform can benefit at least one fleet manager, at least one service provider, at least one good supplier, at least one owner or at least one controller of at least one autonomous vehicle, at least one logistics provider, at least one logistics supplier, or the like, by having at least one third party or the like control, manage, or operate at least one autonomous vehicle to provide or perform at least one conveyance service. As a non-limiting example, at least one Autonomous Vehicle Automated Platform can benefit at least one third party or the like, by having at least one fleet manager, at least one service provider, at least one good supplier, at least one owner or at least one controller of at least one autonomous vehicle, at least one logistics provider, at least one logistics supplier, or the like control, manage, or operate at least one autonomous vehicle to provide or perform at least one conveyance service.

As a non-limiting example, at least one secured or obtained conveyance service can be performed at the same time or during the same or similar trip. As a non-limiting example, at least one Autonomous Vehicle Automated Platform can create and/or optimize at least one route of at least one preferred conveyance service request based on including but not limited to at least one selected preference, at least one real time or near real time geographical location of at least one autonomous vehicle, or a combination thereof. As a non-limiting example, at least one Autonomous Vehicle Automated Platform can show at least one preferred conveyance service request or at least one autonomous vehicle that can be identified as preferred on at least one owner or controller application, at least one application, at least one central server, at least one visual representation, or a combination thereof. As a non-limiting example, at least one Autonomous Vehicle Automated Platform can utilize at least one application, at least one owner or controller application, at least one autonomous vehicle, at least one terminal, at least one central server, at least one external server, at least one link, or a combination thereof, that can be combined or integrated.

As a non-limiting example, at least one Autonomous Vehicle Automated Platform can unsecure or cancel at least one secured or obtained preferred conveyance service request or at least one secured or obtained filtered conveyance service request if at least one better preferred conveyance service request or at least one better filtered conveyance service request becomes available such as but not limited to in real time or near real time. As a non-limiting example, at least one Autonomous Vehicle Automated Platform can unsecure or cancel at least one secured or obtained autonomous vehicle that can be identified as preferred or at least one secured or obtained autonomous vehicle that can be filtered if at least one better autonomous vehicle that can be identified as preferred or at least one better autonomous vehicle that can be filtered becomes available such as but not limited to in real time or near real time. As a non-limiting example, at least one Autonomous Vehicle Automated Platform can unsecure or cancel at least one autonomous vehicle that can be identified as preferred if at least one autonomous vehicle that can be identified as preferred is or becomes unavailable.

As a non-limiting example, at least one Autonomous Vehicle Automated Platform can propose or recommend at least one different conveyance service request in at least one other geographical location or at least one other area based on at least one historical conveyance service. As a non-limiting example, at least one Autonomous Vehicle Automated Platform can propose or recommend at least one preferred conveyance service request, at least one filtered conveyance service request, at least one conveyance service request, at least one autonomous vehicle, at least one autonomous vehicle that can be filtered, at least one autonomous vehicle that can be identified as preferred, or a combination thereof, based on high conveyance service request density when at least one owner or at least one controller of at least one autonomous vehicle has chosen at least one specific conveyance industry segment preference and at least one level of service preference as at least one selected preference. As a non-limiting example, at least one central server, at least one application, at least one owner or controller application, or a combination thereof, can propose or recommend at least one different conveyance service request other than at least one preferred conveyance service request. As a non-limiting example, at least one central server, at least one application, at least one owner or controller application, or a combination thereof, can propose or recommend at least one different autonomous vehicle other than at least one autonomous vehicle that can be identified as preferred.

As a non-limiting example, at least one Autonomous Vehicle Automated Platform, automated in whole or in part, can be used as at least one tool to help at least one service provider, at least one owner or at least one controller of at least one autonomous vehicle, at least one good supplier, at least one fleet manager, at least one logistics provider, at least one logistics supplier, or a combination thereof, integrate at least one autonomous vehicle to at least one conveyance industry segment. As a non-limiting example, at least one Autonomous Vehicle Automated Platform can be at least one operating system, at least one operating method, at least one backend operating system, at least one backend operating method, or a combination thereof.

As a non-limiting example, at least one Autonomous Vehicle Automated Platforms can automatically secure or obtain at least one preferred conveyance service request, at least one autonomous vehicle, at least one autonomous vehicle that can be identified as preferred, or a combination thereof, after at least one pop-up or at least one notification has had a given amount of time elapse. As a non-limiting example, at least one owner or at least one controller of at least one autonomous vehicle or the like can accept or decline at least one preferred conveyance service request, at least one autonomous vehicle, at least one autonomous vehicle that can be identified as preferred, or a combination thereof, identified by at least one Autonomous Vehicle Automated Platform by swiping or using at least one other gesture on at least one owner or controller application or at least one application. As a non-limiting example, at least one Autonomous Vehicle Automated Platform can utilize at least one neural network. As a non-limiting example, at least one Autonomous Vehicle Automated Platform can utilize quantum computing. As a non-limiting example, more than one preferred conveyance service request can be secured or obtained concurrently for or with at least one autonomous vehicle, at least one autonomous vehicle that can be identified as preferred, or a combination thereof.

As a non-limiting example, at least one Autonomous Vehicle Automated Platform can manage, control, or operate at least one fleet of at least one autonomous vehicle. As a non-limiting example, at least one Autonomous Vehicle Automated Platform can manage, control, or operate at least one fleet of at least one autonomous vehicle for or with at least one owner or at least one controller of at least one autonomous vehicle, at least one service provider, at least one good supplier, at least one fleet manager, at least one logistics provider, at least one logistics supplier, or the like. As a non-limiting example, at least one Autonomous Vehicle Automated Platform can secure or obtain at least one preferred conveyance service request for or with at least one fleet of at least one autonomous vehicle. As a non-limiting example, at least one Autonomous Vehicle Automated Platform can secure or obtain at least one fleet of at least one autonomous vehicle that can be identified as preferred for or with at least one preferred conveyance service request.

As a non-limiting example, at least one Autonomous Vehicle Automated Platform can assign at least one unique identifier or at least one unique number to at least one autonomous vehicle or at least one fleet of at least one autonomous vehicle. As a non-limiting example, at least one Autonomous Vehicle Automated Platform can use at least one unique identifier or at least one unique number to manage, control, or operate at least one autonomous vehicle or at least one fleet of at least one autonomous vehicle. As a non-limiting example, at least one Autonomous Vehicle Automated Platform can use at least one unique identifier or at least one unique number to manage, control, or operate at least one owner or at least one controller of at least one autonomous vehicle, at least one service provider, at least one good supplier, at least one fleet manager, at least one logistics provider, at least one logistics supplier, or a combination thereof.

As a non-limiting example, at least one Autonomous Vehicle Automated Platform can optimize fleet performance by taking perspective from a single autonomous vehicle. As a non-limiting example, at least one Autonomous Vehicle Automated Platform can optimize fleet performance by taking perspective from multiple autonomous vehicles. As a non-limiting example, at least one Autonomous Vehicle Automated Platform can license or hire at least on third party to manage logistics for at least one owner or at least one controller of at least one autonomous vehicle, at least one service provider, at least one good supplier, at least one fleet manager, at least one logistics provider, at least one logistics supplier, or a combination thereof.

As a non-limiting example, at least one Autonomous Vehicle Automated Platform can be utilized to manage, control, or operate at least one robot taxi service. As a non-limiting example, at least one Autonomous Vehicle Automated Platform can be utilized to manage, control, or operate at least one food delivery service. As a non-limiting example, at least one Autonomous Vehicle Automated Platform can be utilized to manage, control, or operate at least one package delivery service. As a non-limiting example, at least one Autonomous Vehicle Automated Platform can be utilized to manage, control, or operate multiple conveyance industry segments.

As a non-limiting example, at least one Autonomous Vehicle Automated Platform can integrate or incorporate at least one input source or at least one API, such as for example, at least one driving navigation application. As a non-limiting example, at least one Autonomous Vehicle Automated Platform can use or utilize information or data from at least one third party API or service, such as at least one routing or mapping service. As a non-limiting example, at least one Autonomous Vehicle Automated Platform can integrate or incorporate at least one high-definition map or at least one mapping provider. As a non-limiting example, at least one Autonomous Vehicle Automated Platform can integrate information or data from at least one third party. As a non-limiting example, at least one Autonomous Vehicle Automated Platform can integrate information or data from at least one map provider. As a non-limiting example, at least one Autonomous Vehicle Automated Platform can improve with at least one "network effect."

As a non-limiting example, at least one owner or at least one controller of at least one autonomous vehicle, at least one service provider, at least one good supplier, at least one fleet manager, at least one logistics provider, at least one logistics supplier, or a combination thereof, can utilize at least one Autonomous Vehicle Automated Platform in conjunction with at least one Representative Automated Platform to facilitate or perform at least one conveyance service. As a non-limiting example, at least one representative can perform all or some of at least one conveyance service utilizing at least one Autonomous Vehicle Automated Platform. As a non-limiting example, at least one representative can perform all or some of at least one conveyance service in conjunction with at least one autonomous vehicle utilizing at least one Autonomous Vehicle Automated Platform. As a non-limiting example, at least one representative can perform part of at least one conveyance service and at least one autonomous vehicle can perform at least one other part of at least one conveyance service utilizing at least one Autonomous Vehicle Automated Platform.

As a non-limiting example, at least one Autonomous Vehicle Automated. Platform can allow or ask at least one conveyance client or at least one recipient of at least one conveyance service to select or choose at least one route for at least one conveyance service. As a non-limiting example, at least one Autonomous Vehicle Automated Platform can identify at least one preferred conveyance service request and then secure at least one autonomous vehicle that can be identified as preferred on at least one central server relating to at least one service provider, at least one owner or at least one controller of at least one autonomous vehicle, at least one good supplier, at least one fleet manager, at least one logistics provider, at least one logistics supplier, at least one third party, or the like. As a non-limiting example, at least one Autonomous Vehicle Automated Platform can identify at least one preferred conveyance service request or at least one autonomous vehicle that can be identified as preferred and can be secured or obtained on another server relating to at least one service provider, at least one owner or at least one controller of at least one autonomous vehicle, at least one good supplier, at least one fleet manager, at least one logistics provider, at least one logistics supplier, at least one third party, or the like.

As a non-limiting example, at least one Autonomous Vehicle Automated Platform can utilize at least one database table to filter and preferably identify at least one preferred conveyance service request. As a non-limiting example, at least one Autonomous Vehicle Automated Platform can use at least one database table to filter and preferably identify at least one autonomous vehicle that can be identified as preferred. As a non-limiting example, at least one Autonomous Vehicle Automated Platform can use at least one database table to filter and preferably identify at least one preferred conveyance service request and at least one autonomous vehicle that can be identified as preferred.

As a non-limiting example, at least one Autonomous Vehicle Automated Platform can identify at least one traffic based information, for example, at least one car accident and communicate at least one traffic based information to at least one autonomous vehicle, at least one owner or at least one controller of at least one autonomous vehicle, at least one service provider, at least one good supplier, at least one fleet manager, at least one logistics provider, at least one logistics supplier, at least one application, at least one owner or controller application, at least one central server, or a combination thereof.

As a non-limiting example, at least one Autonomous Vehicle Automated Platform can communicate with or connect to at least one central server relating to at least one owner or at least one controller of at least one autonomous vehicle, at least one service provider, at least one good supplier, at least one fleet manager, at least one logistics provider, at least one logistics supplier, or a combination thereof. As a non-limiting example, at least one Autonomous Vehicle Automated Platform can communicate with or connect to at least one other central server relating to at least one owner or at least one controller of at least one autonomous vehicle, at least one service provider, at least one good supplier, at least one fleet manager, at least one logistics provider, at least one logistics supplier, or a combination thereof. As a non-limiting example, at least one Autonomous Vehicle Automated Platform can communicate with or connect to three central servers, being one central server to manage, control, or operate at least one Autonomous Vehicle Automated Platform, one central server associated with a fleet manager, and another central server associated with a service provider.

The following are different examples of at least one present invention used by various parties or entities:

As a non-limiting example, at least one independent third party can own or develop at least one present invention and can license including but not limited to all or some of at least one software, at least one Software as a service (SaaS), at least one subscription service, at least one technology, at least one Autonomous Vehicle Automated Platform, at least one Representative Automated Platform, at least one system, at least one method, or a combination thereof, to at least one OEM, where at least one OEM can control, manage, or operate at least one present invention. As a non-limiting example, Independent Company A can own or develop at least one present invention and can license at least one Autonomous Vehicle Automated Platform to OEM Company B, where OEM Company B can control, manage, or operate the backend logistics. As a non-limiting example, Independent Company A can own or develop at least one present invention and can license at least one Autonomous Vehicle Automated Platform to multiple OEM Companies, where multiple OEM Companies can control, manage, or operate the backend logistics.

As a non-limiting example, at least one independent third party can own, manage, and/or operate at least one present invention, including but not limited to all or some of at least one software, at least one Software as a service (SaaS), at least one subscription service, at least one technology, at least one Autonomous Vehicle Automated Platform, at least one Representative Automated Platform, at least one system, at least one method, or a combination thereof, for at least one OEM. As a non-limiting example, Independent Company A can own or license at least one Autonomous Vehicle Automated Platform and Independent Company A can control, manage, or operate the backend logistics for OEM Company B. As a non-limiting example, Independent Company A can own or license at least one Autonomous Vehicle Automated Platform and Independent Company A can control, manage, or operate the backend logistics for multiple OEM Companies.

As a non-limiting example, at least one OEM can own or license at least one present invention, including but not limited to all or some of at least one software, at least one Software as a service (SaaS), at least one subscription service, at least one technology, at least one Autonomous Vehicle Automated Platform, at least one Representative Automated Platform, at least one system, at least one method, or a combination thereof, and at least one OEM can control, manage, or operate at least one present invention on their own OEM conveyance network. As a non-limiting example, OEM Company C can own or license at least one Autonomous Vehicle Automated Platform, where OEM Company C can control, manage, or operate the backend logistics for their own conveyance network. As a non-limiting example, OEM Company C can own or license at least one Autonomous Vehicle Automated Platform, where OEM Company C can control, manage, or operate the backend logistics in multiple conveyance industry segments on their own conveyance network.

As a non-limiting example, at least one OEM can own or license at least one present invention, including but not limited to all or some of at least one software, at least one Software as a service (SaaS), at least one subscription service, at least one technology, at least one Autonomous Vehicle Automated Platform, at least one Representative Automated Platform, at least one system, at least one method, or a combination thereof, and at least one OEM can control, manage, or operate at least one present invention on at least one other conveyance network. As a non-limiting example, OEM Company C can own or license at least one Autonomous Vehicle Automated Platform, where OEM Company C can control, manage, or operate the backend logistics for Service Provider Company A's conveyance network. As a non-limiting example, OEM Company C can own or license at least one Autonomous Vehicle Automated Platform, where OEM Company C can control, manage, or operate the backend logistics for other multiple service provider's conveyance network.

As a non-limiting example, at least one service provider or the like can own or license at least one present invention, including but not limited to all or some of at least one software, at least one Software as a service (SaaS), at least one subscription service, at least one technology, at least one Autonomous Vehicle Automated Platform, at least one Representative Automated Platform, at least one system, at least one method, or a combination thereof, and at least one service provider or the like can control, manage, or operate at least one present invention on their own service provider conveyance network or the like. As a non-limiting example, Service Provider Company B can own or license at least one Autonomous Vehicle Automated Platform, where Service Provider Company B can control, manage, or operate the backend logistics for their own conveyance network. As a non-limiting example, Service Provider Company B can own or license at least one Autonomous Vehicle Automated Platform, where Service Provider Company B can control, manage, or operate the backend logistics in multiple conveyance industry segments on their own conveyance network.

As a non-limiting example, at least one service provider or the like can own or license at least one present invention, including but not limited to all or some of at least one software, at least one Software as a service (SaaS), at least one subscription service, at least one technology, at least one Autonomous Vehicle Automated Platform, at least one Representative Automated Platform, at least one system, at least one method, or a combination thereof, and at least one independent third party can control, manage, or operate at least one present invention on the service provider conveyance network or the like. As a non-limiting example, Service Provider Company C can own or license at least one Autonomous Vehicle Automated Platform, where Independent Company B can control, manage, or operate the backend logistics for Service Provider Company C's conveyance network. As a non-limiting example, Service Provider Company C can own or license at least one Autonomous Vehicle Automated Platform, and Independent Company B can control, manage, or operate the backend logistics for multiple service provider conveyance networks.

Visual Representation

At least one visual representation can be at least one tool used to assist at least one representative analyze or evaluate at least one conveyance service request or at least one conveyance service request metric on, for example, at least one geographical map to secure or obtain at least one preferred conveyance service request. At least one visual representation can be viewed from including but not limited to at least one perspective, at least one point of reference, at least one point of interest, or a combination thereof.

At least one visual representation can be, for example, at least one geographical map that can display including but not limited to at least one preferred conveyance service request in conjunction with corresponding conveyance data, at least one filtered conveyance service request in conjunction with corresponding conveyance data, at least one conveyance service request in conjunction with corresponding conveyance data, at least one metric relating to at least one respective request, at least one real time or near real time geographical location of at least one representative, at least one real time or near real time geographical location of at least one autonomous vehicle, at least one real time or near real time geographical location of at least one owner or at least one controller of at least one autonomous vehicle, at least one real time or near real time geographical location of at least one service provider, at least one real time or near real time geographical location of at least one good supplier, at least one real time or near real time geographical location of at least one fleet manager, at least one real time or near real time geographical location of at least one conveyance client, at least one real time or near real time geographical location of at least one logistics provider, at least one real time or near real time geographical location of at least one logistics supplier, at least one selected preference, at least one representative preference, or a combination thereof. At least one visual representation can be, for example, at least one geographical map that can display including but not limited to all or some of conveyance data relating to at least one autonomous vehicle, all or some of filtered conveyance data relating to at least one autonomous vehicle, all or some of preferred conveyance data relating to at least one autonomous vehicle, or a combination thereof.

At least one visual representation can be, for example, at least one geographical map that can display including but not limited to at least one preferred conveyance service offering in conjunction with corresponding conveyance data, at least one filtered conveyance service offering in conjunction with corresponding conveyance data, at least one conveyance service offering in conjunction with corresponding conveyance data, at least one metric relating to at least one respective offering, or a combination thereof.

At least one visual representation can be displayed in or on at least one autonomous vehicle. At least one visual representation can be displayed in or on at least one autonomous vehicle to show at least one route or at least one path for at least one autonomous vehicle. At least one visual representation can be utilized by at least one conveyance client in at least one autonomous vehicle. At least one visual representation can have or be associated with at least one commercial or at least one advertisement. At least one visual representation can be at least one interactive map. At least one visual representation can be at least one interactive map that can be used by at least one conveyance client. At least one visual representation can be at least one interactive map that can be used by at least one conveyance client to communicate with, including but not limited to, at least one service provider, at least one good supplier, at least one fleet manager, at least one owner or at least one controller of at least one autonomous vehicle, at least one logistics provider, at least one logistics supplier, at least one autonomous vehicle, or a combination thereof.

At least one visual representation can be displayed on including but not limited to at least one application, at least one central server, at least one owner or controller application, at least one remote display, or a combination thereof. At least one visual representation can be in any form or format, preferably visual. At least one variation in the form, format, and order of at least one visual representation component is within the scope of the present invention. At least one visual representation can be updated or refreshed in real time or near real time and can refer to being updated or refreshed in the highest level of development or state of the art. At least one visual representation can perform at least one function in real time or near real time and can refer to being updated or refreshed in the highest level of development or state of the art.

At least one visual representation can display including but not limited to at least one conveyance service request, at least one conveyance service request metric, or a combination thereof, in at least one conveyance industry segment on at least one geographical map. At least one visual representation can be at least one tool that can display including but not limited to at least one conveyance service request, at least one conveyance service request metric, or a combination thereof, relating to at least one service provider on at least one geographical map. At least one visual representation can display at least one route from at least one representative or at least one autonomous vehicle to at least one beginning service geographical location and then to at least one ending service geographical location.

At least one owner or at least one controller of at least one autonomous vehicle, at least one service provider, at least one good supplier, at least one fleet manager, at least one logistics provider, at least one logistics supplier, or a combination thereof, can be displayed on or with at least one visual representation that can display at least one level of service preference. At least one owner or at least one controller of at least one autonomous vehicle, at least one service provider, at least one good supplier, at least one fleet manager, at least one logistics provider, at least one logistics supplier, or a combination thereof, can be displayed on or with at least one dynamic map that can display at least one level of service preference. At least one owner or at least one controller of at least one autonomous vehicle, at least one service provider, at least one good supplier, at least one fleet manager, at least one logistics provider, at least one logistics supplier, or a combination thereof, can be displayed on or with at least one heat map that can display at least one level of service preference.

As a non-limiting example, at least one visual representation can be including but not limited to at least one dynamic map, at least one real time or near real time heat map, at least one historical heat map, at least one predictive heat map, or a combination thereof. As a non-limiting example, at least one visual representation can be compiled on at least one third party server such as but not limited to at least one map provider server. As a non-limiting example, at least one visual representation can be compiled with information or data from at least one map provider. As a non-limiting example, at least one representative or the like can use at least one visual representation to analyze or evaluate pricing information or at least one other metric from at east one service provider.

As a non-limiting example, at least one visual representation can utilize at least one application, at least one owner or controller application, at least one autonomous vehicle, at least one terminal, at least one central server, at least one external server, at least one link, or a combination thereof, that can be combined or integrated.

As a non-limiting example, at least one visual representation can be used to analyze or evaluate at least one area on at least one geographical map that can show at least one metric relating to at least one individual conveyance industry segment. As a non-limiting example, at least one visual representation can be used to analyze or evaluate at least one area on at least one geographical map that can show at least one metric relating to at least one individual service provider. As a non-limiting example, at least one visual representation can be, for example, at least one geographical map that can display at least one real time or near real time geographical location of at least one autonomous vehicle fleet.

Application

At least one application can be at least one software that can for example facilitate at least one operation or at least one function to secure or obtain at least one preferred conveyance service request, at least one autonomous vehicle that can be identified as preferred, or a combination thereof. At least one application can be at least one software that can for example be utilized or operated by at least one owner or at least one controller of at least one autonomous vehicle, at least one service provider, at least one good supplier, at least one fleet manager, at least one logistics provider, at least one logistics supplier, or a combination thereof. At least one application can be at least one software for example at least one computer application, at least one computer program, at least one API, at least one website, at least one web application, at least one smartphone application, at least one cloud application, at least one service, or the like.

At least one application can be but is not limited to software that can for example facilitate analyzing, evaluating, securing, obtaining, accepting, declining, canceling, displaying, communicating, or a combination thereof, at least one preferred conveyance service request in conjunction with corresponding conveyance data, all or some of preferred conveyance data relating to at least one autonomous vehicle, all or some of at least one real time or near real time geographical location of at least one autonomous vehicle, or a combination thereof. At least one application can be provided in any form or format, such as but not limited to any appropriate tangible or intangible medium of expression, but can preferably be provided in at least one electronic form. At least one application can be associated with, including but not limited to, at least one central server, at least one link, at least one external server, at least one good supplier, at least one autonomous vehicle, at least one owner or controller application, at least one service provider, at least one owner or at least one controller of at least one autonomous vehicle, at least one good supplier, at least one fleet manager, at least one logistics provider, at least one logistics supplier, or a combination thereof.

At least one application can be software appropriate for communicating to or with including but not limited to at least one central server, at least one external server, at least one good supplier, at least one autonomous vehicle, at least one terminal, at least one owner or controller application, at least one service provider, at least one owner or at least one controller of at least one autonomous vehicle, at least one good supplier, at least one fleet manager, at least one logistics provider, at least one logistics supplier, at least one representative, at least one conveyance client, or a combination thereof. At least one application can operate on including but not limited to at least one terminal, at least one central server, at least one external server, or a combination thereof. At least one application can standardize or convert at least one conveyance service request in conjunction with corresponding conveyance data, all or some of conveyance data relating to at least one autonomous vehicle, all or some of at least one real time or near real time geographical location of at least one autonomous vehicle, or a combination thereof, structured in at least one different format, into at least one uniform format. At least one representative can input or provide at least one representative preference into at least one application.

At least one application can provide including but not limited to at least one real time or near real time geographical location of at least one representative, at least one real time or near real time geographical location of at least one autonomous vehicle, at least one real time or near real time geographical location of at least one service provider, at least one real time or near real time geographical location of at least one good supplier, at least one real time or near real time geographical location of at least one fleet manager, at least one real time or near real time geographical location of at least one logistics provider, at least one real time or near real time geographical location of at least one logistics supplier, at least one real time or near real time geographical location of at least one owner or at least one controller of at least one autonomous vehicle, or a combination thereof, using at least one geographical location module of at least one terminal. Information and/or data inputted or discovered by at least one application can be cached. At least one application can be updated or refreshed in real time or near real time and can refer to being updated or refreshed in the highest level of development or state of the art. At least one application can perform at least one function in real time or near real time and can refer to being updated or refreshed in the highest level of development or state of the art.

At least one application can communicate information or data including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of preferred conveyance data relating to at least one autonomous vehicle, all or some of filtered conveyance data relating to at least one autonomous vehicle, all or some of conveyance data relating to at least one autonomous vehicle, all or some of at least one real time or near real time geographical location of at least one autonomous vehicle, at least one representative preference, at least one selected preference, at least one secured or obtained preferred conveyance service request, at least one secured or obtained autonomous vehicle that can be identified as preferred, or a combination thereof. At least one application can communicate all or some of information or data with at least one central server, at least one external server, at least one application, at least one owner or controller application, at least one autonomous vehicle, or a combination thereof.

At least one application can filter and identify including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of preferred conveyance data relating to at least one autonomous vehicle, all or some of filtered conveyance data relating to at least one autonomous vehicle, all or some of conveyance data relating to at least one autonomous vehicle, all or some of at least one real time or near real time geographical location of at least one autonomous vehicle, at least one representative preference, at least one selected preference, at least one secured or obtained preferred conveyance service request, at least one secured or obtained autonomous vehicle that can be identified as preferred, or a combination thereof, together or separately.

At least one application can be at least one software that can for example facilitate at least one operation or at least one function to secure or obtain at least one conveyance service request, at least one filtered conveyance service request, at least one preferred conveyance service request, at least one autonomous vehicle, at least one autonomous vehicle that can be filtered, at least one autonomous vehicle that can be identified as preferred, or a combination thereof.

At least one application can be used to analyze, evaluate, secure, obtain, accept, decline, cancel, or communicate at least one preferred conveyance service request, at least one autonomous vehicle that can be identified as preferred, all or some of preferred conveyance data relating to at least one autonomous vehicle, or a combination thereof. At least one application can be used by including but not limited to at least one representative, at least one autonomous vehicle, at least one service provider, at least one good supplier, at least one owner or at least one controller of at least one autonomous vehicle, at least one fleet manager, at least one logistics provider, at least one logistics supplier, or a combination thereof. At least one application can be used, accessed, controlled, or operated by including but not limited to at least one owner or at least one controller of at least one autonomous vehicle, at least one service provider, at least one good supplier, at least one fleet manager, at least one logistics provider, at least one logistics supplier, or a combination thereof, to optionally analyze or evaluate and then preferably secure or obtain at least one preferred conveyance service request, at least one autonomous vehicle that can be identified as preferred, or a combination thereof.

At least one application can display at least one visual representation. At least one application can display at least one secured or obtained preferred conveyance service request, at least one secured or obtained autonomous vehicle that can be identified as preferred, all or some of preferred conveyance data relating to at least one autonomous vehicle, or a combination thereof. At least one application can display at least one preferred conveyance service request, at least one autonomous vehicle that can be identified as preferred, all or some of preferred conveyance data relating to at least one autonomous vehicle, or a combination thereof, that can be accepted or declined. At least one application can display conveyance data relating to including but not limited to at least one conveyance service request, at least one filtered conveyance service request, at least one preferred conveyance service request, or a combination thereof. At least one application can display all or some of conveyance data relating to at least one autonomous vehicle, all or some of filtered conveyance data relating to at least one autonomous vehicle, all or some of preferred conveyance data relating to at least one autonomous vehicle, or a combination thereof.

As a non-limiting example, there can be at least one different variation of at least one application used by including but not limited to at least one representative, at least one autonomous vehicle, at least one service provider, at least one good supplier, at least one owner or at least one controller of at least one autonomous vehicle, at least one fleet manager, at least one logistics provider, at least one logistics supplier, or a combination thereof. As a non-limiting example, at least one application can transmit at least one Inertial Measurement Unit (IMU) reading of at least one terminal to at least one central server to determine at least one orientation or at least one direction of at least one representative, at least one autonomous vehicle, at least one service provider, at least one good supplier, at least one owner or at least one controller of at least one autonomous vehicle, at least one fleet manager, at least one logistics provider, at least one logistics supplier, or a combination thereof. As a non-limiting example, at least one application can be in at least one form of but is not limited to at least one mobile application, at least one non-mobile application, at least one website, at least one plugin, or a combination thereof.

As a non-limiting example, at least one application can operate on at least one central server, at least one external server, at least one owner or controller application, or a combination thereof. As a non-limiting example, at least one application can perform at least one central server function or at least one external server function. As a non-limiting example, at least one application can perform at least one similar function as at least one central server or at least one external server function to identify at least one preferred conveyance service request, at least one autonomous vehicle that can be identified as preferred, all or some of preferred conveyance data relating to at least one autonomous vehicle, or a combination thereof. As a non-limiting example, there can be at least one different application used by at least one representative, at least one autonomous vehicle, at least one service provider, at least one good supplier, at least one owner or at least one controller of at least one autonomous vehicle, at least one fleet manager, at least one logistics provider, at least one logistics supplier, or a combination thereof.

As a non-limiting example, at least one preferred conveyance service request in conjunction with corresponding conveyance data, at least one autonomous vehicle that can be identified as preferred, all or some of preferred conveyance data relating to at least one autonomous vehicle, or a combination thereof, can be transmitted to at least one application and can be displayed as at least one pop-up, at least one icon, at least one visual, at least one symbol, at least one pattern, at least one marker, at least one notification, at least one alert, at least one message, at least one short message service, at least one multimedia messaging service, at least one smart messaging service, at least one extended message service, or a combination thereof.

As a non-limiting example, at least one application can secure or obtain at least one preferred conveyance service request, at least one filtered conveyance service request, at least one conveyance service request, at least one autonomous vehicle that can be identified as preferred, at least one autonomous vehicle that can be filtered, at least one autonomous vehicle, or a combination thereof, and can communicate directly or indirectly with at least one central server, at least one external server, at least one application, at least one owner or controller application, at least one autonomous vehicle, at least one owner or at least one controller of at least one autonomous vehicle, at least one service provider, at least one good supplier, at least one fleet manager, at least one logistics provider, at least one logistics supplier, at least one third party, or a combination thereof.

As a non-limiting example, at least one application can secure or obtain at least one preferred conveyance service request, at least one filtered conveyance service request, or a combination thereof, and can communicate indirectly with at least one external server via at least one central server. As a non-limiting example, at least one application can secure or obtain at least one preferred conveyance service request, at least one filtered conveyance service request, or a combination thereof, and can communicate directly with at least one external server, at least one service provider, or the like. As a non-limiting example, at least one application can be at least one service provider application or the like.

As a non-limiting example, at least one application can secure or obtain at least one autonomous vehicle that can be identified as preferred, at least one autonomous vehicle that can be filtered, or a combination thereof, and can communicate indirectly with at least one external server via at least one central server. As a non-limiting example, at least one application can secure or obtain at least one autonomous vehicle that can be identified as preferred, at least one autonomous vehicle that can be filtered, or a combination thereof, and can communicate directly with at least one external server, at least one service provider, or the like. As a non-limiting example, at least one application can be at least one service provider application, at least one owner or at least one controller of at least one autonomous vehicle application, at least one good supplier application, at least one fleet manager application, at least one logistics provider application, at least one logistics supplier application, or a combination thereof.

As a non-limiting example, there can be at least one application on or associated with at least one autonomous vehicle. As a non-limiting example, there can be at least one different application on or associated with at least one autonomous vehicle. As a non-limiting example, there can be at least one application with at least one different function that can reside on or be associated with one autonomous vehicle. As a non-limiting example, there can be more than one application on or associated with one autonomous vehicle. As a non-limiting example, there can be more than one different application on or associated with one autonomous vehicle. As a non-limiting example, there can be two different applications on or associated with one autonomous vehicle, first being a dealership application allowing for vehicle maintenance and second an application integrated with at least one central server that facilitates conveyance services.

As a non-limiting example, at least one application can be associated with at least one autonomous vehicle. As a non-limiting example, at least one application can be associated with at least one fleet of at least one autonomous vehicle. As a non-limiting example, at least one application can be accessed, controlled, or operated remotely by at least one service provider, at least one owner or at least one controller of at least one autonomous vehicle, at least one autonomous vehicle, at least one good supplier, at least one fleet manager, at least one logistics provider, at least one logistics supplier, at least one representative, or a combination thereof, to optionally analyze or evaluate and then preferably secure or obtain at least one preferred conveyance service request and/or at least one autonomous vehicle that can be identified as preferred. As a non-limiting example, at least one application, at least one owner or controller application, at least one autonomous vehicle, at least one terminal, at least one central server, at least one external server, at least one link, or a combination thereof, can be combined or integrated.

As a non-limiting example, at least one conveyance service request or all or some of conveyance data relating to at least one autonomous vehicle can be filtered in real time or near real time on at least one application. As a non-limiting example, at least one preferred conveyance service request can be identified in real time, from at least one filtered conveyance service request on at least one application. As a non-limiting example, at least one autonomous vehicle that can be identified as preferred, all or some of preferred conveyance data relating to at least one autonomous vehicle, or a combination thereof, can be identified in real time or near real time, from all or some of filtered conveyance data relating to at least one autonomous vehicle on at least one application. As a non-limiting example, at least one representative can input or provide at least one representative preference into or to at least one application.

As a non-limiting example, at least one different geographical location can be used other than at least one real time or near real time geographical location of at least one representative or the like when filtering at least one conveyance service request. As a non-limiting example, at least one different geographical location can be used other than at least one real time or near real time geographical location of at least one autonomous vehicle when filtering at least one conveyance service request. As a non-limiting example, at least one different geographical location can be used other than at least one real time or near real time geographical location of at least one autonomous vehicle when filtering all or some of conveyance data relating to at least one autonomous vehicle. As a non-limiting example, at least one application can expose or be accessed through at least one API relating to at least one service provider, at least one owner or at least one controller of at least one autonomous vehicle, at least one good supplier, at least one fleet manager, at least one logistics provider, at least one logistics supplier, at least one third party, or the like.

The following are different examples of at least one application used by various parties:

At least one representative can access at least one application via at least one terminal. As a non-limiting example, at least one representative can analyze or evaluate and then secure or obtain at least one preferred conveyance service request. At least one application can be used with at least one Representative Automated Platform to secure or obtain at least one preferred conveyance service request for at least one representative.

At least one autonomous vehicle can access at least one application via at least one terminal. As a non-limiting example, at least one service provider, at least one good supplier, at least one owner or at least one controller of at least one autonomous vehicle, at least one fleet manager, at least one logistics provider, at least one logistics supplier, or a combination thereof, can analyze or evaluate and then secure or obtain at least one preferred conveyance service request, at least one autonomous vehicle that can be identified as preferred, or a combination thereof.

At least one owner or at least one controller of at least one autonomous vehicle, at least one service provider, at least one good supplier, at least one fleet manager, at least one logistics provider, at least one logistics supplier, at least one third party, or a combination thereof, can access at least one application to manage, control, operate, or the like, at least one autonomous vehicle.

As a non-limiting example, at least one application can be used with at least one Autonomous Vehicle Automated Platform to secure or obtain at least one preferred conveyance service request for or with at least one autonomous vehicle that can be identified as preferred. As a non-limiting example, at least one application can be used with at least one Autonomous Vehicle Automated Platform to secure or obtain at least one autonomous vehicle that can be identified as preferred for or with at least one preferred conveyance service request. As a non-limiting example, at least one application can secure or obtain at least one preferred conveyance service request relating to at least one service provider operating in at least one conveyance industry segment. As a non-limiting example, at least one application can secure or obtain at least one autonomous vehicle that can be identified as preferred relating to at least one fleet provider operating in at least one conveyance industry segment.

Owner or Controller Application

At least one owner or controller application can be at least one software that can for example facilitate at least one operation or at least one function to secure or obtain at least one preferred conveyance service request, at least one autonomous vehicle that can be identified as preferred, or a combination thereof. At least one owner or controller application can be at least one software that can for example be utilized or operated by at least one owner or at least one controller of at least one autonomous vehicle, at least one service provider, at least one good supplier, at least one fleet manager, at least one logistics provider, at least one logistics supplier, or a combination thereof.

At least one owner or controller application can be at least one software for example at least one computer application, at least one computer program, at least one API, at least one website, at least one web application, at least one smartphone application, at least one cloud application, at least one service, or the like. At least one owner or controller application can be but is not limited to software that can for example facilitate analyzing, evaluating, securing, obtaining, accepting, declining, canceling, displaying, communicating, or a combination thereof, at least one preferred conveyance service request in conjunction with corresponding conveyance data, all or some of preferred conveyance data relating to at least one autonomous vehicle, all or some of at least one real time or near real time geographical location of at least one autonomous vehicle, or a combination thereof, that can be used by at least one owner or at least one controller of at least one autonomous vehicle, at least one service provider, or the like. At least one owner or controller application can for example control or operate at least one autonomous vehicle or at least one fleet of at least one autonomous vehicle. At least one owner or controller application can be provided in any form or format, such as but not limited to any appropriate tangible or intangible medium of expression, but can preferably be provided in at least one electronic form.

At least one owner or controller application can be associated with including but not limited to at least one central server, at least one external server, at least one link, at least one good supplier, at least one autonomous vehicle, at least one application, at least one service provider, at least one owner or at least one controller of at least one autonomous vehicle, at least one fleet manager, at least one logistics provider, at least one logistics supplier, or a combination thereof. At least one owner or at least one controller of at least one autonomous vehicle, at least one service provider, at least one good supplier, at least one fleet manager, at least one logistics provider, at least one logistics supplier, or a combination thereof, can input or provide at least one selected preference into at least one owner or controller application.

At least one owner or controller application can operate on including but not limited to at least one terminal, at least one central server, at least one external server, or a combination thereof. At least one owner or controller application can be used in conjunction with or in addition to at least one application associated with at least one autonomous vehicle. Information and/or data inputted or discovered by at least one owner or controller application can be cached.

At least one owner or controller application can be updated or refreshed in real time or near real time and can refer to being updated or refreshed in the highest level of development or state of the art. At least one owner or controller application can perform at least one function in real time or near real time and can refer to being updated or refreshed in the highest level of development or state of the art.

At least one owner or controller application can communicate information or data including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of preferred conveyance data relating to at least one autonomous vehicle, all or some of filtered conveyance data relating to at least one autonomous vehicle, all or some of conveyance data relating to at least one autonomous vehicle, all or some of at least one real time or near real time geographical location of at least one autonomous vehicle, at least one representative preference, at least one selected preference, at least one secured or obtained preferred conveyance service request, at least one secured or obtained autonomous vehicle that can be identified as preferred, or the like. At least one owner or controller application can communicate all or some of information or data with at least one central server, at least one external server, at least one application, at least one owner or controller application, at least one autonomous vehicle, or a combination thereof.

At least one owner or controller application can filter and identify including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of preferred conveyance data relating to at least one autonomous vehicle, all or some of filtered conveyance data relating to at least one autonomous vehicle, all or some of conveyance data relating to at least one autonomous vehicle, all or some of at least one real time or near real time geographical location of at least one autonomous vehicle, at least one representative preference, at least one selected preference, at least one secured or obtained preferred conveyance service request, at least one secured or obtained autonomous vehicle that can be identified as preferred, or a combination thereof, together or separately.

At least one owner or controller application can be at least one software that can for example facilitate at least one operation or at least one function to secure or obtain at least one conveyance service request, at least one filtered conveyance service request, at least one preferred conveyance service request, at least one autonomous vehicle, at least one autonomous vehicle that can be filtered, at least one autonomous vehicle that can be identified as preferred, or a combination thereof.

At least one owner or controller application can secure or obtain at least one preferred conveyance service request, at least one filtered conveyance service request, at least one conveyance service request, at least one autonomous vehicle that can be identified as preferred, at least one autonomous vehicle that can be filtered, at least one autonomous vehicle, or a combination thereof, and can communicate directly or indirectly with at least one central server, at least one external server, at least one application, at least one owner or controller application, at least one autonomous vehicle, at least one owner or at least one controller of at least one autonomous vehicle, at least one service provider, at least one good supplier, at least one fleet manager, at least one logistics provider, at least one logistics supplier, at least one third party, or a combination thereof.

At least one owner or controller application can be but is not limited to software that can for example be used to input or provide at least one selected preference. At least one owner or controller application can be used to analyze, evaluate, secure, obtain, accept, decline, cancel, or communicate at least one preferred conveyance service request, at least one autonomous vehicle that can be identified as preferred, all or some of preferred conveyance data relating to at least one autonomous vehicle, or a combination thereof. At least one owner or controller application can be used by including but not limited to at least one service provider, at least one autonomous vehicle, at least one owner or at least one controller of at least one autonomous vehicle, at least one representative, at least one good supplier, at least one fleet manager, at least one logistics provider, at least one logistics supplier, or a combination thereof, to secure or obtain at least one preferred conveyance service request for or with at least one autonomous vehicle or at least one autonomous vehicle that can be identified as preferred. At least one owner or controller application can be used, accessed, controlled, or operated by including but not limited to at least one service provider, at least one good supplier, at least one owner or at least one controller of at least one autonomous vehicle, at least one fleet manager, at least one logistics provider, at least one logistics supplier, or a combination thereof, remotely to secure or obtain at least one preferred conveyance service request, at least one autonomous vehicle that can be identified as preferred, or a combination thereof.

At least one owner or controller application can display at least one visual representation. At least one owner or controller application can display at least one secured or obtained preferred conveyance service request, at least one secured or obtained autonomous vehicle that can be identified as preferred, all or some of preferred conveyance data relating to at least one autonomous vehicle, or a combination thereof. At least one owner or controller application can display at least one preferred conveyance service request, at least one autonomous vehicle that can be identified as preferred, all or some of preferred conveyance data relating to at least one autonomous vehicle, or a combination thereof, that can be accepted or declined. At least one owner or controller application can display conveyance data relating to including but not limited to at least one conveyance service request, at least one filtered conveyance service request, at least one preferred conveyance service request, or a combination thereof. At least one owner or controller application can display all or some of conveyance data relating to at least one autonomous vehicle, all or some of filtered conveyance data relating to at least one autonomous vehicle, all or some of preferred conveyance data relating to at least one autonomous vehicle, or a combination thereof.

As a non-limiting example, there can be at least one different variation of at least one owner or controller application used by including but not limited to at least one representative, at least one autonomous vehicle, at least one service provider, at least one good supplier, at least one owner or at least one controller of at least one autonomous vehicle, at least one fleet manager, at least one logistics provider, at least one logistics supplier, or a combination thereof. As a non-limiting example, at least one owner or controller application can for example control or operate at least one fleet of at least one autonomous vehicle. As a non-limiting example, at least one owner or controller application can be at least one service provider application, at least one owner or at least one controller of at least one autonomous vehicle application, at least one good supplier application, at least one fleet manager application, at least one logistics provider application, at least one logistics supplier application, or a combination thereof.

As a non-limiting example, at least one preferred conveyance service request in conjunction with corresponding conveyance data, at least one autonomous vehicle that can be identified as preferred, all or some of preferred conveyance data relating to at least one autonomous vehicle, or a combination thereof, can be transmitted to at least one owner or controller application and can be displayed as at least one pop-up, at least one icon, at least one visual, at least one symbol, at least one pattern, at least one marker, at least one notification, at least one alert, at least one message, at least one short message service, at least one multimedia messaging service, at least one smart messaging service, at least one extended message service, or a combination thereof.

As a non-limiting example, at least one owner or controller application can perform at least one similar function as at least one central server, at least one application, or at least one external server, or a combination thereof, to identify at least one preferred conveyance service request, at least one autonomous vehicle that can be identified as preferred, all or some of preferred conveyance data relating to at least one autonomous vehicle, or a combination thereof. As a non-limiting example, at least one function of at least one central server, at least one application, at least one external server, or a combination thereof, can be performed by at least one owner or controller application. As a non-limiting example, at least one owner or controller application can operate on at least one central server, at least one application, at least one external server, or a combination thereof. As a non-limiting example, at least one application, at least one owner or controller application, at least one autonomous vehicle, at least one terminal, at least one central server, at least one external server, at least one link, or a combination thereof, can be combined or integrated.

As a non-limiting example, at least one owner or controller application can standardize or convert at least one conveyance service request in conjunction with corresponding conveyance data, all or some of conveyance data relating to at least one autonomous vehicle, all or some of at least one real time or near real time geographical location of at least one autonomous vehicle, or a combination thereof, structured in at least one different format, into at least one uniform format. As a non-limiting example, at least one owner or controller application can be associated with at least one autonomous vehicle. As a non-limiting example, at least one owner or controller application can be associated with at least one fleet of at least one autonomous vehicle. As a non-limiting example, at least one owner or controller application can be in at least one form of but is not limited to at least one mobile application, at least one non-mobile application, at least one website, at least one plugin, or a combination thereof.

As a non-limiting example, at least one conveyance service request or all or some of conveyance data relating to at least one autonomous vehicle can be filtered in real time or near real time on at least one owner or controller application. As a non-limiting example, at least one preferred conveyance service request can be identified in real time or near real time, from at least one filtered conveyance service request on at least one owner or controller application. As a non-limiting example, at least one autonomous vehicle that can be identified as preferred, all or some of preferred conveyance data relating to at least one autonomous vehicle, or a combination thereof, can be identified in real time or near real time, from all or some of filtered conveyance data relating to at least one autonomous vehicle on at least one owner or controller application.

As a non-limiting example, at least one owner or controller application can secure or obtain at least one preferred conveyance service request, at least one filtered conveyance service request, or a combination thereof, and can communicate indirectly with at least one external server via at least one central server. As a non-limiting example, at least one owner or controller application can secure or obtain at least one preferred conveyance service request, at least one filtered conveyance service request, or a combination thereof, and can communicate directly with at least one external server. As a non-limiting example, at least one owner or controller application can secure or obtain at least one preferred conveyance service request, at least one filtered conveyance service request, or a combination thereof, and can communicate directly with at least one service provider or the like. As a non-limiting example, at least one owner or controller application can be at least one service provider application or the like.

As a non-limiting example, at least one owner or controller application can secure or obtain at least one autonomous vehicle that can be identified as preferred, at least one autonomous vehicle that can be filtered, or a combination thereof, and can communicate indirectly with at least one external server via at least one central server. As a non-limiting example, at least one owner or controller application can secure or obtain at least one autonomous vehicle that can be identified as preferred, at least one autonomous vehicle that can be filtered, or a combination thereof, and can communicate directly with at least one external server, at least one service provider, at least one owner or at least one controller of at least one autonomous vehicle, at least one good supplier, at least one fleet manager, at least one logistics provider, at least one logistics supplier, or the like.

As a non-limiting example, at least one owner or controller application can secure or obtain at least one preferred conveyance service request relating to at least one service provider operating in at least one conveyance industry segment. As a non-limiting example, at least one owner or controller application can be accessed, controlled, or operated remotely by at least one service provider, at least one owner or at least one controller of at least one autonomous vehicle, at least one autonomous vehicle, at least one good supplier, at least one fleet manager, at least one logistics provider, at least one logistics supplier, at least one representative, or a combination thereof, to optionally analyze or evaluate and then preferably secure or obtain at least one preferred conveyance service request and/or at least one autonomous vehicle that can be identified as preferred. As a non-limiting example, at least one representative can input or provide at least one selected preference into or to at least one owner or controller application.

As a non-limiting example, at least one owner or controller application can expose or be accessed through at least one API relating to at least one service provider, at least one owner or at least one controller of at least one autonomous vehicle, at least one good supplier, at least one fleet manager, at least one logistics provider, at least one logistics supplier, at least one third party, or the like.

Terminal

At least one terminal can be at least one hardware that can for example facilitate at least one operation or at least one function to secure or obtain at least one preferred conveyance service request, at least one autonomous vehicle that can be identified as preferred, or a combination thereof. At least one terminal can be at least one hardware that can for example be utilized or operated by at least one owner or at least one controller of at least one autonomous vehicle, at least one service provider, at least one good supplier, at least one fleet manager, at least one logistics provider, at least one logistics supplier, or a combination thereof.

At least one terminal can be for example at least one autonomous vehicle that can be utilized to combine or integrate at least one application, at least one owner or controller application, at least one central server, at least one external server, at least one terminal, at least one link, or a combination thereof. At least one terminal can be but is not limited to at least one device that can for example facilitate operating at least one application. At least one terminal can for example be capable of communicating with at least one central server, at least one external server, at least one application, at least one owner or controller application, at least one autonomous vehicle, or a combination thereof, by way of at least one link. At least one terminal can be but is not limited to at least one electronic computing device that can include at least one computer processor, at least one computer readable memory, at least one input source, at least one geographical location module, at least one display, at least one network interface, or a combination thereof. At least one terminal can encompass hardware and/or software alone or in a combination.

At least one terminal can be used to access including but not limited to at least one application, at least one owner or controller application, or a combination thereof. At least one application can operate on at least one terminal. At least one terminal can be associated with at least one autonomous vehicle. At least one operating system can run on at least one terminal. At least one terminal can facilitate including but not limited to at least one display function, at least one input function, at least one operation, or a combination thereof, of at least one application. At least one application can provide at least one real time or near real time geographical location of including but not limited to at least one representative, at least one autonomous vehicle, at least one service provider, at least one good supplier, at least one fleet manager, at least one logistics provider, at least one logistics supplier, at least one owner or at least one controller of at least one autonomous vehicle, or a combination thereof, using at least one geographical location module of at least one terminal. At least one terminal can be associated with at least one display or at least one remote display.

As a non-limiting example, at least one terminal can be but is not limited to at least one computer, at least one smartphone device, at least one plug-in device, at least one mobile computing device, at least one handheld computing device, at least one tablet computing device, at least one laptop computing device, at least one wearable computing device, at least one portable computing device, at least one fixed computing device, at least one non-fixed computing device, at least one physiologically embedded computing device, at least one biologically integrated computing device, at least one In-Vehicle infotainment device, at least one Internet of Things (IoT) device, at least one projecting device, at least one computing device embedded in at least one vehicle, at least one head-up display, at least one voice recognition, at least one voice control, or a combination thereof.

As a non-limiting example, at least one Inertial Measurement Unit (IMU) reading of at least one terminal can be used to determine at least one orientation or at least one direction least one representative, at least one autonomous vehicle, at least one service provider, at least one good supplier, at least one fleet manager, at least one logistics provider, at least one logistics supplier, at least one owner or at least one controller of at least one autonomous vehicle, or a combination thereof. As a non-limiting example, at least one geographical location module of at least one terminal can include but is not limited to at least one Global Positioning System (GPS), at least one satellite tracking, at least one RFID tracking, at least one radiolocation, at least one WiFi positioning system, at least one geofencing, at least one global system for mobile communications, at least one cell phone triangulation, at least one Internet tracking, or a combination thereof.

As a non-limiting example, at least one central server can optionally be located on at least one terminal that can be associated with at least one autonomous vehicle. As a non-limiting example, at least one owner or controller application can optionally be located on at least one terminal. As a non-limiting example, at least one input source of at least one terminal can be but is not limited to at least one touchscreen, at least one keypad, at least one keyboard, at least one voice controlled input, or a combination thereof. As a non-limiting example, at least one visual representation can be displayed on at least one application using at least one display of at least one terminal. As a non-limiting example, at least one terminal can be embedded in or attached to at least one autonomous vehicle. As a non-limiting example, at least one terminal can be inside or outside of at least one autonomous vehicle. As a non-limiting example, at least one terminal can be at least one smartphone that can be used by at least one representative, at least one conveyance client, at least one owner or at least one controller of at least one autonomous vehicle, at least one service provider, at least one good supplier, at least one fleet manager, at least one logistics provider, at least one logistics supplier, or a combination thereof.

As a non-limiting example, at least one application, at least one owner or controller application, at least one central server, at least one external server, at least one link, at least one autonomous vehicle, or a combination thereof, can be combined or integrated on at least one terminal, such as at least one smartphone. As a non-limiting example, at least one terminal does not need at least one physical connection to be associated or communicate with at least one application, at least one owner or controller application, at least one link, at least one terminal, at least one central server, at least one external server, at least one autonomous vehicle, or a combination thereof.

As a non-limiting example, at least one terminal can be associated with at least one fleet of at least one autonomous vehicle. As a non-limiting example, at least one terminal, using at least one geographical location module of at least one terminal, can provide at least one real time or near real time geographical location of at least one fleet of at least one autonomous vehicle.

Link

At least one link can be at least one software and/or at least one hardware that can for example facilitate at least one operation or at least one function to secure or obtain at least one preferred conveyance service request, at least one autonomous vehicle that can be identified as preferred, or a combination thereof. At least one link can be at least one software and/or at least one hardware that can for example be utilized or operated by at least one owner or at least one controller of at least one autonomous vehicle, at least one service provider, at least one good supplier, at least one fleet manager, at least one logistics provider, at least one logistics supplier, or a combination thereof.

At least one link can be for example at least one connection or at least one association with at least one software function, at least one software operation, at least one software component, at least one software module, or a combination thereof. At least one link can connect or be associated with at least one software function or at least one software operation. At least one link can connect or be associated with at least one software module. At least one link can include but is not limited to at least one electronic communication network channel. At least one link can be for example at least one appropriate link that can allow an efficient, rapid, accurate, or the like transmission of information or data. At least one link can be but is not limited to at least one combination of at least one connection between at least one central server, at least one external server, at least one terminal, at least one owner or controller application, at least one autonomous vehicle, at least one application, or a combination thereof. Preferably, at least one link between including but not limited to at least one central server, at least one external server, at least one terminal, at least one application, at least one owner or controller application, or a combination thereof, can be via the Internet, preferably secure, and can be more preferably encrypted. The definition of at least one link can encompass hardware and/or software alone or in a combination.

At least one link can communicate or provide data or information in real time or near real time and can refer to the highest level of development or state of the art. At least one link can be updated or refreshed in real time or near real time and can refer to being updated or refreshed in the highest level of development or state of the art. At least one link can perform at least one function in real time or near real time and can refer to being updated or refreshed in the highest level of development or state of the art.

At least one link can be utilized by at least one autonomous vehicle to communicate with at least one other autonomous vehicle. At least one link can be utilized by at least one owner or at least one controller of at least one autonomous vehicle, at least one service provider, at least one good supplier, at least one fleet manager, at least one logistics provider, at least one logistics supplier, or a combination thereof, to communicate all or some of conveyance data relating to at least one autonomous vehicle. At least one link can be utilized by at least one owner or at least one controller of at least one autonomous vehicle, at least one service provider, at least one good supplier, at least one fleet manager, at least one logistics provider, at least one logistics supplier, or a combination thereof, to communicate at least one conveyance service request in conjunction with corresponding conveyance data.

At least one link can be utilized by at least one owner or at least one controller of at least one autonomous vehicle, at least one service provider, at least one good supplier, at least one fleet manager, at least one logistics provider, at least one logistics supplier, or a combination thereof, to facilitate at least one conveyance service. At least one link can be utilized to communicate information or data including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of preferred conveyance data relating to at least one autonomous vehicle, all or some of filtered conveyance data relating to at least one autonomous vehicle, all or some of conveyance data relating to at least one autonomous vehicle, all or some of at least one real time or near real time geographical location of at least one autonomous vehicle, at least one representative preference, at least one selected preference, at least one secured or obtained preferred conveyance service request, at least one secured or obtained autonomous vehicle that can be identified as preferred, or the like.

As a non-limiting example, at least one link can be any appropriate connection, such as but not limited to at least one WiFi connection, at least one wireless connection, at least one Ethernet connection, at least one LTE connection, at least one 3G connection, at least one 4G connection, at least one 5G connection, at least one 6G connection, at least one 7G connection, at least one radio connection, at least one RFID connection, at least one Bluetooth connection, at least one BLE connection, at least one PAN connection, at least one LAN connection, at least one MAN connection, at least one WAN connection, at least one WLAN connection, at least one GSM connection, at least one GPRS connection, at least one UMTS connection, at least one dial-up connection, at least one broadband connection, at least one mobile connection, at least one DSL connection, at least one cable connection, at least one wired connection, at least one satellite connection, at least one ISDN connection, at least one fiber-optics connection, at least one infrared connection, at least one client-server network such as at least one cloud computing network connection, at least one other appropriate method, means, hardware and/or software capable of conveying information, or a combination thereof.

As a non-limiting example, at least one link can be but is not limited to at least one combination of at least one connection between at least one central server, at least one external server, at least one terminal, at least one owner or controller application, at least one autonomous vehicle, at least one application, at least one application associated with at least one autonomous vehicle, or a combination thereof. As a non-limiting example, at least one link can be used to manage or control at least one fleet of at least one autonomous vehicle between including but not limited to at least one central server, at least one external server, at least one terminal, at least one owner or controller application, at least one autonomous vehicle, at least one application, at least one application associated with at least one autonomous vehicle, at least one application associated with at least one autonomous vehicle fleet, or a combination thereof.

As a non-limiting example, at least one link can be in at least one form of at least one software interface or API. As a non-limiting example at least one link can be at least one inter-process communication. As a non-limiting example, at least one link can be utilized to connect to or be associated with at least one application, at least one owner or controller application, at least one terminal, at least one central server, at least one external server, or a combination thereof, on one software application. As a non-limiting example, at least one central server can connect to or communicate with at least one application, at least one owner or controller application, at least one terminal, at least one central server, at least one external server, or a combination thereof, on the same software application. As a non-limiting example, at least one link can be utilized to connect to or be associated with at least one application, at least one owner or controller application, at least one terminal, at least one central server, at least one external server, or a combination thereof, to secure or obtain at least one preferred conveyance service request, at least one autonomous vehicle that can be identified as preferred, or a combination thereof. As a non-limiting example, at least one link does not need at least one physical connection to connect or communicate with at least one application, at least one owner or controller application, at least one terminal, at least one central server, at least one external server, at least one autonomous vehicle, or a combination thereof.

As a non-limiting example, at least one link can be utilized by at least one owner or at least one controller of at least one autonomous vehicle, at least one service provider, at least one good supplier, at least one fleet manager, at least one logistics provider, at least one logistics supplier, or a combination thereof, to communicate all or some of conveyance data relating to at least one autonomous vehicle, all or some of filtered conveyance data relating to at least one autonomous vehicle, all or some of preferred conveyance data relating to at least one autonomous vehicle, or a combination thereof, with including but not limited to at least one central server, at least one external server, at least one terminal, at least one owner or controller application, at least one autonomous vehicle, at least one application, at least one application associated with at least one autonomous vehicle, at least one application associated with at least one autonomous vehicle fleet, or a combination thereof.

As a non-limiting example, at least one link can be utilized by at least one owner or at least one controller of at least one autonomous vehicle, at least one service provider, at least one good supplier, at least one fleet manager, at least one logistics provider, at least one logistics supplier, or a combination thereof, to communicate at least one conveyance service request in conjunction with conveyance data, at least one filtered conveyance service request in conjunction with conveyance data, at least one preferred conveyance service request in conjunction with conveyance data, or a combination thereof, with including but not limited to at least one central server, at least one external server, at least one terminal, at least one owner or controller application, at least one autonomous vehicle, at least one application, at least one application associated with at least one autonomous vehicle, at least one application associated with at least one autonomous vehicle fleet, or a combination thereof. As a non-limiting example, at least one link can connect at least one central server with at least one other central server.

As a non-limiting example, at least one link can be utilized by at least one owner or at least one controller of at least one autonomous vehicle, at least one service provider, at least one good supplier, at least one fleet manager, at least one logistics provider, at least one logistics supplier, or a combination thereof, to communicate with at least one OEM indirectly or directly. As a non-limiting example, at least one link can be utilized by at least one owner or at least one controller of at least one autonomous vehicle, at least one service provider, at least one good supplier, at least one fleet manager, at least one logistics provider, at least one logistics supplier, or a combination thereof, to communicate with at least one third party indirectly or directly. As a non-limiting example, at least one link can be utilized by at least one autonomous vehicle to communicate with at least one other autonomous vehicle regarding at least one route or at least one traffic information in real time or near real time.

Central Server

At least one central server can be at least one software and/or at least one hardware that can for example facilitate at least one operation or at least one function to secure or obtain at least one preferred conveyance service request, at least one autonomous vehicle that can be identified as preferred, or a combination thereof. At least one central server can be at least one software and/or at least one hardware that can for example be utilized or operated by at least one owner or at least one controller of at least one autonomous vehicle, at least one service provider, at least one good supplier, at least one fleet manager, at least one logistics provider, at least one logistics supplier, at least one conveyance client, or a combination thereof. At least one central server can be at least one software and/or at least one hardware for example at least one computer application, at least one computer program, at least one website, at least one web application, at least one cloud application, at least one service, or the like.

At least one central server can for example facilitate at least one operation or at least one function to secure or obtain at least one preferred conveyance service request for or with at least one autonomous vehicle, at least one autonomous vehicle that can be identified as preferred, or a combination thereof. At least one central server can include but is not limited to at least one computer processor, at least one computer readable memory, at least one network interface, or a combination thereof. At least one central server can be but is not limited to at least one computer network system. At least one central server can preferably encompass hardware and/or software alone or in a combination.

At least one central server can be used to manage or operate logistics for at least one service provider, at least one good supplier, at least one fleet manager, at least one owner or at least one controller of at least one autonomous vehicle, at least one third party, at least one logistics provider, at least one logistics supplier, or a combination thereof. At least one central server can be used to control, manage, or operate at least one autonomous vehicle for at least one service provider, at least one good supplier, at least one fleet manager, at least one owner or at least one controller of at least one autonomous vehicle, at least one third party, at least one logistics provider, at least one logistics supplier, or a combination thereof. At least one central server can be associated with including but not limited to at least one external server, at least one link, at least one terminal, at least one central server, at least one owner or controller application, at least one good supplier, at least one autonomous vehicle, at least one application, at least one service provider, at least one fleet manager, at least one logistics provider, at least one logistics supplier, at least one owner or at least one controller of at least one autonomous vehicle, at least one representative, at least one conveyance client, or a combination thereof.

At least one central server can encompass different hardware and/or software alone or in a combination. At least one central server can include or connect to at least one database. At least one computer readable memory of at least one central server can be or include at least one database that at least one central server can use or connect to. At least one central server can store, retrieve, or utilize any information or data from at least one database, at least one real time database, at least one near real time database, at least one database trigger, at least one database table, at least one database row, at least one database column, at least one database result set, at least one database node, at least one database edge, at least one database property, at least one blockchain, at least one blockchain technology, or a combination thereof. At least one central server can store or retrieve any information or data in at least one database, at least one schemaless database, at least one graph database, at least one relational database, at least one non-relational database, at least one distributed database, at least one parallel database, or the like.

At least one central server can connect to or communicate with including but not limited to at least one application, at least one external server, at least one central server, at least one owner or controller application, at least one terminal, or a combination thereof, by way of at least one link. At least one central server can control at least one flow of information or data between including but not limited to at least one application, at least one owner or controller application, at least one external server, at least one central server, or a combination thereof, in either direction. At least one central server can be at least one server in at least one individual geographical location or at least one additional geographical location. At least one central server can preferably relate to a single Internet location, but that need not be the case.

At least one central server can communicate information or data including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of preferred conveyance data relating to at least one autonomous vehicle, all or some of filtered conveyance data relating to at least one autonomous vehicle, all or some of conveyance data relating to at least one autonomous vehicle, all or some of at least one real time or near real time geographical location of at least one autonomous vehicle, at least one representative preference, at least one selected preference, at least one secured or obtained preferred conveyance service request, at least one secured or obtained autonomous vehicle that can be identified as preferred, or the like. At least one central server can communicate all or some of information or data with at least one central server, at least one external server, at least one application, at least one owner or controller application, at least one autonomous vehicle, or a combination thereof.

At least one central server can filter and identify including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of preferred conveyance data relating to at least one autonomous vehicle, all or some of filtered conveyance data relating to at least one autonomous vehicle, all or some of conveyance data relating to at least one autonomous vehicle, all or some of at least one real time or near real time geographical location of at least one autonomous vehicle, at least one representative preference, at least one selected preference, at least one secured or obtained preferred conveyance service request, at least one secured or obtained autonomous vehicle that can be identified as preferred, or a combination thereof, together or separately.

At least one central server can be at least one software and/or at least one hardware that can for example facilitate at least one operation or at least one function to secure or obtain at least one conveyance service request, at least one filtered conveyance service request, at least one preferred conveyance service request, at least one autonomous vehicle, at least one autonomous vehicle that can be filtered, at least one autonomous vehicle that can be identified as preferred, or a combination thereof.

At least one central server can secure or obtain at least one preferred conveyance service request, at least one filtered conveyance service request, at least one conveyance service request, at least one autonomous vehicle that can be identified as preferred, at least one autonomous vehicle that can be filtered, at least one autonomous vehicle, or a combination thereof, and can communicate directly or indirectly with at least one central server, at least one external server, at least one application, at least one owner or controller application, at least one terminal, at least one autonomous vehicle, at least one owner or at least one controller of at least one autonomous vehicle, at least one service provider, at least one good supplier, at least one fleet manager, at least one logistics provider, at least one logistics supplier, at least one third party, or a combination thereof.

At least one central server can standardize or convert at least one conveyance service request, all or some of conveyance data relating to at least one autonomous vehicle, all or some of at least one real time or near real time geographical location of at least one autonomous vehicle, or a combination thereof, structured in at least one different format, into at least one uniform format. At least one central server can preferably be at least one secure server. At least one central server can be made secure using hardware and/or software commercially available. Additionally, at least one central server can include encryption software such that communications entering or exiting at least one server are encrypted. Encryption hardware and/or software are commercially available. At least one central server can be updated or refreshed in real time or near real time and can refer to being updated or refreshed in the highest level of development or state of the art. At least one central server can perform at least one function in real time or near real time and can refer to being updated or refreshed in the highest level of development or state of the art. At least one central server can use machine learning technology or the like to identify at least one pattern that can improve at least one Autonomous Vehicle Automated Platform, at least one Representative Automated Platform, at least one visual representation, or a combination thereof.

At least one central server can use at least one database, at least one database table, at least one result set, or the like, to filter at least one conveyance service request. At least one central server can use at least one database, at least one database table, at least one result set, or the like, to identify at least one preferred conveyance service request. At least one central server can use at least one database to filter all or some of conveyance data relating to at least one autonomous vehicle. At least one central server can use at least one database, at least one database table, at least one result set, or the like, to identify at least one autonomous vehicle that can be identified as preferred. At least one central server can use at least one database, at least one database table, at least one result set, or the like, to identify all or some of preferred conveyance data relating to at least one autonomous vehicle.

At least one central server can filter at least one conveyance service request or all or some of conveyance data relating to at least one autonomous vehicle relating to at least one representative preference and preferably at least one real time or near real time geographical location of at least one representative, to identify at least one filtered conveyance service request or all or some of filtered conveyance data relating to at least one autonomous vehicle by at least one process including but not limited to at least one of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

At least one central server can filter at least one conveyance service request or all or some of conveyance data relating to at least one autonomous vehicle relating to at least one representative preference, to identify at least one filtered conveyance service request or all or some of filtered conveyance data relating to at least one autonomous vehicle by at least one process including but not limited to at least one of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

At least one central server can filter at least one conveyance service request or all or some of conveyance data relating to at least one autonomous vehicle relating to at least one selected preference and preferably at least one real time or near real time geographical location of at least one autonomous vehicle, to identify at least one filtered conveyance service request or all or some of filtered conveyance data relating to at least one autonomous vehicle by at least one process including but not limited to at least one of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

At least one central server can filter at least one conveyance service request or all or some of conveyance data relating to at least one autonomous vehicle relating to at least one selected preference, to identify at least one filtered conveyance service request or all or some of filtered conveyance data relating to at least one autonomous vehicle by at least one process including but not limited to at least one of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, comparing, or a combination thereof.

At least one central server can filter and identify at least one preferred conveyance service request first and then filter and identify at least one autonomous vehicle that can be identified as preferred, which can be matched together and secured or obtained to perform at least one conveyance service. At least one central server can filter and identify at least one autonomous vehicle that can be identified as preferred first and then filter and identify at least one preferred conveyance service request, which can be matched together and secured or obtained to perform at least one conveyance service. Filtering and identifying at least one preferred conveyance service request, at least one autonomous vehicle that can be identified as preferred, or a combination thereof, can be done in either order or either direction.

At least one central server can filter, categorize, or the like, at least one conveyance service request, all or some of conveyance data relating to at least one autonomous vehicle, all or some of at least one real time or near real time geographical location of at least one autonomous vehicle, or a combination thereof, upon being received. At least one central server can filter, or the like, at least one conveyance service request, all or some of conveyance data relating to at least one autonomous vehicle, or a combination thereof, more than once. At least one central server can, including but not limited to, receive, transmit, store, standardize, aggregate, or a combination thereof, at least one conveyance service request in any order prior to filtering at least one conveyance service request or all or some of conveyance data relating to at least one autonomous vehicle. At least one central server can, including but not limited to, receive, transmit, store, standardize, aggregate, or a combination thereof, all or some of conveyance data relating to at least one autonomous vehicle or all or some of at least one real time or near real time geographical location of at least one autonomous vehicle, in any order prior to filtering at least one conveyance service request or all or some of conveyance data relating to at least one autonomous vehicle.

At least one central server can identify at least one preferred conveyance service request from at least one filtered conveyance service request or at least one pre-filtered conveyance service request. At least one central server can identify all or some of preferred conveyance data relating to at least one autonomous vehicle from all or some of filtered conveyance data relating to at least one autonomous vehicle or all or some of pre-filtered conveyance data relating to at least one autonomous vehicle. At least one central server can identify at least one autonomous vehicle that can be identified as preferred from all or some of filtered conveyance data relating to at least one autonomous vehicle or all or some of pre-filtered conveyance data relating to at least one autonomous vehicle.

At least one preferred conveyance service request relating to at least one representative preference or at least one selected preference can be identified from at least one filtered conveyance service request by using including but not limited to at least one sorting algorithm, at least one selection algorithm, at least one search algorithm, at least one merge algorithm, at least one maximum function, at least one minimum function, at least one graph algorithm, at least one graph search algorithm, at least one tree algorithm, at least one tree search algorithm, at least one matrix calculation, at least one matrix algorithm, at least one comparison, or a combination thereof.

At least one preferred conveyance service request relating to at least one selected preference can be identified from all or some of plurality of filtered conveyance service requests, at least one autonomous vehicle that can be identified as preferred or all or some of preferred conveyance data relating to at least one autonomous vehicle, relating to at least one selected preference from or all or some of filtered conveyance data relating to at least one autonomous vehicle, or a combination thereof, by using at least one sorting algorithm, at least one selection algorithm, at least one search algorithm, at least one merge algorithm, at least one maximum function, at least one minimum function, at least one graph algorithm, at least one graph search algorithm, at least one tree algorithm, at least one tree search algorithm, at least one matrix calculation, at least one matrix algorithm, at least one comparison, or a combination thereof.

At least one central server can preferably sort, or the like, at least one filtered conveyance service request or all or some of filtered conveyance data relating to at least one autonomous vehicle using at least one representative preference or at least one selected preference to identify at least one preferred conveyance service request, at least one autonomous vehicle that can be identified as preferred, all or some of preferred conveyance data relating to at least one autonomous vehicle, or a combination thereof.

At least one central server can preferably sort, or the like, at least one filtered conveyance service request in at least one order relating to at least one weighted average of at least one representative preference to identify at least one preferred conveyance service request. At least one central server can preferably sort, or the like, at least one filtered conveyance service request in at least one order relating to at least one weighted average of at least one selected preference to identify at least one preferred conveyance service request. At least one weighted average of at least one selected preference can be used to identify all or some of preferred conveyance data relating to at least one autonomous vehicle or at least one autonomous vehicle that can be identified as preferred from all or some of filtered conveyance data relating to at least one autonomous vehicle, at least one preferred conveyance service request that can be identified from all or some of plurality of filtered conveyance service requests, or a combination thereof.

At least one central server can process or facilitate including but not limited to at least one conveyance service request, at least one filtered conveyance service request, at least one preferred conveyance service request, all or some of conveyance data relating to at least one autonomous vehicle, all or some of filtered conveyance data relating to at least one autonomous vehicle, all or some of preferred conveyance data relating to at least one autonomous vehicle, at least one autonomous vehicle that can be identified as preferred, or a combination thereof, relating to at least one service provider or the like operating in at least one conveyance industry segment. At least one central server can use or have at least one default representative preference, at least one default selected preference, or a combination thereof.

When at least one Representative Automated Platform or at least one Autonomous Vehicle Automated Platform is used, at least one central server can analyze or evaluate at least one conveyance service request or all or some of conveyance data relating to at least one autonomous vehicle in real time or near real time. At least one conveyance service request can be filtered by using at least one representative preference or at least one selected preference and preferably at least one real time or near real time geographical location of at least one representative or at least one autonomous vehicle respectively. All or some of conveyance data relating to at least one autonomous vehicle can be filtered by using at least one selected preference and preferably at least one real time or near real time geographical location of at least one autonomous vehicle.

If at least one conveyance service request is pre-filtered or pre-categorized, then at least one conveyance service request can be perceived or referred to as at least one filtered conveyance service request and at least one central server can identify at least one preferred conveyance service request. If all or some of conveyance data relating to at least one autonomous vehicle is pre-filtered or pre-categorized, then all or some of conveyance data relating to at least one autonomous vehicle can be perceived or referred to as all or some of filtered conveyance data relating to at least one autonomous vehicle and at least one central server can identify all or some of preferred conveyance data relating to at least one autonomous vehicle, at least one autonomous vehicle that can be identified as preferred, or a combination thereof.

At least one filtered conveyance service request can preferably be sorted relating to at least one weighted average of at least one representative preference or at least one selected preference, however, sorting is not required to identify at least one preferred conveyance service request respectively. All or some of filtered conveyance data relating to at least one autonomous vehicle can preferably be sorted relating to at least one weighted average of at least one selected preference, however, sorting is not required to identify all or some of preferred conveyance data relating to at least one autonomous vehicle, at least one autonomous vehicle that can be identified as preferred, or a combination thereof. At least one preferred conveyance service request can be identified and then preferably secured or obtained. At least one autonomous vehicle that can be identified as preferred, all or some of preferred conveyance data relating to at least one autonomous vehicle, or a combination thereof, can be identified and then preferably secured or obtained.

As a non-limiting example, at least one computer readable memory of at least one central server can be but is not limited to at least one database, at least one database table, at least one database result set, at least one cloud storage, at least one hard disk drive, at least one solid state drive, at least one optical disk drive, at least one flash memory, at least one Random Access Memory (RAM), at least one tape, or the like.

As a non-limiting example, at least one central server can include at least one distinct server operably linked in the same or at least one different geographical location. As a non-limiting example, at least one central server can optionally be part of at least one terminal. As a non-limiting example, at least one central server can optionally be part of at least one application or at least one owner or controller application. As a non-limiting example, at least one central server can optionally be located on at least one terminal. As a non-limiting example, at least one application, at least one owner or controller application, or a combination thereof, can optionally operate on at least one central server. As a non-limiting example, at least one function of at least one central server or at least one external server can be performed by at least one application, at least one owner or controller application, or a combination thereof. As a non-limiting example, at least one function of at least one application, at least one owner or controller application, or a combination thereof, can be performed by at least one central server or at least one external server. As a non-limiting example, at least one function of at least one central server can be performed by at least one external server. As a non-limiting example, at least one central server can include or utilize quantum computing. As a non-limiting example, at least one central server can include or utilize at least one neural network. As a non-limiting example, at least one central server can include or utilize machine learning technology or the like. As a non-limiting example, at least one central server can be dispersed or located across at least one geographical location such as Los Angeles and New York.

As a non-limiting example, at least one central server can aggregate at least one conveyance service request, all or some of conveyance data relating to at least one autonomous vehicle, or a combination thereof, within at least one service provider, at least one owner or at least one controller of at least one autonomous vehicle, at least one good supplier, at least one fleet manager, at least one logistics provider, at least one logistics supplier, or a combination thereof. As a non-limiting example, at least one central server can process or facilitate at least one conveyance service request, at least one filtered conveyance service request, at least one preferred conveyance service request, all or some of conveyance data relating to at least one autonomous vehicle, all or some of filtered conveyance data relating to at least one autonomous vehicle, all or some of preferred conveyance data relating to at least one autonomous vehicle, at least one autonomous vehicle that can be identified as preferred, or a combination thereof, from at least one individual service provider or the like relating to at least one individual conveyance industry segment. As a non-limiting example, at least one central server can compile at least one visual representation to be transmitted to at least one application or at least one owner or controller application. As a non-limiting example, at least one central server can control or operate at least one fleet of at least one autonomous vehicle. As a non-limiting example, at least one application, at least one owner or controller application, at least one autonomous vehicle, at least one terminal, at least one central server, at least one external server, at least one link, or a combination thereof, can be combined or integrated.

As a non-limiting example, at least one conveyance service request, all or some of conveyance data relating to at least one autonomous vehicle, all or some of at least one real time or near real time geographical location of at least one autonomous vehicle, or a combination thereof, can be transmitted from at least one external server to at least one central server by way of at least one link. As a non-limiting example, at least one conveyance service request, all or some of conveyance data relating to at least one autonomous vehicle, all or some of at least one real time or near real time geographical location of at least one autonomous vehicle, or a combination thereof, can be transmitted from at least one service provider, at least one owner or at least one controller of at least one autonomous vehicle, at least one good supplier, at least one fleet manager, at least one logistics provider, at least one logistics supplier, or a combination thereof, to at least one central server by way of at least one link. As a non-limiting example, at least one conveyance service request, all or some of conveyance data relating to at least one autonomous vehicle, all or some of at least one real time or near real time geographical location of at least one autonomous vehicle, or a combination thereof, can be structured in at least one uniform format prior to being transmitted from at least one external server and is not needed to be standardized.

As a non-limiting example, at least one central server can execute at least one function of the present invention for at least one representative and/or at least one autonomous vehicle including but not limited to receiving, storing, standardizing, aggregating, filtering, and preferably sorting, at least one conveyance service request in conjunction with corresponding conveyance data, and securing or obtaining at least one preferred conveyance service request. As a non-limiting example, at least one central server can execute at least one function of the present invention for at least one owner or at least one controller of at least one autonomous vehicle including but not limited to receiving, storing, standardizing, aggregating, filtering, and preferably sorting, all or some of conveyance data relating to at least one autonomous vehicle, and securing or obtaining at least one autonomous vehicle that can be identified as preferred.

As a non-limiting example, at least one different geographical location can be used other than at least one real time or near real time geographical location of at least one representative or at least one real time or near real time geographical location of at least one autonomous vehicle when filtering at least one conveyance service request, all or some of conveyance data relating to at least one autonomous vehicle, or a combination thereof.

As a non-limiting example, at least one representative preference, preferably at least one real time or near real time geographical location of at least one representative, or a combination thereof, can be transmitted to at least one central server at any time prior to filtering at least one conveyance service request. As a non-limiting example, at least one selected preference, preferably at least one real time or near real time geographical location of at least one autonomous vehicle, all or some of conveyance data relating to at least one autonomous vehicle, or a combination thereof, can be transmitted to at least one central server at any time prior to filtering at least one conveyance service request.

As a non-limiting example, at least one central server can use at least one equal weight or at least one unequal weight for at least one representative preference when calculating at least one weighted average to identify at least one preferred conveyance service request. As a non-limiting example, at least one central server can use at least one equal weight or at least one unequal weight for at least one selected preference when calculating at least one weighted average to identify at least one preferred conveyance service request, at least one autonomous vehicle that can be identified as preferred, all or some of preferred conveyance data relating to at least one autonomous vehicle, or a combination thereof.

As a non-limiting example, when at least one central server receives at least one conveyance service request, at least one central server can categorize or pre-filter at least one conveyance service request. As a non-limiting example, at least one central server can obtain or receive at least one pre-filtered or at least one pre-categorized conveyance service request relating to at least one geographical area. As a non-limiting example, at least one central server can obtain or receive at least one pre-filtered or at least one pre-categorized conveyance service request relating to at least one level of service. As a non-limiting example, at least one conveyance service request can be pre-filtered or pre-categorized on at least one central server based on at least one geographical area. As a non-limiting example, at least one conveyance service request can be pre-filtered or pre-categorized on at least one central server based on at least one level of service.

As a non-limiting example, when at least one central server receives all or some of conveyance data relating to at least one autonomous vehicle, at least one central server can categorize or pre-filter all or some of conveyance data relating to at least one autonomous vehicle. As a non-limiting example, at least one central server can obtain or receive all or some of at least one pre-filtered conveyance data relating to at least one autonomous vehicle, or all or some of at least one pre-categorized conveyance data relating to at least one autonomous vehicle, relating to at least one geographical area. As a non-limiting example, at least one central server can obtain or receive all or some of at least one pre-filtered conveyance data relating to at least one autonomous vehicle or all or some of at least one pre-categorized conveyance data relating to at least one autonomous vehicle, relating to at least one level of service. As a non-limiting example, all or some of conveyance data relating to at least one autonomous vehicle can be pre-filtered or pre-categorized on at least one central server based on at least one geographical area. As a non-limiting example, all or some of conveyance data relating to at least one autonomous vehicle can be pre-filtered or pre-categorized on at least one central server based on at least one level of service.

As a non-limiting example, at least one conveyance service request or all or some of conveyance data relating to at least one autonomous vehicle can be filtered based on at least one representative preference, at least one selected preference, or a combination thereof, on at least one central server after being pre-filtered or pre-categorized.

As a non-limiting example, when at least one central server obtains at least one pre-filtered conveyance service request, at least one central server can compare at least one pre-filtered conveyance service request to at least one representative preference or at least one selected preference to identify at least one filtered conveyance service request. As a non-limiting example, when at least one central server obtains at least one pre-filtered autonomous vehicle, at least one central server can compare all or some of pre-filtered conveyance data relating to at least one autonomous vehicle to at least one selected preference to identify all or some of filtered conveyance data relating to at least one autonomous vehicle.

As a non-limiting example, if at least one conveyance service request is pre-filtered, then at least one conveyance service request is not filtered. As a non-limiting example, at least one pre-filtered conveyance service request can be perceived or referred to as at least one filtered conveyance service request. As a non-limiting example, at least one central server can filter at least one conveyance service request at least once. As a non-limiting example, at least one central server can preferably sort, or the like, at least one conveyance service request at least once to identify at least one preferred conveyance service request. As a non-limiting example, at least one central server can filter at least one conveyance service request more than once based on at least one pricing preference and then at least one service provider preference. As a non-limiting example, at least one conveyance service request can be categorized by at least one geographical location after being received on at least one central server.

As a non-limiting example, if all or some of conveyance data relating to at least one autonomous vehicle is pre-filtered, then all or some of conveyance data relating to at least one autonomous vehicle is not filtered. As a non-limiting example, all or some of pre-filtered conveyance data relating to at least one autonomous vehicle can be perceived or referred to as all or some of filtered conveyance data relating to at least one autonomous vehicle. As a non-limiting example, at least one central server can filter all or some of conveyance data relating to at least one autonomous vehicle at least once. As a non-limiting example, at least one central server can preferably sort, or the like, all or some of conveyance data relating to at least one autonomous vehicle at least once, to identify at least one autonomous vehicle that can be identified as preferred, all or some of preferred conveyance data relating to at least one autonomous vehicle, or a combination thereof. As a non-limiting example, at least one central server can filter all or some of conveyance data relating to at least one autonomous vehicle more than once based on at least one pricing preference and then at least one good supplier preference. As a non-limiting example, all or some of conveyance data relating to at least one autonomous vehicle can be categorized by at least one geographical location after being received on at least one central server. As a non-limiting example, all or some of pre-filtered conveyance data relating to at least one autonomous vehicle can be pre-filtered, filtered again, or a combination thereof, including all or some of at least one real time or near real time geographical location of at least one autonomous vehicle.

As a non-limiting example, at least one filtered conveyance service request can preferably be sorted in at least one ascending or descending order relating to at least one weighted average of at least one representative preference or at least one weighted average of at least one selected preference to identify at least one preferred conveyance service request. As a non-limiting example, all or some of filtered conveyance data relating to at least one autonomous vehicle can preferably be sorted in at least one ascending or descending order relating to at least one weighted average of at least one selected preference to identify at least one autonomous vehicle that can be identified as preferred, all or some of preferred conveyance data relating to at least one autonomous vehicle, or a combination thereof.

As a non-limiting example, at least one preferred conveyance service request in conjunction with corresponding conveyance data, at least one filtered conveyance service request in conjunction with corresponding conveyance data, all or some of preferred conveyance data relating to at least one autonomous vehicle, all or some of filtered conveyance data relating to at least one autonomous vehicle, all or some of conveyance data relating to at least one autonomous vehicle, or a combination thereof, can be identified or updated in real time or near real time as at least one real time or near real time geographical location of at least one representative or at least one autonomous vehicle updates or changes.

As a non-limiting example, at least one preferred conveyance service request in conjunction with corresponding conveyance data, all or some of plurality of filtered conveyance service requests in conjunction with corresponding conveyance data, all or some of plurality of conveyance service requests in conjunction with corresponding conveyance data, all or some of preferred conveyance data relating to at least one autonomous vehicle, all or some of filtered conveyance data relating to at least one autonomous vehicle, all or some of conveyance data relating to at least one autonomous vehicle, at least one representative preference, at least one selected preference, at least one secured or obtained preferred conveyance service request, at least one secured or obtained autonomous vehicle that is identified as preferred, or a combination thereof, can be identified or updated in real time or near real time as traffic information updates or changes.

As a non-limiting example, at least one central server can secure or obtain at least one preferred conveyance service request, at least one filtered conveyance service request, at least one autonomous vehicle that can be identified as preferred, at least one autonomous vehicle that can be filtered, or a combination thereof, and can communicate directly with at least one external server, at least one central server, at least one service provider, at least one owner or at least one controller of at least one autonomous vehicle, at least one good supplier, at least one fleet manager, at least one logistics provider, at least one logistics supplier, or a combination thereof.

As a non-limiting example, at least one secured or obtained preferred conveyance service request or at least one secured or obtained autonomous vehicle that can be identified as preferred, can be sent to including but not limited to at least one service provider, at least one external server, at least one central server, at least one good supplier, at least one fleet manager, at least one logistics provider, at least one logistics supplier, at least one owner or at least one controller of at least one autonomous vehicle, at least one owner or controller application, at least one application, at least one autonomous vehicle, at least one representative, at least one conveyance client; or a combination thereof.

As a non-limiting example, at least one central server can be used to manage logistics on the front-end or back-end for at least one service provider, at least one good supplier, at least one fleet manager, at least one owner or at least one controller of at least one autonomous vehicle, at least one third party, at least one logistics provider, at least one logistics supplier, or the like. As a non-limiting example, at least one central server can be used to control or operate at least one autonomous vehicle on the front-end or back-end for at least one service provider, at least one good supplier, at least one fleet manager, at least one owner or at least one controller of at least one autonomous vehicle, at least one third party, at least one logistics provider, at least one logistics supplier, or a combination thereof. As a non-limiting example, at least one central server can be used by at least one fleet manager to manage logistics on the back-end for at least one service provider or the like. As a non-limiting example, at least one central server can be used by at least one service provider or the like to manage logistics on the back-end for at least one OEM or at least one auto manufacturer. As a non-limiting example, at least one central server can be used by at least one service provider or the like to manage logistics on the back-end for at least one fleet of at least one autonomous vehicle. As a non-limiting example, at least one central server can be used by at least one owner or at least one controller of at least one autonomous vehicle or the like to manage logistics for at least one private owner of at least one autonomous vehicle. As a non-limiting example, at least one central server can be used by at least one owner or at least one controller of at least one autonomous vehicle or the like to manage logistics for at least one fleet manager.

As a non-limiting example, at least one central server can receive, store, standardize, aggregate, transmit, filter, identify, or a combination thereof, at least one conveyance service request or all or some of conveyance data relating to at least one autonomous vehicle in at least one database, at least one database table, or at least one database result set. As a non-limiting example, at least one central server can receive, store, standardize, aggregate, transmit, filter, identify, or a combination thereof, and then secure or obtain at least one preferred conveyance service request or at least one autonomous vehicle that can be identified as preferred in at least one database, at least one database table, or at least one database result set. As a non-limiting example, when securing or obtaining at least one autonomous vehicle that can be identified as preferred, all or some of preferred conveyance data relating to at least one autonomous vehicle can optionally be secured or obtained.

As a non-limiting example, at least one central server can categorize or pre-categorize conveyance service requests with corresponding conveyance data in at least one database, at least one database table, at least one database result set, or a combination thereof. As a non-limiting example, at least one central server can categorize or pre-categorize a fleet of autonomous vehicles with corresponding conveyance data based on conveyance data corresponding to each individual autonomous vehicle in at least one database, at least one database table, at least one database result set, or a combination thereof. As a non-limiting example, at least one central server can categorize or pre-categorize all or some of conveyance data relating to at least one autonomous vehicle fleet as a whole in at least one database, at least one database table, at least one database result set, or a combination thereof. As a non-limiting example, at least one central server can categorize or pre-categorize a fleet of autonomous vehicles with corresponding conveyance data based on conveyance data corresponding with each individual autonomous vehicle in at least one database, at least one database table, at least one database result set, or a combination thereof. As a non-limiting example, at least one central server can categorize or pre-categorize a fleet of autonomous vehicles with corresponding conveyance data as a whole in at least one database, at least one database table, at least one database result set, or a combination thereof.

As a non-limiting example, at least one central server can use at least one graph database to identify at least one preferred conveyance service request for or with at least one autonomous vehicle, at least one autonomous vehicle that can be identified as preferred, or a combination thereof, that can be in the closest proximity. As a non-limiting example, at least one central server can utilize at least one directed graph or at least one undirected graph with at least one node and/or at least one edge to identify at least one autonomous vehicle within the shortest travel time to or for at least one preferred conveyance service request.

As a non-limiting example, two autonomous vehicles with corresponding conveyance data can be stored or categorized in two different databases, two different database tables, or two different database result sets, based on a conveyance industry segment preference and all or some of conveyance service requests can be stored or categorized in another database, another database table, or another database result set. Continuing with this non-limiting example, at least one central server can have or use three different databases, different database tables, or different database result sets to filter and identify preferred conveyance service requests to be secured or obtained for or with both autonomous vehicles. Continuing with this non-limiting example, at least one central server can have or use at least one database or at least one database table, where at least one central server can have or use three different queries, but at least one underlying database table is still the same or unchanged.

As a non-limiting example, at least one central server can filter at least one conveyance service request or all or some of conveyance data relating to at least one autonomous vehicle, from at least one database or at least one database table, and at least one database result set can identify at least one filtered conveyance service request or all or some of filtered conveyance data relating to at least one autonomous vehicle. As a non-limiting example, at least one central server can identify at least one preferred conveyance service request or all or some of preferred conveyance data relating to at least one autonomous vehicle, from at least one database or at least one database table, and at least one database result set can identify at least one preferred conveyance service request or all or some of preferred conveyance data relating to at least one autonomous vehicle.

As a non-limiting example, at least one owner or at least one controller of at least one autonomous vehicle or at least one fleet manager can use, for example, multiple selected preferences for each database, database table, or database result set when filtering and identifying preferred conveyance service requests to be secured or obtained for or with both autonomous vehicles. As a non-limiting example, at least one owner or at least one controller of at least one autonomous vehicle or at least one fleet manager can use, for example, multiple selected preferences for each database, database table, or database result set when filtering and identifying two autonomous vehicles that can be identified as preferred to be secured or obtained for or with both preferred conveyance service requests.

As a non-limiting example, at least one central server can filter conveyance service requests, all or some of conveyance data relating to at least one autonomous vehicle, or combination thereof, utilizing at least one step process. As a non-limiting example, at least one central server can filter conveyance service requests using a two step process to first filter conveyance service requests based on at least one selected preference and then filter at least one subset of conveyance service requests based on at least one real time or near real time geographical location of at least one autonomous vehicle. As a non-limiting example, at least one central server can filter conveyance service requests using a two step process to first filter conveyance service requests based on at least one real time or near real time geographical location of at least one autonomous vehicle and then filter at least one subset of conveyance service requests based on at least one selected preference. As a non-limiting example, at least one central server can filter conveyance service requests using a two step process to first filter conveyance service requests based on at least one selected preference and then filter at least one subset of conveyance service requests based on at least one different selected preference.

As a non-limiting example, at least one central server can filter all or some of conveyance data relating to at least one autonomous vehicle using a two step process to first filter all or some of conveyance data relating to at least one autonomous vehicle based on at least one selected preference and then filter at least one subset of all or some of conveyance data relating to at least one autonomous vehicle based on at least one real time or near real time geographical location of at least one autonomous vehicle. As a non-limiting example, at least one central server can filter all or some of conveyance data relating to at least one autonomous vehicle using a two step process to first filter all or some of conveyance data relating to at least one autonomous vehicle based at least one real time or near real time geographical location of at least one autonomous vehicle and then filter at least one subset of all or some of conveyance data relating to at least one autonomous vehicle based on at least one selected preference. As a non-limiting example, at least one central server can filter all or some of conveyance data relating to at least one autonomous vehicle using a two step process to first filter all or some of conveyance data relating to at least one autonomous vehicle based on at least one selected preference and then filter at least one subset of all or some of conveyance data relating to at least one autonomous vehicle based on at least one different selected preference.

As a non-limiting example, at least one central server can filter and identify multiple preferred conveyance service requests, a fleet of autonomous vehicles that can be identified as preferred, or a combination thereof, that can be matched together and secured or obtained to perform multiple conveyance services. As a non-limiting example, at least one central server can filter and identify multiple preferred conveyance service requests first and then filter and identify multiple autonomous vehicles that can be identified as preferred, which can be matched together and secured or obtained to perform multiple conveyance services. As a non-limiting example, at least one central server can filter and identify multiple autonomous vehicles that can be identified as preferred first and then filter and identify multiple preferred conveyance service requests, which can be matched together and secured or obtained to perform multiple conveyance services.

As a non-limiting example, at least one central server can filter at least one conveyance service request in conjunction with corresponding conveyance data, all or some of conveyance data relating to at least one autonomous vehicle, or a combination thereof, in any order. As a non-limiting example, at least one central server can identify at least one preferred conveyance service request in conjunction with corresponding conveyance data, at least one autonomous vehicle that can be identified as preferred, all or some of preferred conveyance data relating to at least one autonomous vehicle, or a combination thereof, in any order. As a non-limiting example, at least one central server can secure or obtain at least one preferred conveyance service request in conjunction with corresponding conveyance data, at least one autonomous vehicle that can be identified as preferred, or a combination thereof, in any order. As a non-limiting example, at least one central server can use or apply a second selected preference and at least one process can optionally be referred to or seen as at least one additional level of filtering.

As a non-limiting example, at least one central server can use machine learning technology or the like to identify at least one pattern and at least one Autonomous Vehicle Automated Platform can add at least one more autonomous vehicle in at least one specific area around 9 PM due to at least one identified pattern of increased conveyance service demand. As a non-limiting example, at least one central server can use machine learning technology or the like to identify at least one pattern based on at least one correlation relating to conveyance data. As a non-limiting example, at least one central server can identify at least one correlation between traffic congestion and at least one time of the day. As a non-limiting example, at least one application, at least one owner or controller application, at least one external server, or a combination thereof, can operate on at least one central server.

As a non-limiting example, at least one central server can unsecure or cancel at least one secured or obtained preferred conveyance service request or at least one secured or obtained filtered conveyance service request if at least one better preferred conveyance service request or at least one better filtered conveyance service request becomes available such as but not limited to in real time or near real time. As a non-limiting example, at least one central server can unsecure or cancel at least one secured or obtained autonomous vehicle that can be identified as preferred or at least one secured or obtained autonomous vehicle that can be filtered if at least one better autonomous vehicle that can be identified as preferred or at least one better autonomous vehicle that can be filtered becomes available such as but not limited to in real time or near real time. As a non-limiting example, at least one central server can unsecure or cancel at least one autonomous vehicle that can be identified as preferred if at least one autonomous vehicle that can be identified as preferred is or becomes unavailable. As a non-limiting example, at least one central server can have or be associated with at least one database based on at least one data point.

As a non-limiting example, at least one central server relating to at least one service provider, at least one owner or at least one controller of at least one autonomous vehicle, at least one good supplier, at least one fleet manager, at least one logistics provider, at least one logistics supplier, or a combination thereof, can secure or obtain at least one preferred conveyance service request, at least one autonomous vehicle that can be identified as preferred, or a combination thereof, and can facilitate and communicate with at least one central server relating or belonging to at least one third party. As a non-limiting example, at least one central server relating to at least one service provider, at least one owner or at least one controller of at least one autonomous vehicle, at least one good supplier, at least one fleet manager, at least one logistics provider, at least one logistics supplier, or a combination thereof, can secure or obtain at least one preferred conveyance service request, at least one autonomous vehicle that can be identified as preferred, or a combination thereof, and can facilitate and communicate with at least one other central server relating or belonging to at least one other service provider, at least one other owner or at least one other controller of at least one autonomous vehicle, at least one other good supplier, at least one other fleet manager, at least one other logistics provider, at least one other logistics supplier, or the like. As a non-limiting example, at least one autonomous vehicle that can be identified as preferred can be secured or obtained concurrently for or with more than one preferred conveyance service requests.

System

At least one system can be but is not limited to a collection of elements of the present invention that can for example secure or obtain at least one preferred conveyance service request, at least one autonomous vehicle that can be identified as preferred, or a combination thereof. At least one system can be but is not limited to a collection of elements of the present invention, where at least one element can be associated or integrated with at least one other element. The collection of elements or individual elements can be in the same or different locations. At least one system can be but is not limited to at least one computer program product. At least one system can be but is not limited to at least one rules based system.

As a non-limiting example, in the present invention, at least one conveyance client, at least one application, at least one owner or controller application, at least one representative, at least one autonomous vehicle, at least one fleet of at least one autonomous vehicle, at least one autonomous vehicle, at least one autonomous vehicle that can be filtered, at least one autonomous vehicle that can be identified as preferred, at least one fleet manager, at least one logistics provider, at least one logistics supplier, at least one owner or at least one controller of at least one autonomous vehicle, at least one terminal, at least one link, at least one central server, at least one external server, at least one service provider, at least one good supplier, at least one Representative Automated Platform, at least one Autonomous Vehicle Automated Platform, at least one visual representation, at least one representative preference, at least one selected preference, conveyance data, conveyance data relating to at least one autonomous vehicle, filtered conveyance data relating to at least one autonomous vehicle, preferred conveyance data relating to at least one autonomous vehicle, at least one conveyance service request, at least one filtered conveyance service request, and at least one preferred conveyance service request can all be in at least one similar geographical location, or spread out in at least one distant location, including at least one cross-border location.

At least one system can be used to analyze or evaluate and preferably secure or obtain at least one preferred conveyance service request, at least one autonomous vehicle that can be identified as preferred, or a combination thereof, relating to at least one service provider operating in at least one conveyance industry segment. At least one system can be updated or refreshed in real time or near real time and can refer to being updated or refreshed in the highest level of development or state of the art. At least one system can perform at least one function in real time or near real time and can refer to being updated or refreshed in the highest level of development or state of the art.

Method

At least one method can be but is not limited to a collection of elements of the present invention that can for example secure or obtain at least one preferred conveyance service request, at least one autonomous vehicle that can be identified as preferred, or a combination thereof. At least one method can be but is not limited to a collection of elements of the present invention, where at least one element can be associated or integrated with at least one other element. The collection of elements or individual elements can be in the same or different locations. At least one method can be but is not limited to at least one computer program product. At least one method can be but is not limited to at least one rules based method.

As a non-limiting example, in the present invention, at least one conveyance client, at least one application, at least one owner or controller application, at least one representative, at least one autonomous vehicle, at least one fleet of at least one autonomous vehicle, at least one autonomous vehicle, at least one autonomous vehicle that can be filtered, at least one autonomous vehicle that can be identified as preferred, at least one fleet manager, at least one logistics provider, at least one logistics supplier, at least one owner or at least one controller of at least one autonomous vehicle, at least one terminal, at least one link, at least one central server, at least one external server, at least one service provider, at least one good supplier, at least one Representative Automated Platform, at least one Autonomous Vehicle Automated Platform, at least one visual representation, at least one representative preference, at least one selected preference, conveyance data, conveyance data relating to at least one autonomous vehicle, filtered conveyance data relating to at least one autonomous vehicle, preferred conveyance data relating to at least one autonomous vehicle, at least one conveyance service request, at least one filtered conveyance service request, and at least one preferred conveyance service request can all be in at least one similar geographical location, or spread out in at least one distant location, including at least one cross-border location.

At least one method can be used to analyze or evaluate and preferably secure or obtain at least one preferred conveyance service request, at least one autonomous vehicle that can be identified as preferred, or a combination thereof, relating to at least one service provider operating in at least one conveyance industry segment. At least one method can be updated or refreshed in real time or near real time and can refer to being updated or refreshed in the highest level of development or state of the art. At least one method can perform at least one function in real time or near real time and can refer to being updated or refreshed in the highest level of development or state of the art.

External Server

At least one external server can be at least one software and/or at least one hardware that can for example facilitate at least one operation or at least one function to secure or obtain at least one preferred conveyance service request, at least one autonomous vehicle that can be identified as preferred, or a combination thereof. At least one external server can be at least one software and/or at least one hardware that can for example be utilized or operated by at least one owner or at least one controller of at least one autonomous vehicle, at least one service provider, at least one good supplier, at least one fleet manager, at least one logistics provider, at least one logistics supplier, or a combination thereof. At least one external server can be at least one software and/or at least one hardware for example at least one computer application, at least one computer program, at least one API, at least one website, at least one web application, at least one smartphone application, at least one cloud application, at least one service, or the like.

At least one external server can communicate information or data including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of preferred conveyance data relating to at least one autonomous vehicle, all or some of filtered conveyance data relating to at least one autonomous vehicle, all or some of conveyance data relating to at least one autonomous vehicle, all or some of at least one real time or near real time geographical location of at least one autonomous vehicle, at least one representative preference, at least one selected preference, at least one secured or obtained preferred conveyance service request, at least one secured or obtained autonomous vehicle that can be identified as preferred, or the like. At least one external server can communicate all or some of information or data with at least one central server, at least one external server, at least one application, at least one owner or controller application, at least one autonomous vehicle, or a combination thereof.

At least one external server can be at least one software and/or at least one hardware that can for example facilitate at least one operation or at least one function to secure or obtain at least one conveyance service request, at least one filtered conveyance service request, at least one preferred conveyance service request, at least one autonomous vehicle, at least one autonomous vehicle that can be filtered, at least one autonomous vehicle that can be identified as preferred, or a combination thereof.

At least one external server can expose or be accessed through at least one API relating to at least one service provider, at least one owner or at least one controller of at least one autonomous vehicle, at least one good supplier, at least one fleet manager, at least one logistics provider, at least one logistics supplier, at least one third party, or the like.

All or some of conveyance data relating to at least one autonomous vehicle can be sourced or provided by at least one external server that can be associated with at least one service provider, at least one good supplier, at least one fleet manager, at least one logistics provider, at least one logistics supplier, at least one owner or at least one controller of at least one autonomous vehicle, or a combination thereof. All or some of conveyance data relating to at least one autonomous vehicle can be sourced or provided by at least one external server that can also have or provide at least one conveyance service request in conjunction with corresponding conveyance data. All or some of conveyance data relating to at least one autonomous vehicle can be sourced or provided by at least one external server that does not have or does not provide at least one conveyance service request in conjunction with corresponding conveyance data. At least one autonomous vehicle, all or some of conveyance data relating to at least one autonomous vehicle, or a combination thereof, can be sourced or provided by at least one third party.

At least one external server can include but is not limited to at least one source of at least one conveyance service request in conjunction with corresponding conveyance data, all or some of conveyance data relating to at least one autonomous vehicle, or a combination thereof. At least one external server can be for example at least one source of at least one real time or near real time conveyance service request, at least one source of all or some of conveyance data relating to at least one autonomous vehicle, or a combination thereof. At least one external server can be but is not limited to at least one computer network system. At least one external server can include but is not limited to at least one computer processor, at least one computer readable memory, and at least one network interface. At least one external server preferably can encompass hardware and/or software alone or in a combination.

At least one autonomous vehicle can be sourced or provided by at least one external server that can be associated with at least one service provider, at least one good supplier, at least one fleet manager, at least one owner or at least one controller of at least one autonomous vehicle, at least one logistics provider, at least one logistics supplier, or a combination thereof. At least one autonomous vehicle can be sourced or provided by at least one external server that can also source or provide at least one conveyance service request. At least one autonomous vehicle can be sourced or provided by at least one external server that does not have or does not provide at least one conveyance service request.

All or some of conveyance data relating to at least one autonomous vehicle can be sourced or provided by at least one external server that can be associated with at least one service provider, at least one good supplier, at least one fleet manager, at least one owner or at least one controller of at least one autonomous vehicle, at least one logistics provider, at least one logistics supplier, or a combination thereof. All or some of conveyance data relating to at least one autonomous vehicle can be sourced or provided by at least one external server that can also have or provide at least one conveyance service request. All or some of conveyance data relating to at least one autonomous vehicle can be sourced or provided by at least one external server that does not have or does not provide at least one conveyance service request.

All or some of conveyance data relating to at least one autonomous vehicle can be transmitted to or communicated with at least one central server, at least one external server, at least one application, at least one application that can be associated with at least one autonomous vehicle, at least one owner or controller application, at least one terminal, at least one autonomous vehicle, at least one owner or at least one controller of at least one autonomous vehicle, at least one service provider, at least one good supplier, at least one fleet manager, at least one logistics provider, at least one logistics supplier, or a combination thereof.

All or some of filtered conveyance data relating to at least one autonomous vehicle can be transmitted to or communicated with at least one central server, at least one external server, at least one application, at least one application that can be associated with at least one autonomous vehicle, at least one owner or controller application, at least one terminal, at least one autonomous vehicle, at least one owner or at least one controller of at least one autonomous vehicle, at least one service provider, at least one good supplier, at least one fleet manager, at least one logistics provider, at least one logistics supplier, or a combination thereof.

All or some of preferred conveyance data relating to at least one autonomous vehicle can be transmitted to or communicated with at least one central server, at least one external server, at least one application, at least one application that can be associated with at least one autonomous vehicle, at least one owner or controller application, at least one terminal, at least one autonomous vehicle, at least one owner or at least one controller of at least one autonomous vehicle, at least one service provider, at least one good supplier, at least one fleet manager, at least one logistics provider, at least one logistics supplier, or a combination thereof.

At least one autonomous vehicle can communicate with at least one external server through at least one central server. At least one autonomous vehicle can communicate with at least one owner or at least one controller of at least one autonomous vehicle, at least one service provider, at least one good supplier, at least one fleet manager, at least one logistics provider, at least one logistics supplier, at least one conveyance client, or a combination thereof, through or by at least one central server, at least one application, or at least one external server. At least one autonomous vehicle can communicate with at least one external server or at least one central server through or by at least one application. At least one autonomous vehicle can communicate with at least one owner or at least one controller of at least one autonomous vehicle, at least one service provider, at least one good supplier, at least one fleet manager, at least one logistics provider, at least one logistics supplier, at least one conveyance client, or a combination thereof, using at least one link between at least one application associated with at least one autonomous vehicle and at least one central server. At least one autonomous vehicle can communicate with at least one owner or at least one controller of at least one autonomous vehicle, at least one service provider, at least one good supplier, at least one fleet manager, at least one logistics provider, at least one logistics supplier, at least one conveyance client, or a combination thereof, using at least one link between at least one application associated with at least one autonomous vehicle and at least one external server. At least one autonomous vehicle can communicate with at least one external server or at least one central server through or by at least one owner or controller application.

At least one preferred conveyance service request, at least one autonomous vehicle that can be identified as preferred, or a combination thereof, can be secured or obtained through or by at least one central server, at least one application, at least one owner or controller application, at least one external server, or a combination thereof. At least one preferred conveyance service request, at least one autonomous vehicle that can be identified as preferred, or a combination thereof, can be secured or obtained by at least one central server or at least one external server through at least one application associated with at least one autonomous vehicle. At least one preferred conveyance service request, at least one autonomous vehicle that can be identified as preferred, or a combination thereof, can be secured or obtained and transmitted between at least one application associated with at least one autonomous vehicle and at least one central server by way of at least one link. At least one preferred conveyance service request, at least one autonomous vehicle that can be identified as preferred, or a combination thereof, can be secured or obtained and transmitted between at least one application associated with at least one autonomous vehicle and at least one external server through at least one central server by way of at least one link. At least one preferred conveyance service request, at least one autonomous vehicle that can be identified as preferred, or a combination thereof, can be secured or obtained and transmitted between at least one application associated with at least one autonomous vehicle and at least one external server by way of at least one link. At least one preferred conveyance service request, at least one autonomous vehicle that can be identified as preferred, or a combination thereof, can be secured or obtained through or by at least one owner or controller application.

At least one external server can have or be associated with at least one database based on at least one data point. At least one external server can have or be associated with at least one database for at least one conveyance service request, all or some of conveyance data relating to at least one autonomous vehicle, or a combination thereof. At least one external server can have or be associated with at least one database based on at least one selected preference or at least one representative preference. At least one external server can have or be associated with at least one database for at least one conveyance industry segment. At least one external server can have or be associated with at least one conveyance industry segment.

At least one external server can be but is not limited to at least one server that can connect to or communicate with at least one central server by way of at least one link. At least one external server can transmit in real time or near real time, including but not limited to, at least one conveyance service request in conjunction with conveyance data, all or some of conveyance data relating to at least one autonomous vehicle, or a combination thereof, to at least one central server by way of at least one link. At least one external server can encompass different hardware and/or software alone or in a combination. At least one external server can include or connect to at least one database. At least one computer readable memory of at least one external server can be at least one database that at least one external server can connect to.

At least one external server can have or be associated with including but not limited to at least one central server, at least one external server, at least one link, at least one terminal, at least one owner or controller application, at least one good supplier, at least one autonomous vehicle, at least one application, at least one service provider, at least one owner or at least one controller of at least one autonomous vehicle, at least one fleet manager, at least one logistics provider, at least one logistics supplier, or a combination thereof. At least one external server can optionally be perceived or referred to as at least one service provider server, at least one good supplier server, at least one fleet manager server, at least one owner or at least one controller of at least one autonomous vehicle server, at least one logistics provider, at least one logistics supplier, or a combination thereof. At least one external server can be at least one server in at least one individual geographical location or at least one additional geographical location. At least one external server can preferably relate to a single Internet location, but that need not be the case. Preferably, at least one external server can be at least one secure server. At least one external server can be made secure using hardware and/or software commercially available. Additionally, at least one external server can include encryption software such that communications entering or exiting at least one external server are encrypted. Encryption hardware and/or software are commercially available.

At least one external server can be associated with at least one Application Program Interface (API) or the like. At least one external server Application Program Interface (API) or the like can be used to facilitate communication between including but not limited to at least one central server, at least one external server, at least one application, at least one owner or controller application, at least one autonomous vehicle, or a combination thereof. At least one external server can provide at least one conveyance service request in conjunction with conveyance data, all or some of conveyance data relating to at least one autonomous vehicle, or a combination thereof, relating to at least one service provider or the like operating in at least one conveyance industry segment. At least one external server can be updated or refreshed in real time or near real time and can refer to being updated or refreshed in the highest level of development or state of the art. At least one external server can perform at least one function in real time or near real time and can refer to being updated or refreshed in the highest level of development or state of the art.

As a non-limiting example, at least one external server being at least one source of at least one conveyance service request in conjunction with corresponding conveyance data, all or some of conveyance data relating to at least one autonomous vehicle, or a combination thereof, can be associated with at least one individual service provider, at least one individual owner or at least one individual controller of at least one autonomous vehicle, at least one individual good supplier, at least one individual fleet manager, at least one individual logistics provider, at least one individual logistics supplier, or a combination thereof.

As a non-limiting example, at least one external server can operate on at least one central server. As a non-limiting example, at least one external server can include at least one distinct server operably linked in the same or at least one different geographical location. As non-limiting example, at least one external server can optionally be perceived or referred to as at least one peer-to-peer network. As a non-limiting example, at least one external server can transmit at least one conveyance service request, all or some of conveyance data relating to at least one autonomous vehicle, or a combination thereof, that can be pre-standardized to or with at least one central server. As a non-limiting example, at least one external server can be but is not limited to at least one server that can connect to or communicate with at least one application, at least one owner or controller application, at least one central server, or a combination thereof, by way of at least one link. As a non-limiting example, at least one application, at least one owner or controller application, at least one autonomous vehicle, at least one terminal, at least one central server, at least one external server, at least one link, or a combination thereof, can be combined or integrated.

As a non-limiting example, at least one fleet of at least one autonomous vehicle can be sourced or provided by at least one external server that can be associated with at least one service provider, at least one good supplier, at least one fleet manager, at least one owner or at least one controller of at least one autonomous vehicle, at least one logistics provider, at least one logistics supplier, or a combination thereof.

As a non-limiting example, an individual service provider or the like can be associated with at least one external server that can use or have at least one database based on at least one data point. As a non-limiting example, an individual service provider or the like can be associated with at least one external server that can use or have at least one database for at least one conveyance service request, all or some of conveyance data relating to at least one autonomous vehicle, or a combination thereof. As a non-limiting example, an individual service provider or the like can be associated with at least one external server that can use or have at least one database based on at least one selected preference or at least one representative preference. As a non-limiting example, an individual service provider or the like can be associated with at least one external server that can use or have at least one database for at least one conveyance industry segment. As a non-limiting example, an individual service provider or the like can use or have at least one external server relating to a conveyance industry segment being a ride-hail industry segment and at least one other external server relating to a conveyance industry segment being a freight industry segment. As a non-limiting example, an individual service provider or the like can use or have at least one external server for at least one conveyance service request. As a non-limiting example, an individual service provider or the like can use or have at least one external server for all or some of conveyance data relating to at least one autonomous vehicle.

As a non-limiting example, at least one fleet manager or the like can use or have at least one external server that can include at least one database for at least one fleet of at least one autonomous vehicle. As a non-limiting example, at least one external server can connect to or communicate with two central servers belonging to two different entities. As a non-limiting example, at least one secured or obtained preferred conveyance service request, at least one secured or obtained autonomous vehicle that can be identified as preferred, or a combination thereof, can be transmitted from at least one application to at least one external server through at least one link.

As a non-limiting example, at least one external server can filter and identify including but not limited to all or some of at least one preferred conveyance service request in conjunction with corresponding conveyance data, all or some of at least one filtered conveyance service request in conjunction with corresponding conveyance data, all or some of at least one conveyance service request in conjunction with corresponding conveyance data, all or some of preferred conveyance data relating to at least one autonomous vehicle, all or some of filtered conveyance data relating to at least one autonomous vehicle, all or some of conveyance data relating to at least one autonomous vehicle, all or some of at least one real time or near real time geographical location of at least one autonomous vehicle, at least one representative preference, at least one selected preference, at least one secured or obtained preferred conveyance service request, at least one secured or obtained autonomous vehicle that can be identified as preferred, or a combination thereof, together or separately.

As a non-limiting example, at least one external server can secure or obtain at least one preferred conveyance service request, at least one filtered conveyance service request, at least one conveyance service request, at least one autonomous vehicle that can be identified as preferred, at least one autonomous vehicle that can be filtered, at least one autonomous vehicle, or a combination thereof, and can communicate directly or indirectly with at least one central server, at least one external server, at least one application, at least one owner or controller application, at least one autonomous vehicle, at least one owner or at least one controller of at least one autonomous vehicle, at least one service provider, at least one good supplier, at least one fleet manager, at least one logistics provider, at least one logistics supplier, at least one third party, or a combination thereof. As a non-limiting example, at least one function of at least one external server can be performed by at least one central server.

Conveyance Data

Conveyance data can be information or data that can for example be used to facilitate at least one operation or at least one function to secure or obtain at least one preferred conveyance service request, at least one autonomous vehicle that can be identified as preferred, or a combination thereof. Conveyance data can be information or data that can for example be utilized or managed by at least one owner or at least one controller of at least one autonomous vehicle, at least one service provider, at least one good supplier, at least one fleet manager, at least one logistics provider, at least one logistics supplier, or a combination thereof.

Conveyance data can be for example data or information corresponding to at least one past metric, at least one current metric, at least one future metric, or a combination thereof, of including but not limited to at least one request for transporting at least one person, at least one good, at least one article, at least one thing, or a combination thereof, from at least one geographical location to at least one other geographical location.

When all or some of conveyance data relating to at least one autonomous vehicle is considered, all or some of filtered conveyance data relating to at least one autonomous vehicle, all or some of preferred conveyance data relating to at least one autonomous vehicle, or a combination thereof, can also be considered. When all or some of conveyance data relating to at least one autonomous vehicle is considered, all or some of at least one real time or near real time geographical location of at least one autonomous vehicle, all or some of at least one real time or near real time geographical location of at least one autonomous vehicle that can be filtered, all or some of at least one real time or near real time geographical location of at least one autonomous vehicle that can be identified as preferred, or a combination thereof, can also be considered.

Conveyance data relating to at least one autonomous vehicle, at least one conveyance service request, at least one real time or near real time geographical location of at least one autonomous vehicle, or a combination thereof, can be sourced or provided from at least one external server, at least one central server, at least one application, at least one owner or controller application, or the like. Conveyance data relating to at least one autonomous vehicle, at least one conveyance service request, at least one real time or near real time geographical location of at least one autonomous vehicle, or a combination thereof, can be sourced or provided by at least one autonomous vehicle, at least one owner or at least one controller of at least one autonomous vehicle, at least one service provider, at least one good supplier, at least one fleet manager, at least one logistics provider, at least one logistics supplier, or the like.

Conveyance data relating to at least one autonomous vehicle, at least one conveyance service request, or a combination thereof, can be generated by at least one external server, at least one central server, at least one application, at least one owner or controller application, or the like. Conveyance data relating to at least one autonomous vehicle, at least one conveyance service request, or a combination thereof, can be generated by at least one autonomous vehicle, at least one owner or at least one controller of at least one autonomous vehicle, at least one service provider, at least one good supplier, at least one fleet manager, at least one logistics provider, at least one logistics supplier, or the like.

Conveyance data can be sourced, provided, or generated by at least one technology, at least one software, at least one hardware, or a combination thereof, relating to at least one autonomous vehicle. All or some of conveyance data relating to at least one autonomous vehicle can be used by at least one owner or at least one controller of at least one autonomous vehicle, at least one service provider, at least one good supplier, at least one fleet manager, at least one logistics provider, at least one logistics supplier, or a combination thereof, to control, manage, or operate at least one autonomous vehicle.

Conveyance data can be but is not limited to any data or information corresponding to at least one conveyance service request, at least one filtered conveyance service request, at least one preferred conveyance service request, at least one autonomous vehicle, at least one autonomous vehicle that can be filtered, at least one autonomous vehicle that can be identified as preferred, or a combination thereof, that can for example be transmitted between at least one external server, at least one central server, at least one application, at least one terminal, at least one owner or controller application, or a combination thereof, by way of at least one link.

Conveyance data can for example be transmitted from at least one external server to at least one central server, at least one application, at least one owner or controller application, at least one external server, or a combination thereof. Conveyance data retrieved from at least one external server can be for example cached on at least one central server, at least one application, at least one owner or controller application, at least one external server, or a combination thereof, to provide enhanced performance and better avoid at least one relevant limitation including but not limited to at least one central server limitation, at least one external server limitation, at least one service provider or the like limitation, at least one link limitation, and any involved service provider or the like limitation.

Conveyance data can be stored or cached in at least one database. Conveyance data can be stored or cached in at least one database table. Conveyance data can be updated or refreshed in real time or near real time and can refer to being updated or refreshed in the highest level of development or state of the art. Conveyance data can correspond to at least one preferred conveyance service request, at least one filtered conveyance service request, at least one conveyance service request, at least one autonomous vehicle, at least one autonomous vehicle that can be filtered, at least one autonomous vehicle that can be identified as preferred, or a combination thereof, relating to at least one owner or at least one controller of at least one autonomous vehicle, at least one service provider, at least one good supplier, at least one fleet manager, at least one logistics provider, at least one logistics supplier, at least one conveyance client, at least one representative, or a combination thereof, operating in at least one conveyance industry segment.

All or some of conveyance data can be but is not limited to any data or information relating to at least one conveyance service request, at least one filtered conveyance service request, at least one preferred conveyance service request, at least one autonomous vehicle, at least one autonomous vehicle that can be filtered, at least one autonomous vehicle that can be identified as preferred, or a combination thereof, that can be used to filter at least one conveyance service request into at least one filtered conveyance service request.

All or some of conveyance data can be but is not limited to any data or information relating to at least one conveyance service request, at least one filtered conveyance service request, at least one preferred conveyance service request, at least one autonomous vehicle, at least one autonomous vehicle that can be filtered, at least one autonomous vehicle that can be identified as preferred, or a combination thereof, that can be used to filter all or some of conveyance data relating to at least one autonomous vehicle into all or some of filtered conveyance data relating to at least one autonomous vehicle.

All or some of conveyance data can be but is not limited to any data or information relating to at least one conveyance service request, at least one filtered conveyance service request, at least one preferred conveyance service request, at least one autonomous vehicle, at least one autonomous vehicle that can be filtered, at least one autonomous vehicle that can be identified as preferred, or a combination thereof, that can be used to identify at least one preferred conveyance service request from at least one filtered conveyance service request.

All or some of conveyance data can be but is not limited to any data or information relating to at least one conveyance service request, at least one filtered conveyance service request, at least one preferred conveyance service request, at least one autonomous vehicle, at least one autonomous vehicle that can be filtered, at least one autonomous vehicle that can be identified as preferred, or a combination thereof, that can be used to identify all or some of preferred conveyance data relating to at least one autonomous vehicle or at least one autonomous vehicle that can be identified as preferred from all or some of filtered conveyance data relating to at least one autonomous vehicle.

All or some of conveyance data can be but is not limited to any data or information relating to at least one conveyance service request, at least one filtered conveyance service request, at least one preferred conveyance service request, at least one autonomous vehicle, at least one autonomous vehicle that can be filtered, at least one autonomous vehicle that can be identified as preferred, or a combination thereof, that can be stored, aggregated, standardized, filtered, identified as preferred, or the like. All or some of conveyance data relating to at least one autonomous vehicle can be filtered and identified as preferred, in at least one same or at least one similar process as at least one conveyance service request, at least one filtered conveyance service request, at least one preferred conveyance service request, or a combination thereof.

All or some of conveyance data relating to at least one autonomous vehicle can be filtered and identified as preferred, instead of or substituted with at least one conveyance service request. All or some of conveyance data relating to at least one autonomous vehicle can be filtered and identified as preferred via at least one process of filtering and identifying at least one preferred conveyance service request. All or some of conveyance data relating to at least one autonomous vehicle can be filtered, identified as preferred, and secured or obtained relating to at least one selected preference, at least one real time or near real time geographical location of at least one autonomous vehicle, or a combination thereof.

All or some of conveyance data can be but is not limited to any data or information relating to at least one conveyance service request, at least one filtered conveyance service request, at least one preferred conveyance service request, at least one autonomous vehicle, at least one autonomous vehicle that can be filtered, at least one autonomous vehicle that can be identified as preferred, or a combination thereof, can be pre-filtered or pre-categorized. All or some of conveyance data relating to at least one autonomous vehicle can be pre-filtered or pre-categorized. All or some of conveyance data relating to at least one autonomous vehicle, all or some of filtered conveyance data relating to at least one autonomous vehicle, or a combination thereof, can be pre-filtered or pre-categorized based on all or some of at least one real time or near real time geographical location of at least one autonomous vehicle.

Conveyance data can be for example used by at least one central server, at least one external server, at least one application, at least one owner or controller application, at least one representative, at least one owner or at least one controller of at least one autonomous vehicle, at least one autonomous vehicle, at least one service provider, at least one good supplier, at least one fleet manager, at least one logistics provider, at least one logistics supplier, or a combination thereof, to analyze or evaluate and then secure or obtain at least one preferred conveyance service request for or with at least one autonomous vehicle, at least one autonomous vehicle that can be identified as preferred, or a combination thereof.

Conveyance data can be optimized to identify at least one preferred conveyance service request. Conveyance data can include but is not limited to optimization data that can come from at least one autonomous vehicle, at least one autonomous vehicle sensor, at least one sensor data, at least one third party provider, at least one mapping provider, at least one remote server, at least one external server, at least one service provider, or the like. Conveyance data can for example, include but is not limited to, demographic data relating to at least one geographical area, at least one conveyance service request, all or some of conveyance data, all or some of conveyance data relating to at least one autonomous vehicle, at least one conveyance client, at least one representative, at least one autonomous vehicle, at least one owner or at least one controller of at least one autonomous vehicle, at least one service provider, at least one good supplier, at least one fleet manager, at least one logistics provider, at least one logistics supplier, or a combination thereof. Conveyance data can include but is not limited to at least one statistical variable of at least one filtered conveyance service request. Conveyance data can include but is not limited to at least one statistical variable of at least one preferred conveyance service request.

All or some of conveyance data relating to at least one autonomous vehicle can be all or some data relating to at least one autonomous vehicle. All or some of conveyance data relating to at least one autonomous vehicle can include but is not limited to at least one real time or near real time geographical location of at least one autonomous vehicle.

As a non-limiting example, conveyance data can preferably be in real time or near real time and can include but is not limited to at least one beginning service geographical location, at least one ending service geographical location, pricing information, elevated pricing information, at least one representative preference, at least one selected preference, at least one distance parameter, at least one estimated time of arrival, at least one time to destination, at least one conveyance client geographical location, at least one conveyance client review, at least one conveyance client rating, at least one conveyance client detail, at least one conveyance service detail, at least one conveyance service route, at least one preferred conveyance client, at least one sensor data, at least one representative geographical location, at least one representative review, at least one representative rating, at least one representative detail, at least one autonomous vehicle geographical location, at least one autonomous vehicle review, at least one autonomous vehicle rating, at least one autonomous vehicle detail, at least one preferred autonomous vehicle, at least one route planning preference, at least one fuel economy preference, at least one battery longevity preference, at least one vehicle capacity preference, at least one vehicle diagnostic preference, at least one conveyance data preference, at least one service provider geographical location, at least one service provider review, at least one service provider rating, at least one service provider detail, at least one preferred service provider, at least one good supplier geographical location, at least one good supplier review, at least one good supplier rating, at least one good supplier detail, at least one preferred good supplier, at least one owner or at least one controller of at least one autonomous vehicle geographical location, at least one owner or at least one controller of at least one autonomous vehicle review, at least one owner or at least one controller of at least one autonomous vehicle rating, at least one owner or at least one controller of at least one autonomous vehicle detail, at least one preferred owner or at least one preferred controller of at least one autonomous vehicle, at least one fleet manager geographical location, at least one fleet manager review, at least one fleet manager rating, at least one fleet manager detail, at least one preferred fleet manager, at least one logistics provider geographical location, at least one logistics provider review, at least one logistics provider rating, at least one logistics provider detail, at least one preferred logistics provider, at least one logistics supplier geographical location, at least one logistics supplier review, at least one logistics supplier rating, at least one logistics supplier detail, at least one preferred logistics supplier, at least one conveyance industry segment detail, at least one preferred conveyance industry segment, at least one good detail, at least one item detail, at least one type of vehicle detail, at least one vehicle detail, at least one measurement of at least one statistical variable, at least one level of service detail, at least one fuel consumption, at least one battery level, at least one vehicle diagnostic, at least one vehicle capacity, or a combination thereof.

As a non-limiting example, at least one sensor data relating to at least one autonomous vehicle can be communicated to at least one other autonomous vehicle, at least one service provider, at least one good supplier, at least one owner or at least one controller of at least one autonomous vehicle, at least one fleet manager, at least one logistics provider, at least one logistics supplier, or a combination thereof. As a non-limiting example, at least one sensor data relating to at least one autonomous vehicle to can be communicated to at least one central server, at least one external server, at least one application, at least one terminal, at least one owner or controller application, or a combination thereof. As a non-limiting example, at least one sensor data can be used to communicate at least one status of at least one autonomous vehicle.

As a non-limiting example, at least one sensor data can be used to communicate at least one battery level of at least one autonomous vehicle, at least one fleet of at least one autonomous vehicle, or a combination thereof. As a non-limiting example, at least one sensor data can be used to communicate at least one status of at least one autonomous vehicle when at least one Autonomous Vehicle Automated Platform can be analyzing or evaluating and preferably securing or obtaining at least one preferred conveyance service request for or with at least one autonomous vehicle, at least one autonomous vehicle that can be identified as preferred, or a combination thereof.

As a non-limiting example, at least one sensor data can be used to find, locate, update, filter, identify, or a combination thereof, at least one real time or near real time geographical location of at least one autonomous vehicle or at least one real time or near real time geographical location of at least one fleet of at least one autonomous vehicle. As a non-limiting example, at least one real time or near real time geographical location of at least one autonomous vehicle can be based on or related to at least one sensor data. As a non-limiting example, at least one sensor data can be used by Autonomous Vehicle Automated Platform that can analyze or evaluate and then secure or obtain at least one preferred conveyance service request, at least one autonomous vehicle that can be identified as preferred, all or some of preferred conveyance data relating to at least one autonomous vehicle, or a combination thereof.

As a non-limiting example, when all or some of conveyance data relating to at least one autonomous vehicle is considered, all or some of conveyance data relating to at least one fleet of at least one autonomous vehicle, can also be considered. As a non-limiting example, when all or some of conveyance data relating to at least one fleet of at least one autonomous vehicle is considered, all or some of filtered conveyance data relating to at least one fleet of at least one autonomous vehicle, all or some of preferred conveyance data relating to at least one fleet of at least one autonomous vehicle, or a combination thereof, can also be considered. As a non-limiting example, all or some of preferred conveyance data relating to at least one fleet of at least one autonomous vehicle can be identified from all or some of filtered conveyance data relating to at least one fleet of at least one autonomous vehicle that can have at least one highest weighted average of at least one representative preference or at least one highest weighted average of at least one selected preference.

As a non-limiting example, conveyance data can be generated or provided from at least one central server, at least one external server, at least one terminal, at least one application, at least one owner or controller application, or a combination thereof. As a non-limiting example, conveyance data relating to at least one autonomous vehicle or at least one conveyance service request can be sourced or provided by at least one external server relating to at least one owner or at least one controller of at least one autonomous vehicle, at least one service provider, at least one good supplier, at least one fleet manager, at least one logistics provider, at least one logistics supplier, or the like. As a non-limiting example, conveyance data relating to at least one autonomous vehicle such as at least one real time or near real time geographical location of at least one autonomous vehicle can be sourced or provided by at least one autonomous vehicle. As a non-limiting example, conveyance data relating to at least one autonomous vehicle such as at least one real time or near real time geographical location of at least one autonomous vehicle can be sourced or provided by at least one external server. As a non-limiting example, all or some of conveyance data can be communicated with at least one application, at least one owner or controller application, at least one autonomous vehicle, at least one terminal, at least one central server, at least one external server, at least one link, or a combination thereof, that can be combined or integrated.

As a non-limiting example, all or some of conveyance data sourced or provided by at least one autonomous vehicle can be sourced from at least one various type of input such as at least one sensor, at least one transceiver, at least one receiver, at least one interface, at least one application, at least one terminal, or the like.

As a non-limiting example, all or some of conveyance data relating to at least one autonomous vehicle or at least one conveyance service request, can include optimization data that can be provided by at least one third party map provider to be utilized with route planning and identifying at least one preferred conveyance service request, at least one autonomous vehicle that can be identified as preferred, or a combination thereof.

As a non-limiting example, conveyance data relating to at least one autonomous vehicle can be used to analyze or evaluate at least one conveyance service request in real time or near real time by at least one owner or at least one controller of at least one autonomous vehicle, at least one service provider, at least one good supplier, at least one fleet manager, at least one logistics provider, at least one logistics supplier, or the like.

As a non-limiting example, conveyance data can relate to at least one battery level of at least one device or at least one terminal belonging to at least one conveyance client. As a non-limiting example, conveyance data can include but is not limited to milestones, awards, incentives, number of rides completed, monetary earnings, financial information, or scheduling information. As a non-limiting example, all or some of conveyance data can include for example at least one vehicle detail or at least one autonomous vehicle detail, which can be utilized to identify at least one preferred vehicle type, at least one preferred vehicle service, or a combination thereof.

Conveyance Service Request

At least one conveyance service request can be for example at least one request from at least one conveyance client or at least one entity for the transportation of including but not limited to at least one person, at least one good, at least one article, at least one thing, or a combination thereof, from at least one geographical location to at least one other geographical location. Once, for example, at least one beginning service geographical location, at least one ending service geographical location, or a combination thereof, is inputted or provided into at least one application, at least one central server or at least one external server, at least one conveyance service request relating to at least one conveyance client can be generated. When at least one conveyance service request is considered, at least one conveyance service request in conjunction with corresponding conveyance data can also be considered.

At least one conveyance service request in conjunction with corresponding conveyance data can be sourced or provided from, including but not limited to, at least one external server, at least one service provider, at least one good supplier, at least one fleet manager, or the like. At least one conveyance service request can be stored or cached in at least one computer readable memory and/or at least one database of at least one central server. At least one conveyance service request can relate to at least one conveyance industry segment. At least one conveyance service request can relate to at least one service provider, at least one good supplier, at least one fleet manager, at least one owner or at least one controller of at least one autonomous vehicle, at least one logistics provider, at least one logistics supplier, or a combination thereof.

All or some of at least one conveyance service request can have or be associated with corresponding conveyance data. All or some of at least one conveyance service request can have or be associated with intrinsic conveyance data that can be stored in at least one database. All or some of at least one conveyance service request can be associated with or inherently have associated conveyance data that can be used to filter and identify at least one preferred conveyance service request to be secured or obtained for or with at least one autonomous vehicle that can be identified as preferred.

At least one conveyance service request can be updated or refreshed in real time or near real time and can refer to being updated or refreshed in the highest level of development or state of the art. At least one conveyance service request can be pre-filtered or pre-categorized on at least one central server. At least one conveyance service request can be at least one filtered conveyance service request, at least one preferred conveyance service request, or a combination thereof, relating to at least one selected preference or at least one representative preference. At least one conveyance service request can become at least one filtered conveyance service request, at least one preferred conveyance service request, or a combination thereof, based on at least one representative preference inputted or provided by at least one representative. At least one conveyance service request can become at least one filtered conveyance service request, at least one preferred conveyance service request, or a combination thereof, based on at least one selected preference inputted or provided by at least one owner or at least one controller of at least one autonomous vehicle, at least one service provider, at least one good supplier, at least one fleet manager, at least one logistics provider, at least one logistics supplier, or the like.

At least one conveyance service request can be filtered once or more than once. Any time at least one conveyance service request can be filtered into at least one filtered conveyance service request or identified as at least one preferred conveyance service request, all or some of conveyance data relating to at least one autonomous vehicle can optionally be filtered into all or some of filtered conveyance data relating to at least one autonomous vehicle or identified as all or some of preferred conveyance data relating to at least one autonomous vehicle.

As a non-limiting example, at least one conveyance service request can be at least one ride-hail service request, at least one ride-share service request, at least one car-share service request, at least one peer-to-peer conveyance service request, at least one transportation service request, at least one person delivery service request, at least one taxi service request, at least one shuttle service request, at least one good delivery service request, at least one item delivery service request, at least one medical service and delivery request, at least one food delivery service request, at least one courier delivery service request, at least one freight delivery service request, at least one animal delivery service request, at least one delivery service request, or a combination thereof.

As a non-limiting example, at least one conveyance service request can be perceived or referred to as at least one filtered conveyance service request or at least one preferred conveyance service request. As a non-limiting example, at least one conveyance service request can be identified or referred to as at least one filtered conveyance service request or at least one preferred conveyance service request for or with at least one representative, at least one autonomous vehicle, at least one fleet of at least one autonomous vehicle, at least one owner or at least one controller of at least one autonomous vehicle, at least one service provider, at least one good supplier, at least one fleet manager, at least one logistics provider, at least one logistics supplier, or a combination thereof. As a non-limiting example, at least one conveyance service request can include at least one waypoint. As a non-limiting example, at least one conveyance service request can include at least one waypoint where at least one conveyance client can walk to at least one designated area to be picked up for at least one conveyance service. As a non-limiting example, if at least one conveyance service request is secured or obtained, that same at least one secured or obtained conveyance service request can be referred to or identified as at least one preferred conveyance service request.

As a non-limiting example, at least one conveyance service request can be pre-scheduled. As a non-limiting example, at least one thing to be conveyed can include but is not limited to at least one personal item such as but not limited to keys or documents. As a non-limiting example, at least one conveyance service request can include special request information. As a non-limiting example, at least one conveyance service request can be stored or cached in at least one computer readable memory and/or at least one database of at least one application. As a non-limiting example, at least one conveyance service request can relate to at least one individual conveyance industry segment. As a non-limiting example, at least one conveyance service request can relate to at least one individual service provider, at least one individual good supplier, at least one individual fleet manager, or the like. As a non-limiting example, at least one conveyance service request can be at least one pre-filtered conveyance service request. As a non-limiting example, a plurality of conveyance service requests can be a single conveyance service request. As a non-limiting example, at least one conveyance service request can be pre-filtered or pre-categorized on at least one central server based on at least one geographical location.

As a non-limiting example, at least one conveyance service request can optionally be perceived as or treated the same or similar as, all or some of conveyance data relating to at least one autonomous vehicle. As a non-limiting example, at least one conveyance service request, all or some of conveyance data relating to at least one autonomous vehicle, or a combination thereof, can be filtered in either order. As a non-limiting example, all or some of conveyance data corresponding to at least one conveyance service request, all or some of conveyance data relating to at least one autonomous vehicle, or a combination thereof, can be stored in at least one database table.

As a non-limiting example, at least one conveyance service request can be filtered with including but not limited to at least one selected preference, at least one real time or near real time geographical location of at least one fleet of at least one autonomous vehicle, or a combination thereof. As a non-limiting example, any time at least one conveyance service request can be filtered into at least one filtered conveyance service request or identified as at least one preferred conveyance service request, all or some of conveyance data relating to at least one fleet of at least one autonomous vehicle can optionally be filtered into all or some of filtered conveyance data relating to at least one fleet of at least one autonomous vehicle or identified as all or some of preferred conveyance data relating to at least one fleet of at least one autonomous vehicle.

Filtered Conveyance Service Request

At least one filtered conveyance service request can be for example at least one conveyance service request that can be filtered with including but not limited to at least one representative preference, at least one selected preference, at least one real time or near real time geographical location of at least one representative, at least one real time or near real time geographical location of at least one autonomous vehicle, or a combination thereof. When at least one filtered conveyance service request is considered, at least one filtered conveyance service request in conjunction with corresponding conveyance data can also be considered.

At least one filtered conveyance service request can be stored or cached in at least one computer readable memory and/or at least one database of at least one central server. When at least one representative preference or at least one selected preference is updated, modified, added, removed, and/or refreshed, at least one new set of at least one filtered conveyance service request can be generated. At least one filtered conveyance service request can relate to at least one conveyance industry segment. At least one filtered conveyance service request can relate to at least one service provider, at least one good supplier, at least one fleet manager, at least one owner or at least one controller of at least one autonomous vehicle, at least one logistics provider, at least one logistics supplier, or a combination thereof.

All or some of at least one filtered conveyance service request can have or be associated with corresponding conveyance data. All or some of at least one filtered conveyance service request can have or be associated with intrinsic conveyance data that can be stored in at least one database. All or some of at least one filtered conveyance service request can be associated with or inherently have associated conveyance data that can be used to identify at least one preferred conveyance service request to be secured or obtained for or with at least one autonomous vehicle that can be identified as preferred.

At least one filtered conveyance service request can be updated or refreshed in real time or near real time and can refer to being updated or refreshed in the highest level of development or state of the art. At least one filtered conveyance service request can be pre-filtered or pre-categorized on at least one central server. At least one filtered conveyance service request can be at least one conveyance service request that matches or satisfies at least one representative preference or at least one selected preference. At least one filtered conveyance service request can become at least one preferred conveyance service request based on at least one selected preference inputted or provided by at least one owner or at least one controller of at least one autonomous vehicle, at least one service provider, at least one good supplier, at least one fleet manager, at least one logistics provider, at least one logistics supplier, or the like.

At least one filtered conveyance service request can be filtered once or more than once. Any time at least one filtered conveyance service request can be identified as at least one preferred conveyance service request, all or some of filtered conveyance data relating to at least one autonomous vehicle can optionally be identified as all or some of preferred conveyance data relating to at least one autonomous vehicle.

As a non-limiting example, at least one filtered conveyance service request can be displayed on at least one application or at least one owner or controller application. As a non-limiting example, at least one filtered conveyance service request can be displayed on at least one geographical map of at least one visual representation. As a non-limiting example, at least one filtered conveyance service request can relate to at least one individual conveyance industry segment. As a non-limiting example, at least one filtered conveyance service request can relate to at least one individual service provider, at least one individual good supplier, at least one individual fleet manager, or the like. As a non-limiting example, if at least one representative, at least one owner or at least one controller of at least one autonomous vehicle, at least one service provider, at least one good supplier, at least one fleet manager, at least one logistics provider, at least one logistics supplier, or a combination thereof, secures or obtains at least one filtered conveyance service request, that same at least one secured or obtained filtered conveyance service request can be referred to or identified as at least one preferred conveyance service request. As a non-limiting example, at least one filtered conveyance service request can be at least one pre-filtered conveyance service request. As a non-limiting example, at least one filtered conveyance service request can be perceived or referred to as at least one conveyance service request. As a non-limiting example, a plurality of filtered conveyance service requests can be a single filtered conveyance service request.

As a non-limiting example, at least one filtered conveyance service request can optionally be perceived as or treated the same or similar as, all or some of filtered conveyance data relating to at least one autonomous vehicle. As a non-limiting example, at least one filtered conveyance service request, all or some of filtered conveyance data relating to at least one autonomous vehicle, or a combination thereof, can be identified as preferred, in either order. As a non-limiting example, all or some of conveyance data corresponding to at least one filtered conveyance service request, all or some of filtered conveyance data relating to at least one autonomous vehicle, or a combination thereof, can be stored in at least one database table.

As a non-limiting example, at least one filtered conveyance service request can be for example at least one conveyance service request that can be filtered with, including but not limited to, at least one selected preference, at least one real time or near real time geographical location of at least one fleet of at least one autonomous vehicle, or a combination thereof. As a non-limiting example, any time at least one filtered conveyance service request can be identified as at least one preferred conveyance service request, all or some of filtered conveyance data relating to at least one fleet of at least one autonomous vehicle can optionally be identified as all or some of preferred conveyance data relating to at least one fleet of at least one autonomous vehicle.

Preferred Conveyance Service Request

At least one preferred conveyance service request can be for example at least one request for transporting including but not limited to at least one person, at least one good, at least one thing, at least one article, or a combination thereof, from at least one geographical location to at least one other geographical location that can be identified from at least one filtered conveyance service request. At least one preferred conveyance service request can be for example at least one request that including but not limited to at least one central server, at least one representative, at least one application, at least one owner or controller application, at least one owner or at least one controller of at least one autonomous vehicle, at least one autonomous vehicle, at least one service provider, at least one good supplier, at least one fleet manager, at least one logistics provider, at least one logistics supplier, or a combination thereof, identifies as preferred. When at least one preferred conveyance service request is considered, at least one preferred conveyance service request in conjunction with corresponding conveyance data can also be considered.

At least one preferred conveyance service request can be stored or cached in at least one computer readable memory and/or at least one database of at least one central server. At least one preferred conveyance service request can for example be originally sourced or provided by at least external server, at least one service provider, at least one good supplier, at least one fleet manager, or the like. At least one preferred conveyance service request can be at least one conveyance service request or at least one filtered conveyance service request that matches or satisfies at least one representative preference or at least one selected preference. At least one filtered conveyance service request can be identified as preferred by at least one central server, at least one representative, at least one application, at least one owner or controller application, at least one owner or at least one controller of at least one autonomous vehicle, at least one autonomous vehicle, at least one service provider, at least one good supplier, at least one fleet manager, at least one logistics provider, at least one logistics supplier, or a combination thereof, and then at least one filtered conveyance service request can become at least one preferred conveyance service request.

All or some of at least one preferred conveyance service request can have or be associated with corresponding conveyance data. All or some of at least one preferred conveyance service request can have or be associated with intrinsic conveyance data that can be stored in at least one database. All or some of at least one preferred conveyance service request can be associated with or inherently have associated conveyance data, that can be used to secure or obtain at least one preferred conveyance service request for or with at least one autonomous vehicle that can be identified as preferred.

Any time at least one preferred conveyance service request can be identified, all or some of preferred conveyance data relating to at least one autonomous vehicle can optionally be identified and at least one preferred conveyance service request can be secured or obtained for or with at least one autonomous vehicle that can be identified as preferred.

At least one preferred conveyance service request can be updated or changed in real time or near real time as at least one real time or near real time geographical location of at least one representative or at least one autonomous vehicle changes or updates. At least one preferred conveyance service request can relate to at least one conveyance industry segment. At least one preferred conveyance service request can relate to at least one service provider, at least one good supplier, at least one fleet manager, at least one owner or at least one controller of at least one autonomous vehicle, at least one logistics provider, at least one logistics supplier, or a combination thereof. At least one preferred conveyance service request can be updated or refreshed in real time or near real time and can refer to being updated or refreshed in the highest level of development or state of the art.

At least one conveyance service request can be filtered in real time or near real time by using at least one representative preference or at least one selected preference to create at least one set of at least one filtered conveyance service request. At least one filtered conveyance service request can preferably be sorted in real time or near real time relating to at least one weighted average of at least one representative preference or at least one selected preference to identify at least one preferred conveyance service request. At least one preferred conveyance service request can be identified as preferred with at least one highest weighted average of at least one representative preference. At least one preferred conveyance service request can be identified as preferred with at least one highest weighted average of at least one selected preference. When at least one representative preference or at least one selected preference is updated, modified, added, removed, and/or refreshed, at least one new set of at least one preferred conveyance service request can be generated or identified.

As a non-limiting example, at least one preferred conveyance service request can be updated in real time or near real time as traffic information changes or updates. As a non-limiting example, at least one different geographical location can be used other than at least one real time or near real time geographical location of at least one representative or the like, when filtering at least one conveyance service request, to identify at least one preferred conveyance service request. As a non-limiting example, at least one preferred conveyance service request can relate to at least one individual conveyance industry segment. As a non-limiting example, at least one preferred conveyance service request can relate to at least one individual service provider, at least one individual good supplier, at least one individual fleet manager, or the like.

As a non-limiting example, at least one preferred conveyance service request can be visually identifiable from at least one filtered conveyance service request displayed on at least one visual representation. As a non-limiting example, at least one preferred conveyance service request can be displayed on at least one geographical map of at least one visual representation. As a non-limiting example, at least one preferred conveyance service request can be displayed on at least one application or at least one owner or controller application. As a non-limiting example, at least one application or at least one owner or controller application can secure or obtain at least one preferred conveyance service request. As a non-limiting example, at least one central server, at least one application, at least one owner or controller application, or a combination thereof, can secure or obtain at least one preferred conveyance service request for or with at least one autonomous vehicle that can be identified as preferred.

As a non-limiting example, at least one preferred conveyance service request can be identified from at least one filtered conveyance service request that has at least one highest weighted average of at least one representative preference or at least one selected preference. As a non-limiting example, at least one representative preference or at least one selected preference can have at least one equal weight or at least one unequal weight when using at least one weighted average to identify at least one preferred conveyance service request. As a non-limiting example, at least one preferred conveyance service request can be perceived or referred to as at least one conveyance service request or at least one filtered conveyance service request. As a non-limiting example, more than one preferred conveyance service requests can be secured or obtained concurrently for or with at least one autonomous vehicle that can be identified as preferred.

As a non-limiting example, at least one preferred conveyance service request can optionally be perceived as or treated the same or similar as all or some of preferred conveyance data relating to at least one autonomous vehicle. As a non-limiting example, at least one preferred conveyance service request, all or some of preferred conveyance data relating to at least one autonomous vehicle, or a combination thereof, can be identified as preferred, in any order. As a non-limiting example, all or some of conveyance data corresponding to at least one preferred conveyance service request, all or some of preferred conveyance data relating to at least one autonomous vehicle, or a combination thereof, can be stored in at least one database table. As a non-limiting example, any time at least one preferred conveyance service request can be identified, all or some of preferred conveyance data relating to at least one fleet of at least one autonomous vehicle can optionally be identified and at least one preferred conveyance service request can be secured or obtained for or with at least one fleet of at least one autonomous vehicle that can be identified as preferred.

Representative Preference

At least one representative preference can be at least one rule or at least one parameter that can for example be used to facilitate at least one operation or at least one function to secure or obtain at least one preferred conveyance service request, at least one autonomous vehicle that can be identified as preferred, or a combination thereof. At least one representative preference can be at least one rule or at least one parameter that can for example be utilized or operated by at least one owner or at least one controller of at least one autonomous vehicle, at least one service provider, at least one good supplier, at least one fleet manager, at least one logistics provider, at least one logistics supplier, or a combination thereof. At least one representative preference can be any rule or parameter that can be used or utilized during at least one process of filtering and/or identifying at least one preferred conveyance service request, at least one autonomous vehicle that can be identified as preferred, or a combination thereof.

At least one representative preference can be at least one rule or at least one parameter that can optimize all or some of conveyance data, all or some of conveyance data relating to at least one autonomous vehicle, at least one autonomous vehicle, at least one conveyance service request, or a combination thereof. At least one representative preference can relate directly or indirectly to at least one preferred conveyance service request, at least one autonomous vehicle that can be identified as preferred, all or some of preferred conveyance data relating to at least one autonomous vehicle, or a combination thereof. At least one representative preference can be associated with or have at least one feature or at least one various feature that can be used to match at least one autonomous vehicle or at least one autonomous vehicle that can be identified as preferred for or with at least one preferred conveyance service request, at least one conveyance client, or a combination thereof. At least one representative preference can be at least one rule implemented in at least one rules based system, at least one rules based method, or a combination thereof.

At least one representative preference can for example be used by at least one representative to identify and preferably secure or obtain at least one preferred conveyance service request. At least one representative preference can include but is not limited to at least one option for example selected or provided by at least one representative to filter and/or preferably sort at least one conveyance service request in real time or near real time in order to identify at least one preferred conveyance service request. At least one representative preference can be used in conjunction with at least one real time or near real time geographical location of at least one representative or at least one different geographical location to filter at least one conveyance service request into at least one filtered conveyance service request. At least one filtered conveyance service request can preferably be sorted in real time or near real time in at least one order relating to at least one weighted average of at least one representative preference to identify at least one preferred conveyance service request. At least one representative can input or provide at least one representative preference into at least one application that can be used to identify and preferably secure or obtain at least one preferred conveyance service request.

At least one representative preference can be stored or cached on including but not limited to at least one central server, at least one application, at least one external server, or a combination thereof. At least one representative preference can be stored or cached on or transmitted to including but not limited to at least one central server, at least one application, at least one external server, or a combination thereof. At least one representative preference can be pre-set on including but not limited to at least one central server, at least one external server, at least one application, or a combination thereof. At least one representative preference can be either inclusive or exclusive for filtering or the like at least one conveyance service request. At least one individual representative preference can have at least one equal weight or at least one unequal weight when calculating at least one weighted average to identify at least one preferred conveyance service request. At least one representative can optionally choose at least one weight for at least one representative preference to have at least one equal weight or at least one unequal weight.

At least one representative preference can be updated or refreshed in real time or near real time and can refer to being updated or refreshed in the highest level of development or state of the art. At least one representative preference can be used to perform at least one function in real time or near real time being updated or refreshed in the highest level of development or state of the art.

At least one central server, at least one application, or a combination thereof, can filter out, hide, or remove at least one conveyance service request that does not meet at least one representative preference criteria for at least one representative. At least one representative preference can be updated or changed and at least one new or different set of including but not limited to at least one filtered conveyance service request, at least one preferred conveyance service request, or a combination thereof, can be identified. At least one representative preference can be used to identify at least one preferred conveyance service request from at least one filtered conveyance service request or at least one pre-filtered conveyance service request. At least one representative preference can be used for at least one conveyance industry segment. At least one representative preference can be used for at least one service provider.

As a non-limiting example, at least one representative preference can be but is not limited to at least one pricing preference, at least one elevated pricing preference, at least one geographical location preference, at least one distance preference, at least one route preference, at least one service duration preference, at least one beginning service geographical location preference, at least one ending service geographical location preference, at least one time preference, at least one predictive preference, at least one historical preference, at least one efficiency preference, at least one event inclusion preference, at least one event exclusion preference, at least one traffic based preference, at least one road condition preference, at least one weather condition preference, at least one duration of conveyance service preference, at least one conveyance service request density preference, at least one conveyance client density preference, at least one conveyance client detail preference, at least one conveyance client rating preference, at least one representative density preference, at least one service provider inclusion preference, at least one service provider exclusion preference, at least one service provider density preference, at least one level of service preference, at least one good supplier inclusion preference, at least one good supplier exclusion preference, at least one good supplier density preference, at least one good detail preference, at least one conveyance industry segment preference, at least one freight preference, at least one waypoint preference, at least one delivery service preference, or a combination thereof.

As a non-limiting example, at least one efficiency preference can be at least one parameter or at least one rule that can optimize vehicle utilization. As a non-limiting example, if at least one efficiency preference is selected, at least one representative can accept at least one additional food delivery service request for the same restaurant to perform at least one additional conveyance service and earn more money. As a non-limiting example, if at least one price preference is selected, then preferably at least one conveyance service request priced higher than at least one set minimum price can be identified as at least one preferred conveyance service request. As a non-limiting example, if a distance preference is selected, then preferably at least one conveyance service request within a selected distance can be identified as at least one preferred conveyance service request. As a non-limiting example, al least one good detail preference can include at least one item being fragile. As a non-limiting example, if at least one good detail preference is selected, then preferably at least one conveyance service request for conveying at least one certain type and/or quantity of at least one good that at least one representative is capable of delivering can be identified as at least one preferred conveyance service request, such as the capability to deliver at least one refrigerator or at least one mirror. As a non-limiting example, if at least one freight preference is selected, then preferably at least one conveyance service request for conveying freight that at least one representative is capable of delivering can be identified as at least one preferred conveyance service request, such as at least one conveyance service request to deliver at least one biohazardous material or at least one flammable material.

As a non-limiting example, when at least one individual representative preference has at least one unequal weight, at least one pricing preference can have 70% weight and at least one distance preference can have 30% weight which can be used to identify at least one preferred conveyance service request when determining which at least one filtered conveyance service request has the highest weighted average.

As a non-limiting example, at least one representative preference can be used for at least one individual conveyance industry segment. As a non-limiting example, at least one representative preference can be used for at least one individual service provider. As a non-limiting example, at least one representative can specify at least one representative preference to work in at least one given area by using at least one geographical location preference. As a non-limiting example, at least one representative can specify at least one representative preference to work in a six-mile perimeter by using at least one geographical location preference.

As a non-limiting example, at least one representative preference, once inputted or provided into at least one application, can be stored or cached on at least one application, at least one computer readable memory of at least one central server, or a combination thereof, and at least one representative preference is not inputted or provided again into at least one application by at least one representative. As a non-limiting example, at least one representative preference can be stored or cached in at least one computer readable memory of at least one central server and at least one representative preference is not transmitted again from at least one application to at least one central server. As a non-limiting example, at least one representative preference, at least one real time or near real time geographical location of at least one representative, or a combination thereof, can be transmitted from at least one application to at least one central server at any time prior to filtering or the like at least one conveyance service request. As a non-limiting example, at least one representative preference and at least one selected preference can be used to manage or operate at least one representative and at least one autonomous vehicle in at least one Representative Automated Platform, at least one Autonomous Vehicle Automated Platform, or a combination thereof.

Selected Preference

At least one selected preference can be at least one rule or at least one parameter that can for example be used to facilitate at least one operation or at least one function to secure or obtain at least one preferred conveyance service request, at least one autonomous vehicle that can be identified as preferred, or a combination thereof. At least one selected preference can be at least one rule or at least one parameter that can for example be utilized or operated by at least one owner or at least one controller of at least one autonomous vehicle, at least one service provider, at least one good supplier, at least one fleet manager, at least one logistics provider, at least one logistics supplier, or a combination thereof. At least one selected preference can be any rule or parameter that can be used or utilized during at least one process of filtering and/or identifying at least one preferred conveyance service request, at least one autonomous vehicle that can be identified as preferred, or a combination thereof.

At least one selected preference can be at least one rule or at least one parameter that can optimize all or some of conveyance data, all or some of conveyance data relating to at least one autonomous vehicle, at least one autonomous vehicle, at least one conveyance service request, or a combination thereof. At least one selected preference can relate directly or indirectly to at least one preferred conveyance service request, at least one autonomous vehicle that can be identified as preferred, all or some of preferred conveyance data relating to at least one autonomous vehicle, or a combination thereof. At least one selected preference can be associated with or have at least one feature or at least one various feature that can be used to match at least one autonomous vehicle or at least one autonomous vehicle that can be identified as preferred for or with at least one preferred conveyance service request, at least one conveyance client, or a combination thereof. At least one selected preference can be at least one rule implemented in at least one rules based system, at least one rules based method, or a combination thereof.

At least one selected preference can for example be used by at least one owner or at least one controller of at least one autonomous vehicle, at least one service provider, at least one good supplier, at least one fleet manager, at least one logistics provider, at least one logistics supplier, or a combination thereof, to identify and preferably secure or obtain at least one preferred conveyance service request, at least one autonomous vehicle, at least one autonomous vehicle that can be identified as preferred, or a combination thereof. At least one selected preference or at least one set of at least one selected preference can be used to filter, identify as preferred, secure or obtain, or a combination thereof, at least one preferred conveyance service request. At least one different selected preference or at least one different set of at least one selected preference can be used to filter, identify as preferred, secure or obtain, or a combination thereof, at least one autonomous vehicle that can be identified as preferred. At least one selected preference or at least one set of at least one selected preference can be used to filter, identify as preferred, secure or obtain, or a combination thereof, at least one autonomous vehicle that can be identified as preferred.

At least one selected preference can be refined or customized by at least one owner or at least one controller of at least one autonomous vehicle, at least one service provider, at least one good supplier, at least one fleet manager, at least one logistics provider, at least one logistics supplier, at least one third party, or a combination thereof. At least one selected preference can be fixed or built-in on at least one central server. At least one selected preference can be made not-editable. At least one selected preference can be at least one digit or at least one number.

At least one selected preference can be at least one tool, for example, at least one rule or at least one parameter to filter, identify, secure or obtain, or a combination thereof, at least one preferred conveyance service request, at least one filtered conveyance service request, at least one conveyance service request, or a combination thereof. At least one selected preference can be at least one tool, for example, at least one rule or at least one parameter to filter, identify, secure or obtain, or a combination thereof, at least one autonomous vehicle that can be identified as preferred, at least one autonomous vehicle that can be filtered, at least one autonomous vehicle, all or some of preferred conveyance data relating to at least one autonomous vehicle, all or some of filtered conveyance data relating to at least one autonomous vehicle, all or some of conveyance data relating to at least one autonomous vehicle, or a combination thereof.

At least one selected preference can be used to match or satisfy at least one preferred conveyance service request, at least one filtered conveyance service request, at least one conveyance service request, or a combination thereof, with at least one autonomous vehicle or at least one autonomous vehicle that can be identified as preferred. At least one selected preference can be used to match or satisfy at least one autonomous vehicle or at least one autonomous vehicle that can be identified as preferred for or with at least one preferred conveyance service request, at least one filtered conveyance service request, at least one conveyance service request, or a combination thereof. At least one selected preference can for example be utilized by at least one owner or at least one controller of at least one autonomous vehicle, at least one service provider, at least one good supplier, at least one fleet manager, at least one logistics provider, at least one logistics supplier, or a combination thereof, to identify and preferably secure or obtain at least one preferred conveyance service request for or with at least one autonomous vehicle that can be identified as preferred.

At least one selected preference can include but is not limited to at least one option for example selected or provided by at least one owner or at least one controller of at least one autonomous vehicle, at least one service provider, at least one good supplier, at least one fleet manager, at least one logistics provider, at least one logistics supplier, or a combination thereof, to filter and/or preferably sort, or the like, at least one conveyance service request in real time or near real time to identify at least one preferred conveyance service request. At least one selected preference can include but is not limited to at least one option for example selected or provided by at least one owner or at least one controller of at least one autonomous vehicle, at least one service provider, at least one good supplier, at least one fleet manager, at least one logistics provider, at least one logistics supplier, or a combination thereof, to filter and/or preferably sort, or the like, all or some of conveyance data relating to at least one autonomous vehicle in real time or near real time to identify all or some of preferred conveyance data relating to at least one autonomous vehicle or at least one autonomous vehicle that can be identified as preferred.

At least one selected preference can, for example, be used to filter and identify at least one preferred conveyance service request and then filter and identify at least one autonomous vehicle that can be identified as preferred, all or some of preferred conveyance data relating to at least one autonomous vehicle, or a combination thereof, and preferably be secured or obtained together. At least one selected preference can, for example, be used to filter and identify at least one autonomous vehicle that can be identified as preferred, all or some of preferred conveyance data relating to at least one autonomous vehicle, or a combination thereof, and then filter and identify at least one preferred conveyance service request and preferably be secured or obtained together.

At least one selected preference can be used to filter at least one conveyance service request, all or some of conveyance data relating to at least one autonomous vehicle, or a combination thereof, in any order prior to securing or obtaining at least one match between at least one preferred conveyance service request, at least one autonomous vehicle that can be identified as preferred, or a combination thereof. At least one selected preference can be used to identify at least one preferred conveyance service request, all or some of preferred conveyance data relating to at least one autonomous vehicle, at least one autonomous vehicle that can be identified as preferred, or a combination thereof, in any order prior to securing or obtaining at least one match between at least one preferred conveyance service request, at least one autonomous vehicle that can be identified as preferred, or a combination thereof.

At least one selected preference can have or be associated with at least one set of preferences or at least one set of parameters that can be used to filter and identify at least one preferred conveyance service request, at least one filtered conveyance service request, or a combination thereof. At least one selected preference can have or be associated with at least one set of preferences or at least one set of parameters that can be used to filter and identify all or some of preferred conveyance data relating to at least one autonomous vehicle, all or some of filtered conveyance data relating to at least one autonomous vehicle, or a combination thereof. At least one selected preference can have or be associated with at least one set of preferences or at least one set of parameters that can be used to filter and identify at least one preferred conveyance service request, at least one filtered conveyance service request, all or some of preferred conveyance data relating to at least one autonomous vehicle, all or some of filtered conveyance data relating to at least one autonomous vehicle, at least one autonomous vehicle that can be identified as preferred, at least one autonomous vehicle that can be filtered, or a combination thereof.

At least one selected preference can be pre-set on including but not limited to at least one central server, at least one external server, at least one application, at least one owner or controller application, at least one terminal, or a combination thereof. At least one selected preference can be either inclusive or exclusive for filtering or the like, at least one conveyance service request. At least one selected preference can be either inclusive or exclusive for identifying or the like, at least one preferred conveyance service request. At least one selected preference can be either inclusive or exclusive for filtering or the like, all or some of conveyance data relating to at least one autonomous vehicle. At least one selected preference can be either inclusive or exclusive for identifying or the like, all or some of preferred conveyance data relating to at least one autonomous vehicle, at least one autonomous vehicle that can be identified as preferred, or a combination thereof.

At least one individual selected preference can have at least one equal weight or at least one unequal weight when calculating at least one weighted average to identify at least one preferred conveyance service request, all or some of preferred conveyance data relating to at least one autonomous vehicle, at least one autonomous vehicle that can be identified as preferred, or a combination thereof. At least one filtered conveyance service request can preferably be sorted in real time or near real time in at least one order relating to at least one weighted average of at least one selected preference to identify at least one preferred conveyance service request. All or some of filtered conveyance data relating to at least one autonomous vehicle can preferably be sorted in real time or near real time in at least one order relating to at least one weighted average of at least one selected preference to identify all or some of preferred conveyance data relating to at least one autonomous vehicle, at least one autonomous vehicle that can be identified as preferred, or a combination thereof.

At least one owner or at least one controller of at least one autonomous vehicle, at least one service provider, at least one good supplier, at least one fleet manager, at least one logistics provider, at least one logistics supplier, or a combination thereof, can optionally choose at least one weight for at least one selected preference to have at least one equal weight or at least one unequal weight. At least one owner or at least one controller of at least one autonomous vehicle, at least one service provider, at least one good supplier, at least one fleet manager, at least one logistics provider, at least one logistics provider, at least one logistics supplier, or a combination thereof, can optionally choose at least one weight for at least one selected preference to filter, identify, secure or obtain, or a combination thereof, at least one preferred conveyance service request. At least one owner or at least one controller of at least one autonomous vehicle, at least one service provider, at least one good supplier, at least one fleet manager, at least one logistics provider, at least one logistics supplier, or a combination thereof, can optionally choose at least one weight for at least one selected preference to filter, identify, secure or obtain, or a combination thereof, at least one autonomous vehicle that can be identified as preferred or all or some of preferred conveyance data relating to at least one autonomous vehicle.

At least one selected preference can be used to filter at least one conveyance service request into at least one filtered conveyance service request. At least one selected preference can be used to identify at least one preferred conveyance service request from at least one filtered conveyance service request. At least one selected preference can be used to filter all or some of conveyance data relating to at least one autonomous vehicle into all or some of filtered conveyance data relating to at least one autonomous vehicle. At least one selected preference can be used to identify all or some of preferred conveyance data relating to at least one autonomous vehicle, at least one autonomous vehicle that can be identified as preferred, or a combination thereof, from all or some of filtered conveyance data relating to at least one autonomous vehicle.

As a non-limiting example, to identify at least one autonomous vehicle that can be identified as preferred, at least one selected preference can be used to filter and identify at least one autonomous vehicle that can be identified as preferred in at least one same or at least one similar process to filter and identify at least one preferred conveyance service request. As a non-limiting example, to identify all or some of preferred conveyance data relating to at least one autonomous vehicle, at least one selected preference can be used to filter and identify all or some of preferred conveyance data relating to at least one autonomous vehicle in at least one same or at least one similar process to filter and identify at least one preferred conveyance service request. As a non-limiting example, anytime at least one conveyance service request is going through at least one process to become filtered or identified as preferred, all or some of conveyance data relating to at least one autonomous vehicle can go through at least one same or at least one similar process.

At least one selected preference can be stored or cached on including but not limited to at least one central server, at least one application, at least one owner or controller application, at least one external server, at least one terminal, or a combination thereof. At least one selected preference can be stored or cached on or transmitted to including but not limited to at least one central server, at least one external server, at least one terminal, at least one application, at least one owner or controller application, or a combination thereof. At least one selected preference can be stored on or retrieved from at least one server that can be remote from at least one central server.

At least one selected preference can be stored or cached in at least one database. At least one selected preference can be used in at least one database to filter and identify at least one preferred conveyance service request, at least one filtered conveyance service request, at least one conveyance service request, or a combination thereof. At least one selected preference can be used in at least one database to filter and identify at least one autonomous vehicle that can be identified as preferred, at least one autonomous vehicle that can be filtered, at least one autonomous vehicle, all or some of preferred conveyance data relating to at least one autonomous vehicle, all or some of filtered conveyance data relating to at least one autonomous vehicle, all or some of conveyance data relating to at least one autonomous vehicle, or a combination thereof.

After identifying at least one preferred conveyance service request as at least one data set result from at least one database, at least one autonomous vehicle that can be identified as preferred can be identified as at least one data set result from at least one other database, and at least one preferred conveyance service request can be secured or obtained for or with at least one autonomous vehicle that can be identified as preferred. After identifying at least one autonomous vehicle that can be identified as preferred or all or some of preferred conveyance data relating to at least one autonomous vehicle as at least one data set result from at least one database, at least one preferred conveyance service request can be identified as at least one data set result from at least one other database, and at least one autonomous vehicle that can be identified as preferred can be secured or obtained for or with at least one preferred conveyance service request.

At least one owner or at least one controller of at least one autonomous vehicle, at least one service provider, at least one good supplier, at least one fleet manager, at least one logistics provider, at least one logistics supplier, or a combination thereof, can use at least one selected preference to filter and identify at least one preferred conveyance service request, at least one filtered conveyance service request, at least one conveyance service request, or a combination thereof. At least one owner or at least one controller of at least one autonomous vehicle, at least one service provider, at least one good supplier, at least one fleet manager, at least one logistics provider, at least one logistics supplier, or a combination thereof, can use at least one selected preference to filter and identify at least one autonomous vehicle that can be identified as preferred, at least one autonomous vehicle that can be filtered, at least one autonomous vehicle, all or some of preferred conveyance data relating to at least one autonomous vehicle, all or some of filtered conveyance data relating to at least one autonomous vehicle, all or some of conveyance data relating to at least one autonomous vehicle, or a combination thereof.

At least one owner or at least one controller of at least one autonomous vehicle, at least one service provider, at least one good supplier, at least one fleet manager, at least one logistics provider, at least one logistics supplier, or a combination thereof, can input or provide at least one selected preference into at least one owner or, controller application, at least one application, or at least one central server that can be used to identify and preferably secure or obtain at least one preferred conveyance service request for or with at least one autonomous vehicle that can be identified as preferred, at least one autonomous vehicle, or a combination thereof.

At least one owner or at least one controller of at least one autonomous vehicle, at least one service provider, at least one good supplier, at least one fleet manager, at least one logistics provider, at least one logistics supplier, or a combination thereof, can use at least one selected preference to manage, control, or operate at least one fleet of at least one autonomous vehicle. At least one owner or at least one controller of at least one autonomous vehicle, at least one service provider, at least one good supplier, at least one fleet manager, at least one logistics provider, at least one logistics supplier, or a combination thereof, can use at least one selected preference to manage, control, or operate at least one autonomous vehicle within at least one fleet of at least one autonomous vehicle.

At least one selected preference can be updated or refreshed in real time or near real time and can refer to being updated or refreshed in the highest level of development or state of the art. At least one selected preference can be used to perform at least one function in real time or near real time being updated or refreshed in the highest level of development or state of the art.

At least one selected preference can be updated or changed and at least one new or different set of including but not limited to at least one filtered conveyance service request, at least one preferred conveyance service request, or a combination thereof, can be identified. At least one selected preference can be updated or changed and at least one new or different set of including but not limited to all or some of filtered conveyance data relating to at least one autonomous vehicle, all or some of preferred conveyance data relating to at least one autonomous vehicle, at least one autonomous vehicle that can be identified as preferred, at least one autonomous vehicle that can be filtered, or a combination thereof.

At least one central server, at least one application, at least one owner or controller application, or a combination thereof, can for example, filter out, hide, or remove at least one conveyance service request that does not meet or match at least one selected preference criteria for at least one owner or at least one controller of at least one autonomous vehicle, at least one service provider, at least one good supplier, at least one fleet manager, at least one logistics provider, at least one logistics supplier, or the like. At least one central server, at least one application, at least one owner or controller application, or a combination thereof, can for example, filter out, hide, or remove all or some of conveyance data relating to at least one autonomous vehicle that does not meet or match at least one selected preference criteria for at least one owner or at least one controller of at least one autonomous vehicle, at least one service provider, at least one good supplier, at least one fleet manager, at least one logistics provider, at least one logistics supplier, or the like. At least one selected preference can be used in conjunction with at least one real time or near real time geographical location of at least one autonomous vehicle or at least one different geographical location to filter at least one conveyance service request into at least one filtered conveyance service request.

At least one selected preference can be used to identify at least one preferred conveyance service request from at least one filtered conveyance service request or at least one pre-filtered conveyance service request. At least one selected preference can be used to identify all or some of preferred conveyance data relating to at least one autonomous vehicle, at least one autonomous vehicle that can be identified as preferred, or a combination thereof, from all or some of filtered conveyance data relating to at least one autonomous vehicle or all or some of pre-filtered conveyance data relating to at least one autonomous vehicle.

At least one selected preference can be used by at least one owner or at least one controller of at least one autonomous vehicle, at least one service provider, at least one good supplier, at least one fleet manager, at least one logistics provider, at least one logistics supplier, or a combination thereof. At least one selected preference can be used by at least one owner or at least one controller of at least one autonomous vehicle, at least one service provider, at least one good supplier, at least one fleet manager, at least one logistics provider, at least one logistics supplier, or a combination thereof, operating in at least one conveyance industry segment.

At least one selected preference can be at least one rule or at least one parameter that can utilize at least one route planning information. At least one selected preference can be learned over time relating to at least one conveyance service request, all or some of conveyance data, all or some of conveyance data relating to at least one autonomous vehicle, at least one conveyance client, at least one representative, at least one autonomous vehicle, at least one owner or at least one controller of at least one autonomous vehicle, at least one service provider, at least one good supplier, at least one fleet manager, at least one logistics provider, at least one logistics supplier, all or some of conveyance data, or a combination thereof. At least one selected preference can be at least one predictive preference that can utilize machine learning technology and/or quantum computing or the like.

At least one selected preference can use at least one sensor data to filter and identify at least one preferred conveyance service request, at least one filtered conveyance service request, at least one conveyance service request, all or some of preferred conveyance data relating to at least one autonomous vehicle, at least one autonomous vehicle that can be identified as preferred, all or some of filtered conveyance data relating to at least one autonomous vehicle, all or some of conveyance data relating to at least one autonomous vehicle, at least one autonomous vehicle, or a combination thereof.

At least one level of service preference can be used to identify, for example, at least one vehicle type, at least one service type, at least one vehicle detail, at least one autonomous vehicle detail, or the like. At least one selected preference can have or relate to at least one cultural trait of at least one regional area or at least one country. At least one selected preference can be at least one capacity preference that can be utilized to manage or monitor at least one capacity level relating to at least one vehicle, at least one autonomous vehicle, at least one representative, at least one owner or at least one controller of at least one autonomous vehicle, at least one service provider, at least one good supplier, at least one fleet manager, at least one logistics provider, at least one logistics supplier, or a combination thereof. At least one selected preference can be at least one vehicle diagnostic preference that can be related to conveyance data, all or some of conveyance data relating to at least one autonomous vehicle, or the like.

As a non-limiting example, at least one selected preference can be but is not limited to at least one pricing preference, at least one elevated pricing preference, at least one geographical location preference, at least one distance preference, at least one route preference, at least one service duration preference, at least one beginning service geographical location preference, at least one ending service geographical location preference, at least one time preference, at least one predictive preference, at least one historical preference, at least one efficiency preference, at least one sensor preference, at least one event inclusion preference, at least one event exclusion preference, at least one traffic based preference, at least one road condition preference, at least one weather condition preference, at least one transportation preference, at least one route planning preference, at least one fuel economy preference, at least one battery longevity preference, at least one vehicle capacity preference, at least one vehicle diagnostic preference, at least one conveyance data preference, at least one duration of conveyance service preference, at least one conveyance service request density preference, at least one conveyance client density preference, at least one conveyance client detail preference, at least one conveyance client rating preference, at least one representative density preference, at least one autonomous vehicle density preference, at least one service provider inclusion preference, at least one service provider exclusion preference, at least one service provider density preference, at least one level of service preference, at least one good supplier inclusion preference, at least one good supplier exclusion preference, at least one good supplier density preference, at least one owner or at least one controller of at least one autonomous vehicle inclusion preference, at least one owner or at least one controller of at least one autonomous vehicle exclusion preference, at least one owner or at least one controller of at least one autonomous vehicle density preference, at least one fleet manager inclusion preference, at least one fleet manager exclusion preference, at least one fleet manager density preference, at least one logistics provider inclusion preference, at least one logistics provider exclusion preference, at least one logistics provider density preference, at least one logistics supplier inclusion preference, at least one logistics supplier exclusion preference, at least one logistics supplier density preference, at least one good detail preference, at least one conveyance industry segment preference, at least one freight preference, at least one waypoint preference, at least one delivery service preference, at least one oldest outstanding request preference, or a combination thereof.

As a non-limiting example, if at least one conveyance service request density preference is selected as at least one selected preference, at least one service provider or at least one fleet manager can strategically position at least one autonomous vehicle in at least one area of greater supply of at least one conveyance service request. As a non-limiting example, if at least one service provider inclusion preference is selected by at least one owner or at least one controller of at least one autonomous vehicle, then preferably at least one conveyance service request from at least one selected service provider can be identified as at least one preferred conveyance service request. As a non-limiting example, if at least one weather preference is selected, then preferably at least one conveyance service request without at least one route through at least one area with inclement weather, such as snow, can be identified as at least one preferred conveyance service request. As a non-limiting example, at least one selected preference can be transmitted from at least one owner or controller application to at least one central server. As a non-limiting example when at least one individual selected preference has at least one equal weight, at least one industry segment preference can have 25% weight, at least one service provider inclusion preference can have 25% weight, at least one pricing preference can have 25% weight, and at least one good detail preference can have 25% weight, which can be used to identify at least one preferred conveyance service request when determining which at least one filtered conveyance service request has at least one highest weighted average.

As a non-limiting example, at least one selected preference can be used for at least one individual conveyance industry segment. As a non-limiting example, at least one selected preference can be used by at least one fleet manager or the like to operate or control at least one fleet of at least one autonomous vehicle in at least one conveyance industry segment. As a non-limiting example, at least one selected preference can be used for at least one individual service provider. As a non-limiting example, at least one owner or at least one controller of at least one autonomous vehicle, at least one service provider, at least one good supplier, at least one fleet manager, at least one logistics provider, at least one logistics supplier, or a combination thereof, can specify at least one selected preference to work in at least one given area by using at least one geographical location preference. As a non-limiting example, at least one owner or at least one controller of at least one autonomous vehicle, at least one service provider, at least one good supplier, at least one fleet manager, at least one logistics provider, at least one logistics supplier, or a combination thereof, can specify at least one selected preference to work in a five-mile perimeter by using at least one geographical location preference. As a non-limiting example, at least one owner or at least one controller of at least one autonomous vehicle, at least one service provider, at least one good supplier, at least one fleet manager, at least one logistics provider, at least one logistics supplier, or a combination thereof, can specify at least one selected preference to identify at least one oldest outstanding conveyance service request to ensure consumer sentiment is maintained and at least one conveyance client does not have to wait too long.

As a non-limiting example, at least one owner or at least one controller of at least one autonomous vehicle, at least one service provider, at least one good supplier, at least one fleet manager, at least one logistics provider, at least one logistics supplier, or the like can use two specific selected preference to filter at least one conveyance service request and can use five specific selected preferences to filter all or some of conveyance data relating to at least one autonomous vehicle. As a non-limiting example, at least one selected preference can be provided or inputted by at least one owner or at least one controller of at least one autonomous vehicle, at least one service provider, at least one good supplier, at least one fleet manager, at least one logistics provider, at least one logistics supplier, or the like into at least one application or at least one owner or controller application and can be stored or cached on at least one application, at least one owner or controller application, at least one central server, at least one external server, or a combination thereof. As a non-limiting example, at least one selected preference can be similar to at least one representative preference.

As a non-limiting example, at least one selected preference can be transmitted between or from at least one application to at least one central server by way of at least one link between at least one application and at least one central server. As a non-limiting example, at least one selected preference can be transmitted between or from at least one application to at least one external server by way of at least one link between at least one application and at least one external server. As a non-limiting example, at least one selected preference can be transmitted between or from at least one owner or controller application to at least one central server by way of at least one link between at least one owner or controller application and at least one central server. As a non-limiting example, at least one selected preference can be transmitted between or from at least one owner or controller application to at least one external server by way of at least one link between at least one owner or controller application and at least one external server. As a non-limiting example, at least one selected preference, all or some of conveyance data relating to at least one autonomous vehicle, at least one real time or near real time geographical location of at least one autonomous vehicle, or a combination thereof, can be transmitted from at least one application or at least one owner or controller application to at least one central server or at least one external server at any time prior to filtering or the like at least one conveyance service request.

As a non-limiting example at least one selected preference can be associated with at least one database, at least one database query, at least one database table, at least one database result set, or the like. As a non-limiting example at least one database query can include or be associated with at least one selected preference. As a non-limiting example at least one selected preference can be related to or associated with another at least one selected preference. As a non-limiting example at least one selected preference can be used to retrieve data from database. As a non-limiting example at least one selected preference can be at least one internal part of at least one central server. As a non-limiting example, at least one selected preference can be in at least one fours or at least one format relating to at least one SQL parameter, at least one variable, or the like. As a non-limiting example multiple selected preferences can be used multiple times during at least one process of filtering and/or identifying at least one preferred conveyance service request for or with at least one autonomous vehicle that can be identified as preferred. As a non-limiting example, at least one selected preference can be used with or within at least one conditional statement, at least one conditional expression, at least one conditional construct, or the like. As a non-limiting example at least one selected preference can be used for altering at least one control flow based on at least one condition.

As a non-limiting example, at least one selected preference can have or be associated with at least one different set of preferences or at least one different set of parameters that can be used to filter and identify at least one preferred conveyance service request, at least one filtered conveyance service request, at least one conveyance service request, or a combination thereof. As a non-limiting example, at least one selected preference can have or be associated with at least one different set of preferences or at least one different set of parameters that can be used to filter and identify at least one preferred conveyance service request, at least one filtered conveyance service request, at least one conveyance service request, all or some of preferred conveyance data relating to at least one autonomous vehicle, all or some of filtered conveyance data relating to at least one autonomous vehicle, all or some of conveyance data relating to at least one autonomous vehicle, at least one autonomous vehicle that can be identified as preferred, at least one autonomous vehicle that can be filtered, at least one autonomous vehicle, or a combination thereof.

As a non-limiting example, some selected preferences can be more relevant than other selected preferences when at least one central server filters and/or identifies at least one preferred conveyance service request, at least one filtered conveyance service request, at least one conveyance service request, at least one autonomous vehicle that can be identified as preferred, at least one autonomous vehicle that can be filtered, at least one autonomous vehicle, all or some of preferred conveyance data relating to at least one autonomous vehicle, all or some of filtered conveyance data relating to at least one autonomous vehicle, all or some of conveyance data relating to at least one autonomous vehicle, or a combination thereof. As a non-limiting example, at least one selected preference can be used for filtering at least one conveyance service request, all or some of conveyance data relating to at least one autonomous vehicle, or a combination thereof, and at least one different selected preference can be used for identifying at least one preferred conveyance service request, at least one autonomous vehicle that can be identified as preferred, all or some of preferred conveyance data relating to at least one autonomous vehicle, or a combination thereof.

As a non-limiting example, at least one selected preference can use at least one sensor data to analyze or evaluate and preferably secure or obtain at least one preferred conveyance service request with or for at least one autonomous vehicle that can be identified as preferred, at least one autonomous vehicle, or a combination thereof. As a non-limiting example, at least one selected preference can use at least one sensor data to identify if at least one autonomous vehicle has enough battery to perform at least one conveyance service.

As a non-limiting example, at least one transportation preference can be at least one parameter or at least one rule that can identify at least one conveyance service preference. As a non-limiting example, at least one transportation preference can identify at least one conveyance service request that requires handicap assistance. As a non-limiting example, at least one transportation preference can identify at least one conveyance service request that requires at least one luxury vehicle. As a non-limiting example, at least one efficiency preference can at least one parameter or at least one rule that can optimize vehicle utilization. As a non-limiting example, at least one selected preference can be stored or cached in at least one database table. As a non-limiting example, at least one selected preference can be stored or cached in at least one database that at least one central server, at least one external server, at least one application, at least one owner or controller application, or a combination thereof, can connect to or be associated with.

As a non-limiting example, at least one route planning preference can identify at least one route that can avoid toll roads. As a non-limiting example, at least one route planning preference can identify at least one optimal navigational route that can aid in identifying at least one preferred conveyance service request, at least one autonomous vehicle that can be identified as preferred, all or some of preferred conveyance data relating to at least one autonomous vehicle, or a combination thereof. As a non-limiting example, at least one fuel economy preference can be to exclude or discard at least one autonomous vehicle that has lower than a quarter battery level. As a non-limiting example, at least one fuel economy preference can be to identify at least one specific mode at least one autonomous vehicle can perform, such as, sport mode, comfort mode, eco mode, or the like.

As a non-limiting example, at least one predictive preference can be identified or learned over time based on at least one pattern relating to at least one conveyance service request, all or some of conveyance data, all or some of conveyance data relating to at least one autonomous vehicle, at least one conveyance client, at least one representative, at least one autonomous vehicle, at least one owner or at least one controller of at least one autonomous vehicle, at least one service provider, at least one good supplier, at least one fleet manager, at least one logistics provider, at least one logistics supplier, or a combination thereof.

As a non-limiting example, at least one battery longevity preference can include only at least one autonomous vehicle that can have greater than 90% battery level for at least one conveyance service that exceeds 100 miles. As a non-limiting example, at least one time preference can relate to at least one time range, at least one pick-up time, at least one drop-off time, at least one pre-scheduled time, or the like, during at least one time of at least one day, at least one time of at least one week, at least one time of at least one month, at least one one time of at least one year, or a combination thereof. As a non-limiting example, at least one conveyance client detail preference can be at least one route preference provided by at least one conveyance client, at least one application, at least one owner or controller application, at least one central server, at least one external server, at least one third party, at least one map provider, or a combination thereof.

As a non-limiting example, at least one route preference can be utilized to identify at least one historical route, at least one specific route, at least one favored route, at least one area, at least one specific location, at least one pricing information, or the like. As a non-limiting example, at least one route preference can be learned over time to avoid traffic congestion on Highway Interstate 5 around 5 PM during the week. As a non-limiting example, at least one route preference can be to avoid at least one road, at least one street, at least one highway, at least one neighborhood, or the like, that at least one conveyance client or at least one recipient of at least one conveyance service prefers.

As a non-limiting example, at least one level of service preference can be used by at least one conveyance client to identify at least one at least one luxury vehicle, at least one environmentally friendly vehicle, at least one driverless vehicle, or the like. As a non-limiting example, at least one level of service preference can be utilized to identify at least one newer vehicle over at least one older vehicle. As a non-limiting example, at least one level of service preference can be utilized by at least one owner or at least one controller of at least one autonomous vehicle, at least one service provider, at least one good supplier, at least one fleet manager, at least one logistics provider, at least one logistics supplier, at least one third party, or the like, to provide at least one higher level of service, for example, at least one luxury service, and make more income potential.

As a non-limiting example, at least one level of service preference can be displayed on or with at least one visual representation to identify different levels of service that at least one owner or at least one controller of at least one autonomous vehicle, at least one service provider, at least one good supplier, at least one fleet manager, at least one logistics provider, at least one logistics supplier, at least one third party, or the like, can provide. As a non-limiting example, at least one level of service preference can be displayed as at least one icon with or on at least one visual representation to allow at least one selection of different levels of service that at least one owner or at least one controller of at least one autonomous vehicle, at least one service provider, at least one good supplier, at least one fleet manager, at least one logistics provider, at least one logistics supplier, at least one third party, or the like, can provide.

As a non-limiting example, at least one level of service preference can be displayed on at least one dynamic map to identify different levels of service that at least one owner or at least one controller of at least one autonomous vehicle, at least one service provider, at least one good supplier, at least one fleet manager, at least one logistics provider, at least one logistics supplier, at least one third party, or the like, can provide. As a non-limiting example, at least one owner or at least one controller of at least one autonomous vehicle, at least one service provider, at least one good supplier, at least one fleet manager, at least one logistics provider, at least one logistics supplier, or a combination thereof, can be displayed on or with at least one dynamic map that can display at least one level of service preference and can be represented by at least one mobile or transitory icon.

As a non-limiting example, at least one event inclusion preference can identify at least one destination rating with 4 out of 5 stars for or with at least one at least one owner or at least one controller of at least one autonomous vehicle, at least one autonomous vehicle, at least one service provider, at least one good supplier, at least one fleet manager, at least one logistics provider, at least one logistics supplier, or a combination thereof. As a non-limiting example, at least one event inclusion preference can identify at least one event or at least one area that can be optimal for at least one service provider or the like that can be currently well positioned in or near that event or area, but it may not be optimal for other service providers or the like further away from that event or area.

As a non-limiting example, at least one selected preference can be at least one good supplier preference that can enable at least one good supplier to delay or postpone at least one current or at least one future conveyance service request. As a non-limiting example, at least one conveyance client preference or at least one preference of at least one recipient of at least one conveyance service, can be compared to or with at least one selected preference, to identify at least one match and preferably secure or obtain at least one preferred conveyance service request for or with at least one autonomous vehicle that can be identified as preferred.

As a non-limiting example, at least one selected preference can have or relate to at least one cultural trait that can impact at least one match between at least one autonomous vehicle and at least one preferred conveyance service request. As a non-limiting example, at least one selected preference can have or relate to at least one cultural trait that can impact all or some of at least one conveyance service request in conjunction with corresponding conveyance data, all or some of conveyance data relating to at least one autonomous vehicle, or a combination thereof. As a non-limiting example, Americans prefer to have at least one selected preference with a shorter estimated time of arrival compared to Canadians.

As a non-limiting example, at least one capacity preference can identify a maximum number of passengers or goods in at least one vehicle or at least one autonomous vehicle. As a non-limiting example, at least one conveyance client can utilize at least one selected preference to specify if at least one conveyance client prefers at least one autonomous vehicle or at least one representative. As a non-limiting example, at least one selected preference can be at least carpool preference. As a non-limiting example, at least one selected preference can be used to identify at least one conveyance client or at least one group of at least one conveyance client that can be pooled together for at least one conveyance service to at least one ending service geographical location. As a non-limiting example, at least one selected preference can relate to safety for example, at least one autonomous vehicle being handicap friendly.

As a non-limiting example, at least one delivery service preference can be to filter out deliveries that can add more than 10 minutes to total travel time. As a non-limiting example, at least one delivery service preference can specify at least one dimension for at least one good, at least one item, or the like. As a non-limiting example, at least one delivery service preference can be used to identify at least one autonomous vehicle with at least one specific feature relating to at least one good delivery, at least one item delivery, or the like. As a non-limiting example, at least one delivery service preference can be used to identify at least one pre-scheduled conveyance service request or at least one pre-scheduled autonomous vehicle.

As a non-limiting example, at least one vehicle diagnostic preference can be to take at least one autonomous vehicle off the road or to not secure or obtain another conveyance service request if at least one autonomous vehicle is due for maintenance. As a non-limiting example, at least one vehicle diagnostic preference can be to take at least one autonomous vehicle off the road or to not secure or obtain another conveyance service request if at least one criteria regarding at least one autonomous vehicle is met. As a non-limiting example, at least one vehicle diagnostic preference can be related to at least one sensor data on at least one autonomous vehicle.

As a non-limiting example, at least one central server can use or apply a second selected preference and at least one process can optionally be referred to or seen as at least one additional level of filtering. As a non-limiting example, at least one central server can filter conveyance service requests using a two step process to first filter conveyance service requests based on at least one selected preference and then filter at least one subset of conveyance service requests based on at least one different selected preference. As a non-limiting example, at least one central server can filter all or some of conveyance data relating to at least one autonomous vehicle using a two step process to first filter all or some of conveyance data relating to at least one autonomous vehicle based on at least one selected preference and then filter at least one subset of all or some of conveyance data relating to at least one autonomous vehicle based on at least one different selected preference.

Geographical Location of at Least One Representative, Autonomous Vehicle, Conveyance Client, Service Provider, Good Supplier, Fleet Manager, Logistics Provider, Logistics Supplier, or Owner or Controller of Autonomous Vehicle At least one geographical location of at least one representative, at least one autonomous vehicle, at least one conveyance client, at least one service provider, at least one good supplier, at least one fleet manager, at least one owner or at least one controller of at least one autonomous vehicle, at least one logistics provider, at least one logistics supplier, or a combination thereof, can be for example in real time, near real time, static, or non-real time.

At least one geographical location of any individual person, machine, entity, or a combination thereof, can be related to or have at least one longitude and at least one latitude in at least one decimal point or format. At least one geographical location of any individual person, machine, entity, or a combination thereof, can be related to or have at least one longitude and at least one latitude in at least one database with at least one decimal point or format. At least one geographical location of any individual person, machine, entity, or a combination thereof, can be related to or have at least one longitude and at least one latitude in at least one different decimal point or format. At least one geographical location of any individual person, machine, entity, or a combination thereof, can be related to or have at least one longitude and at least one latitude in at least one database with at least one different decimal point or format.

At least one geographical location of at least one representative, at least one autonomous vehicle, at least one fleet of at least one autonomous vehicle, at least one conveyance client, at least one service provider, at least one good supplier, at least one fleet manager, at least one owner or at least one controller of at least one autonomous vehicle, at least one logistics provider, at least one logistics supplier, or a combination thereof, can have or utilize at least one variable precision, that can preferably be standardized in at least one uniform format. Due to many different systems and methods of coding at least one geographical location, at least one variable precision can be preferred to standardize at least one geographical location. Due to many different systems and methods of coding at least one real time or near real time geographical location of at least one autonomous vehicle, at least one variable precision can be preferred to standardize at least one digit or at least one decimal.

At least one geographical location of any individual person, machine, entity, or a combination thereof, can be updated or refreshed in real time or near real time and can refer to being updated or refreshed in the highest level of development or state of the art. At least one geographical location of any individual person, machine, entity, or a combination thereof, can be used to perform at least one function in real time or near real time being updated or refreshed in the highest level of development or state of the art. At least one geographical location can be pre-set on including but not limited to at least one central server, at least one external server, at least one application, at least one owner or controller application, at least one visual representation, or a combination thereof.

At least one geographical location of at least one representative can be but is not limited to at least one geographical location, at least one coordinate, at least one position, or at least one place where at least one representative can be at any given point in time.

At least one geographical location of at least one conveyance client can be but is not limited to at least one geographical location, at least one coordinate, at least one position, or at least one place where at least one conveyance client can be at any given point in time.

At least one geographical location of at least one autonomous vehicle can be but is not limited to at least one geographical location, at least one coordinate, at least one position, or at least one place where at least one autonomous vehicle can be at any given point in time.

At least one geographical location of at least one service provider can be but is not limited to at least one geographical location, at least one coordinate, at least one position, or at least one place where at least one service provider can be at any given point in time.

At least one geographical location of at least one good supplier can be but is not limited to at least one geographical location, at least one coordinate, at least one position, or at least one place where at least one good supplier can be at any given point in time.

At least one geographical location of at least one fleet manager can be but is not limited to at least one geographical location, at least one coordinate, at least one position, or at least one place where at least one fleet manager can be at any given point in time.

At least one geographical location of at least one owner or at least one controller of at least one autonomous vehicle can be but is not limited to at least one geographical location, at least one coordinate, at least one position, or at least one place where at least one owner or at least one controller of at least one autonomous vehicle can be at any given point in time.

At least one geographical location of at least one logistics provider can be but is not limited to at least one geographical location, at least one coordinate, at least one position, or at least one place where at least one logistics provider can be at any given point in time.

At least one geographical location of at least one logistics supplier can be but is not limited to at least one geographical location, at least one coordinate, at least one position, or at least one place where at least one logistics supplier can be at any given point in time.

At least one geographical location of at least one representative, at least one autonomous vehicle, at least one conveyance client, at least one service provider, at least one good supplier, at least one fleet manager, at least one owner or at least one controller of at least one autonomous vehicle, at least one logistics provider, at least one logistics supplier, or a combination thereof, can be for example displayed on at least one visual representation.

When at least one real time or near real time geographical location of at least one autonomous vehicle is considered, at least one real time or near real time geographical location of at least one fleet of at least one autonomous vehicle can also be considered. When at least one geographical location of any individual person, machine, entity, or a combination thereof, is considered, at least one geographical location of at least one representative, at least one autonomous vehicle, at least one fleet of at least one autonomous vehicle, at least one conveyance client, at least one service provider, at least one good supplier, at least one fleet manager, at least one owner or at least one controller of at least one autonomous vehicle, at least one logistics provider, at least one logistics supplier, or the like, can also be considered.

As a non-limiting example, at least one geographical location of at least one representative, at least one autonomous vehicle, at least one fleet of at least one autonomous vehicle, at least one conveyance client, at least one service provider, at least one good supplier, at least one fleet manager, at least one owner or at least one controller of at least one autonomous vehicle, at least one logistics provider, at least one logistics supplier, or a combination thereof, can relate to at least one service provider operating in at least one conveyance industry segment.

As a non-limiting example, at least one geographical location of at least one representative, at least one autonomous vehicle, at least one fleet of at least one autonomous vehicle, at least one conveyance client, at least one service provider, at least one good supplier, at least one fleet manager, at least one owner or at least one controller of at least one autonomous vehicle, at least one logistics provider, at least one logistics supplier, or a combination thereof, can be used for respective density preferences. As a non-limiting example, at least one geographical location of at, least one representative, at least one autonomous vehicle, at least one fleet of at least one autonomous vehicle, at least one conveyance client, at least one service provider, at least one good supplier, at least one fleet manager, at least one owner or at least one controller of at least one autonomous vehicle, at least one logistics provider, at least one logistics supplier, or a combination thereof, can relate to at least one individual service provider operating in at least one individual conveyance industry segment.

As a non-limiting example, at least one geographical location of at least one representative, at least one autonomous vehicle, at least one fleet of at least one autonomous vehicle, at least one conveyance client, at least one service provider, at least one good supplier, at least one fleet manager, at least one owner or at least one controller of at least one autonomous vehicle, at least one logistics provider, at least one logistics supplier, or a combination thereof, can be static or non-real time. As a non-limiting example, at least one geographical location of at least one good supplier can be static or non-real time as it can relate to at least one brick and mortar geographical location. As a non-limiting example, at least one geographical location of at least one autonomous vehicle can be based on or related to at least one sensor data associated with at least one autonomous vehicle.

As a non-limiting example, at least one geographical location of at least one fleet of at least one autonomous vehicle or at least one autonomous vehicle fleet, can be but is not limited to at least one geographical location, at least one coordinate, at least one position, or at least one place where at least one fleet of at least one autonomous vehicle can be at any given point in time. As a non-limiting example, at least one geographical location of at least one autonomous vehicle can be based on at least one autonomous vehicle or at least one fleet or at least one autonomous vehicle. As a non-limiting example, at least one geographical location of at least one autonomous vehicle can be at least one real time or near real time geographical location of at least one autonomous vehicle. As a non-limiting example, at least one geographical location of at least one autonomous vehicle can be at least one real time or near real time geographical location of at least one fleet of at least one autonomous vehicle.

As a non-limiting example, at least one geographical location of any individual person, machine, entity, or a combination thereof, can be sourced or provided from three external servers, and can be associated with or have at least one longitude and at least one latitude in at least one database table with at least one different decimal point or format that can be standardized to have at least one similar decimal point or format. As a non-limiting example, at least one real time or near real time geographical location of at least one autonomous vehicle, at least one real time or near real time geographical location of at least one fleet of at least one autonomous vehicle, at least one real time or near real time geographical location of at least one autonomous vehicle fleet, or a combination thereof, can have or be associated with at least one variable precision, that can preferably be standardized in at least one uniform format. As a non-limiting example, at least one geographical location of at least one representative, at least one autonomous vehicle, at least one fleet of at least one autonomous vehicle, at least one conveyance client, at least one service provider, at least one good supplier, at least one fleet manager, at least one owner or at least one controller of at least one autonomous vehicle, at least one logistics provider, at least one logistics supplier, or a combination thereof, can have or be associated with at least one variable precision, that can preferably be standardized in at least one uniform format.

As a non-limiting example, at least one real time or near real time geographical location of at least one autonomous vehicle, at least one real time or near real time geographical location of at least one fleet of at least one autonomous vehicle, at least one real time or near real time geographical location of at least one autonomous vehicle fleet, or a combination thereof, can have or be associated with at least one longitude and at least one latitude in at least one decimal point or format. As a non-limiting example, at least one real time or near real time geographical location of at least one autonomous vehicle, at least one real time or near real time geographical location of at least one fleet of at least one autonomous vehicle, at least one real time or near real time geographical location of at least one autonomous vehicle fleet, or a combination thereof, can have or be associated with at least one longitude and at least one latitude in at least one database table with at least one decimal point or format.

As a non-limiting example, at least one real time or near real time geographical location of at least one autonomous vehicle, at least one real time or near real time geographical location of at least one fleet of at least one autonomous vehicle, at least one real time or near real time geographical location of at least one autonomous vehicle fleet, or a combination thereof, can have or be associated with at least one longitude and at least one latitude in at least one different decimal point or format. As a non-limiting example, at least one real time or near real time geographical location of at least one autonomous vehicle, at least one real time or near real time geographical location of at least one fleet of at least one autonomous vehicle, at least one real time or near real time geographical location of at least one autonomous vehicle fleet, or a combination thereof, can have or be associated with at least one longitude and at least one latitude in at least one database table with at least one different decimal point or format.

As a non-limiting example, at least one geographical location of at least one individual person, at least one individual machine, at least one individual entity, at least one representative, at least one autonomous vehicle, at least one fleet of at least one autonomous vehicle, at least one conveyance client, at least one service provider, at least one good supplier, at least one fleet manager, at least one owner or at least one controller of at least one autonomous vehicle, at least one logistics provider, at least one logistics supplier, or a combination thereof, can have or be associated with at least one longitude and at least one latitude in at least one database table with at least one decimal point or format. As a non-limiting example, at least one geographical location of at least one individual person, at least one individual machine, at least one individual entity, at least one representative, at least one autonomous vehicle, at least one fleet of at least one autonomous vehicle, at least one conveyance client, at least one service provider, at least one good supplier, at least one fleet manager, at least one owner or at least one controller of at least one autonomous vehicle, at least one logistics provider, at least one logistics supplier, or a combination thereof, can have or be associated with at least one longitude and at least one latitude in at least one database table with at least one different decimal point or format.

As a non-limiting example, due to many different systems and methods of coding at least one geographical location of at least one representative, at least one autonomous vehicle, at least one fleet of at least one autonomous vehicle, at least one conveyance client, at least one service provider, at least one good supplier, at least one fleet manager, at least one owner or at least one controller of at least one autonomous vehicle, at least one logistics provider, at least one logistics supplier, or a combination thereof, at least one variable precision is preferred to standardize at least one digit or at least one decimal.

Beginning Service Geographical Location

At least one beginning service geographical location can be but is not limited to at least one geographical location for example requested by at least one conveyance client or at least one entity where at least one conveyance service begins or is requested. At least one beginning service geographical location can be modified before and/or during at least one conveyance service, if utilizing at least one waypoint. At least one beginning service geographical location need not be at least one real time or near real time geographical location of at least one conveyance client. At least one beginning service geographical location can be updated or refreshed in real time or near real time and can refer to being updated or refreshed in the highest level of development or state of the art. At least one beginning service geographical location can be used to perform at least one function in real time or near real time being updated or refreshed in the highest level of development or state of the art. At least one beginning service geographical location can be pre-set or pre-determined on including but not limited to at least one central server, at least one external server, at least one application, at least one owner or controller application, or a combination thereof. At least one beginning service geographical location can be associated with at least one conveyance service request.

As a non-limiting example, at least one beginning service geographical location can be static or non-real time. As a non-limiting example, at least one representative or at least one autonomous vehicle can pick up at least one conveyance client at at least one beginning service geographical location. As a non-limiting example, at least one beginning service geographical location can have or be associated with at least one way-point. As a non-limiting example, at least one beginning service geographical location can have or be associated with at least one way-point, where at least one conveyance client can walk to at least one beginning service geographical location. As a non-limiting example, at least one conveyance client can have or use two or multiple beginning service geographical locations including at least one way-point, where at least one conveyance client can take a public bus from one beginning service geographical location to then be picked up by at least one autonomous vehicle from a second beginning service geographical location.

As a non-limiting example, at least one beginning service geographical location can be at at least one future beginning service geographical location. As a non-limiting example, at least one beginning service geographical location can used for or with at least one autonomous vehicle to create at least one conveyance service offering. As a non-limiting example, at least one beginning service geographical location can be dynamic. As a non-limiting example, at least one beginning service geographical location can be associated with latitude and longitude.

Ending Service Geographical Location

At least one ending service geographical location can be but is not limited to at least one geographical location for example requested by at least one conveyance client or at least one entity where at least one conveyance service ends. At least one ending service geographical location can be modified before and/or during at least one conveyance service. At least one ending service geographical location can include at least one waypoint. At least one ending service geographical location can be updated or refreshed in real time or near real time and can refer to being updated or refreshed in the highest level of development or state of the art. At least one ending service geographical location can be used to perform at least one function in real time or near real time being updated or refreshed in the highest level of development or state of the art. At least one ending service geographical location can be pre-set or pre-determined on including but not limited to at least one central server, at least one external server, at least one application, at least one owner or controller application, or a combination thereof. At least one ending service geographical location can be associated with at least one conveyance service request.

As a non-limiting example, at least one ending service geographical location can be static or non-real time. As a non-limiting example, at least one representative or at least one autonomous vehicle can drop off at least one conveyance client at at least one ending service geographical location. As a non-limiting example, at least one ending service geographical location can have or be associated with at least one way-point, where at least one conveyance client can stop at a coffee shop prior to being dropped off at at least one ending service geographical location. As a non-limiting example, at least one ending service geographical location can be at at least one future ending service geographical location. As a non-limiting example, at least one ending service geographical location can used for or with at least one autonomous vehicle to create at least one conveyance service offering. As a non-limiting example, at least one ending service geographical location can be dynamic. As a non-limiting example, at least one ending service geographical location can be associated with latitude and longitude.

Conveyance Industry Segment

The conveyance industry can be for example an industry categorized by the transportation of someone or something from at least one geographical location to at least one other geographical location. The conveyance industry can be for example an industry categorized by the transportation of someone or something from at least one geographical location to at least one other geographical location in real time or near real time. At least one conveyance industry segment can be for example a smaller part of the overall conveyance industry as a whole, categorized by different limiting characteristics. At least one conveyance industry segment can be updated or refreshed in real time or near real time and can refer to being updated or refreshed in the highest level of development or state of the art.

At least one service provider, at least one owner or at least one controller of at least one autonomous vehicle, at least one good supplier, at least one fleet manager, at least one logistics provider, at least one logistics supplier, at least one autonomous vehicle, or a combination thereof, can operate in at least one conveyance industry segment. At least one owner or at least one controller of at least one autonomous vehicle, at least one service provider, at least one good supplier, at least one fleet manager, at least one logistics provider, at least one logistics supplier, or a combination thereof, can manage, control, operate, or the like, at least one autonomous vehicle in at least one conveyance industry segment. At least one conveyance service request can be associated with at least one conveyance industry segment. At least one Autonomous Vehicle Automated Platform can manage, operate, control, or the like, at least one autonomous vehicle that can operate in at least one conveyance industry segment. At least one Representative Automated Platform can manage, operate, control, or the like, at least one representative that can operate in at least one conveyance industry segment. At least one Autonomous Vehicle Automated Platform, at least one Representative Automated Platform, or a combination thereof, can manage, operate, control, or the like, at least one autonomous vehicle, at least one representative, or a combination thereof, that can operate in at least one conveyance industry segment.

As a non-limiting example, at least one conveyance industry segment can be but is not limited to at least one ride-hail industry segment, at least one ride-share industry segment, at least one car-share industry segment, at least one peer-to-peer conveyance industry segment, at least one person delivery industry segment, at least one taxi industry segment, at least one item delivery industry segment, at least one good delivery industry segment, at least one freight industry segment, at least one medical service and delivery industry segment, at least one food delivery industry segment, at least one courier industry segment, at least one animal delivery industry segment, at least one transportation industry segment, or a combination thereof.

As a non-limiting example, at least one individual service provider or the like can operate in at least one individual conveyance industry segment. As a non-limiting example, the present invention can allow at least one representative or at least one autonomous vehicle to provide a ride in the ride-hail industry segment and deliver food in the food delivery industry segment relating to at least one similar service provider for at least one conveyance client.

As a non-limiting example, at least one owner or at least one controller of at least one autonomous vehicle, at least one service provider, at least one good supplier, at least one fleet manager, at least one logistics provider, at least one logistics supplier, or a combination thereof, can manage or operate at least one fleet of at least one autonomous vehicle in at least one conveyance industry segment. As a non-limiting example, at least one owner or at least one controller of at least one autonomous vehicle, at least one service provider, at least one good supplier, at least one fleet manager, at least one logistics provider, at least one logistics supplier, or a combination thereof, can manage or operate one hundred autonomous vehicles in a ride-hail industry segment and two hundred autonomous vehicles in a freight industry segment. As a non-limiting example, at least one owner or at least one controller of at least one autonomous vehicle, at least one service provider, at least one good supplier, at least one fleet manager, at least one logistics provider, at least one logistics supplier, or a combination thereof, can manage or operate one autonomous vehicle that can operate in more than one conveyance industry segment.

EXAMPLES

Example 1

General Description of Preferred Elements and Preferred Interactions Thereof

This general description of some but not all elements of some but not all aspects and embodiments of the present inventions disclosed relate to some preferred non-limiting aspects of at least one exemplary system of the present invention and at least one exemplary method of use of at least one system of the present invention at least one conveyance industry segment, particularly as set forth in the figures and the description thereof. Not all of these elements need be used in the present invention, other elements can be included or some elements removed, and inventions without any of these elements can be part of the present invention. Numerical references refer to those in the figures. The following are elements shown in FIG. 1 through FIG. 12.

At least one conveyance client 1 can be but is not limited to at least one person, at least one robot, at least one machine, or a combination thereof, that can receive at least one conveyance service. At least one conveyance client 1 does not necessarily have to be at least one consumer of at least one service.

At least one representative 2 can be but is not limited to at least one person, at least one robot, at least one machine, or a combination thereof, that can analyze or evaluate and then preferably secure or obtain at least one preferred conveyance service request 17. At least one representative 2 can provide or perform at least one conveyance service of including but not limited to at least one person, at least one good, at least one thing, at least one article, at least one item, at least one conveyance client 1, or a combination thereof. At least one representative 2 can input or provide at least one representative preference 18 used to identify at least one preferred conveyance service request 17. At least one representative 2 can provide or perform at least one conveyance service relating to at least one service provider 5 operating in at least one conveyance industry segment. At least one representative 2 can accept or decline at least one preferred conveyance service request 17. At least one representative 2 can perform all or some of at least one conveyance service in conjunction with at least one autonomous vehicle 3.

At least one autonomous vehicle 3 can be for example at least one self-governing machine, at least one self-maneuvering machine, at least one self-driving machine, or the like, that can be used to provide or perform at least one conveyance service of including but not limited to at least one person, at least one good, at least one article, at least one thing, at least one item, at least one conveyance client 1, or a combination thereof. At least one autonomous vehicle 3 can perform or provide at least one conveyance service relating to at least one service provider 5 or the like operating in at least one conveyance industry segment. At least one autonomous vehicle 3 can include hardware and/or software alone or in a combination. At least one autonomous vehicle 3 can be identified as preferred.

At least one owner or at least one controller of at least one autonomous vehicle 4 can be but is not limited to at least one entity, at least one business, at least one person, at least one robot, at least one machine, or a combination thereof, that can own or control at least one autonomous vehicle 3. At least one owner or at least one controller of at least one autonomous vehicle 4 can input or provide at least one selected preference 19 used to identify at least one preferred conveyance service request 17. At least one owner or at least one controller of at least one autonomous vehicle 4 can accept or decline at least one preferred conveyance service request 17. At least one owner or at least one controller of at least one autonomous vehicle 4 can be at least one service provider 5, at least one fleet manager, at least one logistics provider, at least one logistics supplier, or a combination thereof.

At least one service provider 5 can be for example at least one entity or at least one business that can retain or contract with including but not limited to at least one representative 2, at least one autonomous vehicle 3, at least one good supplier, or a combination thereof. At least one service provider 5 can facilitate at least one conveyance service between including but not limited to at least one representative 2, at least one autonomous vehicle 3, at least one good supplier, at least one conveyance client 1, at least one owner or at least one controller of at least one autonomous vehicle 4, or a combination thereof. At least one service provider 5 can operate in at least one conveyance industry segment. At least one service provider 5 can be at least one owner or at least one controller of at least one autonomous vehicle 4, at least one good supplier, at least one fleet manager, at least one logistics provider, at least one logistics supplier, or a combination thereof.

At least one application 6 can be but is not limited to software accessible through at least one terminal 7. At least one application 6 can be associated with at least one autonomous vehicle 3. At least one application 6 can be at least one software that can for example facilitate at least one operation or at least one function to secure or obtain at least one preferred conveyance service request 17, at least one autonomous vehicle 3 that can be identified as preferred, or a combination thereof. At least one application 6 can be for example used to analyze, evaluate, secure, obtain, accept, or decline at least one preferred conveyance service request 17. At least one application 6 can display including but not limited to at least one preferred conveyance service request 17. At least one representative 2 can input or provide at least one representative preference 18 into at least one application 6. At least one application 6 can display including but not limited to at least one visual representation 12.

At least one terminal 7 can be but is not limited to at least one electronic computing device. At least one terminal 7 can be associated with at least one autonomous vehicle 3. At least one terminal 7 can include but is not limited to at least one computer processor, at least one computer readable memory, at least one input source, at least one geographical location module, at least one display, at least one network interface, or a combination thereof. At least one terminal 7 can be capable of communicating by way of at least one link 8. At least one terminal 7 can be used to access at least one application 6. At least one terminal 7 can encompass hardware and/or software alone or in a combination. At least one terminal 7 can be associated with at least one autonomous vehicle 3.

At least one link 8 can be but is not limited to at least one connection or at least one association with at least one software function, at least one software operation, at least one software component, at least one software module, or a combination thereof. At least one link 8 can be but is not limited to at least one electronic communication network channel. At least one link 8 can be at least one combination of connections between including but not limited to at least one central server 9, at least one external server 10, at least one terminal 7, at least one application 6, at least one autonomous vehicle 3, at least one owner or controller application 11, or a combination thereof. At least one link 8 can encompass hardware and/or software alone or in a combination.

At least one central server 9 can be at least one software and/or at least one hardware that can for example facilitate at least one operation or at least one function to secure or obtain at least one preferred conveyance service request 17, at least one autonomous vehicle 3 that can be identified as preferred, or a combination thereof, for at least one representative 2 or at least one autonomous vehicle 3. At least one central server 9 can include but is not limited to at least one computer processor, at least one computer readable memory, at least one network interface, or a combination thereof. At least one central server 9 can connect to or communicate with including but not limited to at least one external server 10, at least one application 6, at least one terminal 7, at least one owner or controller application 11, at least one autonomous vehicle 3, or a combination thereof, by way of at least one link 8. At least one central server 9 can include or connect to at least one database. At least one central server 9 can encompass hardware and/or software alone or in a combination.

At least one external server 10, can be but is not limited to at least one source of at least one conveyance service request 15 in conjunction with corresponding conveyance data, all or some of conveyance data relating to at least one autonomous vehicle 3, or a combination thereof. At least one external server 10 can include but is not limited to at least one computer processor, at least one computer readable memory, at least one network interface, or a combination thereof. At least one external server 10 can connect to or communicate with at least one central server 9, at least one application 6, at least one terminal 7, at least one owner or controller application 11, at least one autonomous vehicle 3, or a combination thereof, by way of at least one link 8. At least one external server 10 can include or connect to at least one database. At least one external server 10 can encompass hardware and/or software alone or in a combination.

At least one owner or controller application 11 can be for example software appropriate for communicating with but not limited to at least one central server 9, at least one external server 10, at least one autonomous vehicle 3, at least one application 6, or a combination thereof, by way of at least one link 8. At least one owner or controller application 11 can be at least one software that can for example facilitate at least one operation or at least one function to secure or obtain at least one preferred conveyance service request 17, at least one autonomous vehicle 3 that can be identified as preferred, or a combination thereof. At least one owner or controller application 11 can be used by at least one owner or at least one controller of at least one autonomous vehicle 4 to input or provide at least one selected preference 19 that can be used to identify at least one preferred conveyance service request 17. At least one owner or controller application 11 can be used to analyze, evaluate, secure, obtain, accept, or decline at least one preferred conveyance service request 17. At least one owner or controller application 11 can display at least one preferred conveyance service request 17 to be accepted or declined. At least one owner or controller application 11 can display at least one secured or obtained preferred conveyance service request 17.

At least one visual representation 12 can be at least one tool used to assist at least one representative 2 analyze or evaluate at least one conveyance service request 15 or at least one conveyance service request metric on, for example, at least one geographical map to secure or obtain at least one preferred conveyance service request 17. At least one visual representation 12 can be displayed in or on at least one autonomous vehicle 3. At least one visual representation 12 can be viewed from including but not limited to at least one perspective, at least one point of reference, at least one point of interest, or a combination thereof.

At least one Representative Automated. Platform 13, automated in whole or in part, can for example continuously or repeatedly analyze or evaluate at least one conveyance service request 15 in real time or near real time relating to at least one representative preference 18 and preferably at least one real time or near real time geographical location of at least one representative 2 to secure or obtain at least one preferred conveyance service request 17 for at least one representative 2. At least one Representative Automated Platform 13 can preferably secure or obtain at least one subsequent or additional preferred conveyance service request 17 after at least one first preferred conveyance service request 17 is secured or obtained, while at least one real time or near real time geographical location of at least one representative 2 updates or changes. At least one Representative Automated. Platform 13 can secure or obtain at least one preferred conveyance service request 17 relating to at least one service provider 5 operating in at least one conveyance industry segment.

At least one Autonomous Vehicle Automated Platform 14, automated in whole or in part, can for example continuously or repeatedly analyze or evaluate at least one conveyance service request 15, all or some of conveyance data relating to said at least one autonomous vehicle 3, or a combination thereof, in real time or near real time relating to at least one selected preference 19 and preferably at least one real time or near real time geographical location of at least one autonomous vehicle 3 to secure or obtain at least one preferred conveyance service request 17 for or with at least one autonomous vehicle 3, at least one autonomous vehicle 3 that can be identified as preferred, or a combination thereof. At least one Autonomous Vehicle Automated Platform 14, can preferably secure or obtain at least one subsequent or additional preferred conveyance service request 17 after at least one first preferred conveyance service request 17 is secured or obtained, while at least one real time or near real time geographical location of at least one autonomous vehicle 3 updates or changes. At least one Autonomous Vehicle Automated Platform 14, can secure or obtain at least one preferred conveyance service request 17 relating to at least one service provider 5 or the like operating in at least one conveyance industry segment.

At least one conveyance service request 15 can be for example at least one request for transportation of including but not limited to at least one person, at least one good, at least one article, at least one thing, at least one item, at least one conveyance client 1, or a combination thereof, from at least one geographical location to at least one other geographical location. At least one conveyance service request 15 can be but is not limited to at least one request from at least one conveyance client 1. At least one conveyance service request 15 can be sourced or provided from at least one external server 10. At least one conveyance service request 15 can be sourced or provided by at least one service provider 5. At least one conveyance service request 15 can be updated in real time or near real time.

At least one filtered conveyance service request 16 can be for example at least one conveyance service request 15 that can be filtered by using including but not limited to at least one representative preference 18, at least one real time or near real time geographical location of at least one representative 2, or a combination thereof. At least one filtered conveyance service request 16 can be but is not limited to at least one conveyance service request 15 that can be filtered by using at least one selected preference 19, at least one real time or near real time geographical location of at least one autonomous vehicle 3, or a combination thereof. At least one filtered conveyance service request 16 can be updated in real time or near real time.

At least one preferred conveyance service request 17 can be for example at least one filtered conveyance service request 16 that can be identified as preferred by including but not limited to at least one representative 2, at least one autonomous vehicle 3, at least one owner or at least one controller of at least one autonomous vehicle 4, at least one central server 9, at least one application 6, at least one owner or controller application 11, or a combination thereof. At least one preferred conveyance service request 17 can be identified as preferred for example by using at least one representative preference 18 or at least one selected preference 19. At least one preferred conveyance service request 17 can be updated in real time or near real time.

At least one representative preference 18 can be but is not limited to at least one option selected or provided by at least one representative 2 that can be used to filter at least one conveyance service request 15 and preferably identify at least one preferred conveyance service request 17. At least one representative preference 18 can be stored or cached on at least one central server 9, at least one external server 10, at least one application 6, or a combination thereof. At least one representative preference 18 can be inclusive or exclusive for filtering at least one conveyance service request 15.

At least one selected preference 19 can be at least one rule or at least one parameter that can for example be used to facilitate at least one operation or at least one function to secure or obtain at least one preferred conveyance service request 17, at least one autonomous vehicle 3 that can be identified as preferred, or a combination thereof. At least one selected preference 19 can be but is not limited to at least one option selected or provided by at least one owner or at least one controller of at least one autonomous vehicle 4 or the like that can be used to filter at least one conveyance service request 15 and preferably identify at least one preferred conveyance service request 17. At least one selected preference 19 can be stored or cached on at least one central server 9, at least one external server 10, at least one application 6, at least one owner or controller application 11, or a combination thereof. At least one selected preference 19 can be inclusive or exclusive for filtering of at least one conveyance service request 15, all or some of conveyance data relating to at least one autonomous vehicle 3, or a combination thereof.

Example 2

This example establishes some preferred non-limiting aspects of an exemplary system of the present invention and an exemplary method of use of a system of the present invention, automated in whole or in part, where at least one representative can benefit from the present invention, particularly as set forth in the figures and the description thereof. The following is a non-limiting example where at least one Representative Automated Platform is used by at least one representative. Numerical references refer to those in the figures. The following are steps of an exemplary method in a preferable but not required order. Generally see FIG. 1 and FIG. 2 for a non-limiting and exemplary system and FIG. 3 for a method of the present invention.

Step 1. At least one conveyance service request can be transmitted from at least one external server to at least one central server continuously in real time or near real time by way of at least one link Step 2. At least one conveyance service request can be stored, standardized, aggregated, or a combination thereof, at least once on at least one central server Step 3. At least one representative can use at least one terminal to access at least one application Step 4. At least one representative can be authenticated Step 5. At least one representative can input or provide at least one representative preference into at least one application Step 6. At least one representative preference and preferably at least one real time or near real time geographical location of at least one representative can be transmitted from at least one application to at least one central server by way of at least one link Step 7. At least one conveyance service request can be filtered by at least one central server using at least one representative preference and preferably at least one real time or near real time geographical location of at least one representative into at least one filtered conveyance service request Step 8. At least one filtered conveyance service request can preferably be sorted in at least one order relating to at least one weighted average of at least one representative preference to identify at least one preferred conveyance service request Step 9. At least one preferred conveyance service request can be identified by at least one central server as at least one filtered conveyance service request that has the highest weighted average from at least one filtered conveyance service request Step 10. At least one preferred conveyance service request can be transmitted from at least one central server to at least one application by way of at least one link Step 11. At least one application can, for example, display at least one pop-up with details, such as but not limited to price and at least one service provider of at least one preferred conveyance service request Step 12. At least one representative can, for example, decline at least one preferred conveyance service request Step 13. At least one new or different preferred conveyance service request can be identified by at least one central server in real time or near real time Step 14. At least one application can, for example, display at least one new or different pop-up with details, such as but not limited to price and at least one service provider of at least one new or different preferred conveyance service request Step 15. At least one representative can accept at least one new or different preferred conveyance service request Step 16. At least one central server can secure or obtain at least one accepted preferred conveyance service request Step 17. At least one secured or obtained preferred conveyance service request can be transmitted from at least one central server to at least one application by way of at least one link Step 18. At least one representative can perform at least one conveyance service relating to at least one secured or obtained preferred conveyance service request and at least one real time or near real time geographical location of at least one representative can update or change, while at least one Representative Automated Platform can analyze or evaluate at least one conveyance service request continuously in real time or near real time, and then preferably can secure or obtain at least one subsequent or additional preferred conveyance service request, until stopped by at least one representative The present non-limiting example can be applied to any conveyance of goods or services, however, the following is a non-limiting example in more than one conveyance industry segment. In this non-limiting example, a representative 2 can be a driver, a conveyance client 1 can be a passenger or recipient of a conveyance service, and preferred conveyance service requests 17 can be a delivery service request, a ride service request, and a food delivery service request.

In this non-limiting example, a representative 2 can use a Representative Automated Platform 13 to secure or obtain five preferred conveyance service requests 17. A representative 2 can provide conveyance services based on guidance provided by a Representative Automated Platform 13. Individual preferred conveyance service requests 17 can be secured or obtained and then preferably completed in any order as laid out by a Representative Automated Platform 13. A Representative Automated Platform 13 can apply representative preferences 18 to preferably enable only preferred conveyance service requests 17 to be accepted. A central server 9 can continuously receive conveyance service requests 15 from preferably more than one external server 10 by way of at least one link 8 in real time or near real time and can store, standardize, aggregate, and filter conveyance service requests 15 in real time or near real time. A central server 9 can preferably sort filtered conveyance service requests 16 in real time or near real time, or use another technique, to identify preferred conveyance service requests 17. A representative 2 can access an application 6 using a terminal 7 to gain knowledge of more than one conveyance industry segment, for example.

Once logged into an application 6, a representative 2 can input or provide, for example, representative preferences 18 into an application 6. In this non-limiting example, a representative 2 can input or provide two representative preferences 18, an efficiency preference and a service provider 5 inclusion preference. An efficiency preference can be, for example, a preference of three or more preferred conveyance service requests 17 within a specific geographical location that can be performed at the same time or during the same trip. A service provider 5 inclusion preference can be, for example, a preference to include three specific service providers 5 that a representative 2 holds accounts with.

For example, a central server 9 can filter out conveyance service requests 15 that do not match or satisfy the two representative preferences 18 for a representative 2. Benefits of representative preferences 18 can be to allow a representative 2 to better meet their criteria in providing conveyance services such as but not limited to higher earning potential, better efficiencies, more suitable conveyance service requests 15, or a combination thereof. The two representative preferences 18 for this example and preferably the real time or near real time geographical location of a representative 2 can be transmitted from an application 6 to a central server 9 by way of at least one link 8.

A central server 9 can filter conveyance service requests 15 into filtered conveyance service requests 16 by comparing to, for example, the two representative preferences 18 and preferably the real time or near real time geographical location of a representative 2. The conveyance service requests 15 that match the indicated two representative preferences 18 can be identified as filtered conveyance service requests 16. The conveyance service requests 15 that do not match the indicated two representative preferences 18 can be discarded or ignored as not being filtered conveyance service requests 16. The filtered conveyance service requests 16 can preferably be sorted by a weighted average of, for example, the two representative preferences 18 to identify preferred conveyance service requests 17. The representative preferences 18 can be but are not limited to unequal weights of, for example, 75% efficiency preference and, for example, 25% service provider 5 inclusion preference when calculating a weighted average. A representative 2 can optionally choose for representative preferences 18 to have equal or unequal weights. In this non-limiting example, a representative 2 can favor an efficiency preference more than working with specific service providers 5.

Preferably, the filtered conveyance service requests 16 with a highest weighted average can be identified as preferred conveyance service requests 17. For example, a central server 9 can identify preferred conveyance service requests 17 from filtered conveyance service requests 16 by preferably using the highest weighted averages of an efficiency preference and service provider 5 inclusion preference. Preferably, additional conveyance service requests 15 can be received and continuously filtered by a central server 9 into additional filtered conveyance service requests 16. Preferably, additional filtered conveyance service requests 16 can be sorted by a central server 9 into preferred conveyance service requests 17.

The preferred conveyance service requests 17 in conjunction with corresponding conveyance data can be transmitted from a central server 9 to an application 6 by way of at least one link 8. An application 6 can, for example, display a pop-up with details such as but not limited to price and a service provider 5 of preferred conveyance service requests 17. A representative 2 can analyze or evaluate preferred conveyance service requests 17 with corresponding conveyance data and can, for example, decline preferred conveyance service requests 17, New preferred conveyance service requests 17 can be identified by a central server 9 and can be, for example, displayed to a representative 2 via another pop-up on an application 6. Preferably, a representative 2 can accept new preferred conveyance service requests 17 and a central server 9 can secure or obtain new accepted preferred conveyance service requests 17 for a representative 2. Secured or obtained preferred conveyance service requests 17 can be transmitted from a central server 9 to an application 6 by way of at least one link 8.

At least one application 6, at least one central server 9, at least one external server 10, at least one terminal 7, at least one link 8, or a combination thereof, can be combined or integrated. A representative 2 can perform a conveyance service and the real time or near real time geographical location of a representative 2 can update or change, while a Representative Automated Platform 13 can continuously analyze or evaluate conveyance service requests 15 in real time or near real time, and then preferably secure or obtain subsequent or additional preferred conveyance service requests 17, until stopped by a representative 2.

In this non-limiting example, a Representative Automated Platform 13 can first secure or obtain three preferred conveyance service requests 17 relating to an individual good supplier in the good delivery industry segment accepted by a representative 2 (service request #1, #2, and #3).

For example, a representative 2 can begin performing the conveyance services and can pick up all three good deliveries to be conveyed from the good supplier. Before the completion of service requests #1, #2, and #3, a Representative Automated Platform 13 can, for example, secure or obtain a preferred conveyance service request 17 in the ride-hail industry segment (service request #4).

Preferably a representative 2 can begin service request #4 and pick up a conveyance client 1 at a beginning service geographical location then preferably drop off a conveyance client 1 at an ending service geographical location to complete service request #4. After completion of service request #4, a Representative Automated Platform 13 can, for example, secure or obtain a preferred conveyance service request 17 in the food delivery industry segment (service request #5).

Preferably a representative 2 can begin service request #5 and pick up the requested food at the good supplier geographical location then preferably drop off the requested food at an ending service geographical location to complete service request #5. After completion of service request #5, a Representative Automated Platform 13 can indicate to a representative 2 to complete service request #1, for example.

Preferably a representative 2 can drop off a delivery at an ending service geographical location to complete service request #1. Next, a Representative Automated Platform 13 can indicate to a representative 2 to complete service request #3, for example. Preferably a representative 2 can drop off a delivery at an ending service geographical location to complete service request #3. Lastly, a Representative Automated Platform 13 can indicate to a representative 2 to complete service request #2, for example. Preferably a representative 2 can drop off a delivery at an ending service geographical location to complete service request #2. A representative 2 can then, for example, turn off a Representative Automated Platform 13.

Example 3

This example establishes some preferred non-limiting aspects of an exemplary system of the present invention and an exemplary method of use of a system of the present invention, automated in whole or in part, where at least one owner or at least one controller of at least one autonomous vehicle can benefit from the present invention, particularly as set forth in the figures and the description thereof. The following is a non-limiting example where at least one Autonomous Vehicle Automated Platform is used by at least one autonomous vehicle. Numerical references refer to those in the figures. The following are steps of an exemplary method in a preferable but not required order. Generally see FIG. 4 and FIG. 5 for a non-limiting and exemplary system and FIG. 6 and FIG. 8 for a method of the present invention.

Step 1. At least one conveyance service request can be transmitted from at least one external server to at least one central server continuously in real time or near real time by way of at least one link Step 2. At least one conveyance service request can be stored, standardized, aggregated, or a combination thereof, at least once on at least one central server Step 3. At least one owner or at least one controller of at least one autonomous vehicle can input or provide at least one selected preference into at least one owner or controller application Step 4. At least one autonomous vehicle can connect to at least one application via at least one terminal Step 5. At least one autonomous vehicle can be authenticated Step 6. At least one selected preference can be transmitted from at least one owner or controller application to at least one central server by way of at least one link Step 7. Preferably at least one real time or near real time geographical location of at least one autonomous vehicle can be transmitted from at least one application to at least one central server by way of at least one link Step 8. At least one conveyance service request can be filtered by at least one central server using at least one selected preference and preferably at least one real time or near real time geographical location of at least one autonomous vehicle into at least one filtered conveyance service request Step 9. At least one filtered conveyance service request can preferably be sorted in at least one order relating to at least one weighted average of at least one selected preference to identify at least one preferred conveyance service request Step 10. At least one preferred conveyance service request can be identified by at least one central server as at least one filtered conveyance service request that has the highest weighted average from at least one filtered conveyance service request Step 11. At least one central server can secure or obtain at least one preferred conveyance service request Step 12. At least one secured or obtained preferred conveyance service request can be transmitted from at least one central server to at least one application by way of at least one link Step 13. At least one autonomous vehicle can perform at least one conveyance service relating to at least one secured or obtained preferred conveyance service request and at least one real time or near real time geographical location of at least one autonomous vehicle can update or change, while at least one Autonomous Vehicle Automated Platform can analyze or evaluate at least one conveyance service request continuously in real time or near real time, and then preferably can secure or obtain at least one subsequent or additional preferred conveyance service request, until stopped by at least one owner or at least one controller of at least one autonomous vehicle The present non-limiting example can be applied to any conveyance of goods or services, however, the following is a non-limiting example of an individual service provider 5 that owns or controls a fleet of autonomous vehicles 3 in more than one conveyance industry segment. Even though a fleet of autonomous vehicles 3 can be controlled or operated in a similar fashion, in this non-limiting example, the focus is on one autonomous vehicle 3 being controlled or operated by a service provider 5. In this non-limiting example, a conveyance client 1 can be a passenger or recipient of a conveyance service, an owner or controller of an autonomous vehicle 4 can be a service provider 5, and preferred conveyance service requests 17 can be a courier service request, a ride service request, and a food delivery service request.

An autonomous vehicle 3 can provide conveyance services based on guidance provided by an Autonomous Vehicle Automated Platform 14. Individual preferred conveyance service requests 17 can be secured or obtained and then preferably completed in any order as laid out by an Autonomous Vehicle Automated Platform 14. An Autonomous Vehicle Automated Platform 14 can apply selected preferences 19 to preferably enable only preferred conveyance service requests 17 to be accepted. A central server 9 can continuously receive conveyance service requests 15 from, for example, one external server 10 by way of at least one link 8 in real time or near real time and can store, standardize, aggregate, and filter conveyance service requests 15 in real time or near real time. A central server 9 can preferably sort filtered conveyance service requests 16 in real time or near real time, or use another technique, to identify preferred conveyance service requests 17. At least one application 6, at least one owner or controller application 11, at least one central server 9, at least one external server 10, at least one terminal 7, at least one link 8, or a combination thereof, can be combined or integrated.

An owner or controller of an autonomous vehicle 4 can input or provide, for example, selected preferences 19 into an owner or controller application 11. In this non-limiting example, an owner or controller of an autonomous vehicle 4 can input or provide two selected preferences 19, an industry segment preference and a geographical location preference. An industry segment preference can be, for example, that an autonomous vehicle 3 can provide conveyance services in a courier industry segment, ride-hail industry segment, and food delivery industry segment. A geographical location preference can be, for example, that an autonomous vehicle 3 can provide conveyance services in a certain quadrant or geographical area. A service provider 5 can control where an autonomous vehicle 3 can provide conveyance services across a city or place. For example, a central server 9 can filter out conveyance service requests 15 that do not match or satisfy criteria of the selected preferences 19 for an owner or controller of an autonomous vehicle 4.

Benefits of selected preferences 19 can be to allow an owner or controller of an autonomous vehicle 4 to better meet their criteria in providing conveyance services such as but not limited to higher earning potential, better efficiencies, greater number of conveyance services provided, more suitable conveyance service requests 15, or a combination thereof. The two selected preferences 19 for this example can be transmitted from an owner or controller application 11 to a central server 9 by way of at least one link 8. Preferably the real time or near real time geographical location of an autonomous vehicle 3 can be transmitted from an application 6 to a central server 9 by way of at least one link 8.

A central server 9 can communicate with an autonomous vehicle 3 by using an application 6 on a terminal 7 associated with an autonomous vehicle 3. An autonomous vehicle 3 can connect to an application 6 via a terminal 7 and can be authenticated.

A central server 9 can filter conveyance service requests 15 into filtered conveyance service requests 16 by comparing to, for example, the two selected preferences 19 and preferably the real time or near real time geographical location of an autonomous vehicle 3. The conveyance service requests 15 that match the indicated two selected preferences 19 can be identified as filtered conveyance service requests 16. The conveyance service requests 15 that do not match the indicated two selected preferences 19 can be discarded or ignored as not being filtered conveyance service requests 16. The filtered conveyance service requests 16 can preferably be sorted by a weighted average of, for example, the two selected preferences 19 to identify preferred conveyance service requests 17. An owner or controller of an autonomous vehicle 4 can optionally choose for selected preferences 19 to have equal or unequal weights. The selected preferences 19 can be but are not limited to equal weights, for example, of 50% when calculating a weighted average.

The selected preferences 19 chosen by an owner or controller of an autonomous vehicle 4 can optionally be given unequal weights, for example but not limited to 70% and 30%. In this non-limiting specific example, an industry segment preference can be given a weight of 70% and can be set to include the ride-hail industry, courier industry, and food delivery industry by an owner or controller of an autonomous vehicle 4. The filtered conveyance service requests 16 in the ride-hail industry, courier industry, or food delivery industry can be assigned a score of 10 out of 10 by a central server 9. The filtered conveyance service requests 16 not in the ride-hail industry, courier industry, or food delivery industry can be assigned a score of 0 out of 10 by a central server 9. A geographical location preference can be given a weight of 30% and can be set by an owner or controller of an autonomous vehicle 4 to include filtered conveyance service requests 16 within an area or a perimeter of five miles from the real time or near real time geographical location of an autonomous vehicle 3. The filtered conveyance service requests 16 within one mile from the real time or near real time geographical location of an autonomous vehicle 3 can be assigned a score of 10 out of 10 by a central server 9. The filtered conveyance service requests 16 within two miles from the real time or near real time geographical location of an autonomous vehicle 3 can be assigned a score of 8 out of 10 by a central server 9. The filtered conveyance service requests 16 within three miles from the real time or near real time geographical location of an autonomous vehicle 3 can be assigned a score of 6 out of 10 by a central server 9. The filtered conveyance service requests 16 within four miles from the real time or near real time geographical location of an autonomous vehicle 3 can be assigned a score of 4 out of 10 by a central server 9. The filtered conveyance service requests 16 within five miles from the real time or near real time geographical location of an autonomous vehicle 3 can be assigned a score of 2 out of 10 by a central server 9. The filtered conveyance service requests 16 more than five miles away from the real time or near real time geographical location of an autonomous vehicle 3 can be assigned a score of 0 out of 10 by a central server 9. For example, a filtered conveyance service request 16 in the ride-hail industry within three miles from the real time or near real time geographical location of an autonomous vehicle 3 can be calculated or determined by a central server 9 as having a weighted average of (70% of 10) plus (30% of 6) that can equal 8.8 based on an industry segment preference and a geographical location preference. A filtered conveyance service request 16 with the highest weighted average of 8.8 in this instance can be identified as a preferred conveyance service request 17 in comparison to other filtered conveyance service requests 16 with lower weighted averages.

Preferably, a filtered conveyance service request 16 with the highest weighted average can be identified as a preferred conveyance service request 17. For example, a central server 9 can identify a preferred conveyance service request 17 from filtered conveyance service requests 16 by preferably using the highest weighted average of an industry segment preference and a geographical location preference. Preferably, additional conveyance service requests 15 can be received and continuously filtered by a central server 9 into additional filtered conveyance service requests 16. Preferably, additional filtered conveyance service requests 16 can be sorted by a central server 9 into preferred conveyance service requests 17 when appropriate.

A central server 9 can secure or obtain a preferred conveyance service request 17 for an autonomous vehicle 3. A secured or obtained preferred conveyance service request 17 can be transmitted from a central server 9 to an application 6 in an autonomous vehicle 3 by way of at least one link 8.

An autonomous vehicle 3 can perform a conveyance service and the real time or near real time geographical location of an autonomous vehicle 3 can update or change, while an Autonomous Vehicle Automated Platform 14 can analyze or evaluate conveyance service requests 15 continuously in real time or near real time, and then preferably secure or obtain subsequent or additional preferred conveyance service requests 17, until stopped by an owner or controller of an autonomous vehicle 4.

In this non-limiting example, an Autonomous Vehicle Automated Platform 14 can be used by an autonomous vehicle 3 to secure or obtain, for example, three preferred conveyance service requests 17. Preferably an autonomous vehicle 3 can perform or provide conveyance services based on guidance provided by an Autonomous Vehicle Automated Platform 14. Individual preferred conveyance service requests 17 can be secured or obtain and then preferably completed in any order as laid out by an Autonomous Vehicle Automated Platform 14. In this non-limiting example, an Autonomous Vehicle Automated Platform 14 can first accept a preferred conveyance service request 17 in the courier industry segment (service request #1).

For example, an autonomous vehicle 3 can begin the conveyance service and can pick up a package to be conveyed. A package can be placed in an autonomous vehicle 3. Before the completion of service request #1, an Autonomous Vehicle Automated Platform 14 can, for example, secure or obtain an additional preferred conveyance service request 17 in the ride-hail industry segment (service request #2).

Preferably an autonomous vehicle 3 can begin service request #2 and pick up a conveyance client 1 at a beginning service geographical location then preferably drop off a conveyance client 1 at an ending service geographical location to complete service request #2. After completion of service request #2, an Autonomous Vehicle Automated Platform 14 can, for example, secure or obtain an additional preferred conveyance service request 17 in the food delivery industry (service request #3).

Preferably an autonomous vehicle 3 can begin service request #3 and the food to be delivered can be placed in an autonomous vehicle 3 at a good supplier geographical location. An autonomous vehicle 3 can drop off the food delivery at an ending service geographical location to complete service request #3, for example. After completion of service request #3 an Autonomous Vehicle Automated Platform 14 can, for example, indicate to an autonomous vehicle 3 to complete service request #1. An autonomous vehicle 3 can drop off the package at an ending service geographical location to complete service request #1, for example. An owner or controller of an autonomous vehicle 4 can then, for example, turn off an Autonomous Vehicle Automated Platform 14.

Example 4

This example establishes some preferred non-limiting aspects of an exemplary system of the present invention and an exemplary method of use of a system of the present invention, automated in whole or in part, where at least one representative can benefit from the present invention, particularly as set forth in the figures and the description thereof. The following is a non-limiting example where at least one Representative Automated Platform is used by at least one representative. Numerical references refer to those in the figures. The following are steps of an exemplary method in a preferable but not required order. Generally see FIG. 7 for both a non-limiting and exemplary system and for a method of the present invention.

The present non-limiting example can illustrate how conveyance service requests 15 can become filtered conveyance service requests 16 and then a preferred conveyance service request 17. In this non-limiting example, a representative 2 can be a driver, a conveyance client 1 can be a passenger or recipient of a conveyance service, and a preferred conveyance service request 17 can be a ride service request. In this non-limiting example, a representative 2 can use a Representative Automated Platform 13 to secure or obtain a preferred conveyance service request 17.

A central server 9 can receive conveyance service requests 15 from an external server 10 continuously or repeatedly in real time or near real time. A central server 9 can store, standardize, aggregate, or a combination thereof, conveyance service requests 15 in any order. A representative 2 can input or provide two representative preferences 18, the real time or near real time geographical location of a representative, or a combination thereof, to a central server 9.

A central server 9 can compare conveyance service requests 15 to the real time or near real time geographical location of a representative 2 and discard or ignore conveyance service requests 15 being further than 10 miles perimeter. A subset of conveyance service requests 15 within 10 miles perimeter that also match or satisfy an industry segment preference can be identified as filtered conveyance service requests 16.

In this non-limiting specific example, an industry segment preference can be given a weight of 40% and can be set to include only the ride-hail industry segment by a representative 2. The filtered conveyance service requests 16 in a ride-hail industry segment can be assigned a score of 10 out of 10 by a central server 9. The filtered conveyance service requests 16 not in a ride-hail industry segment can be assigned a score of 0 out of 10 by a central server 9.

A pricing preference can be given a weight of 60% and can be set by a representative 2 to include filtered conveyance service requests 16 with at least $10.00 revenue per conveyance service performed.

The filtered conveyance service requests 16 with less than $10.00 revenue can be assigned a score of 0 out of 10 by a central server 9. The filtered conveyance service requests 16 with pricing being $10.00-$14.99 revenue can be assigned a score of 4 out of 10 by a central server 9. The filtered conveyance service requests 16 with pricing being $15.00-$19.99 revenue can be assigned a score of 7 out of 10 by a central server 9, The filtered conveyance service requests 16 with pricing of $20.00 or more in revenue can be assigned a score of 10 out of 10 by a central server 9.

For example, a filtered conveyance service request 16 in a ride-hail industry segment with pricing being $17.00 can be calculated or determined by a central server 9 as having a weighted average of (40% of 10) plus (60% of 7) that can equal 8.2 based on an industry segment preference and a pricing preference. A filtered conveyance service request 16 can preferably be sorted in an ascending order relating to a weighted average of 8.2 in this instance and can be identified as a preferred conveyance service request 17 in comparison to other filtered conveyance service requests 16 with lower weighted averages.

A Representative Automated Platform 13 can secure or obtain a preferred conveyance service request 17 in a ride-hail industry segment with pricing being $17.00. A representative 2 can perform a conveyance service and the real time or near real time geographical location of a representative 2 can update or change, while a Representative Automated Platform 13 can continuously analyze or evaluate conveyance service requests 15 in real time or near real time, and then preferably secure or obtain a subsequent or additional preferred conveyance service request 17, until stopped by a representative 2. At least one function of a central server 9 or at least one external server 10 can be performed by an application 6.

All or some of conveyance data relating to at least one autonomous vehicle 3 can be filtered and can be identified as preferred in at least one same or at least one similar process to filter and identify at least one conveyance service request 15 into at least one preferred conveyance service request 17. At least one application 6, at least one central server 9, at least one external server 10, at least one terminal 7, at least one link, or a combination thereof, can be combined or integrated.

Example 5

This example establishes some preferred non-limiting aspects of an exemplary system of the present invention and an exemplar), method of use of a system of the present invention, automated in whole or in part, where at least one owner or at least one controller of at least one autonomous vehicle can benefit from the present invention, particularly as set forth in the figures and the description thereof. The following is a non-limiting example where at least one Autonomous Vehicle Automated Platform is used by at least one autonomous vehicle. Numerical references refer to those in the figures. The following are steps of an exemplary method in a preferable but not required order. Generally see FIGS. 5 and 7 for both a non-limiting and exemplary system and for a method of the present invention.

The present non-limiting example can illustrate how conveyance service requests 15 can become filtered conveyance service requests 16 and then a preferred conveyance service request 17. The present non-limiting example can be applied to any conveyance of goods or services, however, the following is a non-limiting example in a food delivery industry segment. In this non-limiting example, a conveyance client 1 can be a person that can order food, an autonomous vehicle 3 can perform a conveyance service, an owner or controller of an autonomous vehicle 4 can be a private owner of an autonomous vehicle 3, and a preferred conveyance service request 17 can be a food delivery service request.

A central server 9 can receive conveyance service requests 15 from external servers 10 continuously or repeatedly in real time or near real time and can pre-categorize conveyance service requests 15 by zip code. A central server 9 can store, standardize, aggregate, or a combination thereof, conveyance service requests 15 in any order. An owner or controller of an autonomous vehicle 4 can input or provide one selected preference 19 to a central server 9. The real time or near real time geographical location of an autonomous vehicle 3 can be transmitted from an application 6 to a central server 9 by way of at least one link 8.

A central server 9 can compare pre-categorized conveyance service requests 15 to the real time or near real time geographical location of an autonomous vehicle 3 and discard or ignore conveyance service requests 15 being in a different zip code area other than an autonomous vehicle 3. A subset of conveyance service requests 15 within the zip code area of an autonomous vehicle 3 that also matches or satisfies an estimated time of arrival preference can be identified as filtered conveyance service requests 16.

In this non-limiting specific example, an estimated time of arrival preference can be given a weight of 100% and can be set by an owner or controller of an autonomous vehicle 4 to less than twenty minutes from an autonomous vehicle 3. The filtered conveyance service requests 16 with an estimated time of arrival of more than twenty minutes can be assigned a score of 10 out of 10 by a central server 9. The filtered conveyance service requests 16 with an estimated time of arrival of less than or equal to twenty minutes can be assigned a score of 0.5 per minute by a central server 9. For example, a filtered conveyance service request 16 with an estimated time of arrival of fourteen minutes can be assigned a score of 7 out of 10 or a filtered conveyance service request 16 with an estimated time of arrival of six minutes can be assigned a score of 3 out of 10.

For example, a filtered conveyance service request 16 in a food delivery industry segment with an estimated time of arrival of four minutes can be calculated or determined by a central server 9 as having a weighted average of (100% of 2) that can equal 2 based on an estimated time of arrival preference. A minimum function can be utilized to identify a filtered conveyance service request 16 having the lowest weighted average in comparison to other filtered conveyance service requests 16 with higher weighted averages as a preferred conveyance service request 17.

At least one application 6, at least one owner or controller application 11, at least one central server 9, at least one external server 10, at least one terminal 7, at least one link, at least one autonomous vehicle 3, or a combination thereof, can be combined or integrated.

Example 6

This example establishes some preferred non-limiting aspects of an exemplary system of the present invention and an exemplary method of use of a system of the present invention, automated in whole or in part, where at least one owner or at least one controller of at least one autonomous vehicle 4 or a fleet manager can benefit from the present invention. Numerical references refer to those in the figures. The following are steps of an exemplary method in a preferable but not required order. Generally see FIGS. 4, 5, 9, 10, 11, and 12 for both a non-limiting and exemplary system and for a method of the present invention.

The present non-limiting example can be applied to any conveyance of goods or services, however, the following is a non-limiting example of an individual fleet manager that owns or controls a fleet of autonomous vehicles 3 in at least one conveyance industry segment. In this non-limiting example, the focus is on assisting a fleet manager to have no conveyance client 1 that waits too long to receive a conveyance service. In this non-limiting example, an Autonomous Vehicle Automated Platform can be used by an owner or controller of an autonomous vehicle 4 or a fleet manager to control or operate a fleet of three autonomous vehicles 3A, 3B, and 3C to perform or service all or most conveyance service requests 15. In this non-limiting example, conveyance clients 1A, 1B, and 1C can be passengers or recipients of the conveyance services, an owner or controller of an autonomous vehicle 4 can be a fleet manager, conveyance service requests 15A, 15B, and 15C can correspond to each respective conveyance client 1A, 1B, and 1C, and a preferred conveyance service request 17C can be the oldest outstanding ride service request. In this non-limiting example, an owner or controller of an autonomous vehicle 4 or a fleet manager can utilize an Autonomous Vehicle Automated Platform to identify the oldest outstanding conveyance service request 15C as the preferred conveyance service request 17C that needs to be fulfilled or performed as soon as possible by an autonomous vehicle 3 to maintain good consumer sentiment.

An autonomous vehicle 3 can provide conveyance services based on guidance provided by an Autonomous Vehicle Automated Platform. An Autonomous Vehicle Automated Platform can optimize fleet performance and can control or operate a fleet of autonomous vehicles 3A, 3B, and 3C in an efficient manner and maintain good consumer sentiment. In this non-limiting example, an owner or controller of an autonomous vehicle 4 or a fleet manager can use the selected preferences 19 to identify a preferred conveyance service request 17C, as being the oldest outstanding ride request, for or with an autonomous vehicle 3B that can be identified as preferred. In this non-limiting example, an Autonomous Vehicle Automated Platform can single out or identify the oldest outstanding conveyance service request 15C as being a preferred conveyance service request 17C. At least one application 6, at least one owner or controller application 11, at least one central server 9, at least one external server 10, at least one terminal 7, at least one link 8, at least one autonomous vehicle 3, or a combination thereof, can be combined or integrated.

A central server 9 can receive conveyance service requests 15A, 15B, and 15C with corresponding conveyance data, a fleet of autonomous vehicles 3A, 3B, and 3C with corresponding conveyance data, a real time or near real time geographical location of a fleet of autonomous vehicles 3A, 3B, and 3C, or a combination thereof, from, for example, two external servers 10 by way of at least one link 8 in real time or near real time. The real time or near real time geographical location of a fleet of autonomous vehicles 3A, 3B, and 3C can optionally be transmitted from at least one application 6 through an external server 10 to a central server 9 by way of at least one link 8. A central server 9 can store, standardize, aggregate, or a combination thereof, conveyance service requests 15A, 15B, and 15C, conveyance data corresponding to a fleet of autonomous vehicles 3A, 3B, and 3C, a real time or near real time geographical location of a fleet of autonomous vehicles 3A, 3B, and 3C, or a combination thereof, in real time or near real time. Conveyance service requests 15A, 15B, and 15C can be sent or transmitted from an external server 10 and can be received on a central server 9. A central server 9 can store conveyance service requests 15A, 15B, and 15C in at least one database and can organize the conveyance service requests 15 in a first database table. In this non-limiting example, all or some of the conveyance service requests 15 can be stored in a first database table along with exact or specific timestamp of creation. A central server 9 can also store, organize, and analyze conveyance data corresponding to a fleet of autonomous vehicles 3A, 3B, and 3C, a real time or near real time geographical location of a fleet of autonomous vehicles 3A, 3B, and 3C, or a combination thereof in at least one database in a second database table.

As a non-limiting example, an owner or controller of an autonomous vehicle 4 or a fleet manager can input or provide the selected preferences 19 into an owner or controller application 11, being a website. The selected preferences 19 in this non-limiting example can be transmitted from an owner or controller application 11, being a website, to a central server 9 by way of at least one link 8. In this non-limiting example, an owner or controller of an autonomous vehicle 4 or a fleet manager can input or provide three selected preferences 19 total and can apply at least one selected preference 19 to each database table. In this non-limiting example, the three selected preferences 19 can be an industry segment preference, a distance preference, and an oldest outstanding request preference. In this non-limiting example, an industry segment preference can be a ride-hail industry segment, a distance preference can identify an autonomous vehicle 3 within a 1 mile perimeter, and an oldest outstanding request preference can identify the oldest outstanding conveyance service request 15 based on the exact or specific timestamp of creation. An owner or controller of an autonomous vehicle 4 or a fleet manager can utilize any combination of the three selected preferences 19 when filtering and identifying a preferred conveyance service request 17, an autonomous vehicle 3 that can be identified as preferred, or a combination thereof.

As a result of executing a database query, conveyance service requests 15A, 15B, and 15C organized in a first database table can be filtered into at least one result set of filtered conveyance service requests 16A and 16C by at least one central server 9. In this non-limiting operation, an industry segment preference, for example, a ride-hail industry segment preference can be applied. Conveyance service requests 15A and 15C being ride-hail conveyance service requests, can match or satisfy the selected preference 19 and can become filtered conveyance service requests 16A and 16C. Conveyance service request 15B can be a food delivery service request, which does not match or satisfy the selected preference 19, and as a result, can get discarded. By applying the oldest outstanding request preference, a central server 9 can sort the filtered conveyance service requests 16A and 16C in ascending or descending order to identify the oldest timestamp or date of creation, and as a result, a filtered conveyance service request 16C can be identified as a preferred conveyance service request 17C. As a result of executing a database query, all or some of conveyance data relating to a fleet of autonomous vehicles 3A, 3B, and 3C organized in second database table can be filtered into at least one result set of all or some of filtered conveyance data relating to autonomous vehicles 3A and 3B by at least one central server 9. In this non-limiting operation, a distance preference, for example, less than 1 mile from a preferred conveyance service request 17C can be applied. All or some of conveyance data relating to a fleet of autonomous vehicles 3A and 3B representing autonomous vehicles 3A and 3B that are located within 1 mile perimeter from a preferred conveyance service request 17C can match or satisfy the selected preference 19 and can become all or some of filtered conveyance data relating to a fleet of autonomous vehicles 3A and 3B. All or some of conveyance data relating to autonomous vehicle 3C representing an autonomous vehicle 3C that can be located further than 1 mile from a preferred conveyance service request 17C does not match or satisfy the selected preference 19, and as a result, can get discarded.

By sorting the remaining all or some of filtered conveyance data relating to a fleet of autonomous vehicles 3A and 3B according to their physical distance from a preferred conveyance service request 17C, a central server 9, can identify all or some of preferred conveyance data relating to an autonomous vehicle 3B or all or some of preferred conveyance data relating to an autonomous vehicle 3B that can be identified as preferred as being within the closest physical distance from a preferred conveyance service request 17C.

After identifying a match between a preferred conveyance service request 17C and an autonomous vehicle 3B that can be identified as preferred, a fleet manager can utilize an Autonomous Vehicle Automated Platform that can automatically secure or obtain a preferred conveyance service request 17C for or with an autonomous vehicle 3B and can improve the efficiency and performance of a fleet of autonomous vehicles 3A, 3B, and 3C. In this non limiting example, a fleet manager can maintain good consumer sentiment as the oldest outstanding conveyance service request 15C can be identified as a preferred conveyance service request 17C and can be secured or obtained for or with an autonomous vehicle 3B that can be identified as preferred to be serviced or performed as soon as possible.

Example 7

This example establishes some preferred non-limiting aspects of an exemplary system of the present invention and an exemplary method of use of a system of the present invention, automated in whole or in part, where at least one owner or at least one controller of at least one autonomous vehicle 4 or at least one fleet manager can benefit from the present invention. Numerical references refer to those in the figures. The following are steps of an exemplary method in a preferable but not required order. Generally see FIGS. 4, 5, 9, 10, 11, and 12 for both a non-limiting and exemplary system and for a method of the present invention.

The present non-limiting example can be applied to any conveyance of goods or services, however, the following is a non-limiting example where at least one Autonomous Vehicle Automated Platform can be used by a fleet manager to control or operate a fleet of autonomous vehicles 3 in more than one conveyance industry segment. In this non-limiting example, the focus is on two autonomous vehicles 3A and 3B within a fleet being controlled or operated by a fleet manager. In this non-limiting example, an autonomous vehicle 3A operates in a ridehail industry segment and an autonomous vehicle 3B operates in a food delivery industry segment that can be operated or controlled by the same fleet manager or same owner or controller of an autonomous vehicle 4. In this non-limiting example, a conveyance client 1 can be a passenger or recipient of a conveyance service, an owner or controller of an autonomous vehicle 4 can be a fleet manager, and preferred conveyance service requests 17A and 17B can be a ride service request and a food delivery service request respectfully. In this non-limiting example, an Autonomous Vehicle Automated Platform can identify and secure or obtain a preferred conveyance service request 17A for the worst performing autonomous vehicle 3A in the ride-hail industry segment first and then can identify and secure or obtain a preferred conveyance service request 17B for the worst performing autonomous vehicle 3B in the food delivery industry segment.

An Autonomous Vehicle Automated Platform can optimize fleet performance by controlling or operating a fleet of autonomous vehicles 3 in an efficient manner. An Autonomous Vehicle Automated Platform can manage or control autonomous vehicles 3 from at least one single autonomous vehicle 3 perspective, at least one fleet perspective, at least one independent third party perspective, or a combination thereof. An Autonomous Vehicle Automated Platform can monitor and single out or pinpoint at least one autonomous vehicle 3 that is underperforming, due to poor operating performance. In this non-limiting example, an owner or controller of an autonomous vehicle 4 or a fleet manager can enhance an autonomous vehicle's 3 selected preferences 19 to increase a likelihood of securing or obtaining a preferred conveyance service request 17 for an underperforming autonomous vehicle 3 if so desired. At least one application 6, at least one owner or controller application 11, at least one central server 9, at least one external server 10, at least one terminal 7, at least one link 8, at least one autonomous vehicle 3, or a combination thereof, can be combined or integrated.

A central server 9 can continuously receive conveyance service requests 15 with corresponding conveyance data, a fleet of autonomous vehicles 3 with corresponding conveyance data, a real time or near real time geographical location of a fleet of autonomous vehicles 3, or a combination thereof, from, for example, one external server 10 by way of at least one link 8 in real time or near real time. A central server 9 can store, standardize, aggregate, and filter conveyance service requests 15, conveyance data corresponding to a fleet of autonomous vehicles 3, a real time or near real time geographical location of a fleet of autonomous vehicles 3, or a combination thereof, in real time or near real time. Preferably the real time or near real time geographical location of a fleet of autonomous vehicles 3 can be transmitted from an API on an external server 10 to a central server 9 by way of at least one link 8.

A central server 9 can categorize or pre-categorize a fleet of autonomous vehicles 3 with corresponding conveyance data in a database. A central server 9 can categorize or pre-categorize conveyance service requests 15 with corresponding conveyance data in a database. In this non-limiting example, a central server 9 can preferably categorize or pre-categorize a fleet of autonomous vehicles 3 with corresponding conveyance data in a database based on a real time or near real time geographical location of a fleet of autonomous vehicles 3. In this non-limiting specific example, an autonomous vehicle 3A with corresponding conveyance data, operating in ride-hail industry segment, can be categorized in first database table and an autonomous vehicle 3B with corresponding conveyance data, operating in food delivery industry segment, can be categorized in second database table. In this non-limiting specific example, conveyance service requests 15 from all industry segments can be categorized or pre-categorized in third database table.

A fleet manager can input or provide at least one selected preference 19 into an owner or controller application 11, being a computer application, that can be communicated with or transmitted to a central server 9 or an Autonomous Vehicle Automated Platform by way of at least one link 8. A fleet manager can use or apply two selected preferences 19 being a longest idle time preference and a ride hail industry segment preference to filter and identify an autonomous vehicle 3A that can be identified as preferred. A fleet manager can also use or apply a selected preference 19 being a geographical location preference or shortest travel time preference to filter and identify a preferred conveyance service request 17A. In this non-limiting example, an owner or controller of an autonomous vehicle 4 or a fleet manager can input or provide multiple selected preferences 19 and can apply at least one selected preference 19 to each database. In this non-limiting example, an Autonomous Vehicle Automated Platform can discover which autonomous vehicle 3 in a ride hail industry segment is waiting the longest time without performing a conveyance service.

As a result of executing at least one database query, all or some of conveyance data relating to a fleet of autonomous vehicles 3 organized in first database table can be filtered into at least one result set of all or some of filtered conveyance data relating to a fleet of autonomous vehicles 3 by at least one central server 9. All or some of conveyance data relating to a fleet of autonomous vehicles 3 performing conveyance services in a ride hail industry segment can match or satisfy the selected preference 19 and can become all or some of filtered conveyance data relating to a fleet of autonomous vehicles 3. All or some of filtered conveyance data relating to a fleet of autonomous vehicles 3 can be sorted by idle time and an autonomous vehicle 3 that is waiting the longest time without performing a conveyance service can be identified as the autonomous vehicle 3A that can be identified as preferred. An autonomous vehicle 3 that does not work or operate in the ridehail industry, can be discarded or ignored and as a result, cannot become an autonomous vehicle 3A that can be identified as preferred. A central server 9 or fleet manager can filter out autonomous vehicles 3 that do not meet or match the two selected preferences 19 and preferably the real time or near real time geographical location of a fleet of autonomous vehicles 3. As a non-limiting example, if an autonomous vehicle 3C works or operates in only the refrigerated freight industry segment due to vehicle requirement restrictions, an autonomous vehicle 3C can be filtered out of at least one database result set.

As a result of executing at least one database query based on a geographical location preference, conveyance service requests 15 organized in third database table can be filtered and preferably sorted by geographical proximity or travel time from an autonomous vehicle 3A that can be identified as preferred. The conveyance service requests 15 that do not match at least one selected preference 19 can be discarded or ignored. The filtered conveyance service request 16 with the shortest travel time to an autonomous vehicle 3A that can be identified as preferred, can be identified as a preferred conveyance service request 17A by An Autonomous Vehicle Automated Platform or a central server 9. A preferred conveyance service request 17A can be secured or obtained for or with an autonomous vehicle 3A that can be identified as preferred.

A fleet manager can input or provide at least one selected preference 19 into an owner or controller application 11, being a computer application, that can be communicated with or transmitted to a central server 9 or an Autonomous Vehicle Automated Platform by way of at least one link 8. A fleet manager can use or apply two selected preferences 19 being a longest idle time preference and a food delivery industry segment preference to filter and identify an autonomous vehicle 3B that can be identified as preferred. A fleet manager can also use or apply at least one selected preference 19 being geographical location preference or shortest travel time preference to filter and identify a preferred conveyance service request 17B. In this non-limiting example, an owner or controller of an autonomous vehicle 4 or a fleet manager can input or provide multiple selected preferences 19 and can apply at least one selected preference 19 to each database. In this non-limiting example an Autonomous Vehicle Automated Platform can discover which autonomous vehicle 3 in a food delivery industry segment is waiting the longest time without performing a conveyance service.

As a result of executing at least one database query, all or some of conveyance data relating to a fleet of autonomous vehicles 3 organized in second database table can be filtered into at least one result set of all or some of filtered conveyance data relating to a fleet of autonomous vehicles 3 by at least one central server 9. All or some of conveyance data relating to a fleet of autonomous vehicles 3 performing conveyance services in a food delivery industry segment can match or satisfy at least one selected preference 19 and can become all or some of filtered conveyance data relating to a fleet of autonomous vehicles 3. All or some of filtered conveyance data relating to a fleet of autonomous vehicles 3 can be sorted by idle time and an autonomous vehicle 3 that can be waiting the longest time without performing a conveyance service can be identified as an autonomous vehicle 3B that can be identified as preferred. A central server 9 or fleet manager can filter out autonomous vehicles 3 that do not meet or match the two selected preferences 19 and preferably the real time or near real time geographical location of a fleet of autonomous vehicles 3. An autonomous vehicle 3 that does not work or operate in the food delivery industry, can be discarded or ignored and cannot become an autonomous vehicle 3B that can be identified as preferred. As a non-limiting example, if autonomous vehicle 3D works or operates in only the biohazard freight industry due to vehicle requirement restrictions, autonomous vehicle 3D can be filtered out of at least one database result set.

As a result of executing at least one database query based on a geographical location preference, conveyance service requests 15 organized in third database table can be filtered and preferably sorted by geographical proximity or travel time from an autonomous vehicle 3B that can be identified as preferred. The conveyance service requests 15 that do not match at least one selected preference 19 can be discarded or ignored. The filtered conveyance service request 16 with the closest geographical proximity to an autonomous vehicle 3B that can be identified as preferred, can be identified as a preferred conveyance service request 17B by an Autonomous Vehicle Automated Platform or a central server 9. A preferred conveyance service request 17B can be secured or obtained for or with an autonomous vehicle 3B that can be identified as preferred.

Both autonomous vehicle 3A and 3B can perform conveyance services and the real time or near real time geographical location of an autonomous vehicle 3A and 3B can update or change, while an Autonomous Vehicle Automated Platform can analyze or evaluate conveyance service requests 15, a fleet of autonomous vehicles 3, conveyance data corresponding to a fleet of autonomous vehicles 3, or a combination thereof, continuously in real time or near real time, and then preferably secure or obtain subsequent or additional preferred conveyance service requests 17 for or with autonomous vehicles 3A and 3B that can be identified as preferred, until stopped by an owner or controller of an autonomous vehicle 4 or a fleet manager. In this non-limiting example, a fleet of autonomous vehicles 3 in conjunction with corresponding conveyance data can be filtered and the autonomous vehicles 3A and 3B can be identified as preferred in a same or similar process to filter and identify conveyance service requests 15 into a preferred conveyance service requests 17.

Example 8

This example establishes some preferred non-limiting aspects of an exemplary system of the present invention and an exemplary method of use of a system of the present invention, automated in whole or in part, where an owner or controller of an autonomous vehicle 4, a fleet manager, a good supplier, a service provider 5, a logistics provider, a logistics supplier, or a combination thereof, can benefit from the present invention. Numerical references refer to those in the figures. The following are steps of an exemplary method in a preferable but not required order. The following can illustrate at least five different scenarios relating to a service provider 5, that can be implemented for or with an Autonomous Vehicle Automated Platform. Generally see FIGS. 4, 5, 9, 10, 11, and 12 for both a non-limiting and exemplary system and for a method of the present invention.

A conveyance service request 15A can be a ride-hail request submitted by a conveyance client 1 to an external server 10A associated with a service provider 5A, as indicated by a single solid line on FIG. 10. A conveyance service request 15B can be a ride-hail request submitted by a conveyance client 1 to an external server 10B associated with a service provider 5B, as indicated by a circular dotted line on FIG. 10. Conveyance service requests 15C can be a food delivery request and a ride-hail request that can come from two external servers 10C associated with a service provider 5C, as both can be indicated by a double solid line on FIG. 10. Conveyance service requests 15D can be a courier delivery request and a good delivery request submitted by two conveyance clients 1 to one external server 10D associated with service provider 5D or good supplier, as indicated by a rectangular dotted line on FIG. 10. There are no conveyance service requests 15 submitted to an external server 10E associated with a service provider 5E or fleet manager on FIG. 10.

Each individual service provider 5 can be displayed with a corresponding letter A, B, C, D, and E to identify different service providers 5. Each individual service provider 5 can optionally have or utilize at least one owner or controller application 11. Each individual service provider 5A, 5B, 5C, and 5D can be displayed for example, with at least one different or unique line representing direct or indirect lines of connections. A service provider 5E or a fleet manager can manage or operate a fleet of autonomous vehicles 3 for another service provider 5C, which is demonstrated and displayed as having a same double solid line as service provider 5C.

Each service provider 5 can utilize at least one external server 10 in conjunction with a central server 9. In this non-limiting example, a ride-hail request, which is illustrated with a human and briefcase icon or visual, can be characterized as a conveyance service request 15A in conjunction with corresponding conveyance data and can be received, managed, operated, or a combination thereof, on or at one external server 10A that can be associated with service provider 5A. In this non-limiting example, a service provider 5A can utilize one external server 10A in conjunction with a central server 9 to manage a conveyance service request 15A in conjunction with corresponding conveyance data and another or separate external server 10A in conjunction with the central server 9 for managing or controlling an autonomous vehicle 3A, conveyance data relating to an autonomous vehicle 3A, a real time or near real time geographical location of an autonomous vehicles 3A, or a combination thereof. In this non-limiting example, a service provider 5A can utilize two different external servers 10A in conjunction with a central server 9 that can manage an on-demand service provider 5A network and match the supply of an autonomous vehicle 3A for or with the demand for ride-hail requests.

A service provider 5B can be associated with one external server 10B in conjunction with a central server 9, that can receive, store, standardize, aggregate, or a combination thereof, a conveyance service request 15B in conjunction with corresponding conveyance data. In this non-limiting example, a ride-hail request, which is illustrated with a human and briefcase icon or visual, can be characterized as a conveyance service request 15B in conjunction with corresponding conveyance data and can be received, stored, managed, or the like, on or at one external server 10B in conjunction with a central server 9. In this non-limiting example, a service provider 5B does not own or control one external server 10B in conjunction with a central server 9 to manage or operate an autonomous vehicle 3B, conveyance data relating to an autonomous vehicle 3B, a real time or near real time geographical location of an autonomous vehicle 3B, or a combination thereof, but does have direct communication to or with an autonomous vehicle 3B through a central server 9.

Both external servers 10C in conjunction with a central server 9 can utilize at least one database table for pre-categorizing, categorizing, storing, organizing, or a combination thereof, all or some of conveyance service requests 15C in conjunction with corresponding conveyance data. In this non-limiting example, a food delivery request, which is illustrated with a pizza box icon or visual, can be characterized as a conveyance service request 15C in conjunction with corresponding conveyance data and can be received, categorized, stored, operated, organized, or the like in one external server 10C in conjunction with a central server 9. In this non-limiting example, a ride-hail request, which is illustrated with a human and briefcase icon or visual, can be characterized as a conveyance service request 15C in conjunction with corresponding conveyance data and can be received, categorized, stored, operated, organized, or the like, on or at another or separate external server 10C in conjunction with the central server 9. In this non-limiting example, a service provider 5C can utilize two different external servers 10C or at least two different database tables in conjunction with a central server 9 to manage or control all or some of conveyance services based on an individual conveyance industry segment. In this non-limiting example, a service provider 5C is the only service provider 5 that can configure both external servers 10C communicate directly with each other, as illustrated by a double solid line between both external servers 10C. In this non-limiting example, a service provider 5C can update or change at least one selected preference 19 or all or some of conveyance service requests 15C in conjunction with corresponding conveyance data that can be pre-categorized, categorized, stored, organized, or the like, on or at one external server 10C, at least one external server 10C, both external servers 10C, at least one central server 9, or a combination thereof.

A service provider 5D or good supplier can be associated with two external servers 10D in conjunction with a central server 9, which can store, standardize, aggregate, or the like, all or some of conveyance service requests 15D in conjunction with corresponding conveyance data, all or some of conveyance data relating to three autonomous vehicles 3D, all or some of the real time or near real time geographical location of three autonomous vehicles 3D, or a combination thereof. In this non-limiting example, a courier delivery request, which is illustrated with a document icon or visual, can be characterized as a conveyance service request 15D in conjunction with corresponding conveyance data and can be standardized, aggregated, organized, managed, or the like in one external server 10D in conjunction with a central server 9.

In this non-limiting example, a good delivery request, which is illustrated with a package icon or visual, can be characterized as a conveyance service request 15D in conjunction with corresponding conveyance data and can be standardized, aggregated, organized, managed, or the like on or at the same external server 10D in conjunction with a central server 9. In this non-limiting example, a service provider 5D or good supplier can utilize one external server 10D or at least one database table in conjunction with a central server 9 to administer all or some of conveyance services based on two different conveyance industry segments. In this non-limiting example, a service provider 5D or a good supplier can utilize one external server 10D or at least one database table in conjunction with a central server 9 to administer all or some of conveyance service requests 15D in conjunction with corresponding conveyance data. In this non-limiting example, a service provider 5D or a good supplier can utilize another or separate external server 10D or at least one database table in conjunction with the central server 9 to administer all or some of the autonomous vehicles 3D, all or some of conveyance data relating to three autonomous vehicles 3D, all or some of the real time or near real time geographical location of three autonomous vehicles 3D, or a combination thereof. In this non-limiting example, a service provider 5D or a good supplier can utilize two different external servers 10D in conjunction with a central server 9 to manage an on-demand delivery network with one external server 10D facilitating all or some of the supply of autonomous vehicles 3D and the other external server 10D facilitating all or some of the demand for conveyance services.

A service provider 5E or a fleet manager can be associated with one external server 10E in conjunction with a central server 9, which can store, pre-standardize, aggregate, or the like conveyance data relating to an autonomous vehicle 3C, a real time or near real time geographical location of an autonomous vehicle 3C, or a combination thereof, that can be directly or indirectly sourced or provided by a service provider 5C that can be associated with two external servers 10C in conjunction with a central server 9. In this non-limiting example, a service provider 5E or a fleet manager can utilize one external server 10E in conjunction with a central server 9 to control or operate an autonomous vehicle 3C, that can only perform all or some of conveyance services for a service provider 5C.

In this non-limiting example, a service provider 5E or a fleet manager can optionally manage or operate at least one external server 10C directly or indirectly with a central server 9, that can be associated with a service provider 5C. In this non-limiting example, a ride-hail request, that is illustrated with a human and briefcase icon or visual, can be characterized as a conveyance service request 15C in conjunction with corresponding conveyance data that can be matched and preferably secured or obtained for or with an autonomous vehicle 3C through at least one external server 10C, a central server 9, one external server 10E, or a combination thereof.

In this non-limiting example, external servers 10A, 10B, 10C, 10D, and 10E, can be connected to a central server 9 by way of at least one link 8. Each link 8 can be displayed for example, with at least one different or unique line representing direct or indirect lines of connections between individual network participants contained therein.

A service provider 5A can only perform ride-hail requests because service provider 5A can only operate in the ride-hail industry segment, as evident with no other conveyance service requests 15 associated with a service provider 5A or an external server 10A. A service provider 5A can employ an Autonomous Vehicle Automated Platform that can only utilize an autonomous vehicle 3A to perform a conveyance service relating to a conveyance service request 15A. In this non-limiting example, a service provider 5A can have their own autonomous vehicle 3A controlled or operated by a central server 9 in conjunction with one external server 10A and can have their own conveyance service request 15A controlled or operated by the central server 9 in conjunction with the other external server 10A.

In this non-limiting example, a service provider 5A can optionally have direct or indirect communication between a central server 9 and at least one external server 10A by way of at least one link 8. In this non-limiting example, a service provider 5A can demonstrate at least one preferred system, at least one preferred method, or a combination thereof, when operating at least one closed-end or private service provider 5 network. A service provider 5 can however utilize an Autonomous Vehicle Automated Platform that can allow or facilitate other autonomous vehicles 3 to perform conveyance services, as evident by an autonomous vehicle 3C being operated or controlled by a service provider 5E for a service provider 5C.

A service provider 5B can only provide ride-hail requests because service provider 5B can only operate in the ride-hail industry segment, as evident with no other conveyance service requests 15 associated with service provider 5B or external server 10B. In this non-limiting example, a service provider 5B does have their own autonomous vehicle 3B, however, service provider 5B does not have the appropriate software or logistics to perform and execute conveyance services in an efficient manner and requires resources from a logistics provider. In this non-limiting example, a service provider 5B can access logistics to perform a conveyance service from a service provider 5E or a fleet manager, as a service provider 5E is also a logistics provider and can provide access to service provider's 5E logistics capabilities for a fee. In this non-limiting example, a service provider 5B can directly contract or use an autonomous vehicle 3B that can be associated with a service provider 5B by employing an Autonomous Vehicle Automated Platform that utilizes logistics from a service provider 5E to perform a ride-hail request relating to a conveyance service request 15B. In this non-limiting example, an autonomous vehicle 3B can be illustrated as an autonomous vehicle 3B that can be operated, controlled, managed, or the like on other service provider 5C and 5D networks, as indicated with the autonomous vehicle 3B having an additional 3C and 3D and displayed in FIG. 10 as autonomous vehicle 3B/3C/3D.

A service provider 5C can perform a ride-hail request and a food delivery request because a service provider 5C can operate in both the ride-hail industry segment and the food delivery industry segment, as evident with no other conveyance service requests 15 associated with a service provider 5C or both external servers 10C. In this non-limiting example, a service provider 5C is the only service provider 5 that can preferably categorize or pre-categorize all or some of conveyance service requests 15C in conjunction with corresponding conveyance data on two external servers 10C or at least two database tables in conjunction with a central server 9, based on an individual conveyance industry segment, which can improve efficiencies when a service provider 5 has the correct infrastructure, including both hardware and/or software. A service provider 5C can access and utilize an autonomous vehicle 3C through at least one central server 9 in conjunction with at least one external server 10C to perform a conveyance service relating to a conveyance service request 15C, being a food delivery request.

In this non-limiting example, a service provider 5C can manage or operate an autonomous vehicle 3C that can be associated with a service provider 5C by employing an Autonomous Vehicle Automated Platform to perform a food delivery request relating to a conveyance service request 15C. In this non-limiting example, a service provider 5C is the only service provider 5 that can own and lease out an autonomous vehicle 3C to a service provider 5E or a fleet manager along with a conveyance service request 15C being the ride-hail request associated with an external server 10C, in return for access to service provider's 5E logistics. In this non-limiting example, a service provider 5C needs service provider's 5E logistics as a service provider 5C cannot fulfill or execute conveyance services in an efficient manner due to a greater number of conveyance service requests 15 in multiple conveyance industry segments relative to a smaller number of autonomous vehicles 3. As a result, a service provider 5E or a fleet manager can utilize an Autonomous Vehicle Automated Platform to gain access and operate on service provider's 5C network to perform or execute a conveyance service request 15C relating to a ride-hail request.

A service provider 5D can also be perceived or referred to as a good supplier. A service provider 5D or a good supplier can perform a courier delivery request and a good delivery request because a service provider 5D or a good supplier can operate in both, the courier industry segment and the good delivery industry segment, as evident with no other conveyance service requests 15 associated with a service provider 5D or an external server 10D. In this non-limiting example, a service provider 5D or a good supplier is the only service provider 5 that can store, standardize, aggregate, manage, or a combination thereof, all or some of conveyance service requests 15D in conjunction with corresponding conveyance data on one external server 10D or at least one database table in conjunction with a central server 9, and the conveyance services are related to two different conveyance industry segments. In this non-limiting example, a service provider 5D or good supplier can optionally utilize at least two database tables on a central server 9 in conjunction with one external server 10D relating to each individual conveyance industry segment.

A service provider 5D or good supplier can directly or indirectly access and utilize all or some of the three autonomous vehicles 3D to perform conveyance services relating to both conveyance service requests 15D. In this non-limiting example, a service provider 5D or a good supplier is the only service provider 5 that controls or operates two different types of autonomous vehicles 3D. In this non-limiting example, an autonomous vehicle 3D can be connected and controlled through both external servers 10D and a central server 9, which is illustrated with an autonomous truck icon or visual, that can be characterized as all or some of conveyance data relating to an autonomous vehicle 3D, a real time or near real time geographical location of an autonomous vehicle 3D, or a combination thereof, on or at one external server 10D. In this non-limiting example, an autonomous vehicle 3D can be connected and controlled through one external server 10D and a central server 9, which is illustrated with an autonomous truck icon or visual, that can be characterized as all or some of conveyance data relating to an autonomous vehicle 3D, a real time or near real time geographical location of an autonomous vehicle 3D, or a combination thereof, on the central server 9.

In this non-limiting example, an autonomous vehicle 3D can be connected and controlled through one external server 10D and a central server 9, which is illustrated with an autonomous vehicle 3D icon or visual, that can be characterized as all or some of conveyance data relating to an autonomous vehicle 3D, a real time or near real time geographical location of an autonomous vehicle 3D, or a combination thereof, on the central server 9.

In this non-limiting example, a service provider 5D or a good supplier can employ an Autonomous Vehicle Automated Platform to access and utilize the autonomous vehicle 3D with a truck icon through a central server 9 in conjunction with both external servers 10D to perform a conveyance service relating to a conveyance service request 15D, being a courier delivery request. In this non-limiting example, a service provider 5D or a good supplier can employ an Autonomous Vehicle Automated Platform to access and utilize the autonomous vehicle 3D with a truck icon through a central server 9 in conjunction with one external server 10D to perform a conveyance service relating to a conveyance service request 15D, being a good delivery request. In this non-limiting example, a service provider 5D or a good supplier can employ an Autonomous Vehicle Automated Platform to utilize and optionally lease time on the remaining autonomous vehicle 3D through a central server 9 in conjunction with at least one external server 10D to perform a conveyance service, when a service provider 5D or good supplier has excess supply of autonomous vehicles 3 or a lack of conveyance service requests 15.

A service provider 5E can also be perceived or referred to as a fleet manager and as a result, a service provider 5E or fleet manager has optimized vehicle utilization with great efficiency over time and is also a logistics provider. A service provider 5E or a fleet manager can perform a ride-hail request and optionally a food delivery request because a service provider 5E or a fleet manager can operate in both the ride-hail industry segment and the food delivery industry segment because a service provider 5E or fleet manager operates on a service provider's 5C network.

A service provider 5E or a fleet manager is also a logistics provider and can provide logistics capabilities to a service provider 5B for a fee. A service provider 5E or a logistics provider can provide logistics capabilities to a service provider 5C in exchange for operating or controlling an autonomous vehicle 3C and performing a conveyance service request 15C, being the ride-hail request associated with an external server 10C on service provider's 5C network. In this non-limiting example, a service provider 5E or a fleet manager does not have their own conveyance network of autonomous vehicles 3 or conveyance service requests 15 and can employ an Autonomous Vehicle Automated Platform to access and utilize service provider's 5C network to perform a conveyance service request 15C relating to the ride-hail request. In this non-limiting example, a service provider 5B and a service provider 5C can employ an Autonomous Vehicle Automated Platform to access and utilize service provider's 5E logistics capabilities to perform conveyance services.

At least one application 6, at least one owner or controller application 11, at least one central server 9, at least one external server 10, at least one terminal 7, at least one link, at least one autonomous vehicle 3, or a combination thereof, can be combined or integrated.

All publications, including patent documents and scientific articles, referred to in this application and the bibliography and attachments are incorporated by reference in their entirety for all purposes to the same extent as if each individual publication were individually incorporated by reference.

All headings and titles are for the convenience of the reader and should not be used to limit the meaning of the text that follows the heading, unless so specified. When the singular is referred to, the plural is also included; and when the plural is referred to the singular is also included.

What is claimed is:

1. A network for securing conveyance services for a conveyance client by at least one autonomous vehicle (AV) operated by an owner/controller and in communication with the network, wherein the conveyance client has a conveyance client device in communication with the network, the network comprising:
   at least one external server in communication with the network, the at least one external server associated with a business entity that provides goods or services, the at least one external server comprising a substantially real time source of conveyance service requests for the conveyance client and conveyance data, at least a portion of the conveyance data comprising autonomous vehicle (AV)-related data relating to the at least one AV;
   at least one central server in communication with the network, wherein the at least one central server is automated in whole or in part and configured for repeatedly receiving the conveyance service requests and the AV-related data from the at least one external server and for performing one or more of standardizing and aggregating one or a combination of the conveyance service requests and the AV-related data;
   at least one autonomous vehicle (AV) application associated with the at least one AV, the at least one AV application configured for communicating one or a combination of geographical location data and the AV-related data, to the network;
   at least one owner/controller application in communication with the network, the at least one owner/controller application configured for entry by the owner/controller of one or more owner/controller-selected preference;
   wherein the at least one central server is further configured to process the conveyance service requests comprising conveyance data corresponding to at least one feature of the conveyance service requests, the geographical location data, the one or more owner/controller-selected preference, and the AV data, and wherein the at least one central server is further configured to repeat the steps of, until halted by the owner/controller or the business entity:
   (a) filtering, in any order:
      (i) at least a portion of the conveyance service requests by using one or a combination of the one or more owner/controller-selected preference and the geographical location data to identify a filtered subset of conveyance service requests; and
      (ii) at least a portion of the AV-related data by using one or a combination of the one or more owner/controller-selected preference and the geographical location data to identify a filtered subset of AV-related data;
   (b) identifying one or more matches between the filtered subset of conveyance service requests and the filtered subset of AV-related data based on one or a combination of the one or more owner/controller-selected preference and the geographical location data;
   (c) securing the one or more matches by communicating one or more of the one or more matches and conveyance service instructions to the at least one AV to cause the at least one AV to provide one or more conveyance services for the conveyance client.

2. The network of claim 1, wherein at least one function of the at least one central server and the at least one external server is performed by one or more of the at least one AV application and the at least one owner/controller application.

3. The network of claim 1, wherein the at least one central server and the at least one autonomous vehicle are colocated.

4. The network of claim 1, wherein at least one function of the at least one AV application and the at least one owner or controller application is performed by one or more of the at least one central server and the at least one external server.

5. The network of claim 1, wherein the conveyance service requests are selected from requests for service comprising one or more of ride-hail, ride-share, car-share, peer-to-peer conveyance, transportation, person delivery, taxi, shuttle, good delivery, item delivery, medical service and delivery, food delivery, courier delivery, freight delivery, and animal delivery.

6. The network of claim 1, wherein conveyance data comprises at least one of data type selected from beginning service geographical location, ending service geographical location, pricing information, elevated pricing information, the one or more owner/controller-selected preference, distance parameter, estimated time of arrival, time to destination, conveyance client geographical location, conveyance client review, conveyance client rating, conveyance client detail, conveyance service detail, conveyance service route, preferred conveyance client, sensor data, representative geographical location, representative review, representative rating, representative detail, autonomous vehicle geographical location, autonomous vehicle review, autonomous vehicle rating, autonomous vehicle detail, preferred autonomous vehicle, route planning preference, fuel economy preference, battery longevity preference, vehicle capacity preference, vehicle diagnostic preference, conveyance data preference, service provider geographical location, service provider review, service provider rating, service provider detail, preferred service provider, good supplier geographical location, the business entity geographical location, good supplier review, good supplier rating, good supplier detail, preferred good supplier, owner/controller geographical location, owner/controller review, owner/controller rating, owner/controller detail, preferred owner/controller, fleet manager geographical location, fleet manager review, fleet manager rating, fleet manager detail, preferred fleet manager, logistics provider geographical location, logistics provider review, logistics provider rating, logistics provider detail, preferred logistics provider, logistics supplier geographical location, logistics supplier review, logistics supplier rating, logistics supplier detail, preferred logistics supplier, conveyance industry segment detail, preferred conveyance industry segment, business entity detail, good detail, item detail, type of vehicle detail, vehicle detail, statistical variable measurement, level of service detail, fuel consumption, battery level, vehicle diagnostic, and vehicle capacity.

7. The network of claim 1, wherein at least one different geographical location is used other than the geographical location data when filtering one or a combination of the conveyance service requests and the AV-related data.

8. The network of claim 1, wherein the filtered subset of conveyance service requests comprises one or more pre-filtered conveyance service requests.

9. The network of claim 1, wherein the at least one AV comprises one or more vehicle selected from a car, an automobile, a van, a delivery van, a delivery vehicle, a last mile delivery vehicle, a vehicle with a locker, a vehicle with a storage unit, a vehicle with a compartment, a RV, a truck, a delivery truck, a semi-trailer truck, a shuttle, a helicopter, a boat, a vessel, an aircraft, a spacecraft, a bus, a train, a wagon, a rickshaw, a scooter, a bike, a moped, a trike, an all-terrain vehicle, an eighteen wheeler, a transportation machine, a drone, a medical vehicle, and a partially autonomous vehicle.

10. The network of claim 1, wherein the one or more owner/controller-selected preference comprises one or more service characteristic selected from pricing, elevated pricing, geographical location, distance, route, service duration, beginning service geographical location, ending service geographical location, time, predictive, historical, efficiency, sensor, event, traffic traffic-based, road condition, weather condition, transportation, route planning, fuel economy, battery longevity, vehicle capacity, vehicle diagnostic, conveyance data, duration of conveyance service, conveyance service request density, conveyance client density, conveyance client detail, conveyance client rating, representative density, autonomous vehicle density, service provider, service provider density, level of service, good supplier, good supplier density, owner/controller detail, owner/controller density, fleet manager, business entity, fleet manager density, logistics provider, logistics provider density, logistics supplier, logistics supplier density, good detail, conveyance industry segment, freight, waypoint, delivery service, and oldest outstanding request.

11. The network of claim 1, the one or more matches comprise a plurality of matches that are secured concurrently.

12. The network of claim 1, wherein the one owner/controller comprises one or more of a service provider, a good supplier, a fleet manager, a freight provider, a logistics provider, a logistics supplier, and an individual person.

13. The network of claim 1, wherein one or more of the conveyance service requests, the one or more matches, the AV-related data, the one or more owner/controller-selected preference, and the geographical location data is identified or updated in substantially real time as the geographical location of the at least one AV updates or changes or as traffic information updates or changes.

14. The network of claim 1, wherein the one or more matches comprises one or more of an object and a person.

15. The network of claim 1, wherein at least one representative provides or performs all or some of the conveyance service in conjunction with the at least one AV.

16. The network of claim 1, wherein the owner/controller secures the one or more matches using one or more of the at least one central server, the at least one external server, the at least one AV application, and the at least one owner or controller application.

17. The network of claim 1, wherein one or more of the at least one central server, the at least one AV application, and the at least one owner or controller application, secures the one or more matches.

18. The network of claim 1, wherein one or more of the at least one AV application, the at least one owner/controller application, the at least one AV, the at least one central server, and the at least one external server is combined or integrated.

19. The network of claim 1, wherein the business entity comprises one or more of a business, an entity that provides goods or services, an entity that conveys goods or services, an entity that produces or supplies freight, a freight provider, a service provider, a good supplier, a fleet manager, a logistics provider, a logistics supplier, a map provider, a third party, a courier, a person, and the owner/controller.

20. The network of claim 1, wherein the at least one external server comprises a plurality of external servers, and wherein a first business entity is associated with a first external server and a second business entity is associated with a second external server.

21. The network of claim 1, wherein the at least one external server comprises a plurality of external servers, and wherein each external server is associated with a different business entity.

22. The network of claim 1, wherein the one or more owner/controller-selected preference is stored or cached on one or more of the at least one AV application, the at least one owner/controller application, the at least one central server, and the at least one external server.

23. The network of claim 1, wherein the geographical location data comprises one or more of a coordinate, a position, a point of reference, a point of interest, a point in time, a geographical location of interest, a perspective, a geographical location of one or more of the business entity, a representative, a conveyance client, an autonomous vehicle, the owner/controller, a machine, an entity, a service provider, a good supplier, a freight provider, a brick and mortar, an object, a person, freight, a static location, a beginning service location, an ending service location, a waypoint, a past location, a future location, and an estimated location.

24. The network of claim 1, wherein the at least one central server utilizes machine learning technology to execute one or more of steps (a), (b) and (c).

25. The network of claim 1, wherein the conveyance service requests comprise one or more pre-filtered conveyance service requests.

26. The network of claim 25, wherein at least one of the group consisting of the conveyance service requests, the one or more pre-filtered conveyance service requests, and the AV-related data is structured in at least one different format, wherein the at least one central server is further configured to standardize or convert the at least one group into at least one uniform format.

27. The network of claim 25, wherein one or a combination of the conveyance service requests, the one or more pre-filtered conveyance service requests, and the AV-related data is pre-structured in at least one uniform format prior to being transmitted by the at least one external server.

28. The network of claim 25, wherein one or more of the at least one AV application and the at least one owner/ controller application retrieves one or a combination of the conveyance service requests, the one or more pre-filtered conveyance service requests, and the AV-related data from the at least one external server.

29. The network of claim 25, wherein one or a combination of the conveyance service requests, the one or more pre-filtered conveyance service requests, the AV-related data, and the geographical data is sourced or provided by the at least one external server.

30. The network of claim 29, wherein the at least one external server is operated, controlled, or managed by the business entity.

31. The network of claim 1, wherein the conveyance service requests are filtered to identify the filtered subset of conveyance service requests by at least one or more of the processes of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, and comparing.

32. The network of claim 31, wherein a weighted average of the one or more owner/controller-selected preference is used to identify the one or more matches between the filtered subset of conveyance service requests and the filtered subset of AV-related data.

33. The network of claim 1, wherein the AV-related data is filtered to identify the filtered subset of AV-related data by at least one of the processes of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, and comparing.

34. The network of claim 33, wherein at least one weighted average of the one or more owner/controller-selected preference is used to identify the one or more matches between the filtered subset of conveyance service requests and the filtered subset of AV-related data.

35. The network of claim 1, wherein the at least one central server is further configured to communicate the one or more matches to the at least one owner/controller, and wherein the owner/controller uses the at least one owner/controller application or the at least one AV application to secure the one or more matches.

36. The network of claim 35, wherein the owner/controller accepts or declines the one or more matches.

37. The network of claim 36, wherein said the owner/controller of the at least one AV declines the one or more matches and in response thereto, the at least one central server identifies one or more different matches.

38. The network of claim 1, wherein the one or more matches relating to the one or more owner/controller-selected preference is identified from one or more of the filtered subset of conveyance service requests and the filtered subset of AV-related data by processing using one or more of a sorting algorithm, a selection algorithm, a search algorithm, a merge algorithm, a maximum function, a minimum function, a graph algorithm, a graph search algorithm, a tree algorithm, a tree search algorithm, a matrix calculation, a matrix algorithm, and a comparison.

39. The network of claim 38, wherein at least one weighted average of the one or more owner/controller-selected preference is used to identify the one or more matches between the filtered subset of conveyance service requests and the filtered subset of AV-related data.

40. The network of claim 1, wherein the at least one central server is further configured to repeatedly receive and process Previously presented or updated conveyance service requests and Previously presented or updated AV-related data to secure additional matches.

41. The network of claim 40, wherein the additional matches are secured in a different conveyance industry segment.

42. The network of claim 40, wherein the additional matches are secured in a similar conveyance industry segment.

43. The network of claim 40, wherein the additional matches are secured and the at least one central server is further configured to generate an updated order in which the conveyance services are to be performed.

44. The network of claim 40, wherein the additional matches are secured and an updated route is identified.

45. A method for securing conveyance services for a conveyance client by at least one autonomous vehicle (AV) operated by an owner/controller and in communication with the network, the conveyance client having a conveyance client device in communication within the network, the method comprising:
(a) receiving at at least one central server in communication with the network in substantially real time, in any order:
(i) conveyance service requests and AV-related data from at least one external server associated with a business entity that provides goods or services, the conveyance service requests comprising conveyance data corresponding to at least one feature of the conveyance service requests, wherein, the at least one external server comprises one or more of a substantially real time source of the conveyance service requests and a substantially real time source of conveyance data, at least a portion of the conveyance data comprising autonomous vehicle (AV)-related data relating to the at least one AV;
(ii) geographical location data; and
(iii) one or more owner/controller-selected preference entered by the owner/controller;
(b) filtering, in any order, the conveyance service requests and the AV-related data to:
(i) identify a filtered subset of conveyance service requests using one or a combination of the one or more owner/controller-selected preference and the geographical location data; and
(ii) identity a filtered subset of AV-related data using one or a combination of the one or more owner/controller-selected preference and the geographical location data;
(c) identifying one or more matches between the filtered subset of conveyance service requests and the filtered subset of AV-related data based on one or a combination of the one or more owner/controller-selected preference and the geographical location data; and
(d) securing the one or more matches by communicating conveyance service instructions to the at least one AV to cause the at least one AV to provide one or more conveyance services for the conveyance client;
wherein the at least one central server is automated in part and configured to repeat steps (a) (d) until halted by the owner/controller or the business entity.

46. The method of claim 45, wherein the one or more owner/controller-selected preference is stored or cached on one or more of at least one AV application, at least one owner/controller application, the at least one central server, and the at least one external server.

47. The method of claim 45, wherein one or more of the one or more owner/controller-selected preference, the geographical location data, and the AV-related data is transmitted to the at least one central server at any time prior to filtering the conveyance service requests or the AV-related data.

48. The method of claim 45, wherein at least one different geographical location is used other than the geographical location data when filtering one or a combination of the conveyance service requests and the AV conveyance.

49. The method of claim 45, wherein the one or more matches comprise a plurality of matches that are secured or obtained concurrently.

50. The method of claim 45, wherein the owner/controller comprises one or more of an entity that provides goods or services, an entity that conveys goods or services, a service provider, a good supplier, a fleet manager, a freight provider, a logistics provider, a logistics supplier, and an individual person.

51. The method of claim 45, wherein one or more of the conveyance service requests, the one or more matches, additional matches, and the AV-related data is filtered and identified in any order prior to securing the one or more matches.

52. The method of claim 45, wherein at least one function of the at least one central server and the at least one external server is performed by one or more of at least one AV application and at least one owner/controller application.

53. The method of claim 45, wherein the filtered subset of conveyance service requests comprises one or more pre-filtered conveyance service request.

54. The method of claim 45, wherein the one or more matches comprises one or more of an object, freight, a package, and a person.

55. The method of claim 45, wherein one or more of the conveyance service requests, the one or more matches, additional matches, the AV-related data, the one or more owner/controller-selected preference, and the geographical location data is identified or updated in substantially real time as the geographical location of the at least one autonomous vehicle updates or changes or as traffic information updates or changes.

56. The method of claim 45, wherein at least one function of at least one AV application and at least one owner/controller application is performed by one or more of the at least one central server and the at least one external server.

57. The method of claim 45, wherein at least one representative provides or performs all or some of the conveyance service in conjunction with the at least one autonomous vehicle.

58. The method of claim 45, wherein the owner/controller secures the one or more matches using one or more of the at least one central server, the at least one external server, at least one AV application, and at least one owner/controller application.

59. The method of claim 45, wherein one or more of the at least one central server, the at least one external server, at least one AV application, and at least one owner/controller application secures the one or more matches.

60. The method of claim 45, wherein the at least one central server and the at least one autonomous vehicle are colocated.

61. The method of claim 45, wherein one or more of at least one AV application, at least one owner/controller application, the at least one AV, the at least one central server, the conveyance client device, and the at least one external server is combined or integrated.

62. The method of claim 45, wherein the at least one central server utilizes machine learning technology to execute one or more of steps (b) and (c).

63. The method of claim 45, wherein the conveyance service requests are filtered to identify the filtered subset of conveyance service requests by one or more process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, and comparing.

64. The method of claim 63, wherein the filtering and identifying in step (b) and step (c) are executed by at least one AV application.

65. The method of claim 63, wherein the filtering and identifying in step (b) and step (c) are executed by at least one owner/controller application.

66. The method of claim 45, the AV-related data are filtered to identify the filtered subset of AV-related data by one or more process of categorizing, filtering, characterizing, screening, selecting, separating, identifying, specifying, distinguishing, naming, numbering, ordering, systematizing, tagging, labeling, recognizing, arranging, bracketing, ranking, organizing, classifying, segregating, isolating, grouping, and comparing.

67. The method of claim 66, wherein the filtering and identifying in step (b) and step (c) are executed by at least one AV application.

68. The method of claim 66, wherein the filtering and identifying in step (b) and step c) are executed by at least one owner/controller application.

69. The method of claim 45, the one or more matches relating to the one or more owner/controller-selected preference is identified from one or more of the filtered subset of conveyance service requests and the filtered subset of AV-related data by processing using one or more of a sorting algorithm, a selection algorithm, a search algorithm, a merge algorithm, a maximum function, a minimum function, a graph algorithm, a graph search algorithm, a tree algorithm, a tree search algorithm, a matrix calculation, a matrix algorithm, and a comparison.

70. The method of claim 69, wherein at least one weighted average of the one or more owner/controller-selected preference is used to identify the one or more matches between the filtered subset of conveyance service requests and the filtered subset of AV-related data.

71. The method of claim 69, wherein the identifying in step (c) is executed by at least one AV application.

72. The method of claim 69, wherein the identifying in step (c) is executed by at least one owner/controller application.

73. The method of claim 45, wherein the conveyance service requests comprise one or more pre-filtered conveyance service requests.

74. The method of claim 73, wherein at least one of the group consisting of the conveyance service requests, the one or more pre-filtered conveyance service requests, and the AV-related data is structured in a different format, wherein the at least one central server is further configured to standardize or convert the group to a uniform format.

75. The method of claim 73, wherein one or a combination of the conveyance service requests, the one or more pre-filtered conveyance service requests, and the AV-related data is structured in a uniform format prior to being transmitted from the at least one external server.

76. The method of claim 73, wherein the at least one central server performs one or more of standardizing and aggregating one or a combination of the conveyance service requests, the one or more pre-filtered conveyance service requests, and the AV-related data.

77. The method of claim 73, wherein one or more of at least one AV application and at least one owner/controller application retrieves one or a combination of the conveyance service requests, the one or more pre-filtered conveyance service requests, and the AV-related data from the at least one external server.

78. The method of claim 45, wherein the at least one central server is further configured to communicate the one or more matches to the owner/controller, and wherein the owner/controller uses at least one owner/controller application or at least one AV application to secure the one or more matches.

79. The method of claim 78, wherein the owner/controller accepts or declines the one or more matches.

80. The method of claim 79, wherein the owner/controller declines the one or more matches and in response thereto, the at least one central server identifies one or more different matches.

\* \* \* \* \*